United States Patent
Al-Shameri

(10) Patent No.: US 8,145,677 B2
(45) Date of Patent: Mar. 27, 2012

(54) AUTOMATED GENERATION OF METADATA FOR MINING IMAGE AND TEXT DATA

(76) Inventor: Faleh Jassem Al-Shameri, Falls Church, VA (US)

( * ) Notice: Subject to any disclaimer, the term of this patent is extended or adjusted under 35 U.S.C. 154(b) by 2 days.

(21) Appl. No.: 12/057,359

(22) Filed: Mar. 27, 2008

(65) Prior Publication Data
US 2010/0223276 A1    Sep. 2, 2010

Related U.S. Application Data

(60) Provisional application No. 60/908,349, filed on Mar. 27, 2007.

(51) Int. Cl.
*G06F 17/30* (2006.01)
(52) U.S. Cl. .................................. 707/802
(58) Field of Classification Search .............. 707/802, 707/803
See application file for complete search history.

(56) References Cited

U.S. PATENT DOCUMENTS 7,155,033 B1 * 12/2006 Naveen et al. ............... 382/108
7,469,240 B2 * 12/2008 Tsukamoto ................... 706/48

FOREIGN PATENT DOCUMENTS

WO    WO2009026965    *    3/2009

OTHER PUBLICATIONS

Lewicki, S. et al., Multi-Angle Imaging Spectro-Radiometer, JPL D-13963, Revision K, Data Products Specifications, Jet Propulsion Laboratory, California Institute of Technology, Dec. 12, 2003.
Ester, M. et al., Spatial Data Mining: A Database Approach, Proc. of the Fifth Int. Symposium on Large Spatial Databases (SSD '97), Berlin, Germany, Lecture Notes in Computer Science, Springer, 1997.
Montes-Y-Gomez, M. et al., Text Mining With Conceptual Graphs, 0-7803-7087-2/01, IEEE, 2001.
Foltz, P. et al., Personalized Information Delivery: An Analysis of Information Filtering Methods, "Communications of the ACM," Dec. 1992, vol. 35, No. 12, pp. 51-60.
Fayyad, U. et al., From Data Mining to Knowledge Discovery in Databases, "AI Magazine," American Association for Artificial Intelligence, 0738-4602-1996, Fall 1996, pp. 37-54.
Ester, M. et al., Spatial Data Mining: Database Primitives, Algorithms and Efficient DBMS Support, "Integration of Data Mining with Database Technology," Data Mining and Knowledge Discovery, an International Journal, Kluwer Academic Publishers, 1999.
Dhillon, I. et al., Efficient Clustering of Very Large Document Collections, Chapter 1, pp. 1-25.

(Continued)

*Primary Examiner* — Cheryl Lewis
(74) *Attorney, Agent, or Firm* — Lowe Hauptman Ham & Berner, LLP

(57) ABSTRACT

A tangible computer readable medium encoded with instructions for automatically generating metadata, wherein said execution of said instructions by one or more processors causes said "one or more processors" to perform the steps comprising: a. creating at least one feature vector for each document in a dataset; b. extracting said one feature vector; c. recording said feature vector as a digital object; and d. augmenting metadata using said digital object to reduce the volume of said dataset, said augmenting capable of allowing a user to perform a search on said dataset.

22 Claims, 95 Drawing Sheets

OTHER PUBLICATIONS

Chen, M., et al., Data Mining: An Overview from a Database Perspective, "IEEE Transactions on Knowledge and Data Engineering," vol. 8, No. 6, Dec. 1996, pp. 866-883.
Dorre, J. et al., Text Mining: Finding Nuggets in Mountains of Textual Data, KDD-99, San Diego, CA, USA, 1-58113-143-7/99/08, ACM 1999, pp. 398-401.
Diner, D. et al., Multi-Angle Imaging Spectroradiometer (MISR) Instrument Description and Experiment Overview, "IEEE Transactions on Geoscience and Remote Sensing," vol. 36, No. 4, Jul. 1998, pp. 1072-1087.
Kafatos, M. et al., Information Technology Implementation for a Distributed Data System Serving Earth Scientists: Seasonal to Interannual ESIP.
Hemmer, M. et al., Data Mining in Chemistry, http://tnc2000.terena.org/proceedings/10B/10b5.html.
Yang, R. et al., An XML-Based Distributed Metadata Server (DIMES) Supporting Earth Science Metadata, Center for Earth Observing & Space Research, School of Computational Sciences, George Mason University, Fairfax, VA, USA.
Yang, R. et al., A Content-Based Search Method and Its Application for EOS Data, Center for Earth Observing & Space Research, School of Computational Sciences, George Mason University, Fairfax, VA, USA.
Yang, R. et al., Massive Data Sets Issues in Earth Observing, "Handbook for Massive Data Sets," J. Abello et al. (eds.), Chapter 29, Kluwer Academic Publishers, Netherlands, 2002, pp. 1099-1140.
Sheikholeslami, G. et al., Geographical Image Classification and Retrieval, GIS 97, Las Vegas, NV, USA, pp. 58-61.
Martinez, A. et al., Encoding of Text to Preserve "Meaning", George Mason University.
Pierre, J., Mining Knowledge from Text Collection Using Automatically Generated Metadata, Interwoven, Inc., San Francisco, CA, USA.
Cannataro, M. et al., Integrating Ontology and Workflow in Proteus, A Grid-Based Problem Solving Environment for Bioinformatics, Proceedings of the International Conference on Information Technology: Coding and Computing (ITCC '04), IEEE.
Haralick, R., Statistical and Structural Approaches to Textures, Proceedings of the IEEE, vol. 676, No. 5, May 1979.
Hall-Beyer, M., The Grey Level Co-Occurrence Matrix, GLCM (Also called the Grey Tone Spatial Depeendency Matrix, http://www.fp.ucalgary.ca/mhallbey/the_glcm.htm.
Grossman, R., A Dataspace Infrastructure for Astronomical Data, draft paper, "Data Mining for Scientific and Engineering Applications," Kluwer Academic Publishers, 2001, pp. 115-123.
Marusic, I., Real Time Feature Extraction for the Analysis of Turbulent Flows.
Ng, R. et al., Efficient and Effective Clustering Methods for Spatial Data Mining, Proceedings of the 20th VLDB Conference, Santiago, Chile, 1994, pp. 144-155.
Green, B., Canny Edge Detection Tutorial, 2002.
Ester, M. et al., Algorithms and Applications for Spatial Data Mining,"Geographic Data Mining and Knowledge Discovery, Research Monographs in GIS," Taylor and Francis, 2001, pp. 1-32.
Berry, M. et al., Using Linear Algebra for Intelligent Information Retrieval, "SIAM Review," vol. 37, No. 4, Dec. 1995, pp. 573-595.
Berry, M. et al., Matrices, Vector Spaces and Information Retrieval, "SIAM Review," vol. 41, No. 2, Jun. 1999, pp. 335-362.
Ali, M. et al., Using the Canny Edge Detector for Feature Extraction and Enhancement of Remote Sensing Images, 0-7803-7031-7/01, IEEE 2001.
Aria, E. et al., Generalized Cooccurrence Matrix to Classify IRS-ID Images Using Neural Network.
Baraldi, A. et al., An Investigation of the Textural Characteristics Associated with Gray Level Cooccurrence Matrix Statistical Parameters, "IEEE Transactions on Geoscience and Remote Sensing," vol. 33, No. 2, Mar. 1995, pp. 293-304.
Kuan, J. et al., Complex Texture Classification with Edge Information.
Pantel, P., Discovering Word Senses from Text. SIGKDD '02, Jul. 23-26, 2002, 1-58113-567-X/02/0007, ACM, 2002.
Kim, K. et al., Feature Extraction of Edge by Directional Computation of Gray-Scale Variation, Proceedings of the 14th International Conference on Pattern Recognition, 1998, vol. 2, pp. 1022-1027.
Wegman, E. et al., Visual Data Mining, "Statistics in Medicine," Statist. Med. 2003; 22: 1383-1397 (DOI 10/1002/sim. 1502).
Rasmussen, M. et al., Gluto—An Interactive Clustering, Visualization and Analysis System, CSE/UMN Technical Report, TR# 04-021.
Zhao, Y. et al., Evaluation of Hierarchical Clustering Algorithms for Document Datasets, Department of Computer Science, University of Minnesota, Minneapolis, MN 55455, Technical Report #02-022.
Zhao, Y. et al., Criterion Functions for Document Clustering Experiments and Analysis, University of Minnesota, Department of Computer Science/Army HPC Research Center, Technical Report #01-40.
Lee, K. et al., Urban Fixture Characterization Using High-Resolution Satellite Imagery: Texture Analysis Approach, http://www.geospatialworld.net/index.php?view=article&catid=89%3Atechnology-image-....
Koperski, K. et al., Discovery of Spatial Association Rules in Geographic Information Databases, School of Computing Science, Simon Fraser University, Buraby, BC, Canada.
Koperski, K. et al. An Efficient Two-Step Method for Classification of Spatial Data, School of Computing Science, Simon Fraser University, Buraby, BC, Canada.
Wong, P. et al., Visualizing Association Rules for Text Mining, Pacific Northwest National Laboratory.
The TDT Pilot Study Corpus Documentation, version 1.3, Oct. 22, 1997.
The Topic Detection and Tracking (TDT) Pilot Study Evaluation Plan, version. 2.8, Oct. 22, 1997.
A Guide to Statistical Software, http://www.galaxy.gmu.edu/papers, astr1.html.
Solka, J. et al., Text Data Mining with Minimal Spanning Trees, DSWCDD, Dahlgren, VA, and Department of Applied and Engineering Sciences, George Mason University, Fairfax, VA.
Tang, J. et al., Prototype of a Value-Range Query Technique on Earth Sciences Data, Center for Earth Observing and Space Research, School of Computational Sciences, George Mason University, Fairfax, VA.
Martinez, A. et al., A Text Stream Transformation for Semantic-Based Clustering, George Mason University.
Shekhar, S. et al., Data Mining for Selective Visualization of Large Spatial Datasets, Proceedings of the 14th IEEE International Conference on Tools with Artifical Intelligence (ICTAI '02), 1082-3409/02, IEEE, 2002.
Palacio, M et al., Graph-Based Knowledge Representation for GIS Data, Universidad de las Americas-Puebla and Instituto Nacional de Astrofisica Optica y Electronica, Puebla, Mexico.
Granzow, E., Automatic Feature Recognition and Extraction from Remote Sensing Imagery, "Technical Notes," Issue 5, Nov. 2001, US Department of Transportation, National Consortia on Remote Sensing in Transportation, National Consortium for Safety, Hazards, and Disaster Assessment of Transportation Lifelines.
Palmason, J. et al., Morphological Transformations and Feature Extraction for Urban Data with High Spectral and Spatial Resolution, 0-7803-7929-2/03, IEEE, 2003.
Sudibjo, E. et al., Digital Enhancement of Star-1 SAR Imagery for Linear Feature Extraction, Aeroscience and Remote Sensing Symposium, 1989, IGARSS '89 12th Canadian Symposium on Remote Sensing, 1989 International, vol. 4, pp. 2242-2245.
Cappellini, V. et al., Circular Geological Features Detection in Remote Sensing Multispectral Images, IEEE Xplore(R). Release 2.1.
Alshameri, F., Automated Generation of Metadata for Mining Image and Text Data, Power Point Presentation.

* cited by examiner

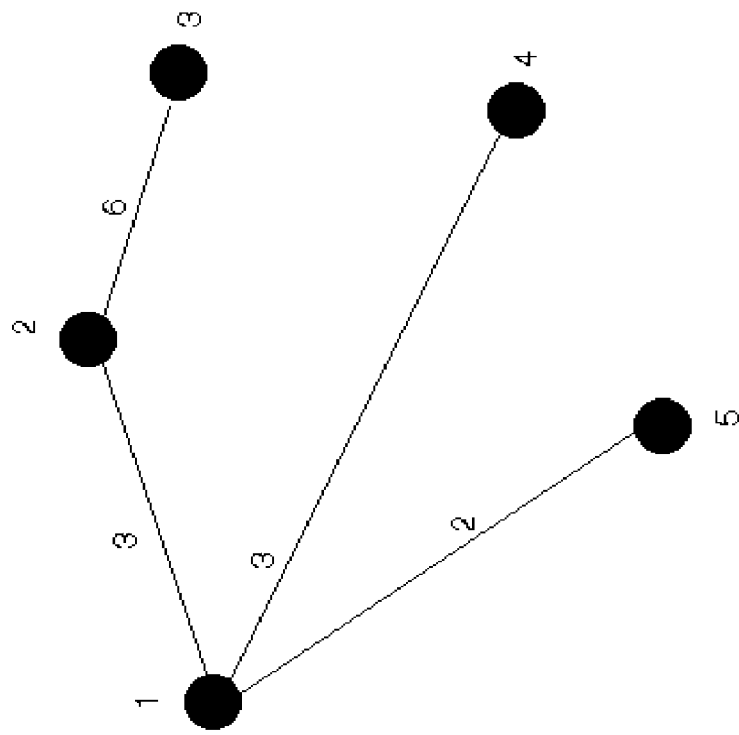
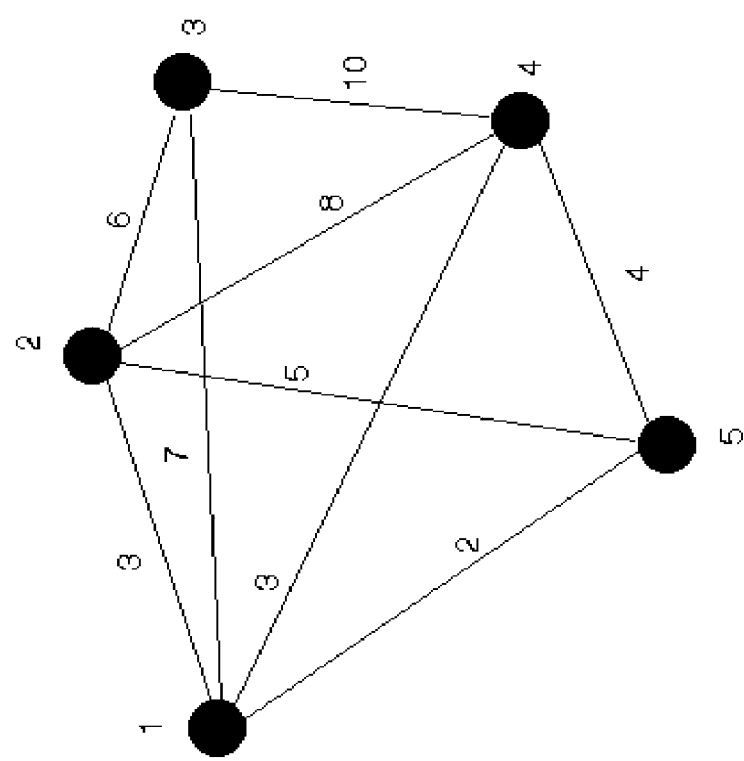
FIG. 58

```
Matrix Information ------------------------------------------
  Name: MajprCorpus.clute.mat.txt, #Rows: 15863, #Columns: 236347, #NonZeros: 3304555

Options ------------------------------------------------------
  CLMethod=RB, CRfun=I2, SimFun=Cosine, #Clusters: 25
  RowModel=None, ColModel=IDF, GrModel=SY-DIR, NNbrs=40
  ColPrune=1.00, EdgePrune=-1.00, VtxPrune=-1.00, MinComponent=5
  CSType=Best, AggloFrom=0, AggloCRfun=I2, NTrials=10, NIter=10

Solution -----------------------------------------------------

25-way clustering: [I2=3.21e+003] (15863 of 15863)

cid    Size   ISim     ISdev    ESim     ESdev
  0     157  +0.142   +0.056   +0.008   +0.002
  1     323  +0.128   +0.044   +0.009   +0.003
  2     213  +0.106   +0.038   +0.008   +0.002
  3     257  +0.106   +0.031   +0.007   +0.002
  4     346  +0.099   +0.034   +0.009   +0.003
  5     214  +0.083   +0.031   +0.009   +0.003
  6    1136  +0.075   +0.024   +0.007   +0.002
  7     437  +0.073   +0.027   +0.009   +0.002
  8     944  +0.070   +0.029   +0.008   +0.003
  9     681  +0.068   +0.026   +0.007   +0.002
 10     317  +0.068   +0.025   +0.009   +0.003
 11     780  +0.056   +0.020   +0.009   +0.003
 12     535  +0.053   +0.021   +0.008   +0.002
 13     211  +0.052   +0.019   +0.008   +0.002
 14     295  +0.047   +0.019   +0.007   +0.002
 15     394  +0.046   +0.019   +0.008   +0.002
 16    1088  +0.043   +0.015   +0.009   +0.003
 17     613  +0.041   +0.013   +0.010   +0.003
 18     431  +0.036   +0.014   +0.006   +0.002
 19     579  +0.031   +0.013   +0.007   +0.002
 20     715  +0.027   +0.009   +0.007   +0.002
 21    1003  +0.019   +0.006   +0.008   +0.002
 22     941  +0.017   +0.005   +0.008   +0.002
 23    1559  +0.015   +0.004   +0.007   +0.002
 24    1788  +0.012   +0.003   +0.007   +0.003
```

Cluster1

North Korea's capitol poises to change gears accepting a new leader. There is still no official word on the final resting ground for President Kim Il Sung and rallies now turn the spotlight toward his chosen successor. CNN's Mike Chinoy reports. In the square that bares his name, the leaders and people of North Korea gathered for a final salute to President Kim Il Sung. The entire ruling hierarchy and tens of thousands of mourners, with hundreds of thousands of mourners more all across Pyongyang, witnessing the first dynastic transfer of power in a Communist state. Kim Jong Il, President Kim's son and heir, known for years as the Dear Leader, stood in silence. He did not speak during the ceremony, he barely moved, letting others praise for creating North Korea and leaving him behind to run it now. [through translator] By giving us the bright leader who would carry on your revolution the great heir and also the leader for the party and the people and also the Commander in Chief, Kim Jong Il, stands in front of us. After nearly two weeks of frenzied grief, the tone of this event was low-key, the rhetoric lavish in it's praise of the two Kims, but generally restrained, except on the question of South Korea, whose government refused to express condolences on Kim's death, instead denouncing the North Korean president as a was criminal. [through translator] The South Koreans do not even understand the basic morality or manners and they shouldn't take the absurd message of provoking us. Our armed forces are ready for any kind of provocation and we will not forgive anybody who would provoke us. To end the mass memorial, a fittingly militant salute from a country that leaves outsiders wondering what road it will now follow. Later, as part of the grand orchestration of events, at midday throughout North Korea, all activity came to a halt, while trains, buses and factories sounded their whistles and horns in memory of Kim Il Sung. The sound that filled the air could be interpreted as a nation in mourning, or that of, at least, a temporary sigh of relief, that for now, there appears to have been an orderly transition of power. Mike Chinoy, CNN, reporting.

Cluster1

For decades, there was nothing more certain in North Korea than continued leadership by Kim Il Sung. Today, adoring masses bid the late leader a final farewell. As CNN's Mike Chinoy reports, the passing of the torch, though it stays in the family, means an uncertain future for an unpredictable nation. In the square that bears his name, the leaders and people of North Korea gathered for a final salute to President Kim Il Sung. The entire ruling hierarchy, and tens of thousands of mourners with hundreds of thousands more all across Pyong Yang, witnessing the first dynastic transfer of power in a communist state. Kim Jong Il, President Kim's son and heir, known for years as 'the dear leader,' stood in silence. He did not speak during the ceremony, he barely moved, letting others praise his father for creating North Korea and leaving him behind to run it now. [via translator] By giving us the bright leader who would carry on your achievement in the past. And in front of our revolution, the great heir, and also the leader for the Party and the people, and also the commander-in-chief, Kim Jong Il stands in front of us. After nearly two weeks of frenzied grief, the tone of this event was low-key, the rhetoric lavish in its praise of the two Kims but generally restrained - except on the question of South Korea, whose government refuses to express condolences on Kim's death, instead, denouncing the North Korean president as a war criminal. [via translator] The South Koreans do not even understand the basic morality or manners, and they shouldn't take the absurd method of provoking us. Our armed forces are ready for any kind of provocation, and then we will not forgive anybody who would provoke us. To end the mass memorial, a fittingly militant salute from a country grown increasingly isolated in recent years, a country that leaves outsiders wondering what road it will now follow. Later, as part of the grand orchestration of events, at mid-day, throughout North Korea, all activity came to a halt, while trains, buses and factories sounded their whistles and horns in memory of Kim Il Sung. The sound that fills the air could be interpreted as a nation in mourning, or that of, at least, a temporary sigh of relief that, for now, there appears to have been an orderly transition of power. Mike Chinoy, CNN reporting

Intersects achiev, past
activ, halt
air, interpret
ani, provoc
anybodi, provok
appear, orderli
ar, readi
arm, forc
bare, move
basic, moral
bright, leader
buse, factori
carri, achiev
ceremoni, bare

FIG. 65

| | |
|---|---|
| 62 | yield |
| 3 | zap |
| 142 | zero |
| 19 | zip |
| 5 | zoom |

| | | | | |
|---|---|---|---|---|
| 100 | abandon | 5 | perish | |
| 3 | abase | 30 | prohibit | |
| 20 | abate | 137 | reject | |
| 9 | abdicate | 109 | reveal | |
| 3 | abduct | 6 | revere | |
| 4 | abhor | 37416 | said | |
| 8 | brake | 61 | salute | |
| 127 | branch | 42 | salve | |
| 2 | cauterize | 2 | sample | |
| 55 | cave | 153 | sand | |
| 2 | cavort | 117 | sang | |
| 158 | cease | 34 | sanitize | |
| 16 | cede | 2 | ... | |
| 175 | celebrate | 65 | tackle | |
| 8 | censor | 14 | tack | |
| 51 | discourage | 63 | tail | |
| 51 | discover | 2440 | taken | |
| ... | | 12822 | think | |
| 3248 | end | 1 | thin | |
| 49 | endure | ... | | |
| 12 | energize | 1422 | thought | |
| 137 | enforce | 22 | thread | |
| 208 | hope | 172 | threaten | |
| 14 | hospitaliz | 175 | threw | |
| 4 | host | 4 | thrived | |
| 243 | hug | 19 | thrive | |
| 29 | hull | ... | | |
| 36 | kiss | 5928 | want | |
| 66 | kneel | 162 | warm | |
| 69 | knelt | 137 | warn | |
| 9 | knew | 13 | warp | |
| ... | | 418 | warrant | |
| 2 | lumber | 45 | weaken | |
| 3 | misfire | 7 | wean | |
| 2 | misinform | | | |
| 105 | misinterpr | | | |
| 26 | pension | | | |
| 142 | perceive | | | |
| | perform | | | |

FIG. 66

| | | |
|---|---|---|
| abandon | drawn | seat |
| abuse | dream | seek |
| accept | drew | seen |
| account | drink | seize |
| achieve | drive | sell |
| act | driven | send |
| add | drop | sense |
| address | drove | sent |
| admit | dry | separate |
| advance | eat | serve |
| affect | elaborate | set |
| affiliate | eliminate | settle |
| afford | emphasize | shall |
| age | encourage | shape |
| agree | endeavor | share |
| aid | end | shell |
| aim | enforce | shelter |
| alarm | engage | shift |
| allow | enjoy | ... |
| ally | ensure | went |
| alternate | enter | wind |
| announce | escape | win |
| answer | escort | winter |
| appeal | ... | wire |
| appear | said | wish |
| apply | sample | withdraw |
| approach | sand | witness |
| approve | sank | wonder |
| argue | sat | won |
| arm | save | work |
| ... | saw | worry |
| divorce | say | worth |
| dock | scale | wound |
| dole | schedule | write |
| don | score | written |
| double | screen | wrote |
| doubt | seal | zero |
| draw | search | |

FIG. 67 bloody
TDTID000292,TDTID000312,TDTID000312,TDTID000312,TDTID000312,TDTID000333
clothing TDTID000292,TDTID000312,TDTID000333
presented
TDTID000292,TDTID000312,TDTID000333
murder TDTID000292,TDTID000312,TDTID000333
weapon TDTID000292,TDTID000312,TDTID000333
discovered
TDTID000292,TDTID000312,TDTID000312,TDTID000312,TDTID000333
shoes TDTID000292,TDTID000312,TDTID000333
nuclear
TDTID000564,TDTID008092,TDTID008498,TDTID008925,TDTID010926
program TDTID000564,TDTID008498,TDTID012445
pakistan TDTID000564,TDTID008925

FIG. 68 address Arab conscience TDTID0000049
Arafat told Arabic-speaking TDTID0000049
jobs said Khaled TDTID0000066
places work early TDTID0000205
bloody clothing presented
TDTID0000292; TDTID0000312; TDTID0000333
murder weapon discovered
TDTID0000292; TDTID0000312; TDTID0000333
bloody shoes discovered
TDTID0000292; TDTID0000312; TDTID0000333
trade proposal comments TDTID0000330
nuclear program Pakistan TDTID0000564
plans strike ignored TDTID0001262
camps old leaders TDTID0001522
people camps h

Automated Generation of Metadata for Mining Image and Text Data

[Image Features]    [Text Features]

FIG. 70

Images in Search Range

Number of images in search: 268

| Image name | Homogeneity | Contrast | Dissimilarity | Entropy | ASM | Energy | Histogram Contrast |
|---|---|---|---|---|---|---|---|
| image_52.jpg | 0.3334 | 50.4703 | 4.521 | 7.6523 | 0.0041 | 0.0638 | 0.286 |
| image_56.jpg | 0.4138 | 87.8478 | 5.1312 | 6.8236 | 0.0084 | 0.0919 | 0.315 |
| image_62.jpg | 0.3545 | 50.56 | 4.3623 | 7.3273 | 0.0057 | 0.0754 | 0.205 |
| image_63.jpg | 0.3299 | 73.2101 | 5.1307 | 7.2077 | 0.0041 | 0.0638 | -0.139 |
| image_77.jpg | 0.246 | 132.771 | 7.6291 | 7.8463 | 0.0016 | 0.0401 | 0.158 |
| image_78.jpg | 0.3454 | 62.5746 | 4.5898 | 7.5948 | 0.0022 | 0.0474 | 0.122 |
| image_79.jpg | 0.2696 | 61.8752 | 5.018 | 7.9261 | 0.0009 | 0.03 | 0.112 |
| image_83.jpg | 0.3553 | 63.6943 | 4.6702 | 7.0516 | 0.0059 | 0.0769 | 0.732 |
| image_96.jpg | 0.3309 | 51.5704 | 4.4211 | 7.4233 | 0.0022 | 0.0472 | -0.174 |
| image_105.jpg | 0.2571 | 127.476 | 7.3313 | 7.7985 | 0.0016 | 0.04 | -0.368 |
| image_106.jpg | 0.2432 | 112.7 | 7.0908 | 7.8604 | 0.0018 | 0.0426 | -0.283 |
| image_107.jpg | 0.2562 | 121.214 | 7.1896 | 7.7749 | 0.0022 | 0.0471 | -0.144 |
| image_108.jpg | 0.2788 | 113.971 | 6.8144 | 7.6235 | 0.0028 | 0.0526 | -0.096 |
| image_109.jpg | 0.2899 | 142.527 | 7.4082 | 7.658 | 0.0026 | 0.0513 | -0.336 |
| image_111.jpg | 0.2374 | 89.8962 | 6.3111 | 7.923 | 0.0011 | 0.0338 | -0.402 |
| image_116.jpg | 0.2261 | 55.203 | 5.093 | 7.9947 | 0.0005 | 0.0216 | -0.145 |
| image_117.jpg | 0.2298 | 54.7018 | 5.1469 | 7.9055 | 0.0006 | 0.0239 | -0.388 |
| image_196.jpg | 0.2988 | 84.0213 | 5.7946 | 7.9256 | 0.0045 | 0.0668 | 0.448 |
| image_200.jpg | 0.375 | 149.644 | 6.7311 | 7.1421 | 0.0077 | 0.0879 | 0.66 |
| image_206.jpg | 0.3188 | 86.4769 | 5.6655 | 7.6563 | 0.0047 | 0.0689 | 0.423 |
| image_207.jpg | 0.2857 | 135.249 | 6.9315 | 7.6563 | 0.0026 | 0.0509 | 0.572 |

FIG. 74

Features Extraction of Image Data

| | From | To |
|---|---|---|
| Homogeneity | .04 | .8 |
| Contrast | 50 | 150 |
| Dissimilarity | 4 | 8 |
| Entropy | 5 | 8 |
| ASM | 0.0003 | .1 |
| Energy | 0.0003 | .1 |
| Contrast(Histogram_based) | -0.5 | 0.9 |
| AVI | 0.2 | 0.8 |
| NDVI | | |
| Vegetation | | |
| Mixture | | |
| Soil | | |
| Water | | | submit  Reset click on feature to see description.

Images in Search Range

Number of images in search: 36
Number of AVI hist in search: 43

| AVI Images | Homogeneity (Green) | Homogeneity (NIR) | Contrast (Green) | Contrast (NIR) | Dissimilarity (Green) | Dissimilarity (NIR) | Entropy (Green) | Entropy (NIR) | ASM (Green) | ASM (NIR) | Energy (Green) | Energy (NIR) | Histogram Contrast (Green) | Histogram Contrast (NIR) | AVI |
|---|---|---|---|---|---|---|---|---|---|---|---|---|---|---|---|
| AVI_62.html | 0.3188 | 0.2983 | 86.4769 | 110.97 | 5.6655 | 6.4386 | 7.6563 | 7.8764 | 0.0047 | 0.0034 | 0.0689 | 0.058 | 0.423 | 0.516 | 0.581 |
| AVI_101.html | 0.3335 | 0.3339 | 58.6866 | 81.0704 | 4.2832 | 5.0461 | 7.4956 | 7.7836 | 0.0033 | 0.0023 | 0.0596 | 0.0525 | 0.458 | 0.618 | 0.5838 |
| AVI_155.html | 0.3197 | 0.2708 | 69.8478 | 94.1456 | 4.7916 | 5.7952 | 7.5663 | 7.8007 | 0.0015 | 0.0013 | 0.0386 | 0.0356 | 0.65 | 0.485 | 0.4645 |
| AVI_212.html | 0.4719 | 0.4333 | 89.5972 | 95.5806 | 4.2263 | 4.7106 | 6.357 | 6.8236 | 0.0084 | 0.0069 | 0.0917 | 0.0833 | 0.892 | 0.781 | 0.5193 |
| AVI_216.html | 0.3447 | 0.3369 | 104.404 | 130.51 | 5.0908 | 5.6234 | 7.153 | 7.2534 | 0.0023 | 0.0021 | 0.0475 | 0.0461 | 0.816 | 0.877 | 0.5603 |
| AVI_217.html | 0.3339 | 0.3285 | 63.4419 | 74.1586 | 4.2769 | 4.6053 | 7.3297 | 7.5999 | 0.0015 | 0.0013 | 0.0383 | 0.0355 | 0.75 | 0.681 | 0.529 |
| AVI_233.html | 0.3371 | 0.3208 | 83.828 | 84.4931 | 5.1893 | 5.5397 | 7.3326 | 7.6496 | 0.0077 | 0.0068 | 0.0878 | 0.0823 | 0.67 | 0.644 | 0.5156 |

FIG. 80

Features Extraction of Image Data

| | From | To |
|---|---|---|
| Homogeneity | .04 | .8 |
| Contrast | 50 | 150 |
| Dissimilarity | 4 | 8 |
| Entropy | 5 | 8 |
| ASM | 0.0003 | .1 |
| Energy | 0.0003 | .1 |
| Contrast(Histogram_based) | -0.5 | 0.8 |
| AVI | 0.2 | 0.8 |
| NDVI | 0 | .9 |
| Vegetation | | |
| Mixture | | |
| Soil | | |
| Water | | |

[submit] [Reset]

click on feature to see description.

Images in Search Range

Number of images in search: 33
Number of AVI hist in search: 11
Number of NDVI hist in search: 11

| AVI Images | NDVI images | AVI | Vegetation | Homogeneity (Green) | Homogeneity (NIR) | Homogeneity (Red) | Contrast (Green) | Contrast (NIR) | Contrast (Red) | Dissimilarity (Green) | Dissimilarity (NIR) | Dissimilarity (Red) | Entropy (Green) | Entropy (NIR) | Entropy (Red) | ASM (Green) | ASM (NIR) | ASM (Red) | Energy (Green) |
|---|---|---|---|---|---|---|---|---|---|---|---|---|---|---|---|---|---|---|---|
| AVI_62.html | NDVI_62.html | 0.581 | 0 | 0.3188 | 0.2983 | 0.2979 | 86.4769 | 110.97 | 129.515 | 5.6655 | 6.4386 | 6.8164 | 7.6563 | 7.8764 | 7.7833 | 0.0047 | 0.0034 | 0.0045 | 0.0689 |
| AVI_101.html | NDVI_101.html | 0.5858 | 0 | 0.3835 | 0.3539 | 0.3458 | 58.6866 | 81.0704 | 111.096 | 4.2852 | 5.0461 | 5.7891 | 7.4956 | 7.7856 | 7.799 | 0.0035 | 0.0028 | 0.0029 | 0.0596 |
| AVI_156.html | NDVI_156.html | 0.4645 | 0 | 0.3197 | 0.2708 | 0.2588 | 69.2478 | 94.1456 | 142.887 | 4.7916 | 5.7952 | 6.7323 | 7.5663 | 7.8007 | 7.8742 | 0.0015 | 0.0013 | 0.0012 | 0.0386 |
| AVI_235.html | NDVI_235.html | 0.5156 | 0.0062 | 0.3571 | 0.3208 | 0.3185 | 83.828 | 84.4931 | 128.702 | 5.1893 | 5.5397 | 6.4661 | 7.3326 | 7.6486 | 7.5506 | 0.0077 | 0.0068 | 0.0071 | 0.0878 |
| AVI_237.html | NDVI_237.html | 0.5396 | 0 | 0.4467 | 0.4182 | 0.4044 | 61.0641 | 75.1871 | 104.917 | 4.2655 | 4.7772 | 5.6257 | 7.3695 | 7.6934 | 7.7106 | 0.0051 | 0.003 | 0.0035 | 0.0713 |
| AVI_444.html | NDVI_444.html | 0.4559 | 0 | 0.3327 | 0.2531 | 0.2484 | 57.9601 | 99.7218 | 139.049 | 4.3542 | 5.9332 | 6.6464 | 7.4385 | 7.8677 | 7.8946 | 0.0016 | 0.0011 | 0.001 | 0.0403 |
| AVI_505.html | NDVI_505.html | 0.5255 | 0 | 0.3013 | 0.2893 | 0.2669 | 60.0614 | 75.4971 | 110.917 | 4.4537 | 4.9197 | 5.833 | 7.6413 | 7.9139 | 7.8633 | 0.001 | 0.0008 | 0.0008 | 0.0309 |
| AVI_523.html | NDVI_523.html | 0.5208 | 0.0048 | 0.3376 | 0.3078 | 0.3028 | 91.9657 | 94.1486 | 144.839 | 5.5659 | 5.9511 | 6.9804 | 7.6302 | 7.8465 | 7.8262 | 0.005 | 0.006 | 0.0048 | 0.0708 |
| AVI_572.html | NDVI_572.html | 0.4554 | 0 | 0.223 | 0.2131 | 0.1954 | 77.7077 | 96.2044 | 125.822 | 5.7239 | 6.434 | 7.2402 | 7.9546 | 7.9578 | 7.9619 | 0.0007 | 0.0007 | 0.0007 | 0.0257 |
| AVI_697.html | NDVI_697.html | 0.4705 | 0 | 0.2836 | 0.2826 | 0.2317 | 62.6318 | 73.2511 | 109.404 | 4.4894 | 4.7114 | 5.8237 | 7.4683 | 7.486 | 7.6937 | 0.0012 | 0.0012 | 0.001 | 0.0348 |
| AVI_717.html | NDVI_717.html | 0.4232 | 0 | 0.3584 | 0.3199 | 0.2985 | 55.8284 | 92.8058 | 118.838 | 4.3633 | 5.6757 | 6.3627 | 7.3318 | 7.522 | 7.5726 | 0.0021 | 0.0024 | 0.0021 | 0.0461 |

FIG. 83

Features Extraction of Text Data

[Topic] [Discriminating Words] [Verbs] [Bigrams]

Topics_List

| Topic NO. | Topic Name |
|---|---|
| 1 | Northern Ireland |
| 2 | North Korea Nuclear |
| 3 | Major League Baseball |
| 4 | Space |
| 5 | Cuban Refuge |
| 6 | Rwanda Refuge |
| 7 | Simpson Case |
| 8 | Gulf War |
| 9 | Bosnia and Serb |
| 10 | Israel and Palestinian conflict |
| 11 | Oklahoma City Bombing |
| 12 | Haiti and Aristid |
| 13 | Chechnya |
| 14 | China Trade |
| 15 | Earthquake in Kobe |
| 16 | Plane Crash |
| 17 | Health Care Reform |
| 18 | Clinton in Whitehouse |
| 19 | Pan American Game |
| 20 | Humble, Tx, Water Flooding |
| 21 | Cancer Research |
| 22 | Election |
| 23 | Iran and Islam |
| 24 | Police and Simpson |
| 25 | Children and Music |

FIG. 87

Topic 1: Northern Ireland
(PAPER 157)

DESCRIPTIVE TERMS
Descriptive: ireland 12.2%, ira 9.1%, northern.ireland 7.6%, irish 5.5%, fein 5.0%, sinn 5.0%, sinn.fein 5.0%, northern 3.2%, british 3.2%, adam 2.4%, ceas 2.0%, ceas.fire 2.0%, peac 1.2%, fish 1.1%, canada 1.0%, britain 1.0%, protest 0.9%, irish.republican 0.7%, fire 0.6%, spanish 0.6%, irish.republican.armi 0.6%, republican.armi 0.6%, belfast 0.5%, polit.wing 0.4%, british.govern 0.4%, peac.process 0.4%, fisheri 0.4%, unionist 0.4%, reynold 0.4%, gerri.adam 0.4%

DISCRIMINATING TERMS
Discriminating: ireland 7.7%, ira 5.9%, northern.ireland 4.9%, irish 3.5%, fein 3.2%, sinn 3.2%, sinn.fein 3.2%, northern 1.6%, british 1.9%, adam 1.5%, ceas 1.1%, ceas.fire 1.1%, simpson 0.7%, fish 0.6%, canada 0.6%, irish.republican 0.5%, britain 0.4%, irish.republican.armi 0.4%, republican.armi 0.4%, protest 0.4%, presid 0.4%, hous 0.3%, spanish 0.3%, serb 0.3%, peopl 0.3%, belfast 0.3%, polit.wing 0.3%, british.govern 0.3%, unionist 0.3%, fisheri 0.3%

SINGLE WORD TERMS
Frq. Phrases 1: ireland 121, northern 119, british 116, irish 111, ira 110, peac 107, minist 104, govern 104, polit 104, talk 102, republican 99, armi 97, fire 97, fein 96, sinn 95, britain 95, ceas 90, protest 84, major 79, wing 77, week 75, told 73, process 73, prime 71, parti 69, call 68, john 67, rule 66, offici 66, leader 64

DOUBLE WORD TERMS
Frq. Phrases 2: northern.ireland 115, sinn.fein 95, irish.republican 94, republican.armi 91, ceas.fire 87, polit.wing 76, prime.minist 71, peac.process 66, gerri.adam 39, british.govern 50, british.rule 49, john.major 48, minist.john 47, ira.polit 47, ira.polit 47, ira.ceas 33, british.prime 34, european.union 33, fein.leader 30, albert.reynold 30, rule.northern 27, ireland.peac 27, fein.polit 26, declar.ceas 26, greenland.halibut 26, irish.govern 25, presid.clinton 25, dick.spring 23, told.report 22, ira.declar 22

TRIPLE WORD TERMS
Frq. Phrases 3: irish.republican.armi 91, prime.minist.john 47, minist.john.major 43, ira.ceas.fire 35, ira.polit.wing 34, british.prime.minist 27, british.rule.northern 27, declar.ceas.fire 26, sinn.fein.polit 26, northern.ireland.peac 26, polit.wing.sinn 25, wing.sinn.fein 25, leader.gerri.adam 21, fein.polit.wing 21, irish.prime.minist 21, prime.minist.albert 20, minist.albert.reynold 20, republican.armi.ira 17, fein.leader.gerri 17, ireland.peac.process 17, peac.northern.ireland 17, northern.ireland.secretari 16, talk.sinn.fein 16, war.british.rule 15, polit.wing.irish 15, fisheri.minist.brian 15, minist.brian.tobin 15, republican.armi.polit 15

PAPERS
IDTID000378
IDTID000525
IDTID000660

FIG. 88

Discriminating Words List

| |
|---|
| accident |
| adam |
| aircraft |
| airline |
| algeria |
| algerian |
| arafat |
| arrest |
| arrested |
| astronaut |
| astronomy |
| attorney |
| baghdad |
| baseball |
| beijing |
| berlusconi |
| bihac |
| bill |

FIG. 89 nuclear:
Number of Documents: 591
back

| TDTID000028 | TDTID000064 | TDTID000092 | TDTID000139 |
|---|---|---|---|
| TDTID000310 | TDTID000311 | TDTID000315 | TDTID000319 |
| TDTID000332 | TDTID000335 | TDTID000336 | TDTID000340 |
| TDTID000383 | TDTID000384 | TDTID000401 | TDTID000402 |
| TDTID000525 | TDTID000529 | TDTID000564 | TDTID000615 |
| TDTID000697 | TDTID000699 | TDTID000731 | TDTID000739 |
| TDTID000833 | TDTID000904 | TDTID000935 | TDTID001028 |
| TDTID001236 | TDTID001271 | TDTID001319 | TDTID001379 |
| TDTID001528 | TDTID001681 | TDTID001697 | TDTID001711 |
| TDTID001957 | TDTID001973 | TDTID002001 | TDTID002004 |
| TDTID002088 | TDTID002099 | TDTID002109 | TDTID002130 |
| TDTID002231 | TDTID002252 | TDTID002294 | TDTID002393 |
| TDTID002469 | TDTID002605 | TDTID002629 | TDTID002663 |
| TDTID002839 | TDTID002894 | TDTID002901 | TDTID003049 |

FIG. 90

Verbs_list

| | | | |
|---|---|---|---|
| abandon | one_word | two_word | three_word |
| abuse | one_word | two_word | three_word |
| accept | one_word | two_word | three_word |
| account | one_word | two_word | three_word |
| achieve | one_word | two_word | three_word |
| act | one_word | two_word | three_word |
| add | one_word | two_word | three_word |
| address | one_word | two_word | three_word |
| admit | one_word | two_word | three_word |
| advance | one_word | two_word | three_word |
| affect | one_word | two_word | three_word |
| affiliate | one_word | two_word | three_word |

FIG. 91 abandon: three words phrase back

| Three words | Documents |
|---|---|
| address arab conscience | TDTID000049 |
| arafat told arabic-speaking | TDTID000049 |
| jobs said khaled | TDTID000066 |
| places work early | TDTID000205 |
| bloody clothing presented | TDTID000292 TDTID000312 |
| murder weapon discovered | TDTID000292 TDTID000312 |
| bloody shoes discovered | TDTID000292 TDTID000312 |
| trade proposal comments | TDTID000330 |
| nuclear program pakistan | TDTID000564 |
| plans strike ignored | TDTID001262 |
| camps old leaders | TDTID001522 |
| people camps hope | TDTID001676 |
| trenches like joel | TDTID001677 |

FIG. 92 nuclear weapons

Number of documents found in search: 188

Return to search

| TDTID000064 | TDTID000139 | TDTID000159 | TDTID000319 |
|---|---|---|---|
| TDTID000697 | TDTID000739 | TDTID000780 | TDTID000832 |
| TDTID001488 | TDTID001498 | TDTID001681 | TDTID001711 |
| TDTID002130 | TDTID002171 | TDTID002252 | TDTID002403 |
| TDTID002748 | TDTID002764 | TDTID002837 | TDTID002839 |
| TDTID003619 | TDTID003679 | TDTID003779 | TDTID003994 |
| TDTID004306 | TDTID004492 | TDTID004576 | TDTID004651 |
| TDTID005238 | TDTID005311 | TDTID005312 | TDTID005362 |

FIG. 94 north korea
Number of documents found in search: 365
Return to search

| TDTID000064 | TDTID000159 | TDTID000308 | TDTID000309 | TDTID000310 |
|---|---|---|---|---|
| TDTID000324 | TDTID000326 | TDTID000330 | TDTID000332 | TDTID000335 |
| TDTID000345 | TDTID000359 | TDTID000360 | TDTID000365 | TDTID000366 |
| TDTID000388 | TDTID000400 | TDTID000401 | TDTID000402 | TDTID000415 |
| TDTID000534 | TDTID000563 | TDTID000626 | TDTID000646 | TDTID000665 |
| TDTID000818 | TDTID000830 | TDTID000832 | TDTID000833 | TDTID000987 |
| TDTID001319 | TDTID001340 | TDTID001379 | TDTID001411 | TDTID001427 |
| TDTID001792 | TDTID001824 | TDTID001860 | TDTID001869 | TDTID001888 |
| TDTID002157 | TDTID002369 | TDTID002419 | TDTID002442 | TDTID002492 |
| TDTID002837 | TDTID002894 | TDTID002901 | TDTID003088 | TDTID003257 |
| TDTID003531 | TDTID003535 | TDTID003558 | TDTID003559 | TDTID003561 |
| TDTID003657 | TDTID003662 | TDTID003697 | TDTID003751 | TDTID003900 |

FIG. 95

AUTOMATED GENERATION OF METADATA FOR MINING IMAGE AND TEXT DATA

RELATED APPLICATIONS

The present application is based on, and claims priority from, Provisional Application No. 60/908,349, filed Mar. 27, 2007 and titled "Automated Generation of Metadata", the disclosure of which is hereby incorporated by reference herein in its entirety.

BACKGROUND

The capabilities for generating and collecting data have been increasing rapidly. The computerization of many business and government transactions, and the advances in data collection tools have provided us with huge amounts of data. Millions of databases have been used in business management, government administration, scientific and engineering data management, and many other applications.

Data mining is the task of discovering interesting patterns in large amounts of data where the data can be stored in a database, data warehouses, or other information repositories.

Data mining is a process of nontrivial extraction of implicit, previously unknown and potentially useful information (such as knowledge rules, constraints, regularities) from data in databases.

Recent years have witnessed an explosion in the amount of digitally-stored data, the rate at which data is being generated, and the diversity of disciplines relying on the availability of stored data.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIGS. 58A and 58B show the completed graph and the associated MST respectively;

FIG. 59 shows the 25 clustering output of the dataset;

Figure 60:
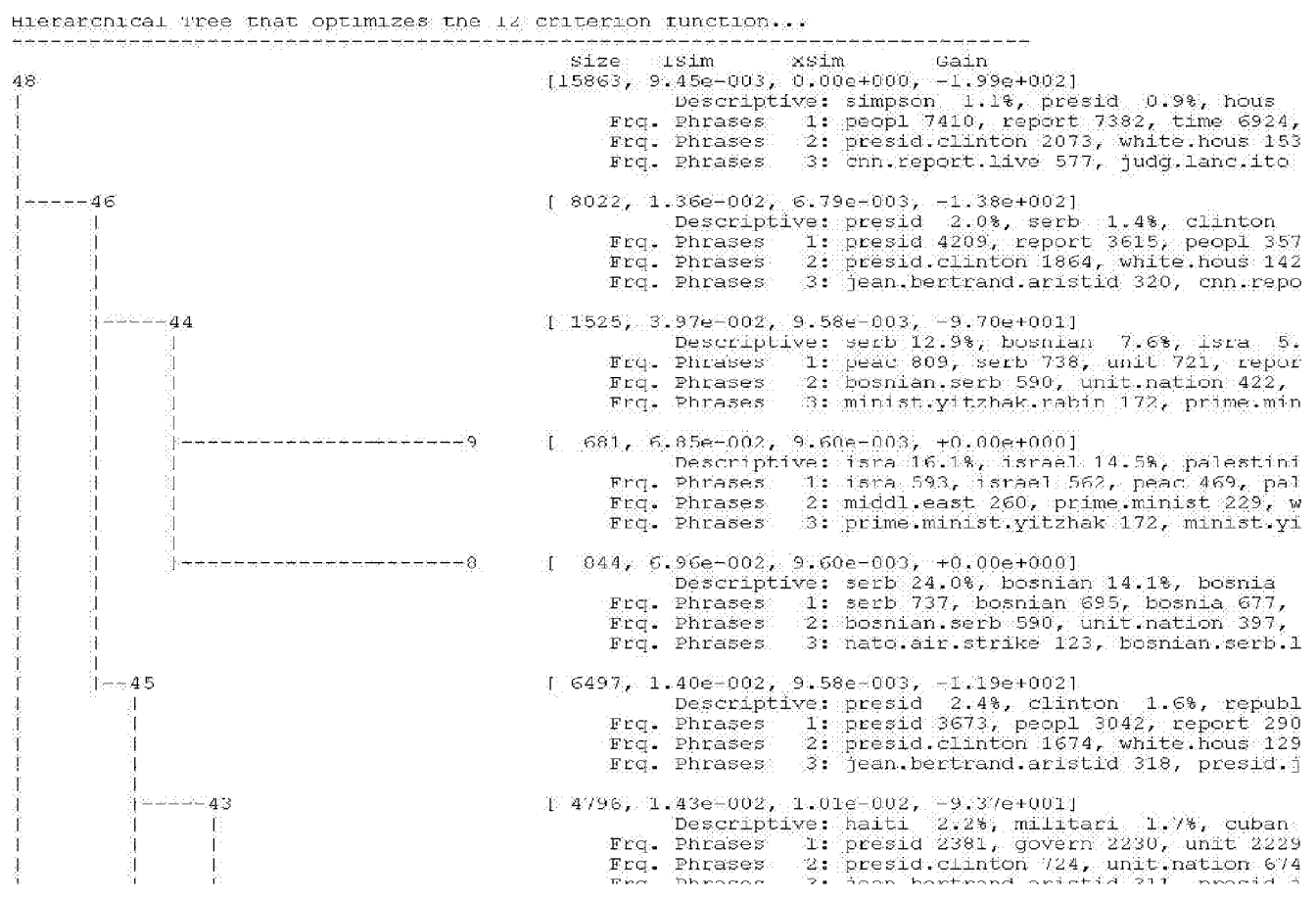

FIG. 60 describes a portion of the hierarchical agglomerative tree for the clusters;

Figure 63:
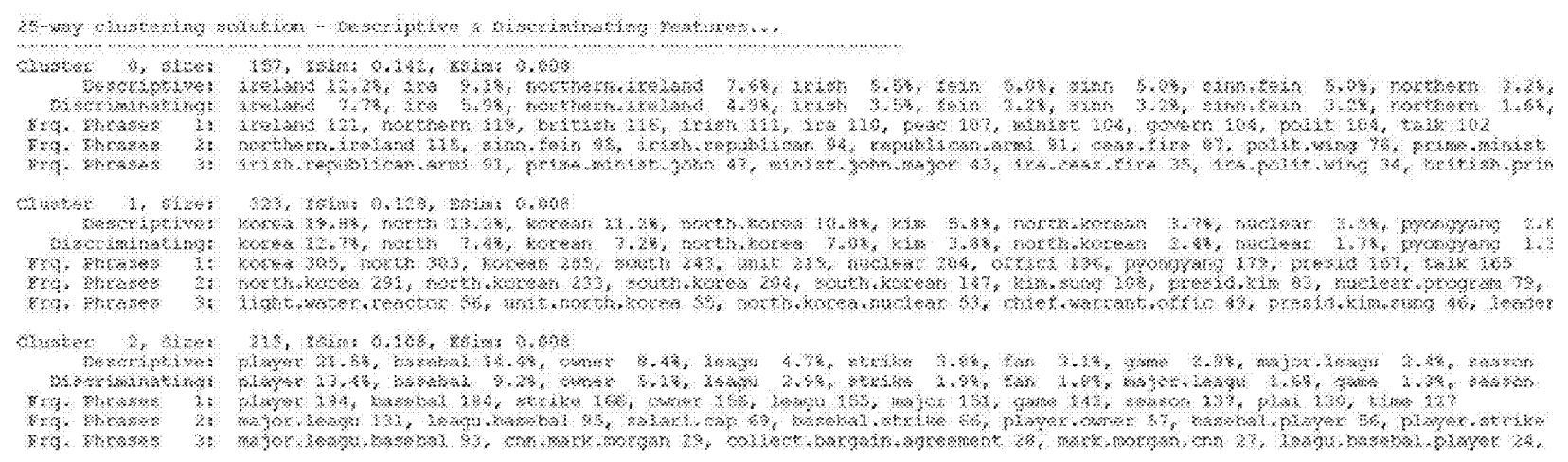

FIG. 63 shows a portion of the output produced by CLUTO for the discriminating words;

FIG. 64 shows a closer look at the association between two documents on the same cluster;

FIG. 65 shows a closer look at the association between two documents in cluster 2 "North Korea";

FIG. 66 shows a sample list of the frequency occur of all verbs in the dataset;

FIG. 67 is a sample list of the verbs used in my research;

FIG. 68 shows a sample list of one word following the verb "abandon";

FIG. 69 shows a sample list of three words following the verb "abandon";

FIG. 70 shows the homepage of the prototype system;

FIG. 74 shows the output of the query in FIG. 73;

FIG. 80 shows the output of the query in FIG. 79;

FIG. 83 shows the output of the query in FIG. 82;

FIG. 87 shows the Topic_List page;

FIG. 88 shows the page related to the Topic_No one "Northern Ireland";

FIG. 89 shows a discriminating words list page;

FIG. 90 shows number of documents where the discriminating word "nuclear" appears;

FIG. 91 shows verbs_list page;

FIG. 92 shows three words phrase for the verb "abandon";

FIG. 94 shows the output search for the "nuclear weapons"; and

FIG. 95 shows the output search for the bigram "north korea".

LIST OF FIGURES

Figure 1:
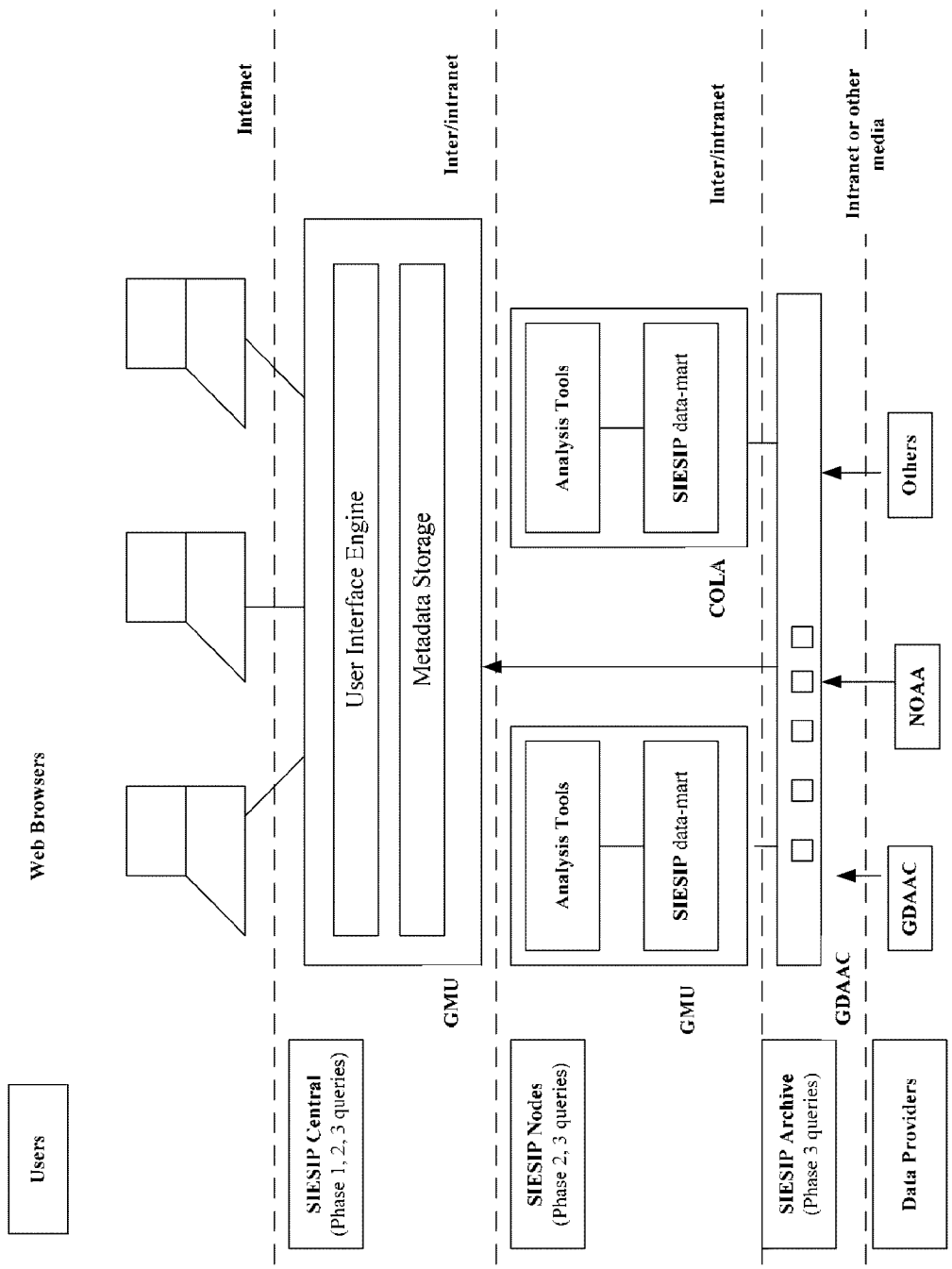
FIG. 1 shows the architecture of the SIESIP system.
Figure 2:
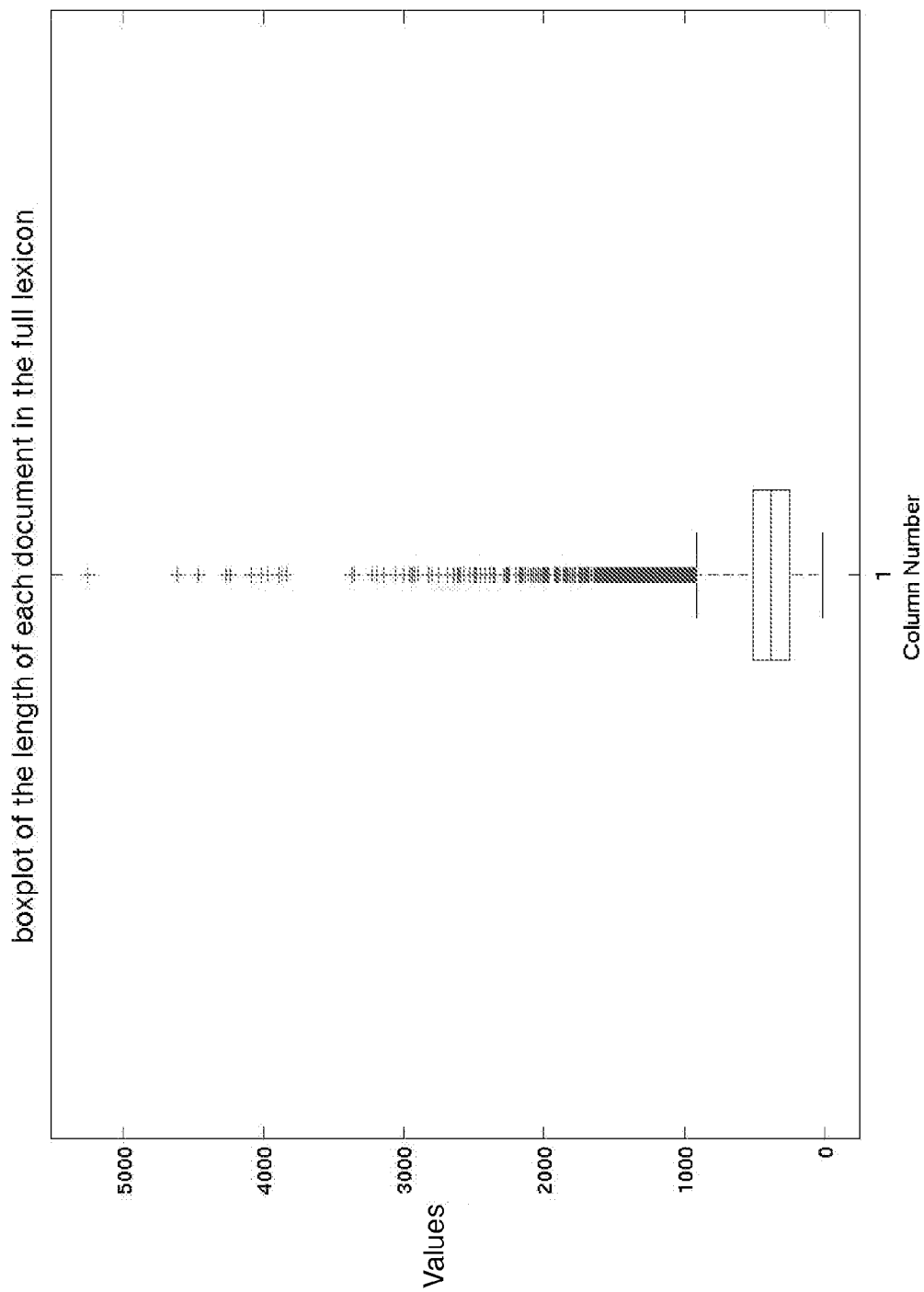
FIG. 2 is a boxplot of the length of each document in the full lexicon.
Figure 3:
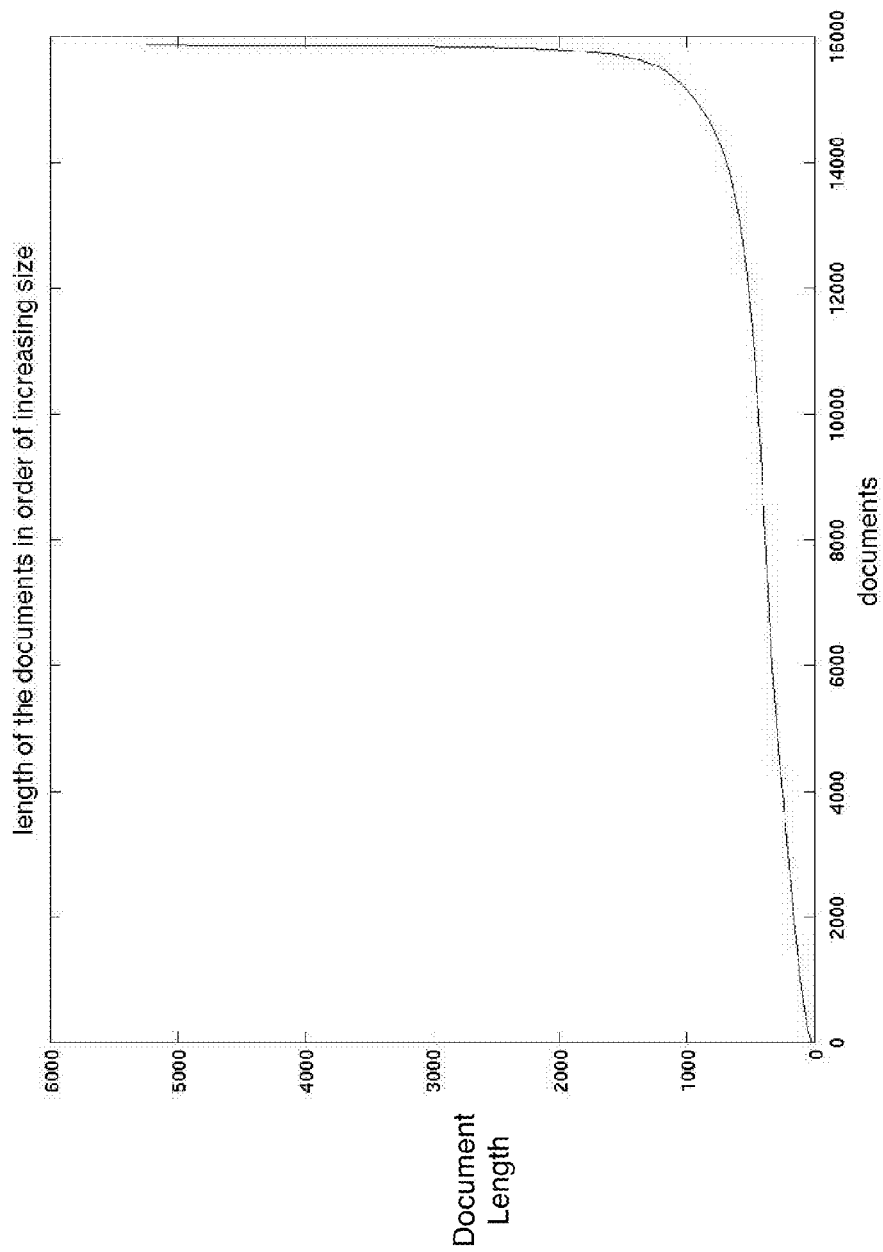
FIG. 3 shows the length of the documents in order of increasing size.
Figure 4:
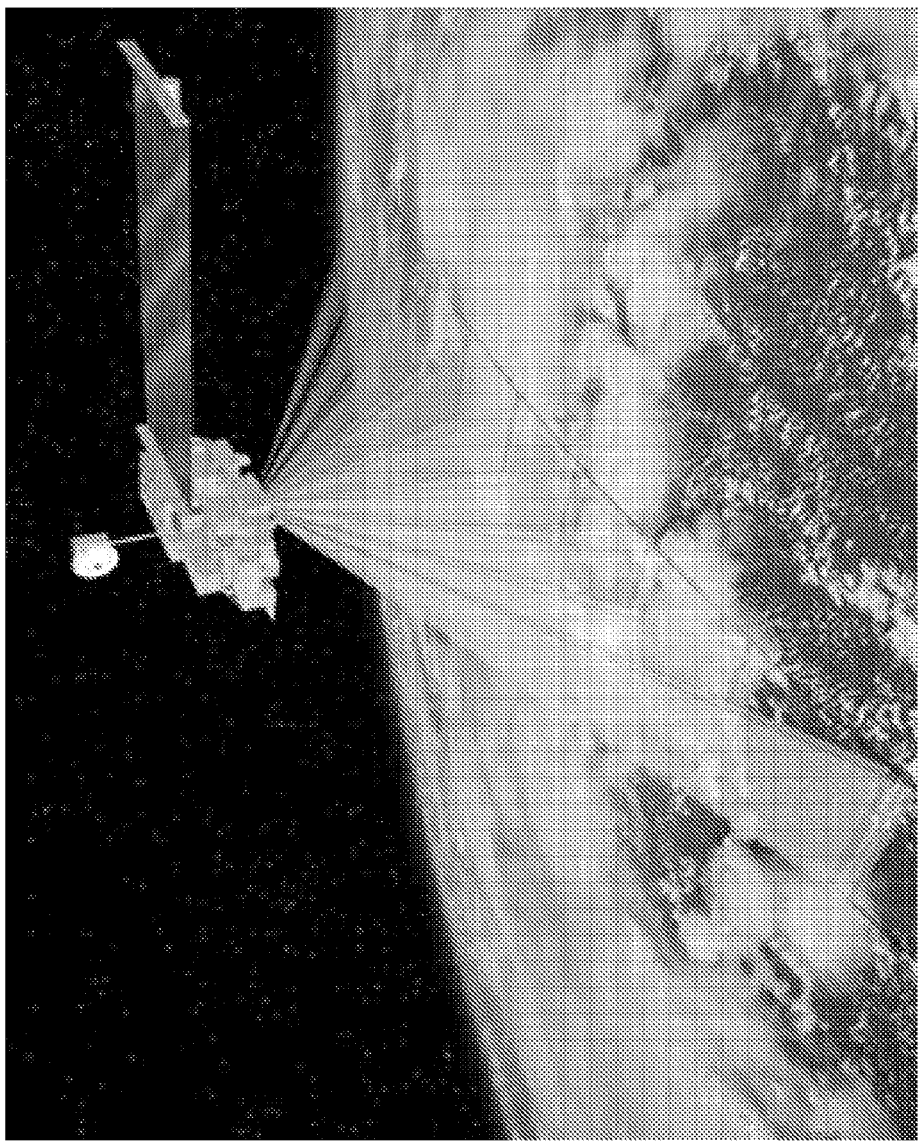
FIG. 4 shows the measurement approach of the MISR instrument.
Figure 5:
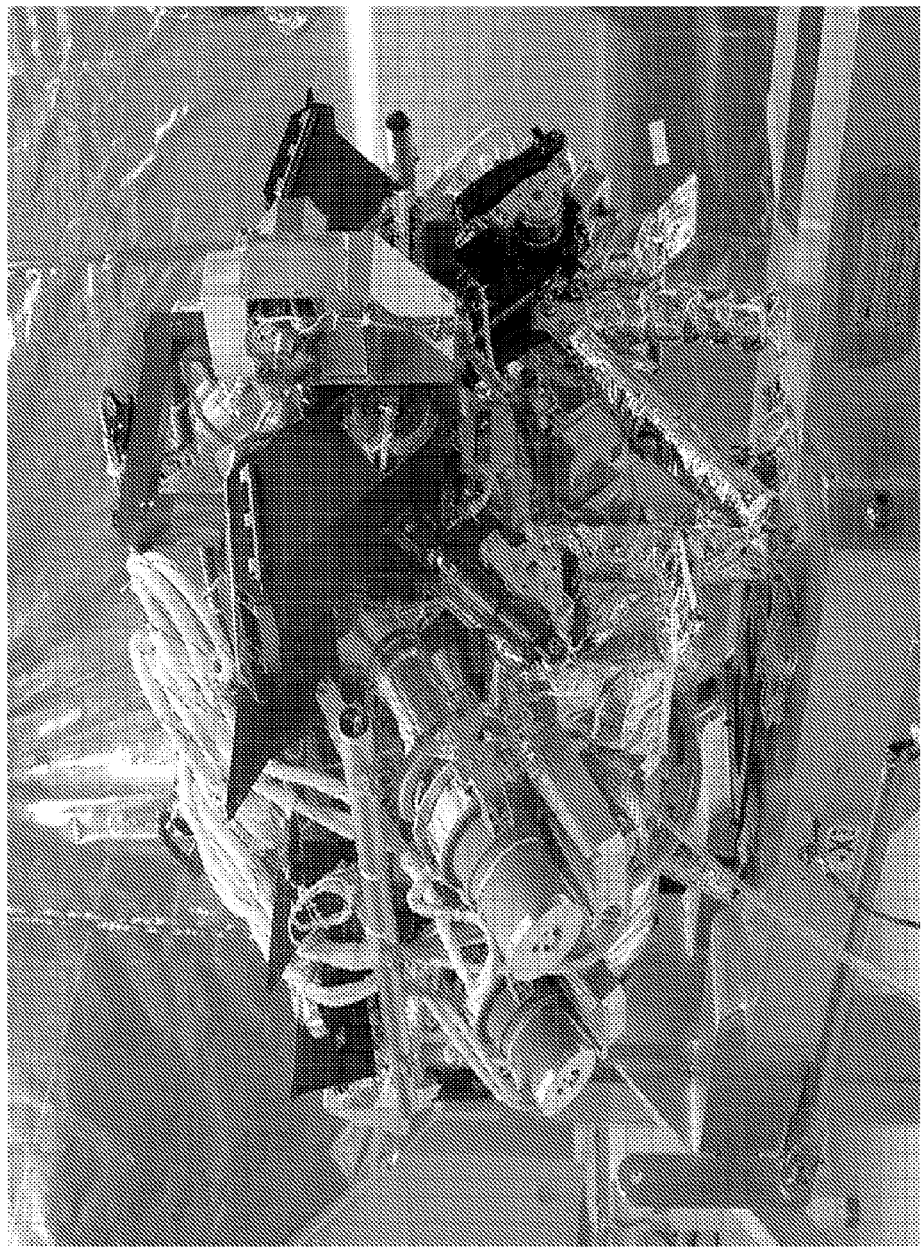
FIG. 5 shows the MISR Optical Bench Assembly.
Figure 6:
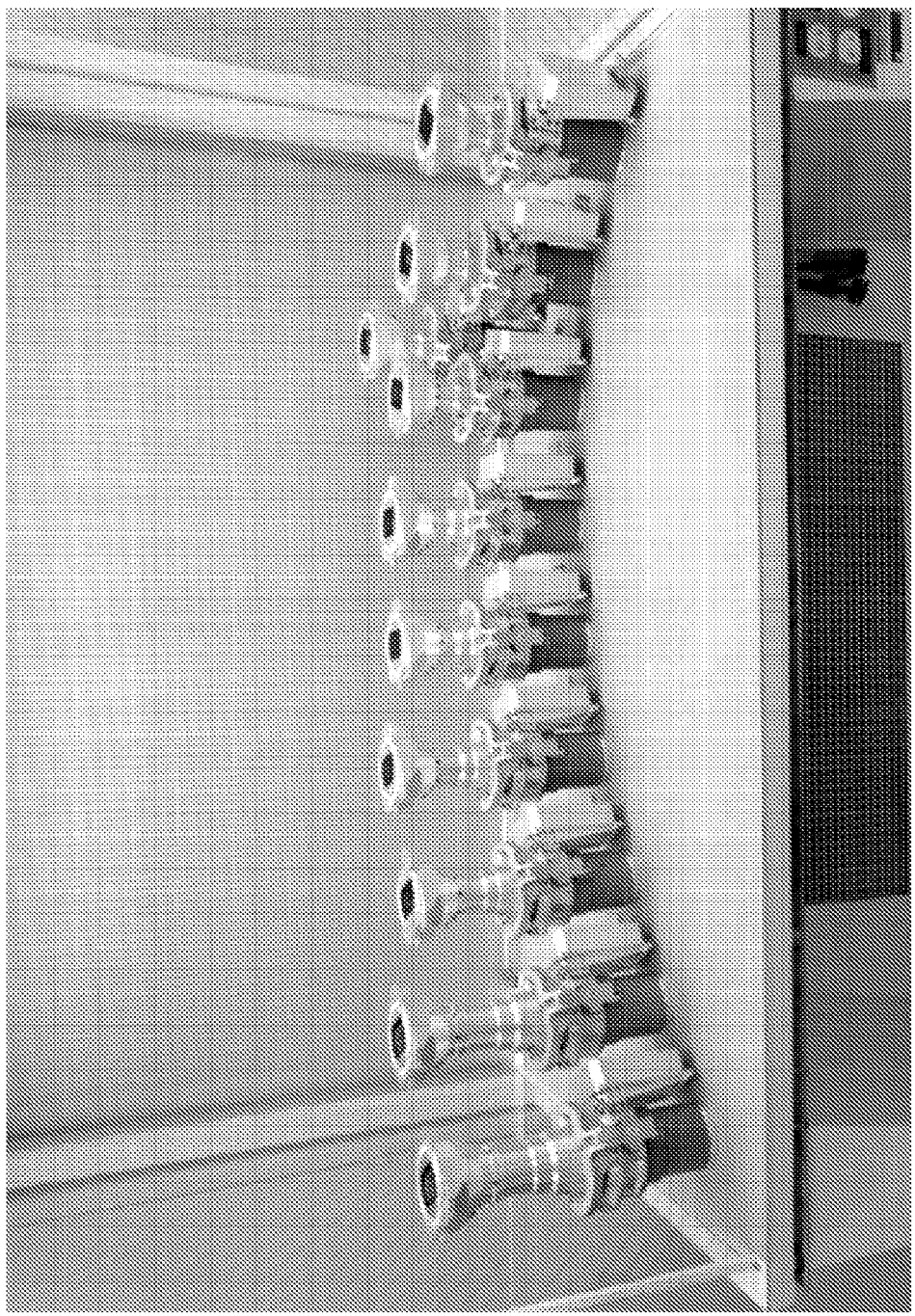
FIG. 6 shows the family portrait of the MISR cameras.
Figure 7:
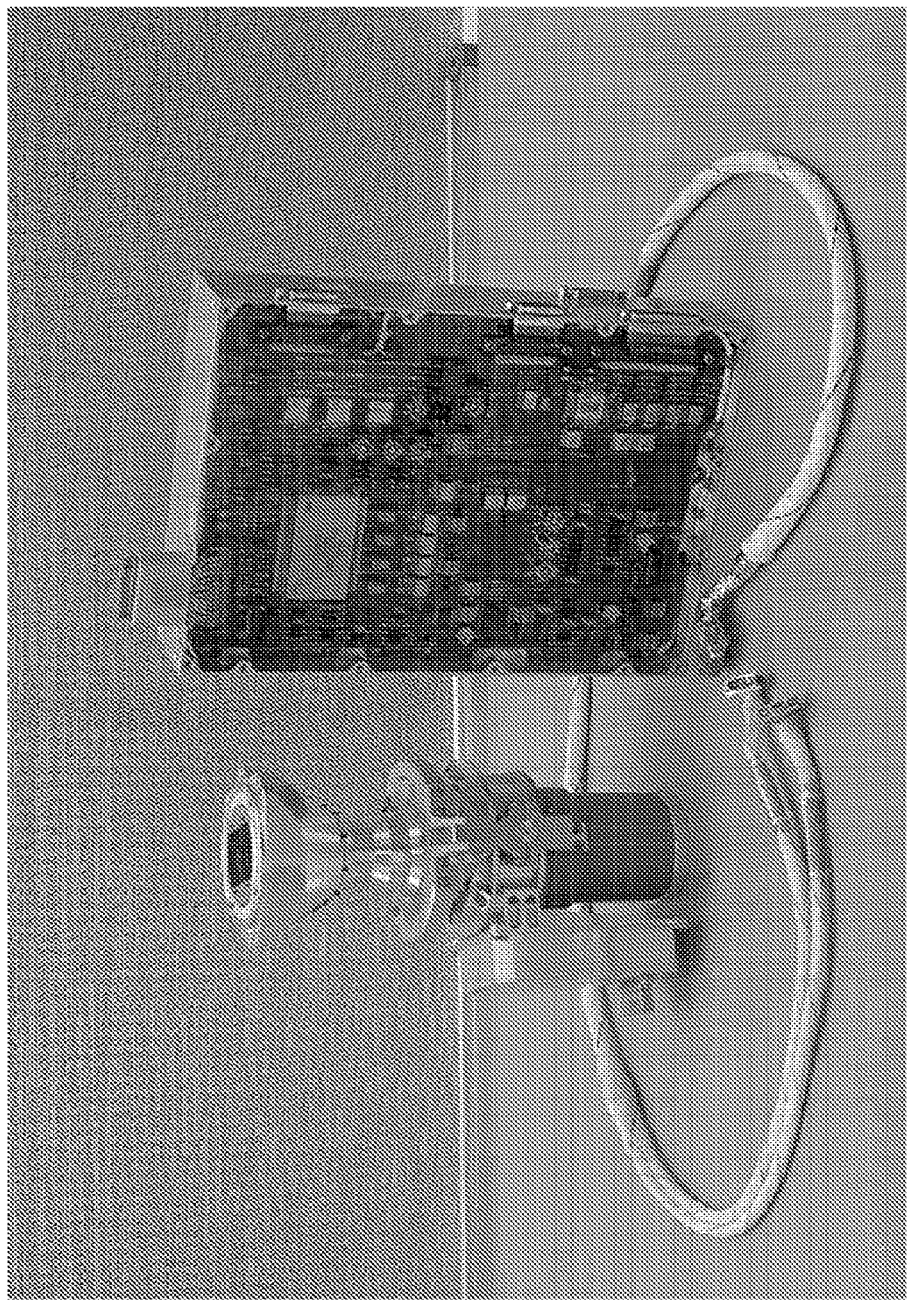
FIG. 7 shows one of the nine MISR cameras completely assembled together with its support.
Figure 8:
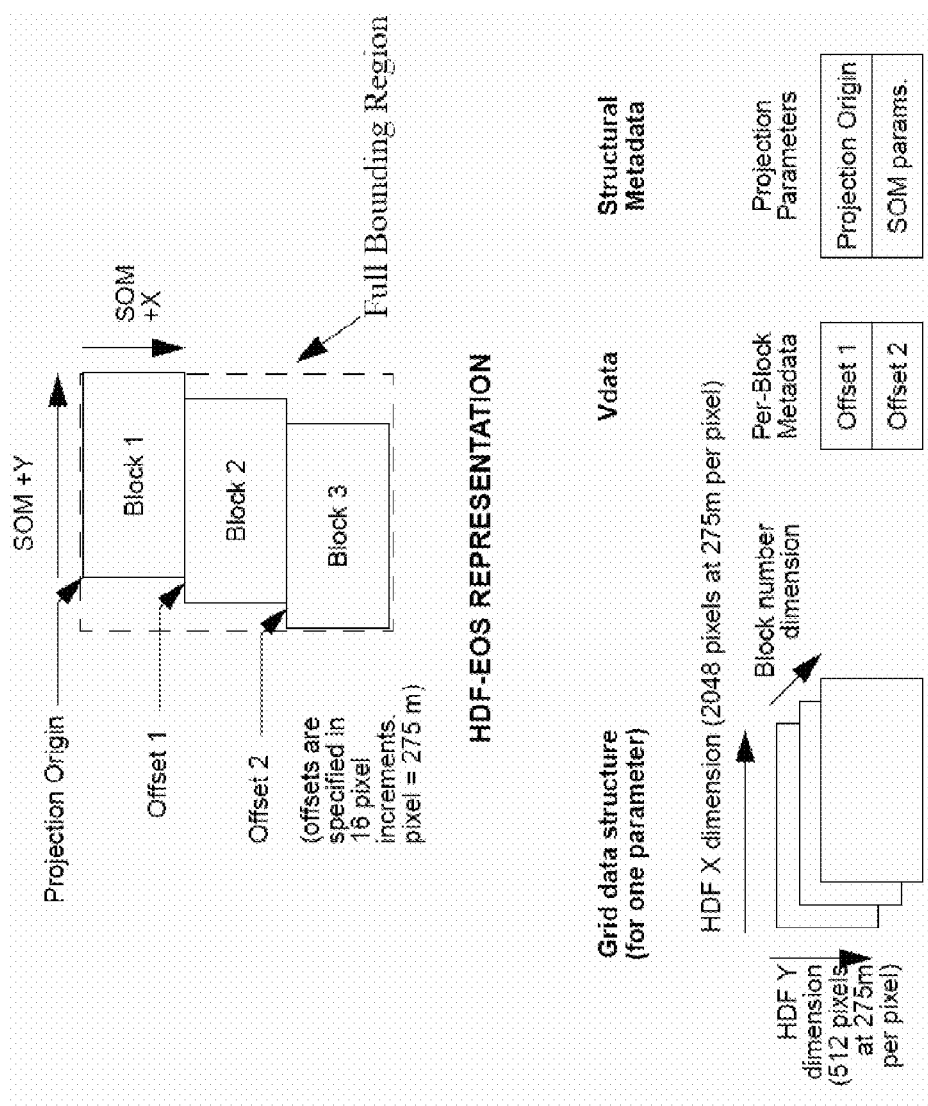
FIG. 8 is an MISR SOM representation in HDF-EO.
Figure 9:
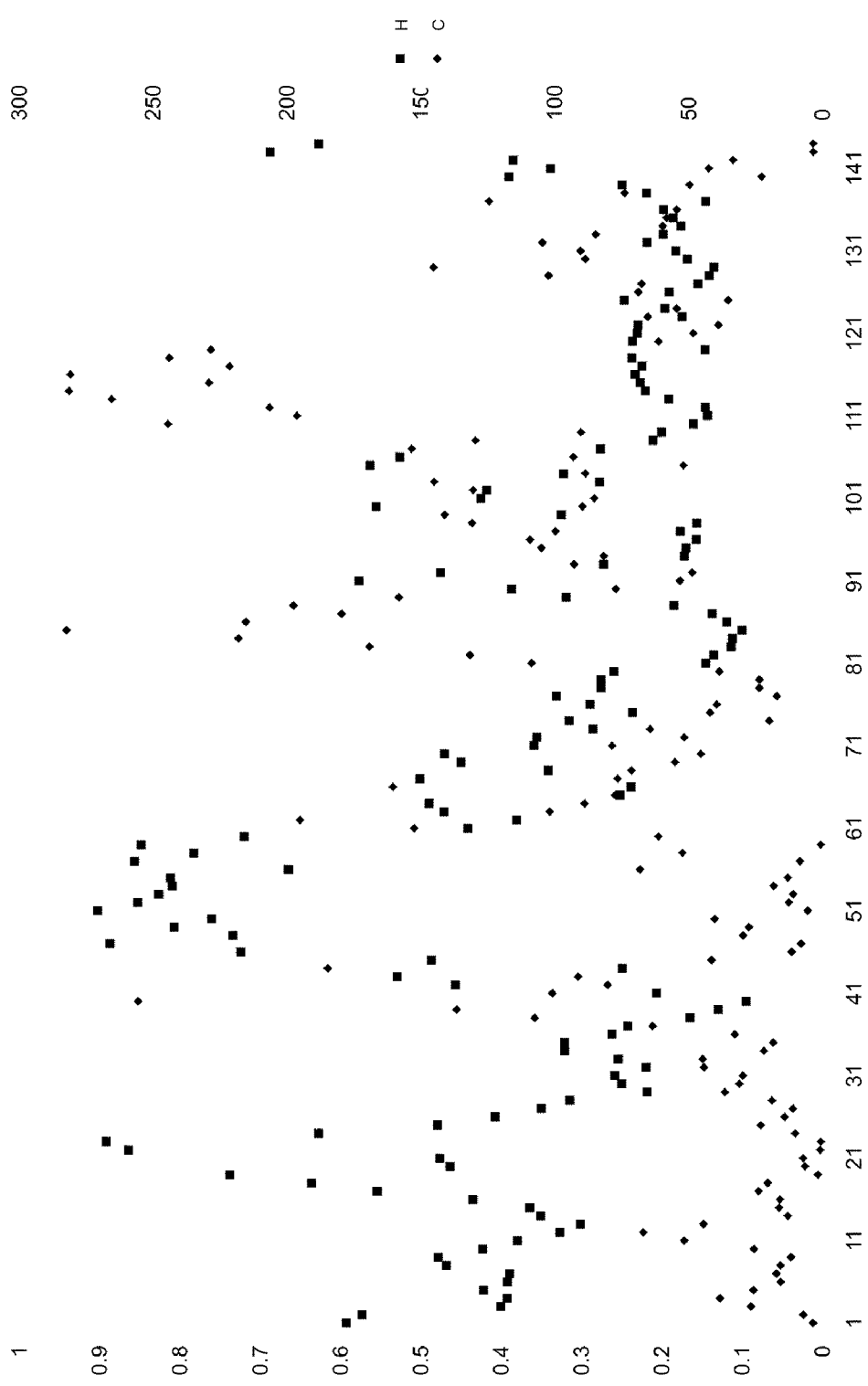
FIG. 9 shows the values of Homogeneity and Contrast for different images.
Figure 10:
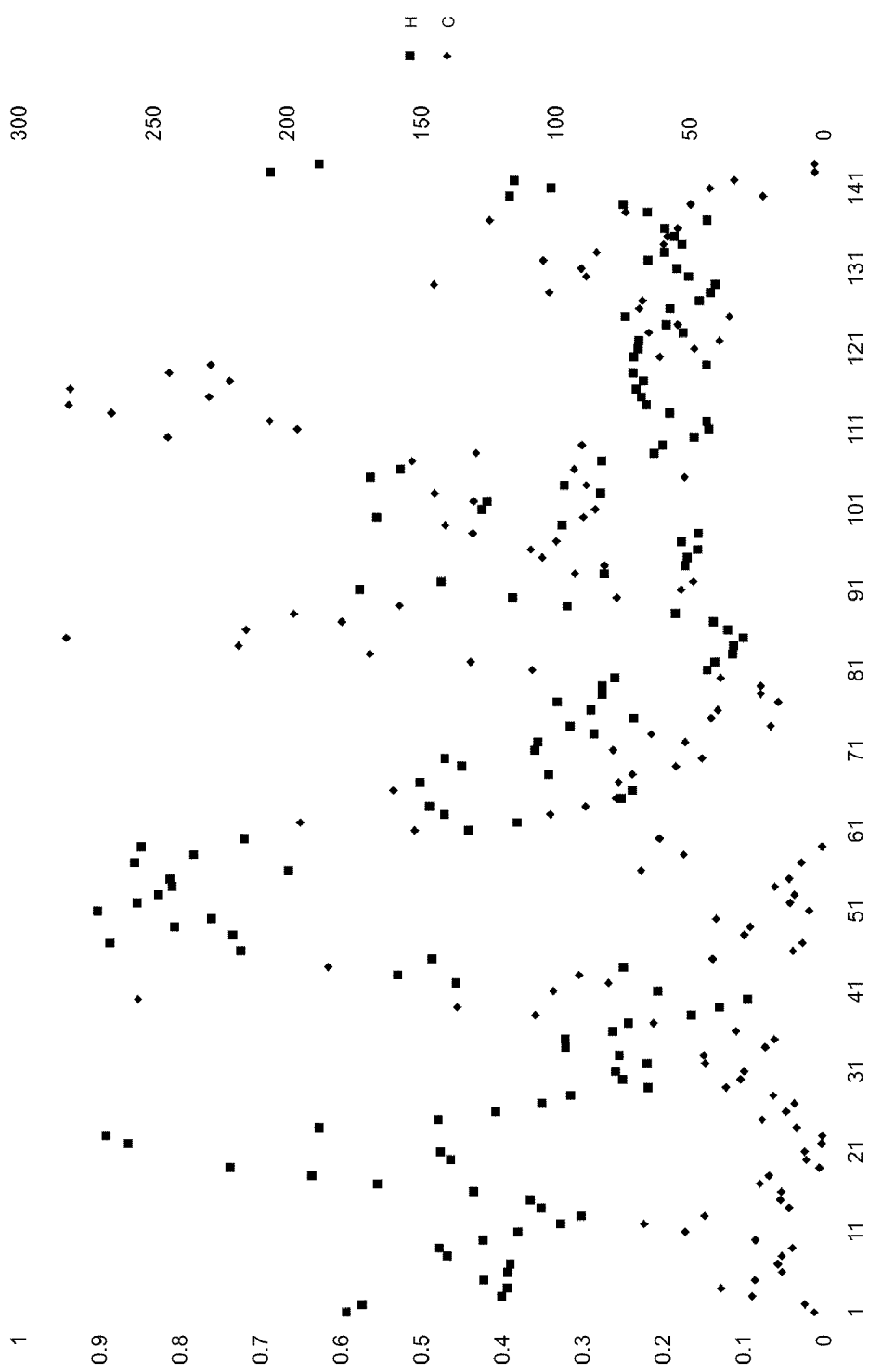
FIG. 10 shows the correlation between Entropy and Energy (inversely correlated)
Figure 11:
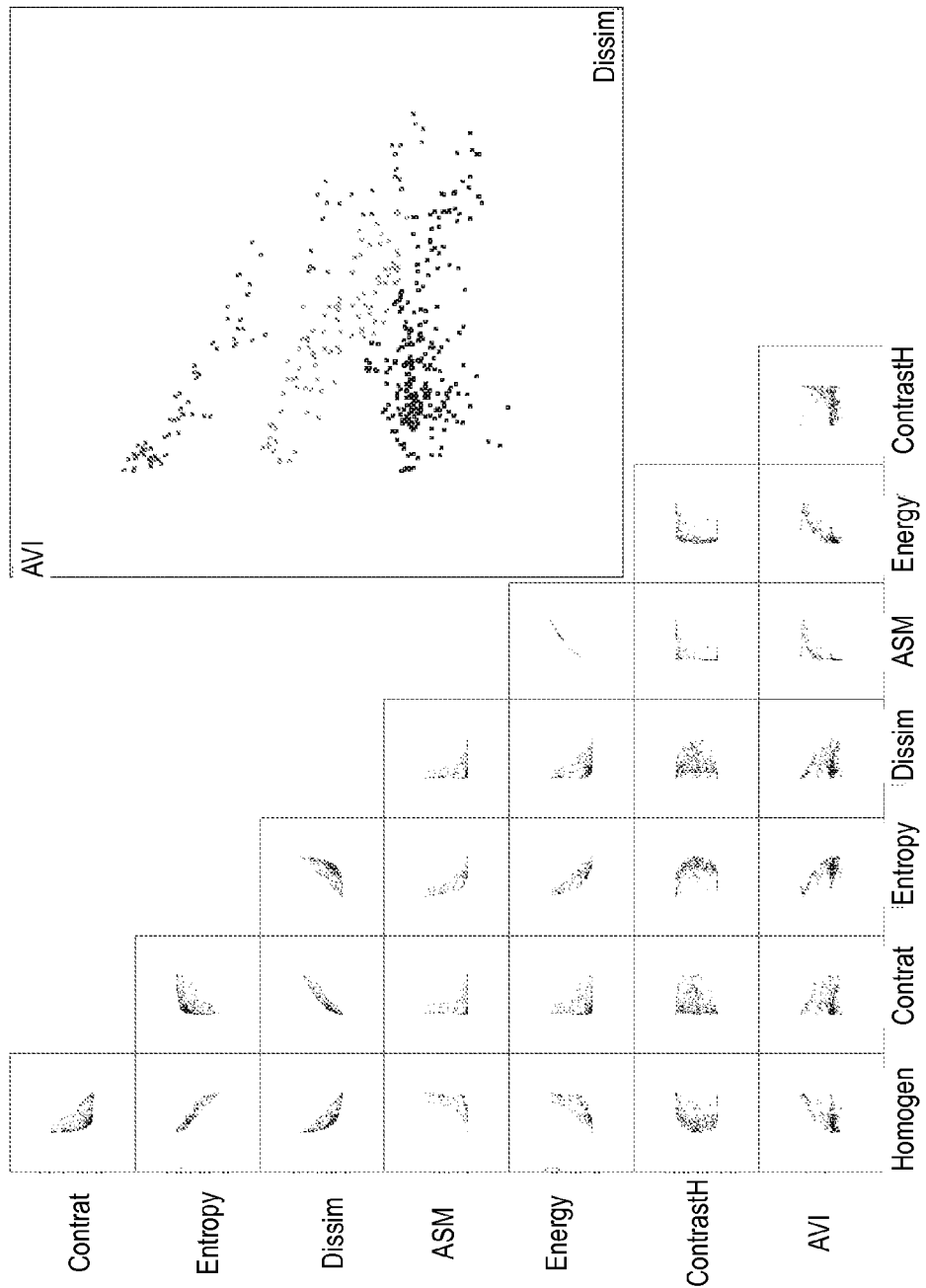
FIG. 11 shows a scatter plot matrix of eight features.
Figure 12:
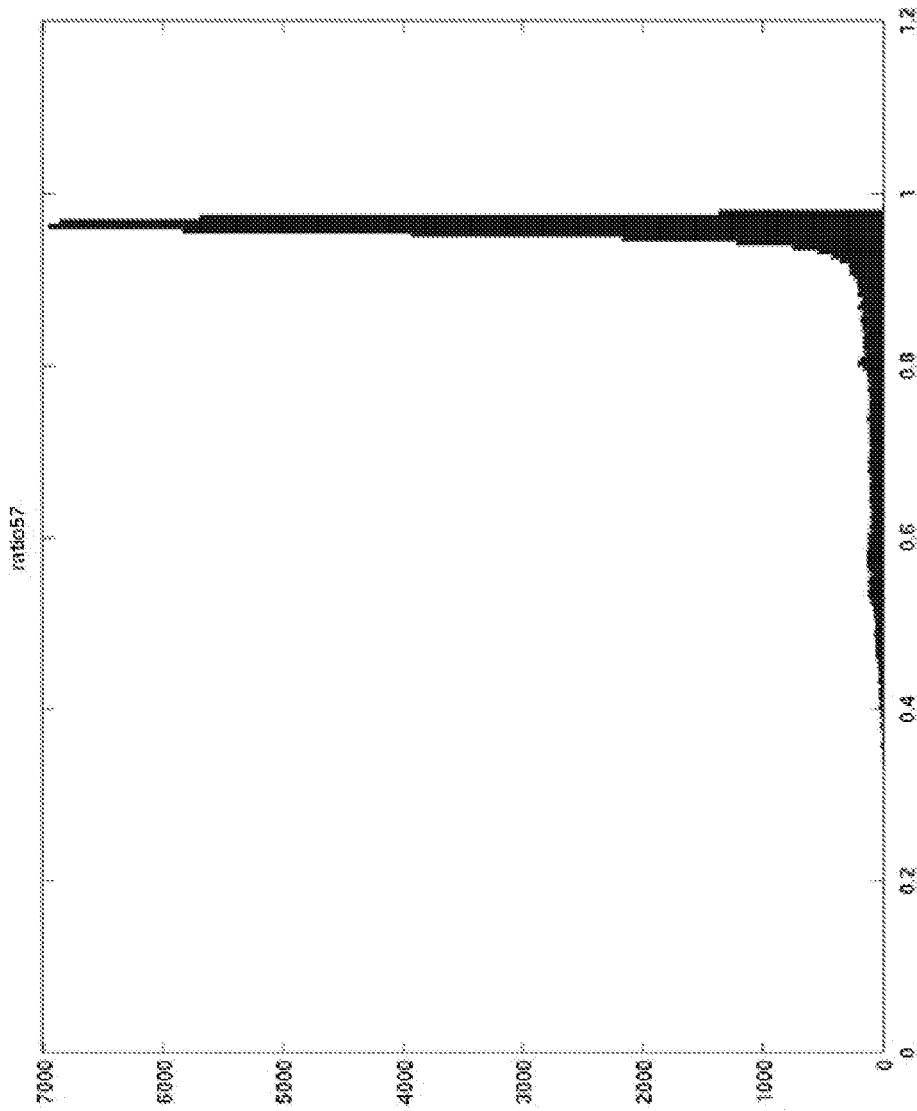
FIG. 12 shows AVI=0.9002.
Figure 13:
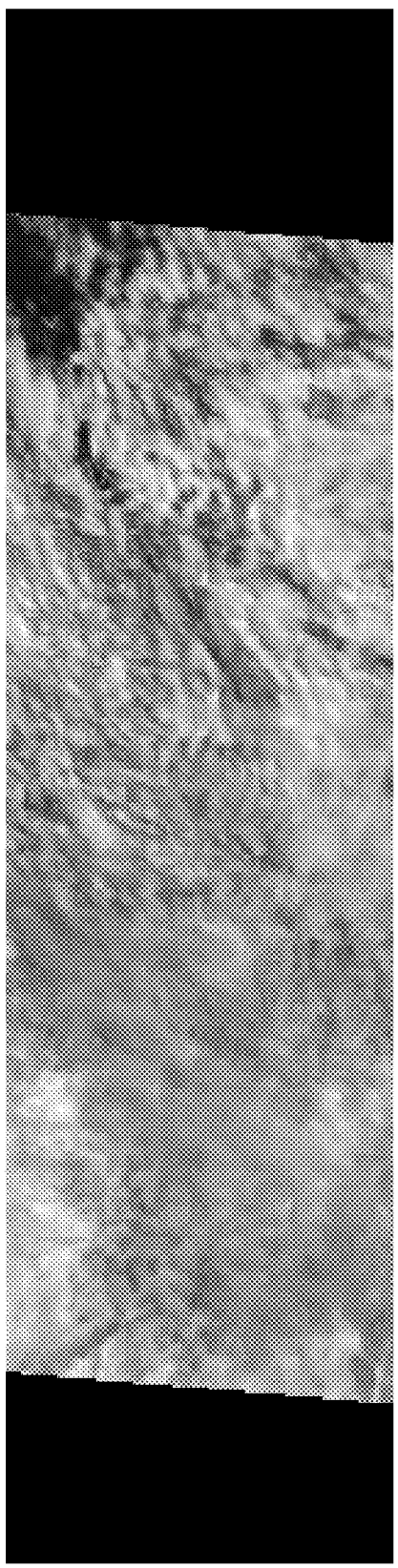
FIG. 13 shows the image of the green band for the above histogram in FIG. 12.
Figure 14:
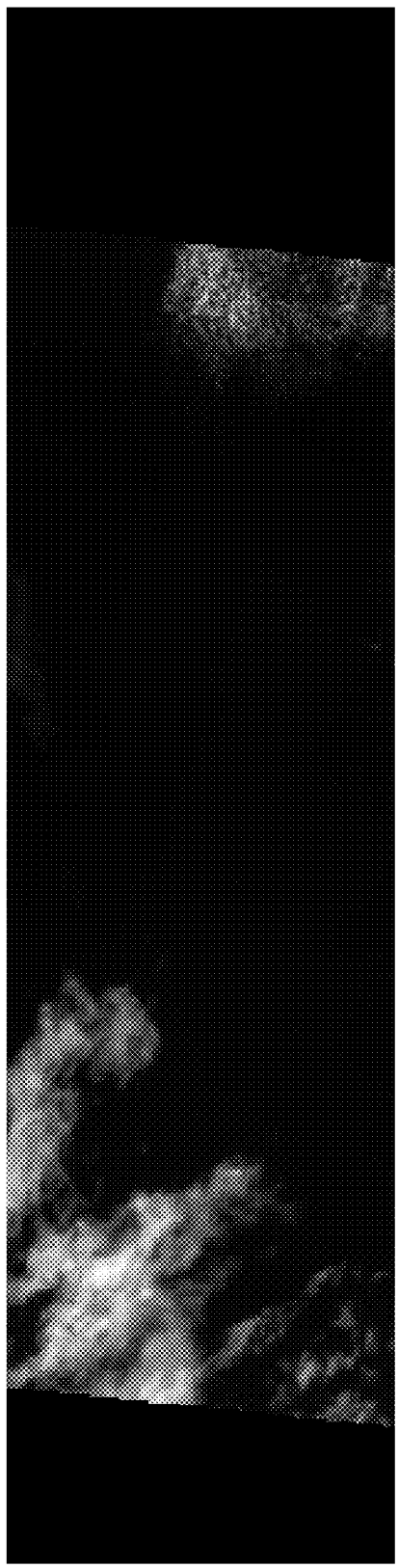
FIG. 14 shows the image of the NIR band for the above histogram in FIG. 12.
Figure 15:
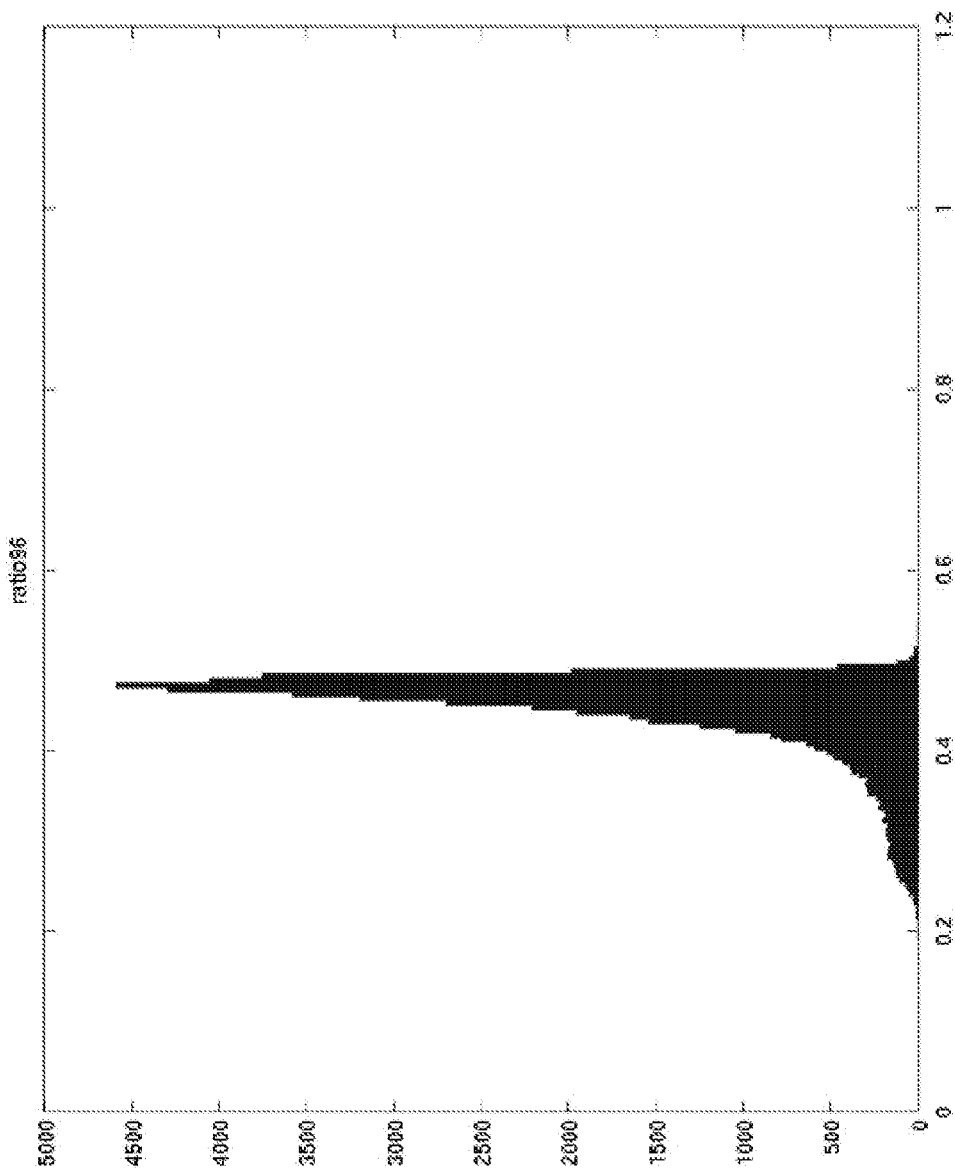
FIG. 15 shows AVI−0.4411.
Figure 16:
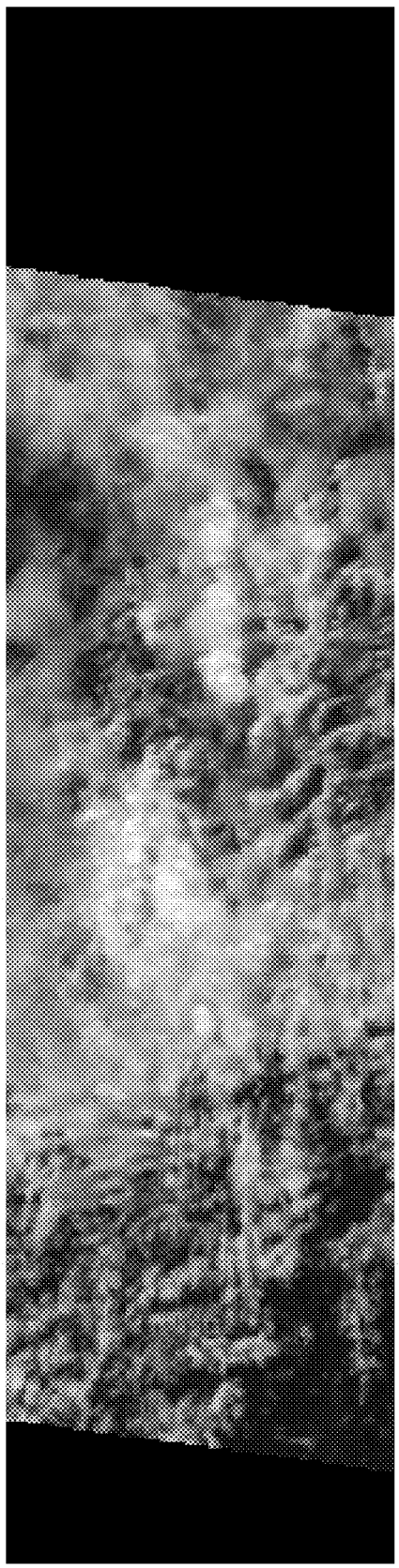
FIG. 16 shows the image of the green band for the above histogram in FIG. 15.
Figure 17:
FIG. 17 shows the image of the NIR band for the above histogram in FIG. 15.
Figure 18:
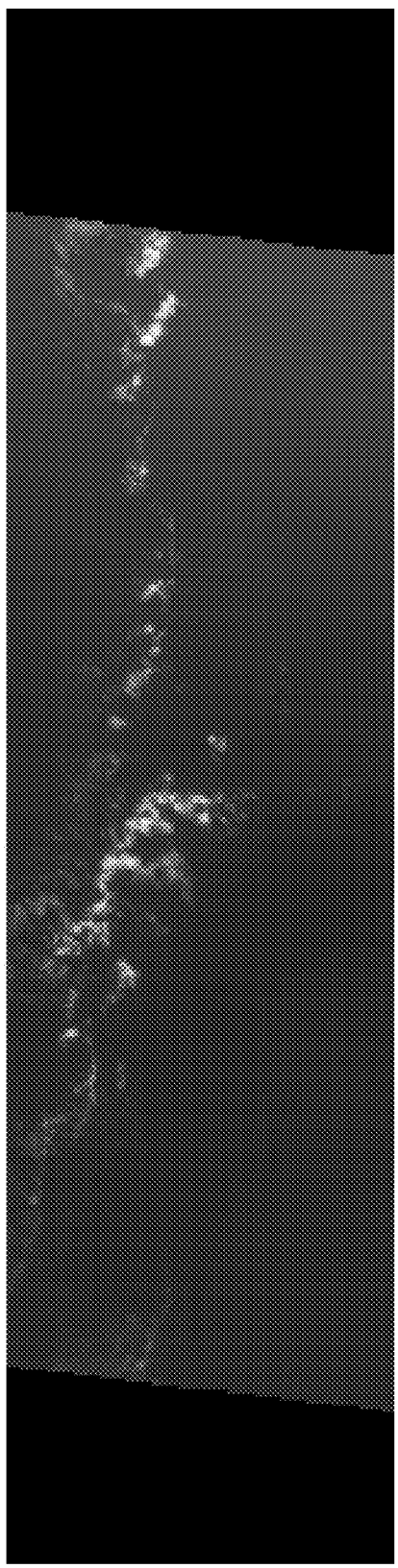
FIG. 18 is a high contrast image (contrast=0.958)
Figure 19:
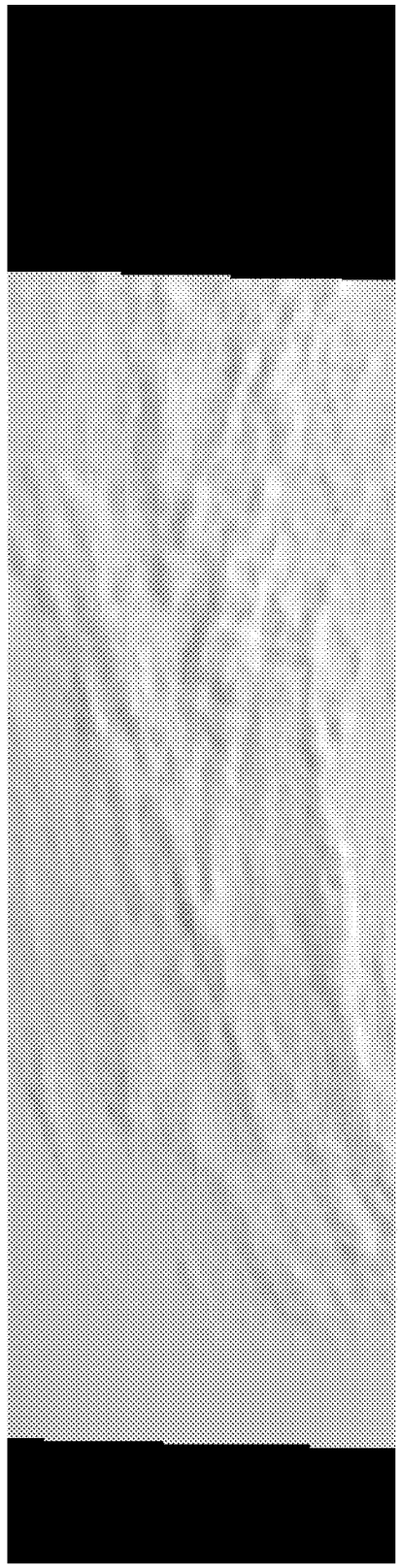
FIG. 19 is a low contrast image (contrast=−1)
Figure 20:
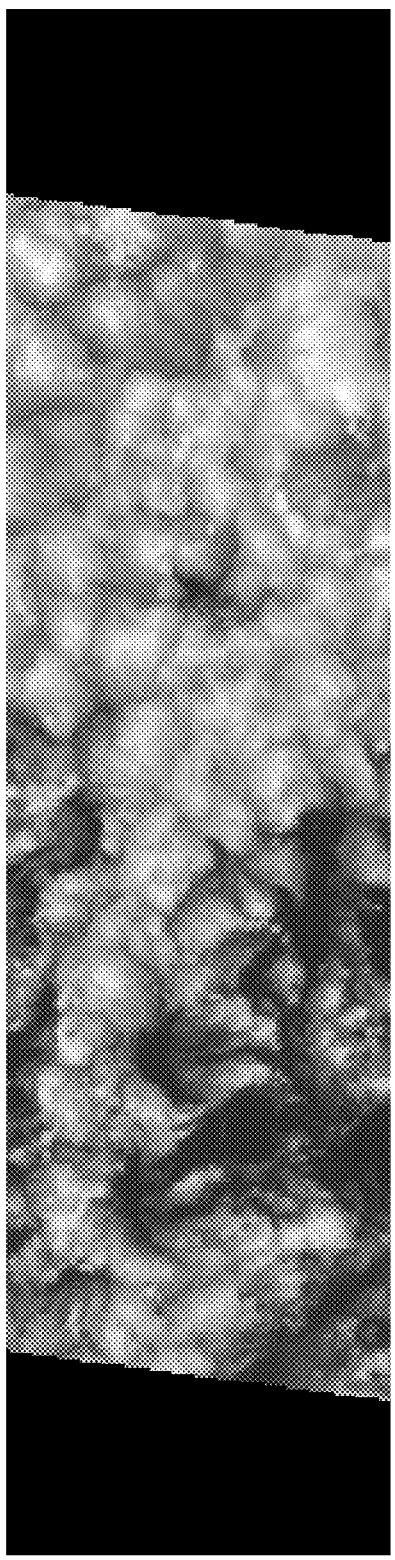
FIG. 20 is a normal contrast image (contrast=0.065)
Figure 21:
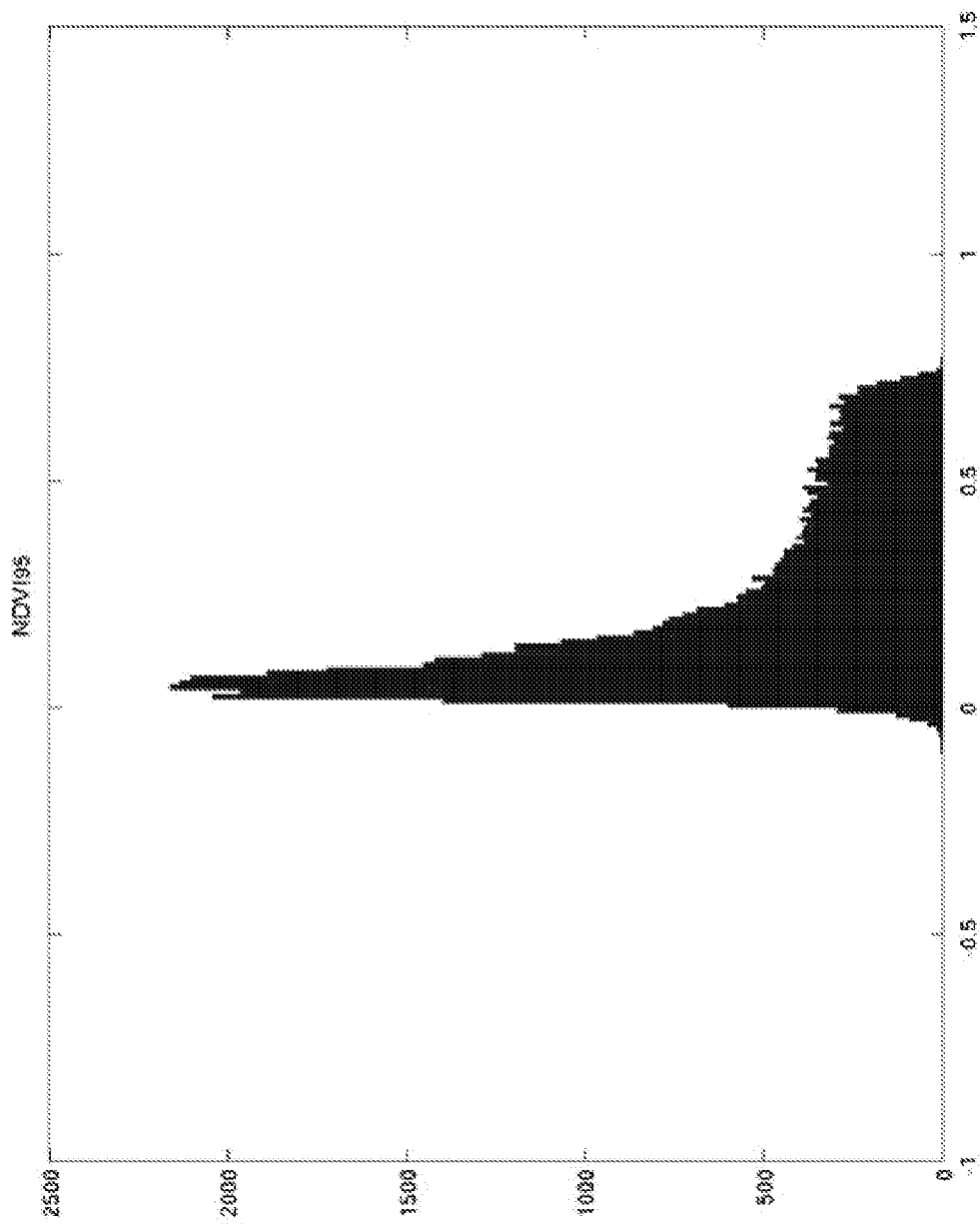
FIG. 21 shows NDVI=0.0713.
Figure 22:
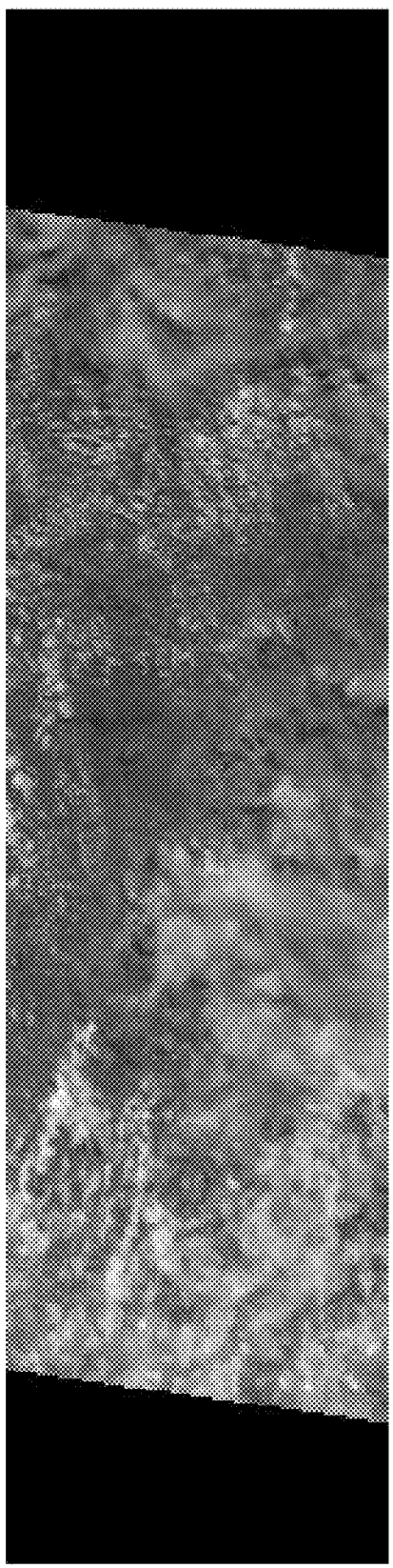
FIG. 22 shows the image of the NIR band for the above histogram in FIG. 21.
Figure 23:
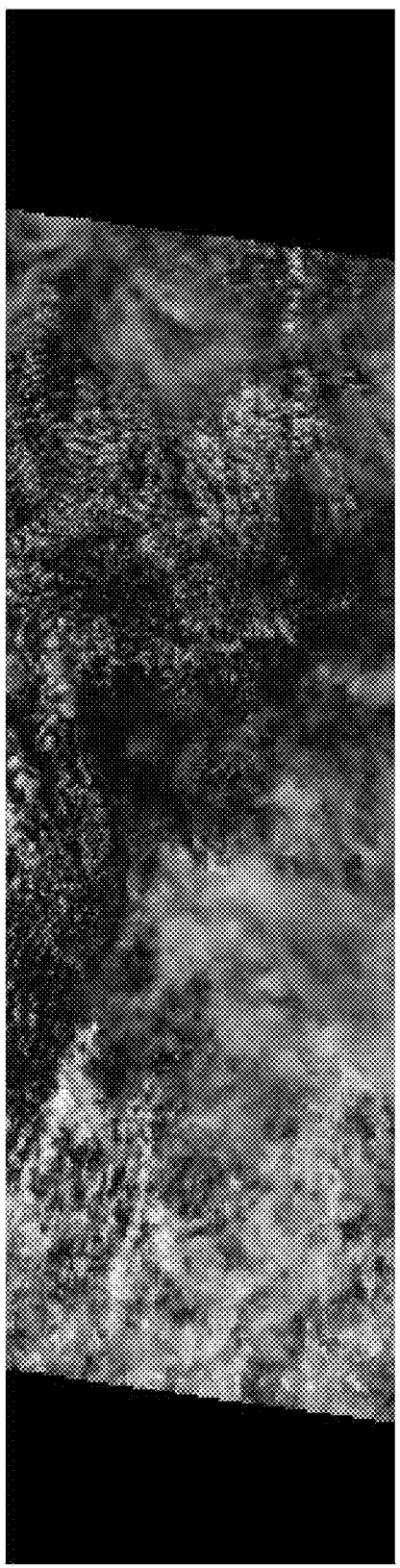
FIG. 23 shows the image of the red band for the above histogram in FIG. 21.
Figure 24:
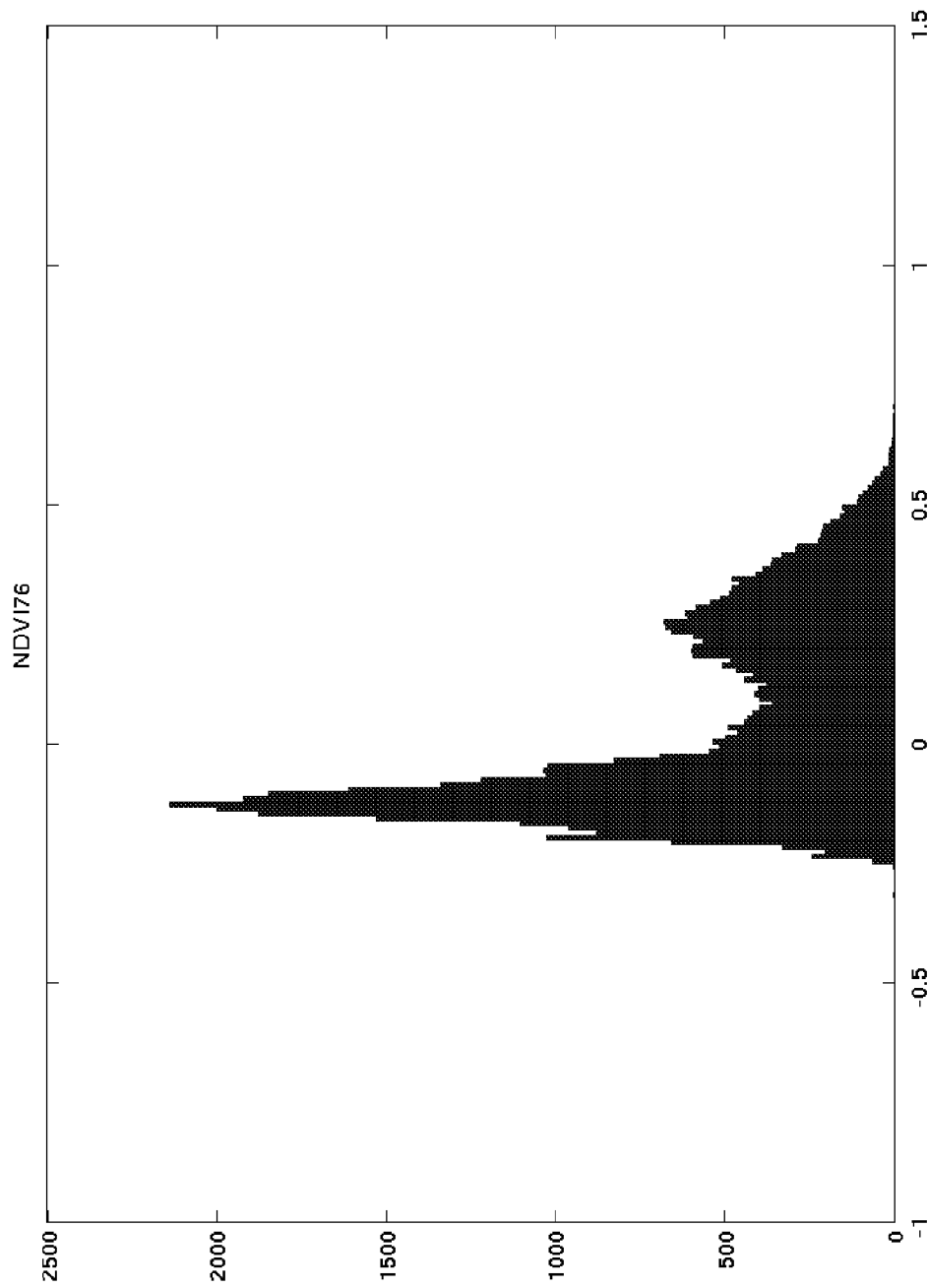
FIG. 24 shows NDVI=0.001.
Figure 25:
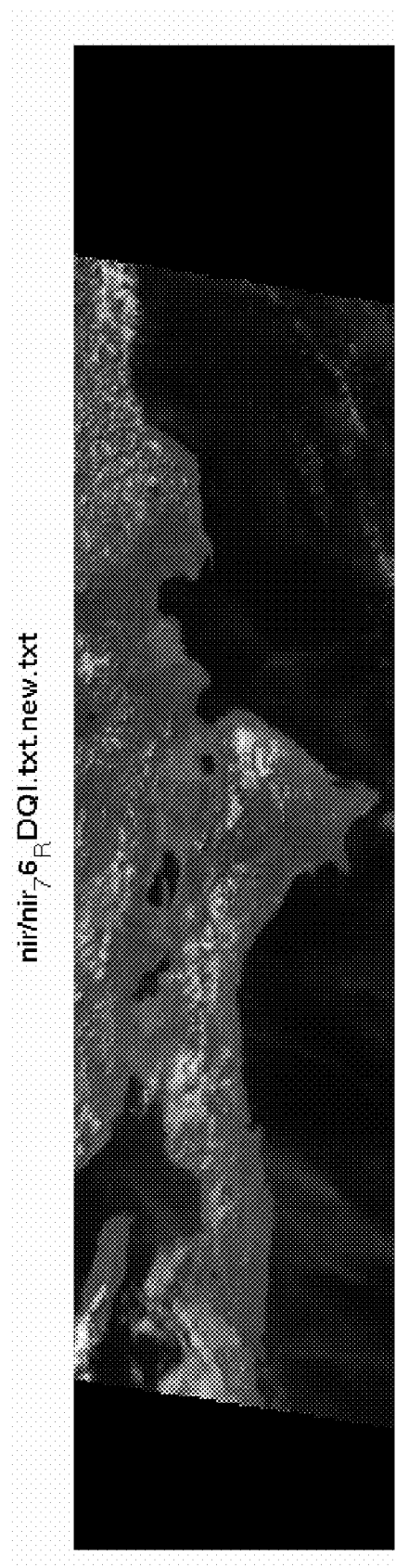
FIG. 25 shows the image of the NIR band for the above histogram in FIG. 24.
Figure 26:
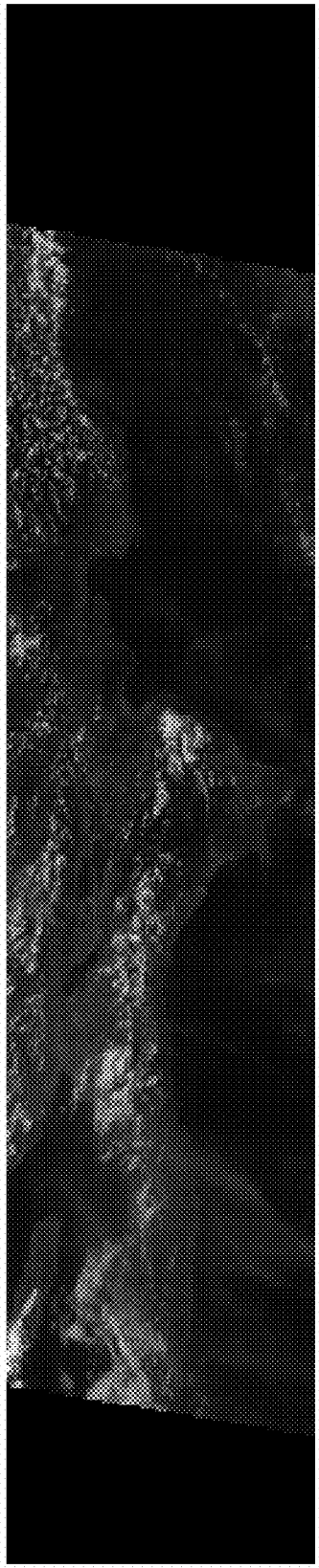
FIG. 26 shows the image of the red band for the above histogram in FIG. 24.
Figure 27:
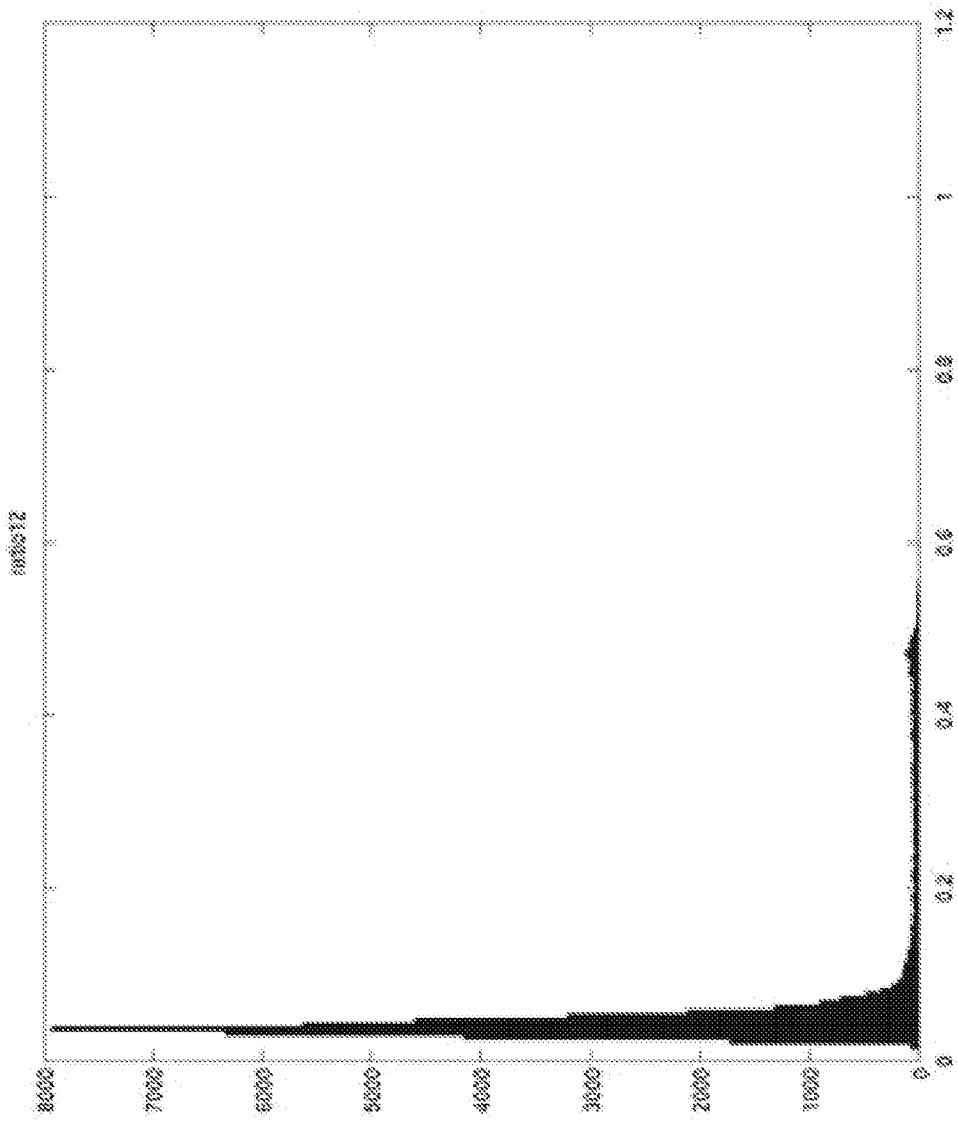
FIG. 27 shows AVI=0.072.
Figure 28:
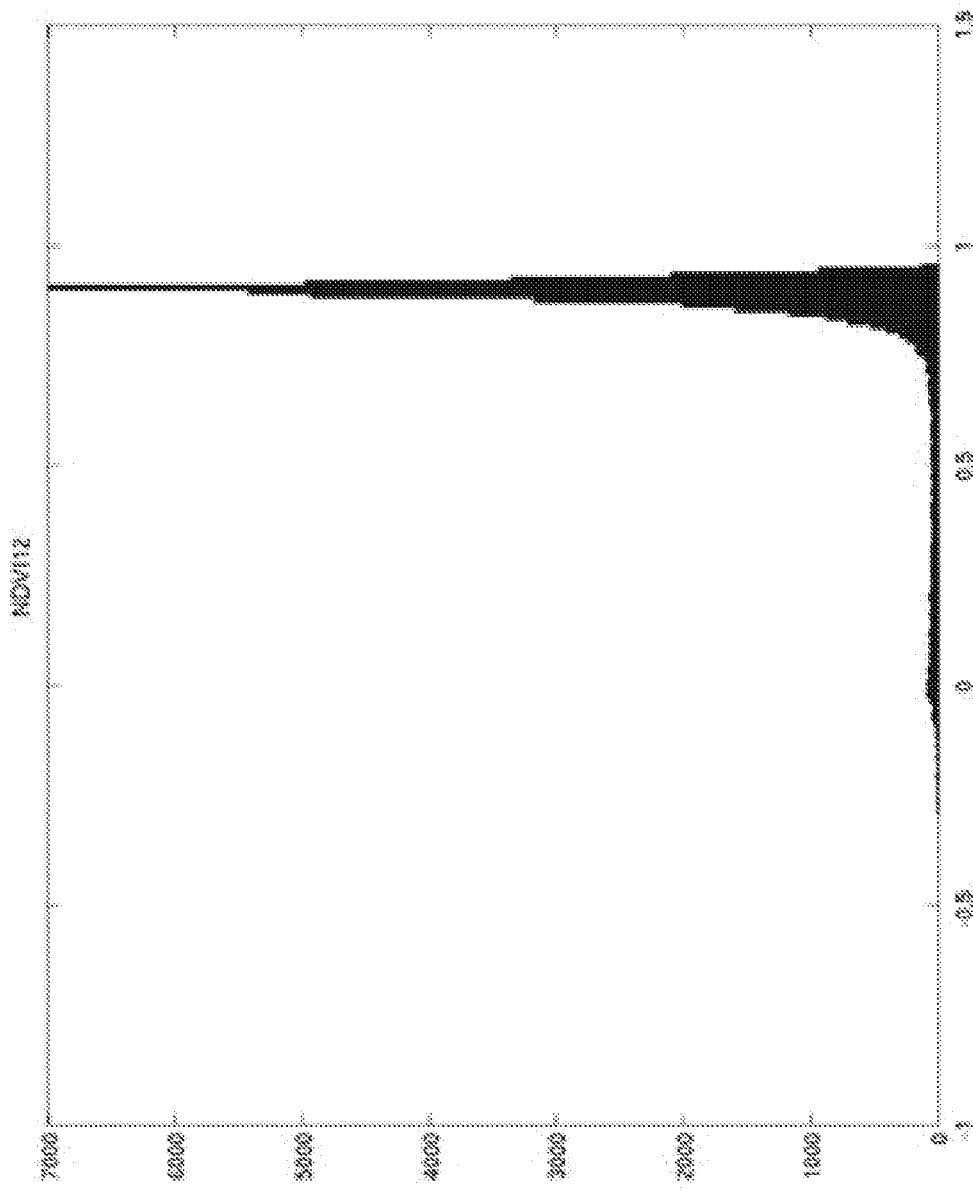
FIG. 28 shows NDVI for the same image of the above AVI histogram FIG. 27.
Figure 29:
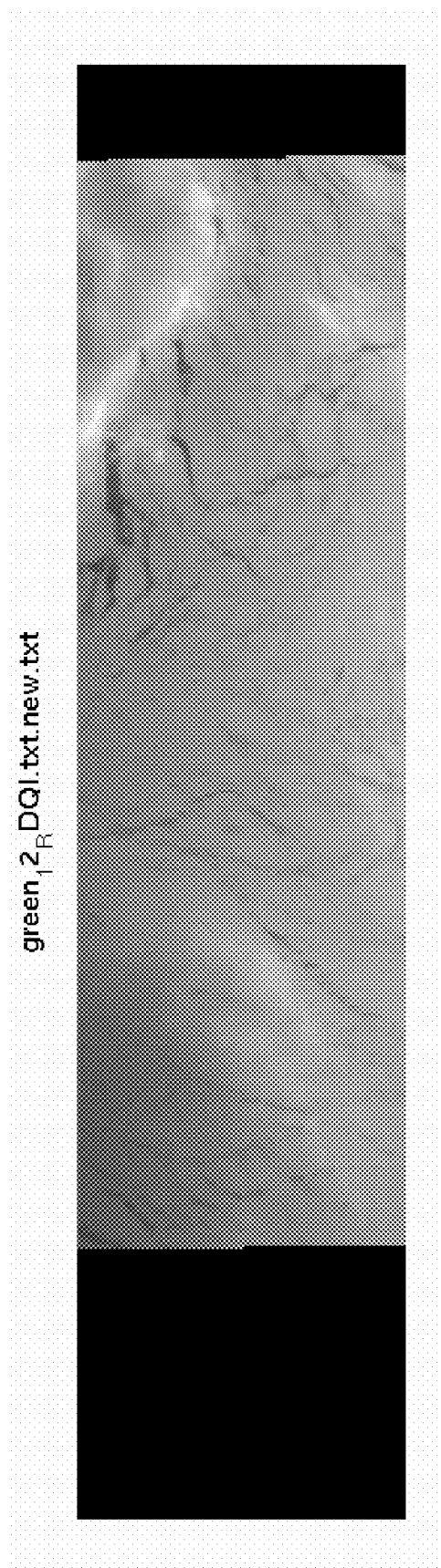
FIG. 29 shows the image of the green band for the above histogram in FIG. 27.
Figure 30:
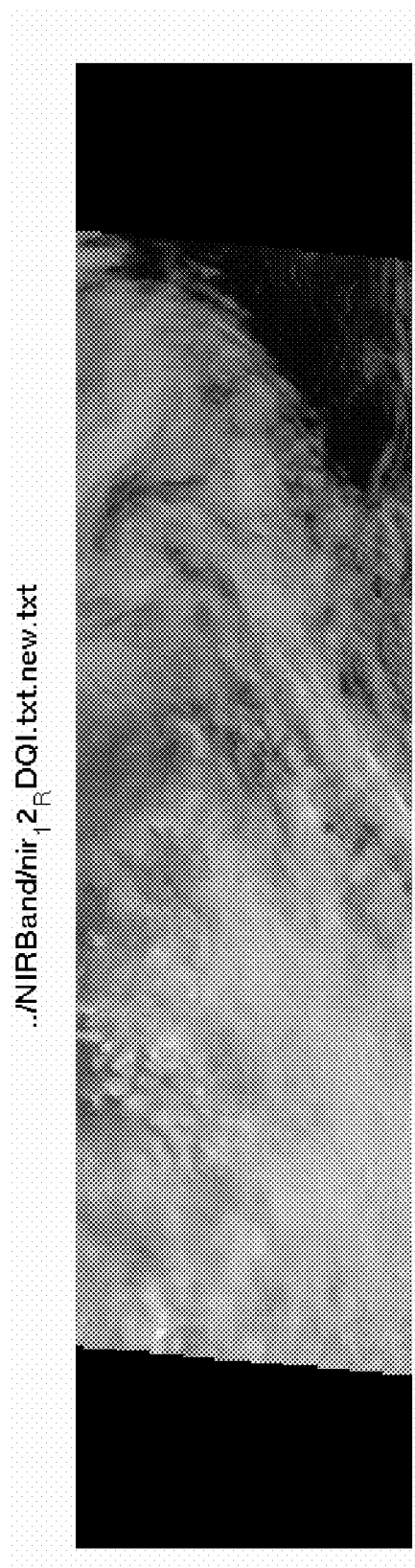
FIG. 30 shows the image of the NIR band for the above histograms in FIG. 27 and FIG. 28.
Figure 31:
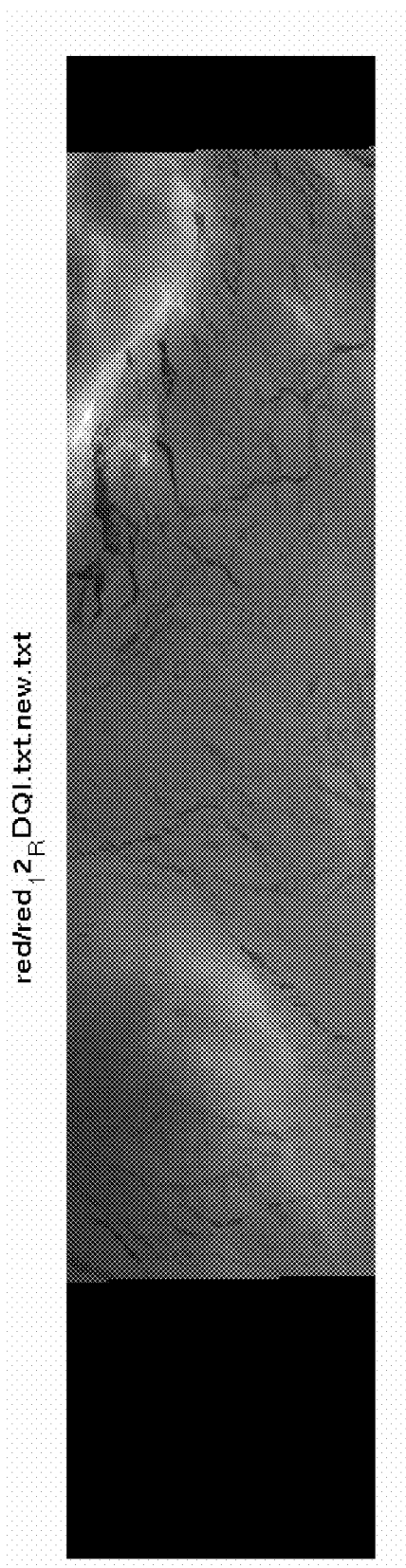
FIG. 31 shows the image of the red band for the above histogram in FIG. 28.
Figure 32:
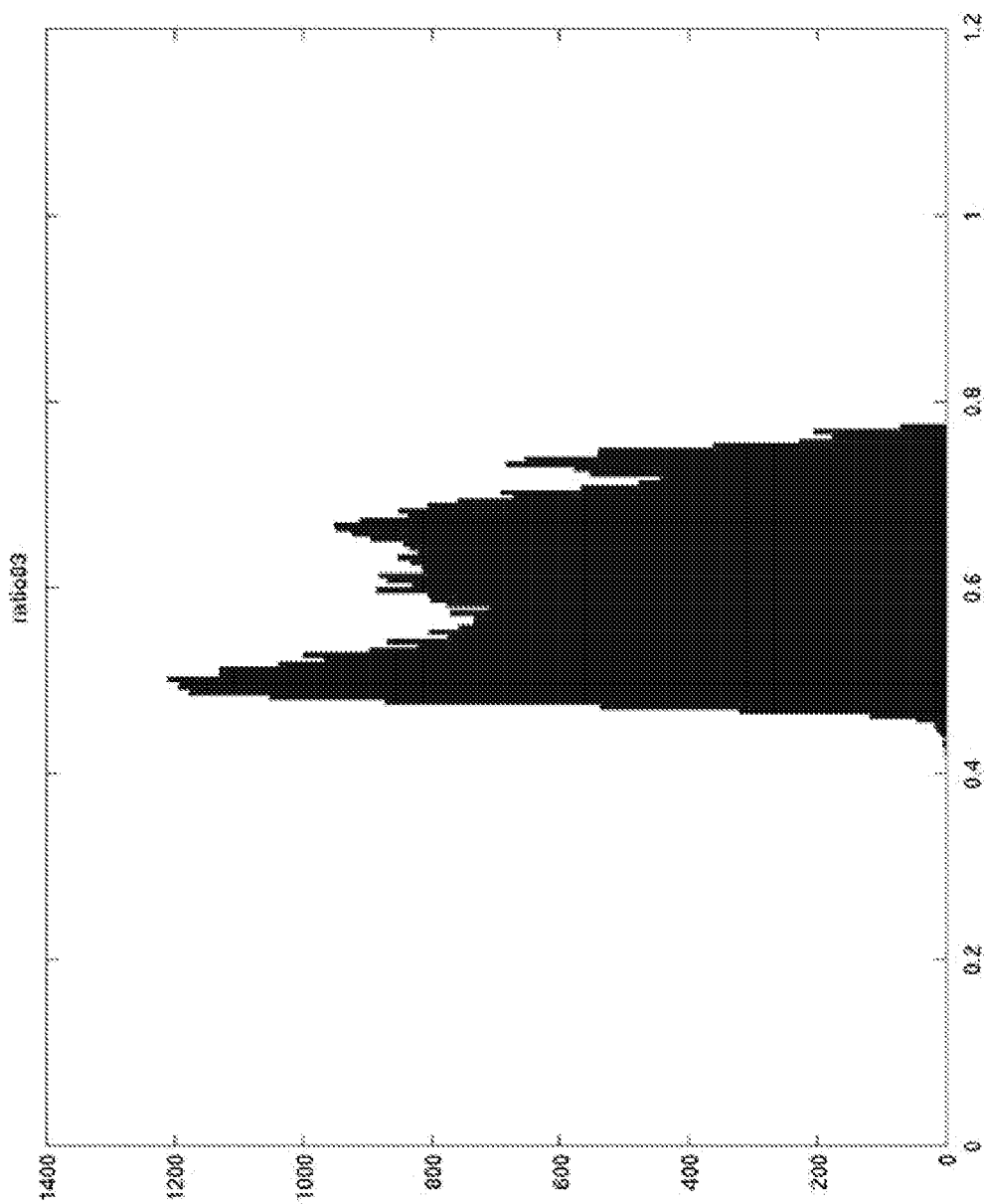
FIG. 32 shows AVI=0.6005.
Figure 33:
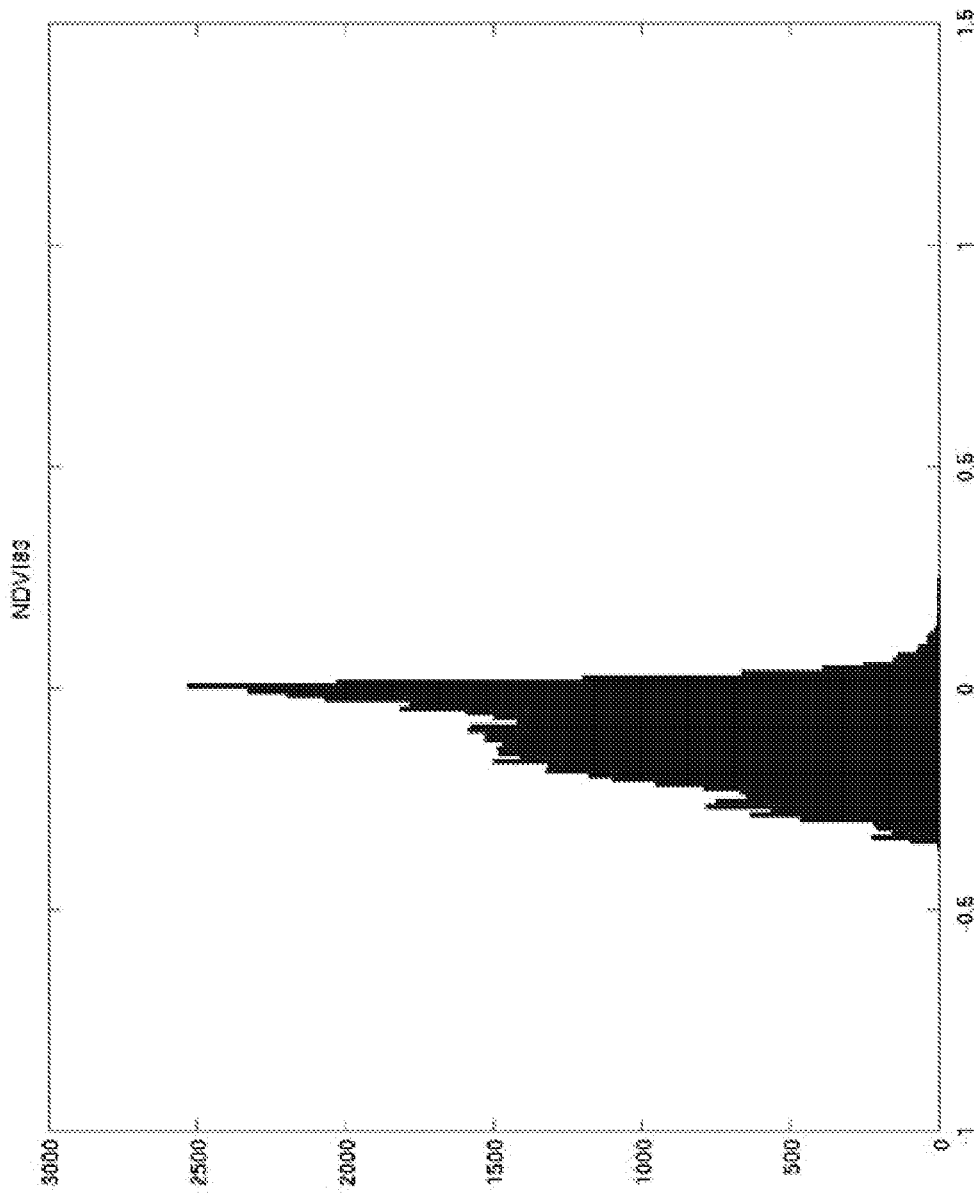
FIG. 33 shows NDVI.
Figure 34:
FIG. 34 shows the image of the green band for the above histogram in FIG. 32.
Figure 35:
FIG. 35 shows the image of the NIR band for the above histograms in FIG. 32 and FIG. 33.
Figure 36:
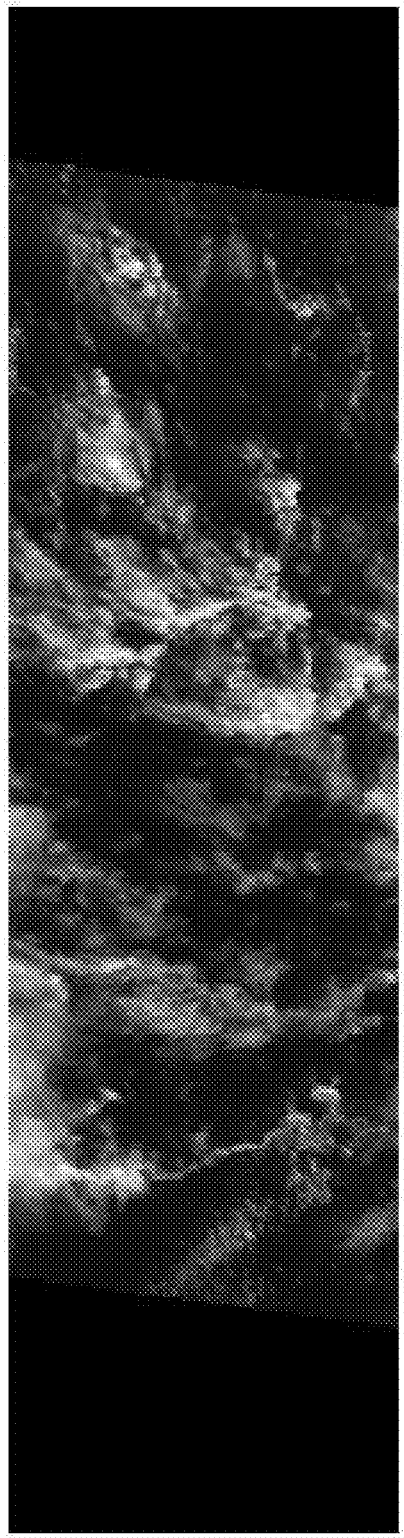
FIG. 36 shows the image of the red band for the above histogram in FIG. 33.
Figure 37:
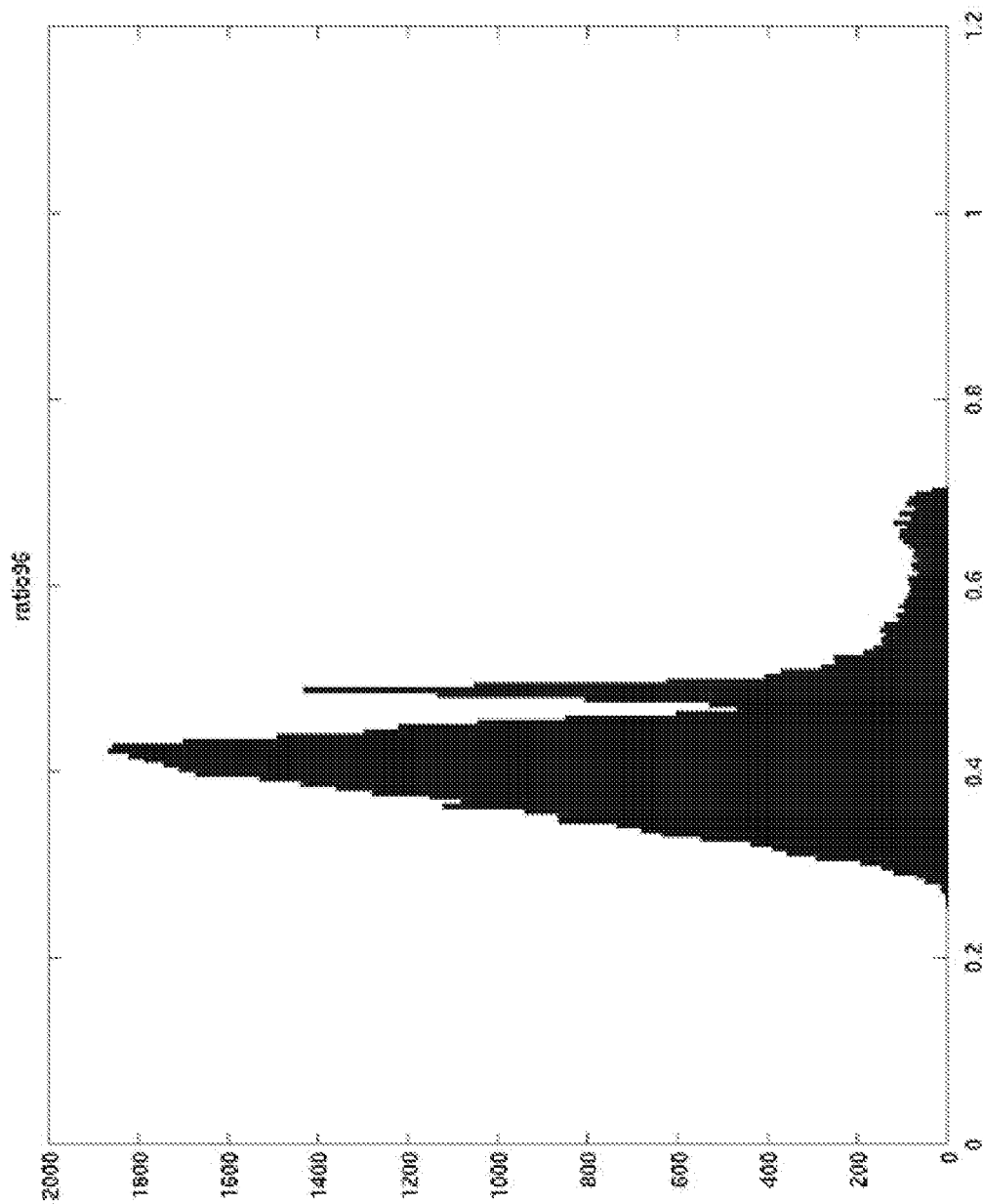
FIG. 37 shows AVI=0.4262.
Figure 38:
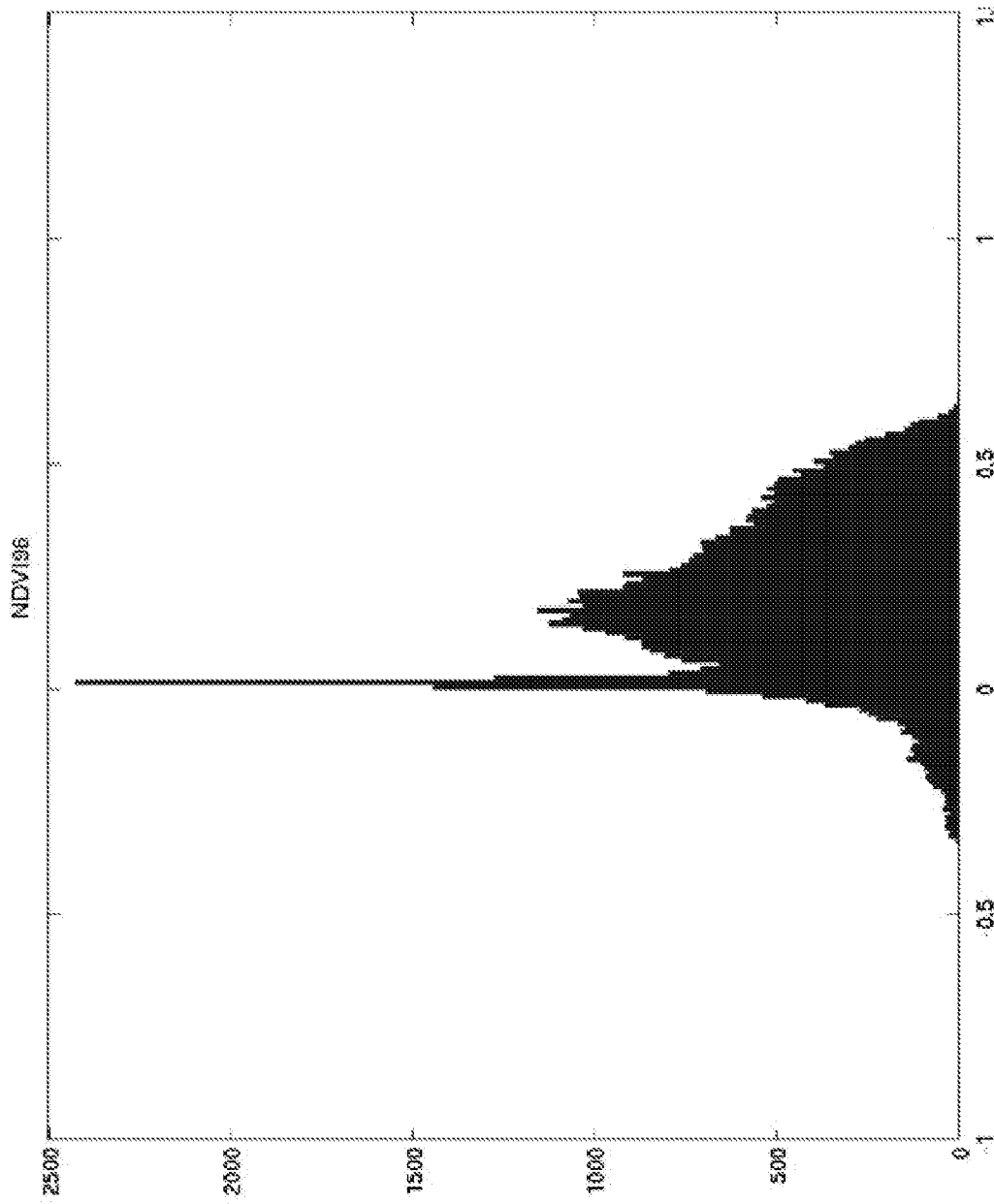
FIG. 38 shows NDVI.
Figure 39:
FIG. 39 shows the image of the green band for the above histogram in FIG. 37.
Figure 40:
FIG. 40 shows the image of the NIR band for the above histograms in FIG. 37 and FIG. 38.
Figure 41:
FIG. 41 shows the image of the red band for the above histogram in FIG. 38.
Figure 42:
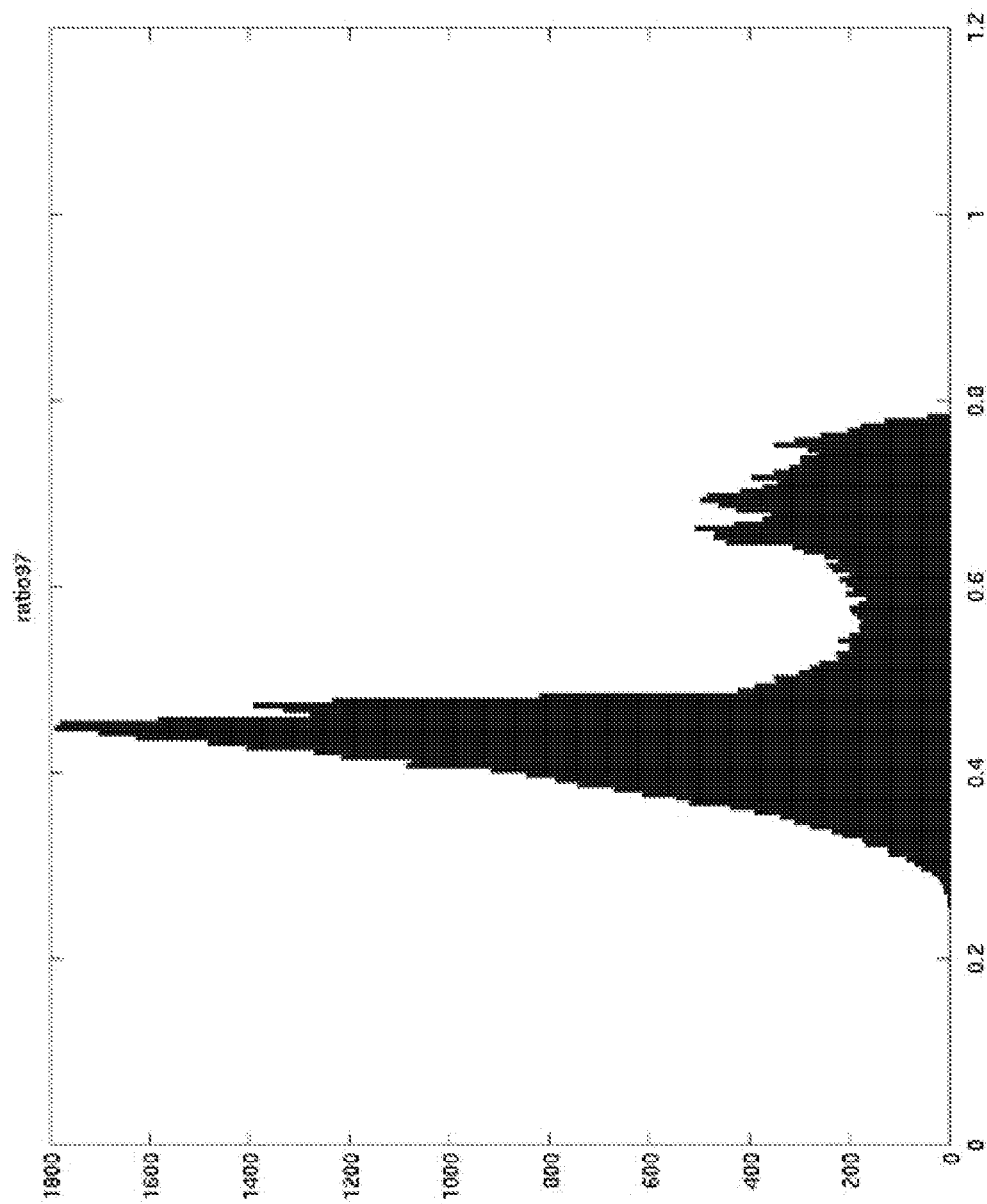
FIG. 42 shows AVI=0.5019.
Figure 43:
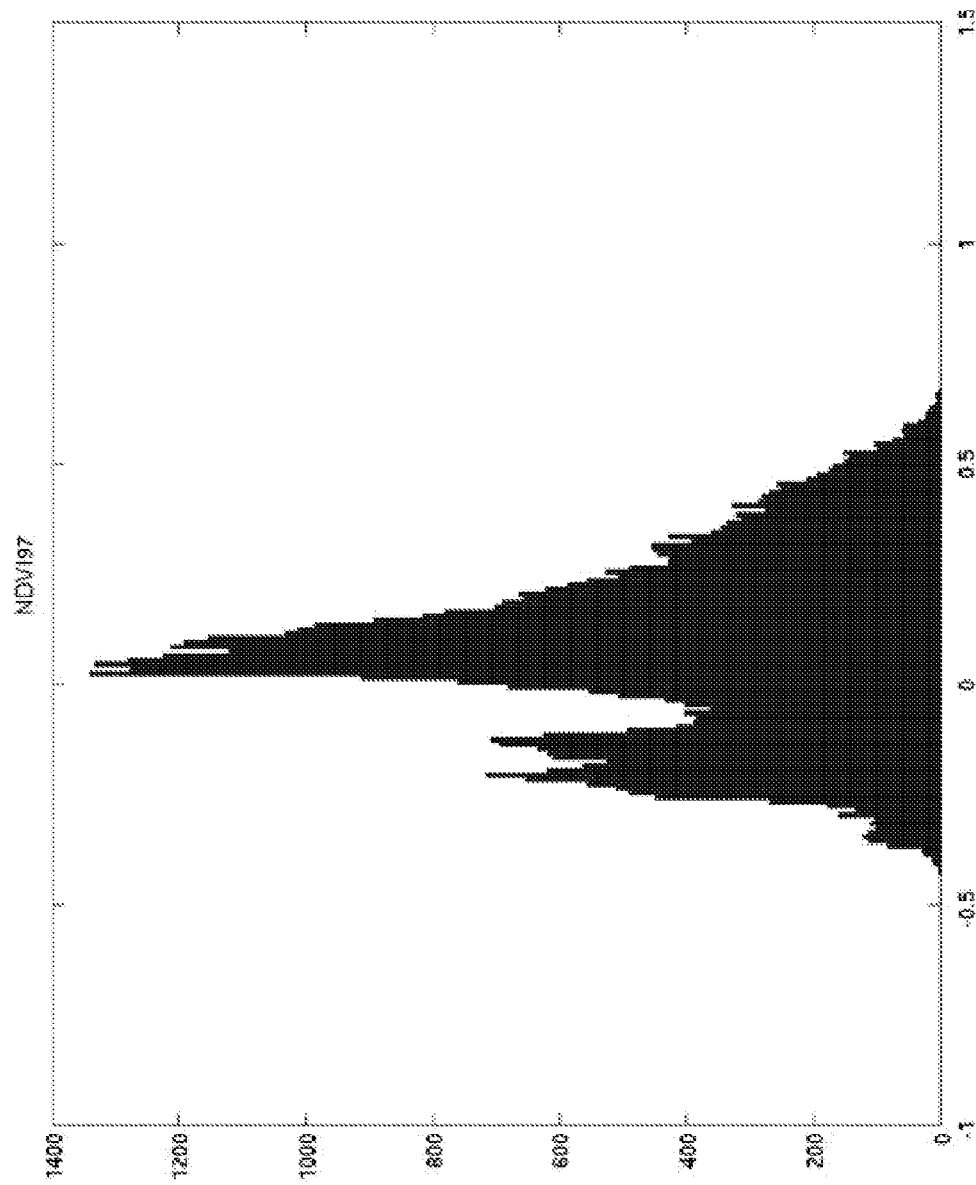
FIG. 43 shows NDVI.
Figure 44:
FIG. 44 shows the image of the green band for the above histogram in FIG. 42.
Figure 45:
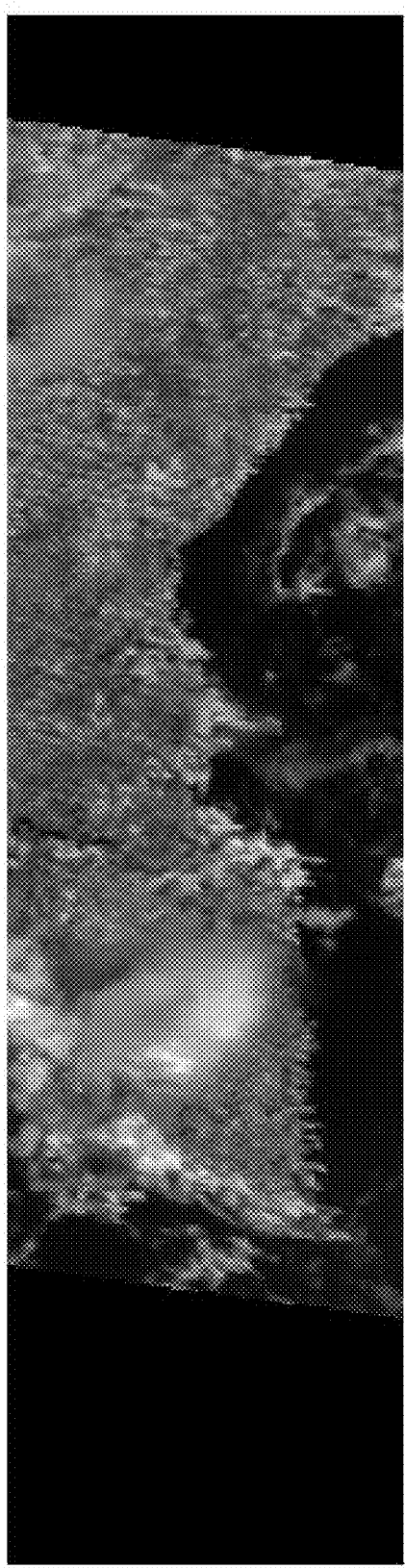
FIG. 45 shows the image of the NIR band for the above histograms in FIGS. 42 and 43.
Figure 46:
FIG. 46 shows the image of the red band for the above histogram in FIG. 43.
Figure 47:
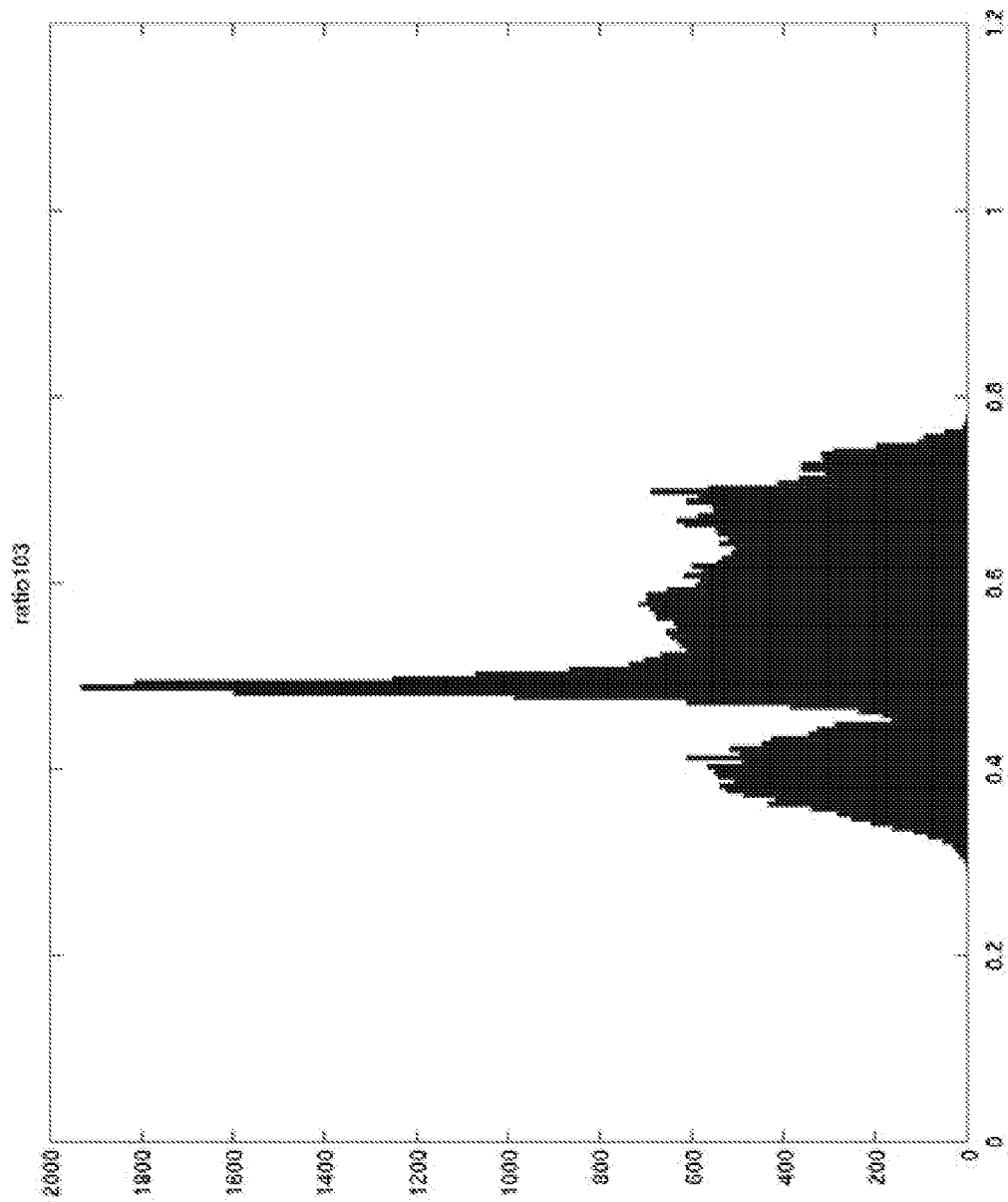
FIG. 47 shows AVI=0.5417.
Figure 48:
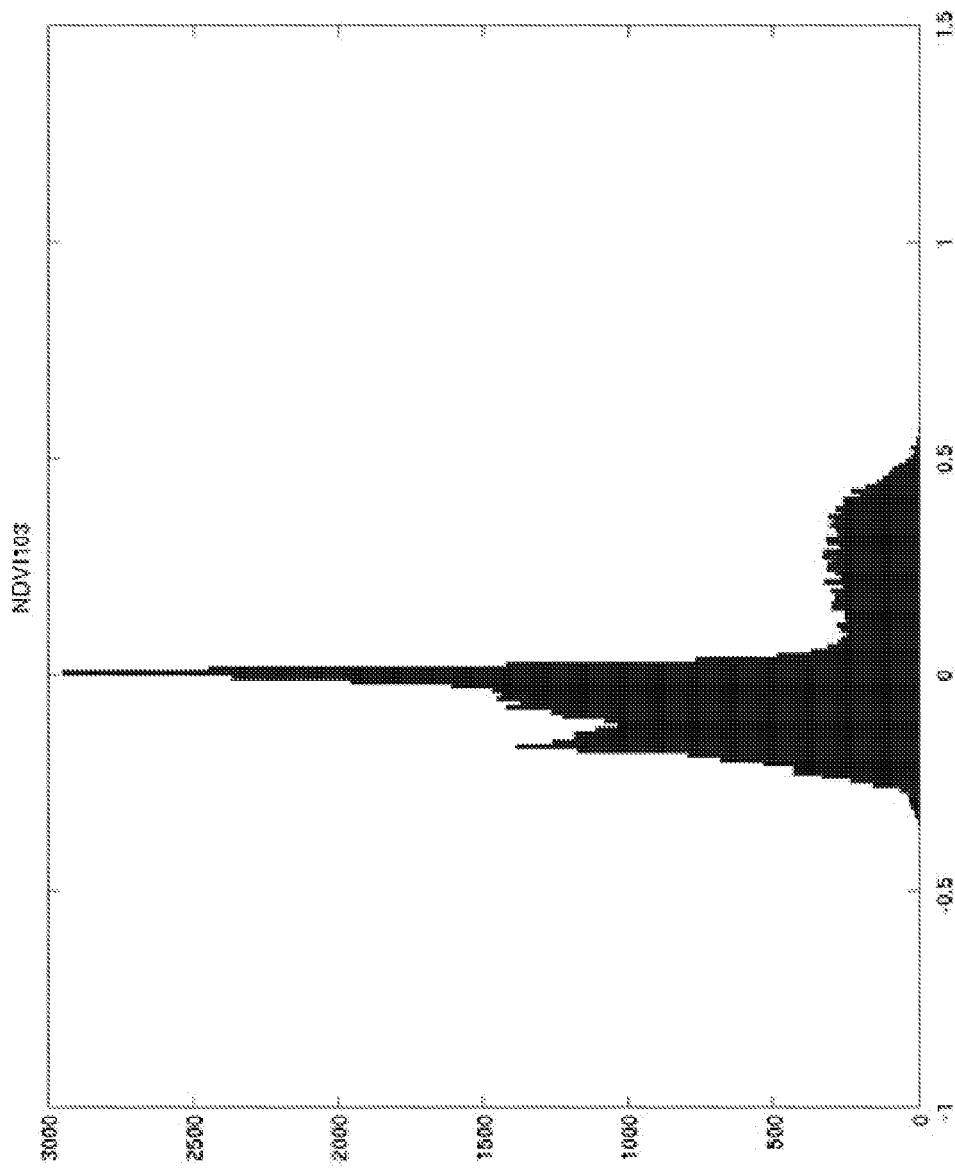
FIG. 48 shows NDVI.
Figure 49:
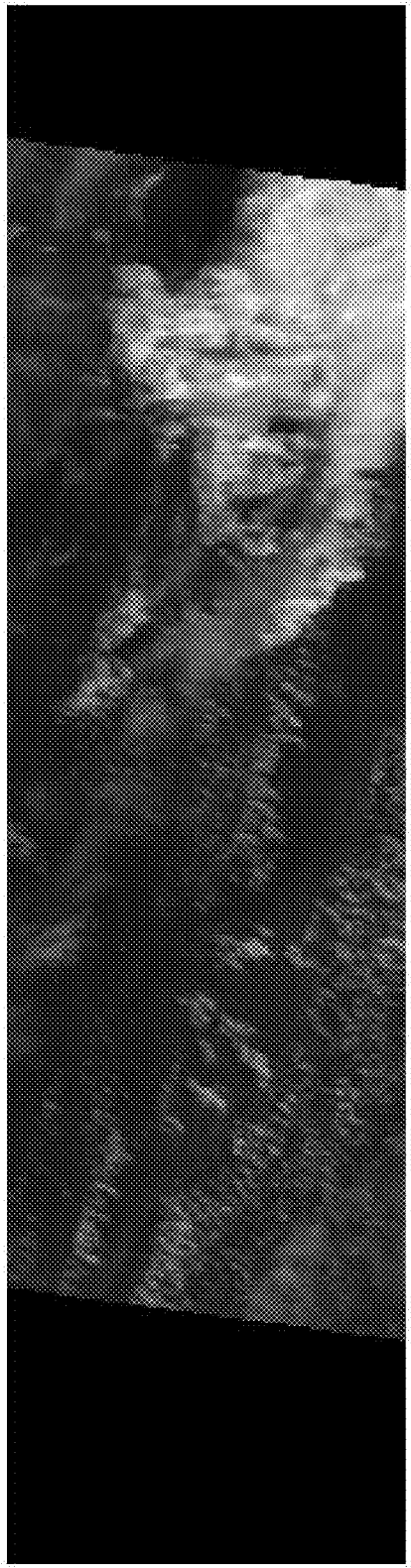
FIG. 49 shows the image of the green band for the above histogram in FIG. 47.
Figure 50:
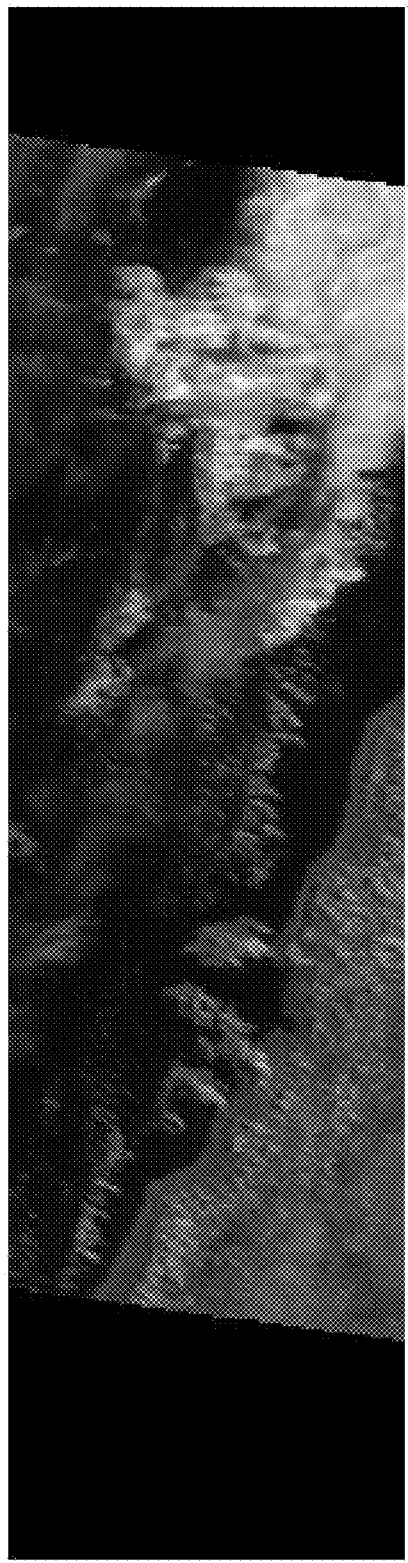
FIG. 50 shows the image of the NIR band for the above histogram in FIG. 47 and FIG. 48.
Figure 51:
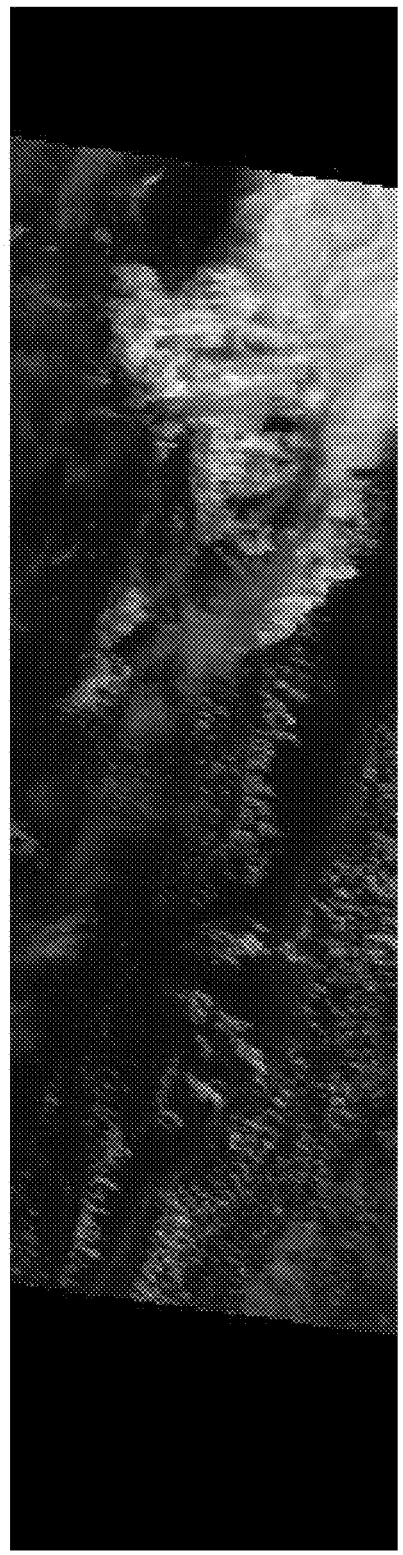
FIG. 51 shows the image of the red band for the above histogram in FIG. 48.
Figure 52:
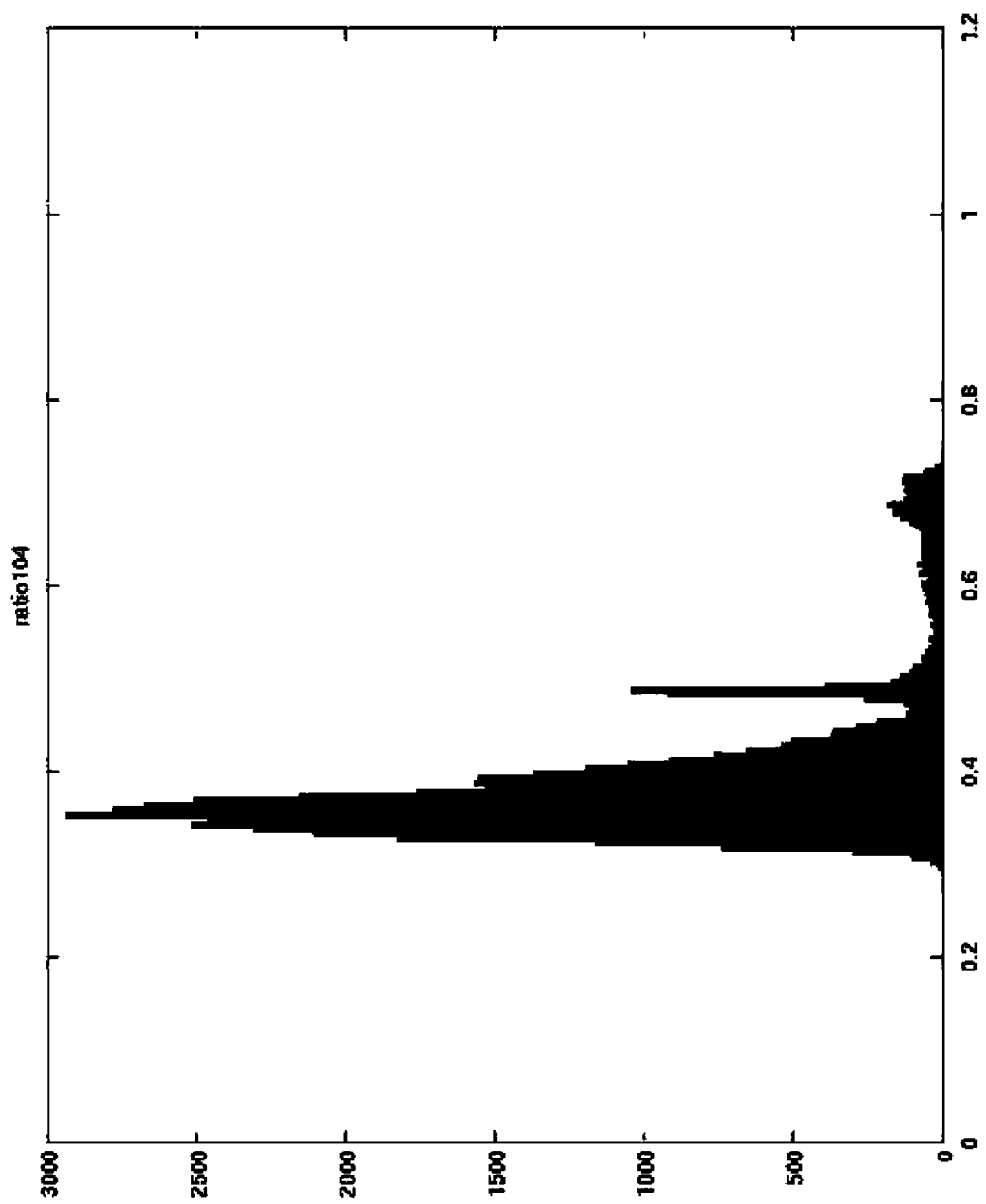
FIG. 52 shows AVI=0.3958.
Figure 53:
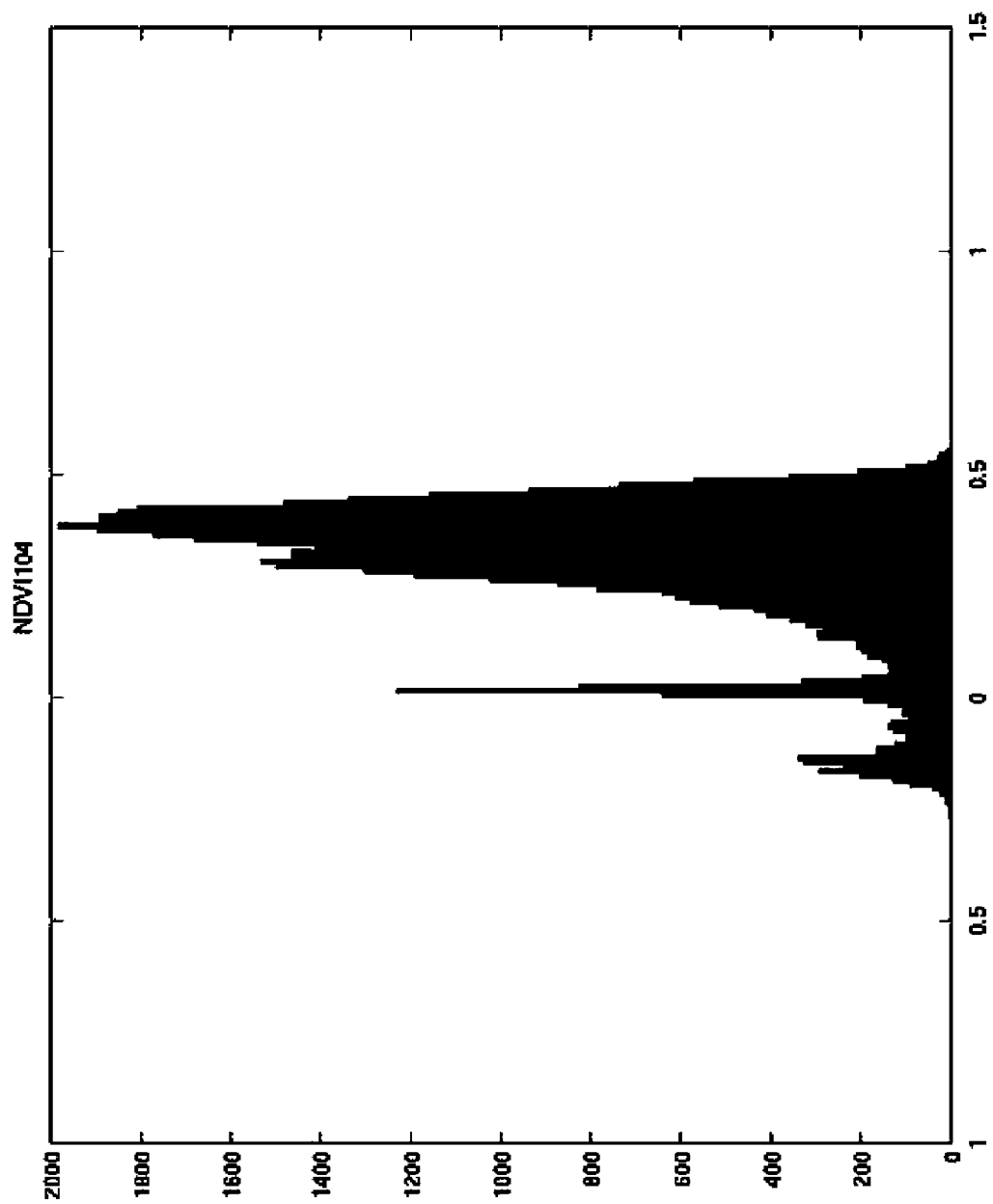
FIG. 53 shows NDVI.
Figure 54:
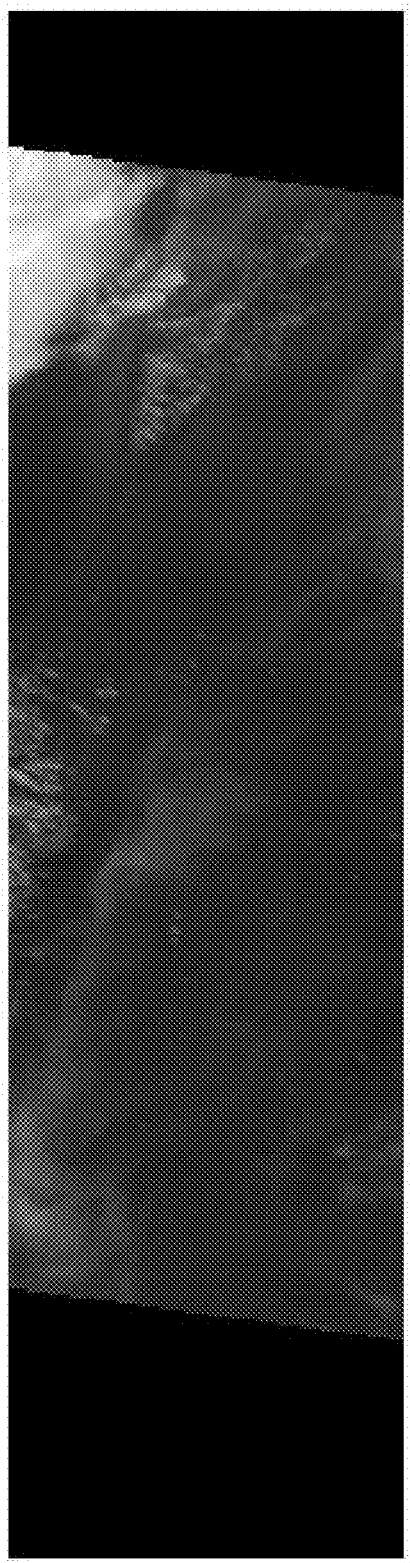
FIG. 54 shows the image of the green band for the above histogram in FIG. 52.
Figure 55:
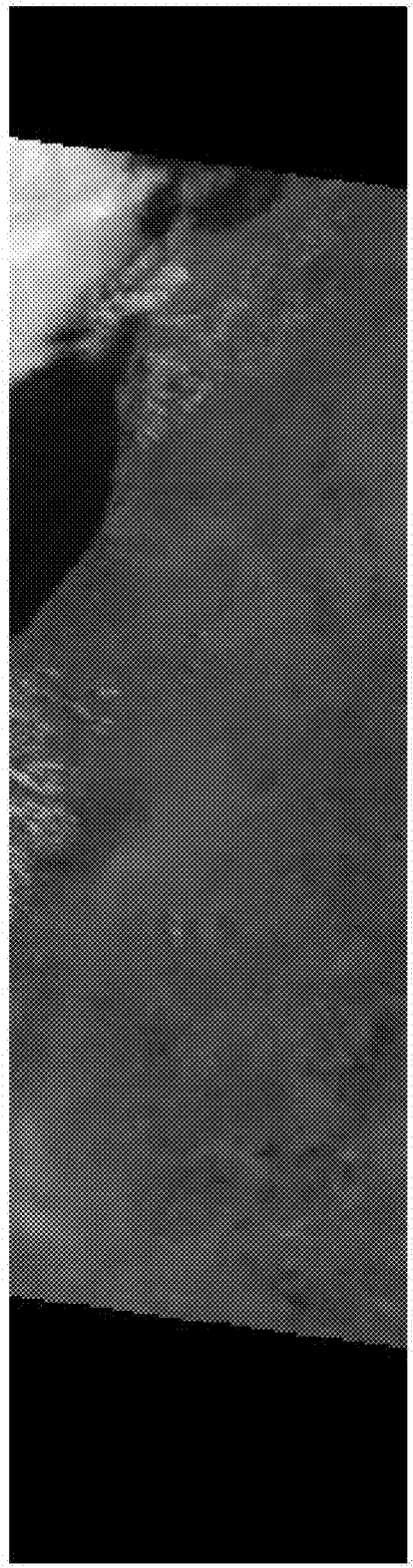
FIG. 55 shows the image of the NIR band for the above histograms in FIGS. 52 and 53.
Figure 56:
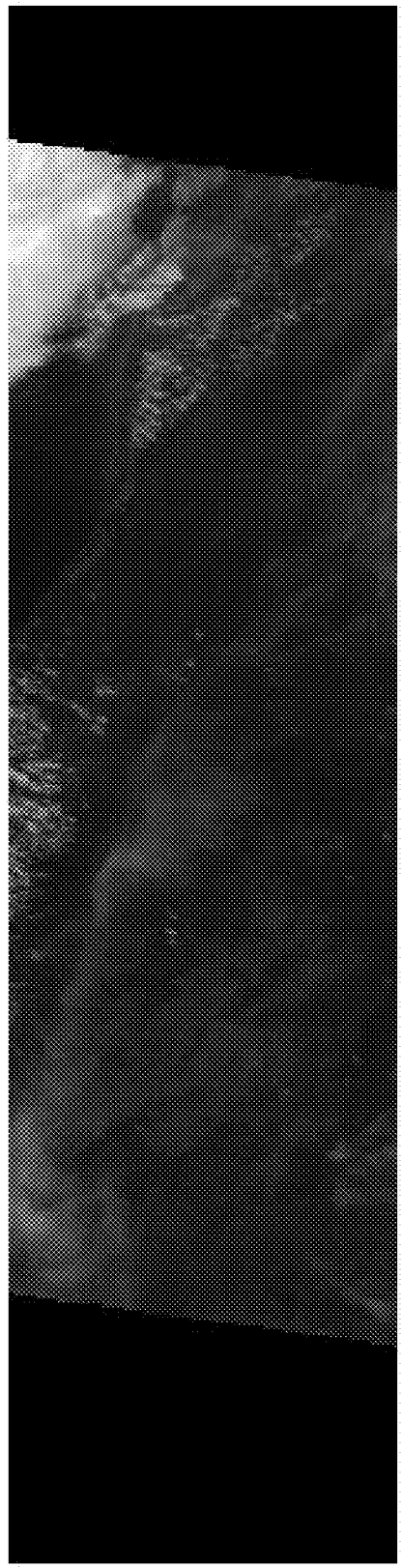
FIG. 56 shows the image of the red band for the above histogram in FIG. 53.
Figure 57:
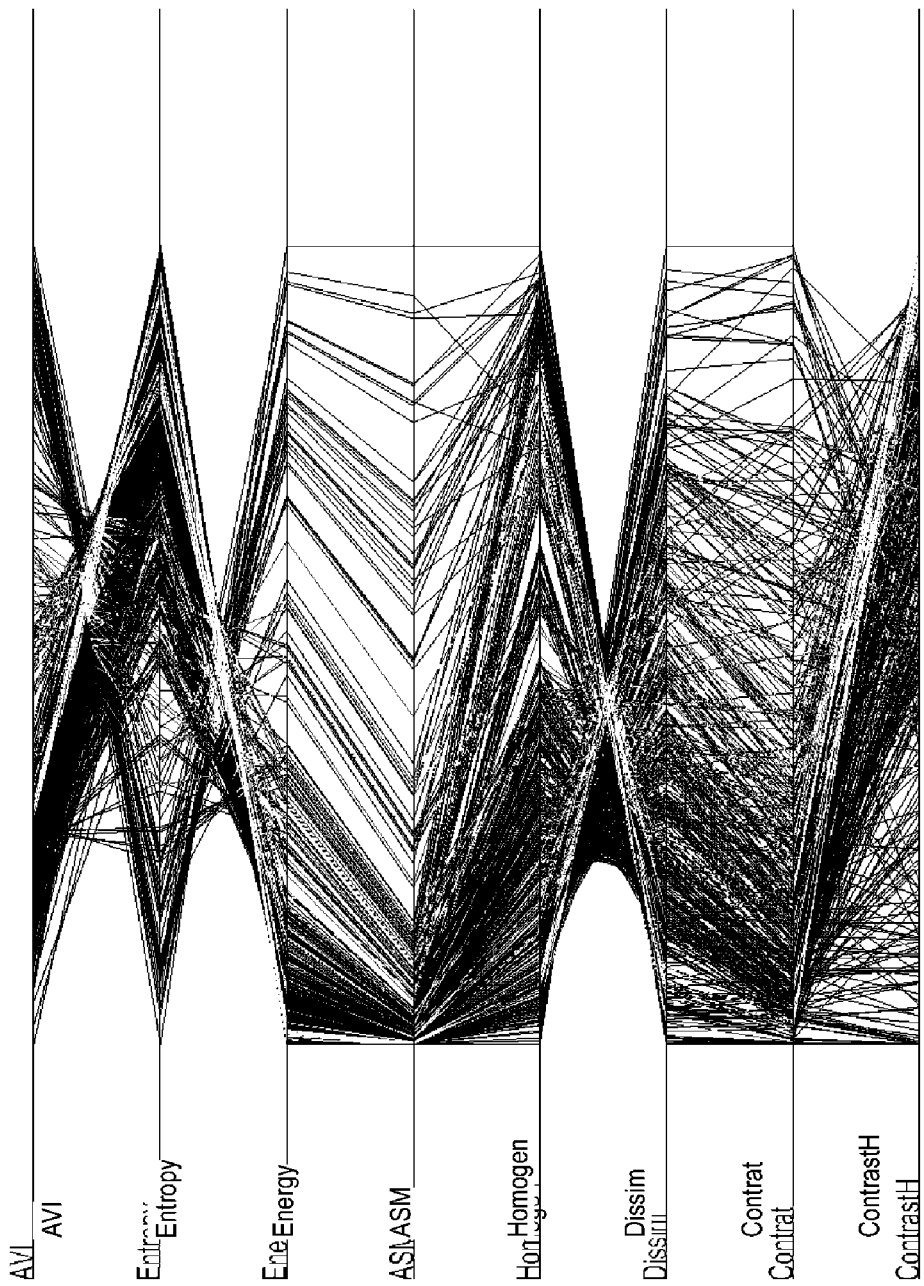
FIG. 57 shows a parallel coordinate display of all image features.
Figure 61:
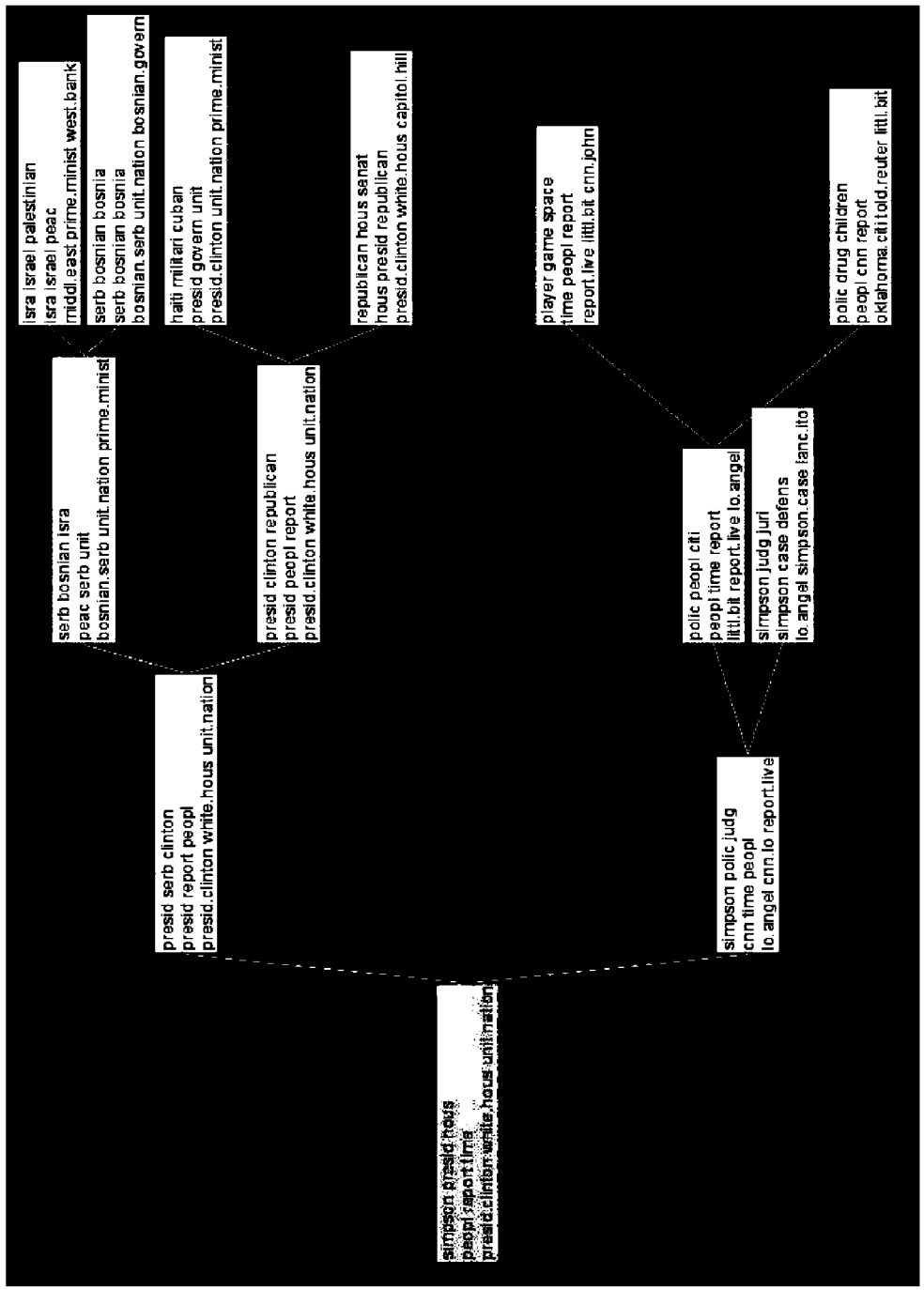
FIG. 61 shows the repeated bisections for clustering the dataset.
Figure 62:
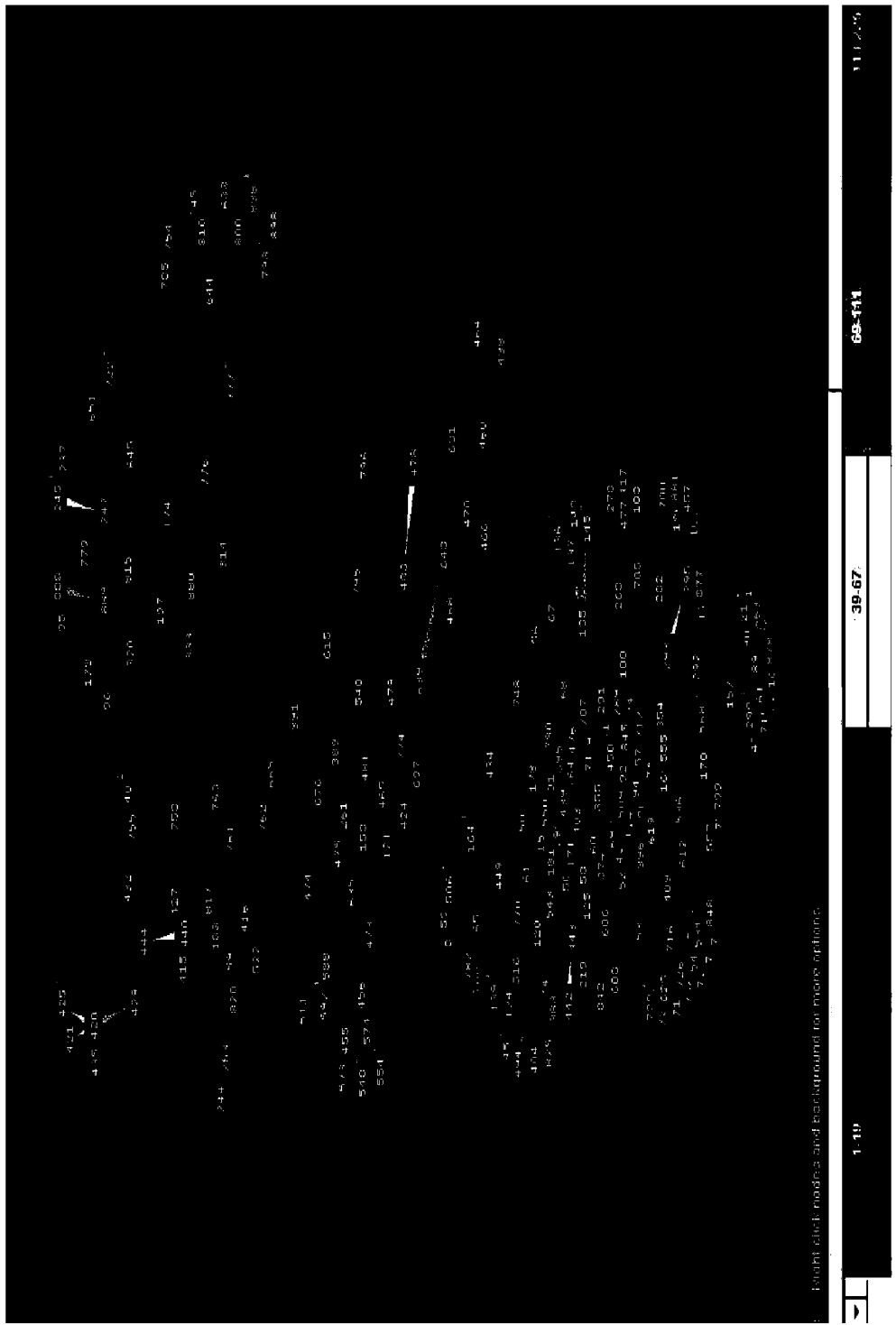
FIG. 62 displays the MST layout model screen for documents on Cluster 12.
Figure 71:
FIG. 71 shows features extraction of image data page.
Figure 72:
FIG. 72 shows the description of Alternative Vegetation index (AVI)
Figure 73:
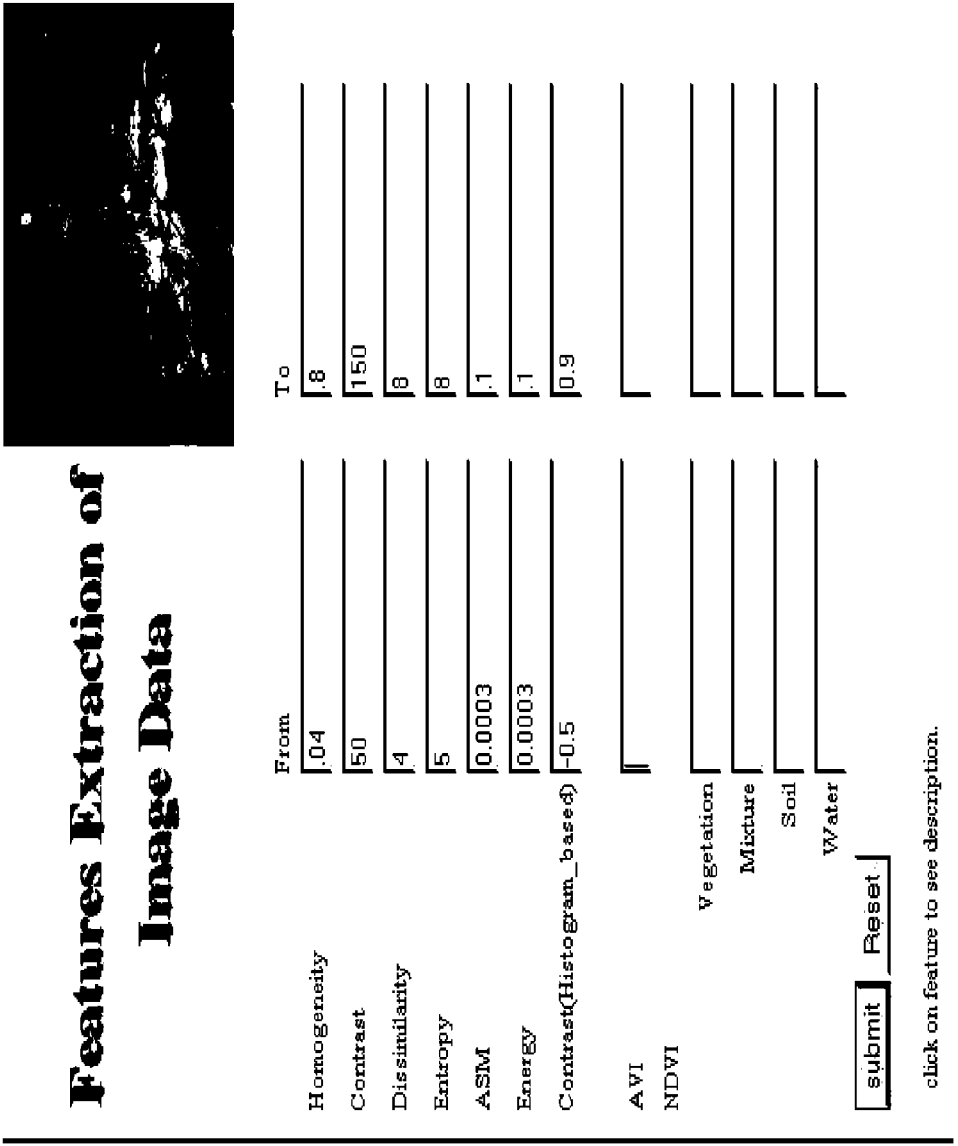
FIG. 73 shows a compound of seven features query.
Figure 75:
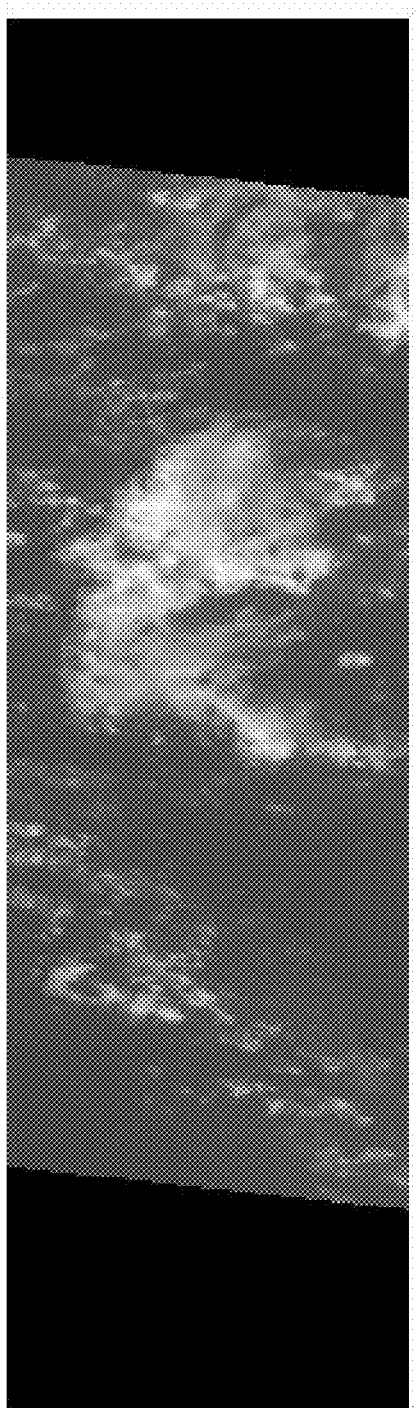
FIG. 75 shows a blue band image as an output of the query in FIG. 73.
Figure 76:
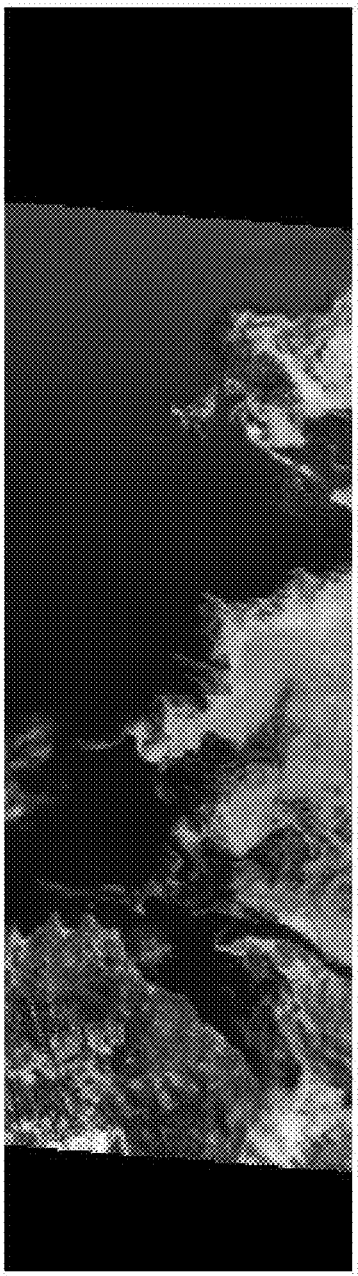
FIG. 76 shows a green band image as an output of the query in FIG. 73.
Figure 77:
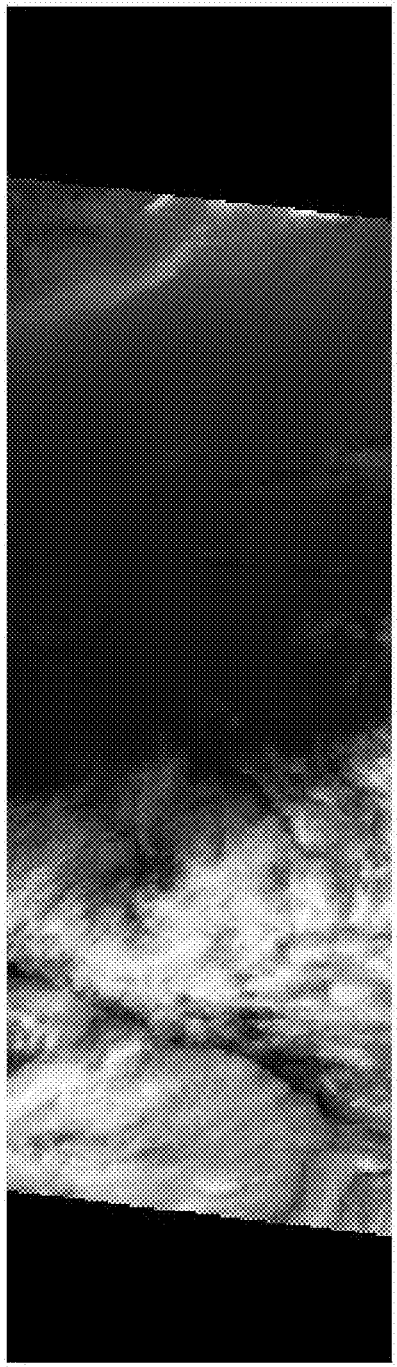
FIG. 77 shows a NIR band image as an output of the query in FIG. 73.
Figure 78:
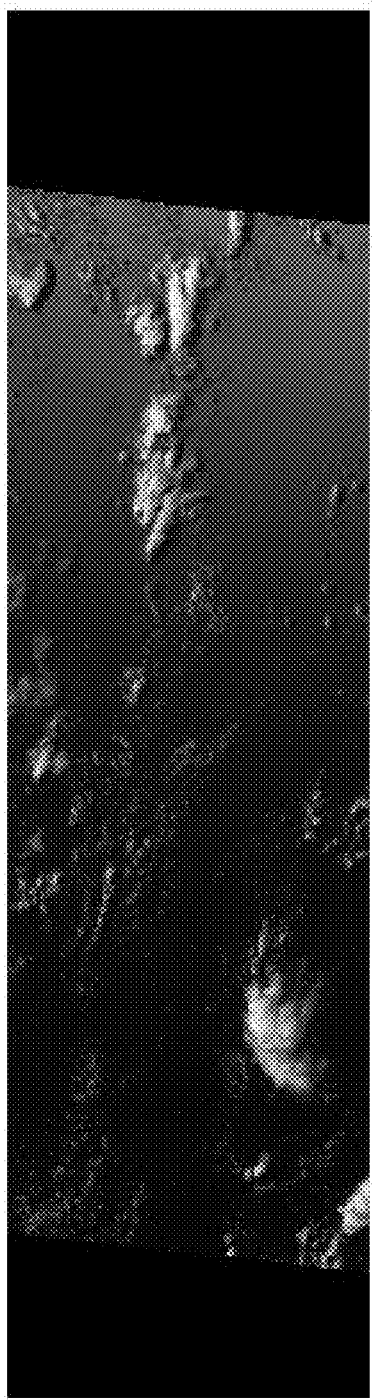
FIG. 78 shows a red band image as an output of the query in FIG. 73.
Figure 79:
FIG. 79 shows the new query after the AVI feature added to the seven features in FIG. 73.
Figure 81:
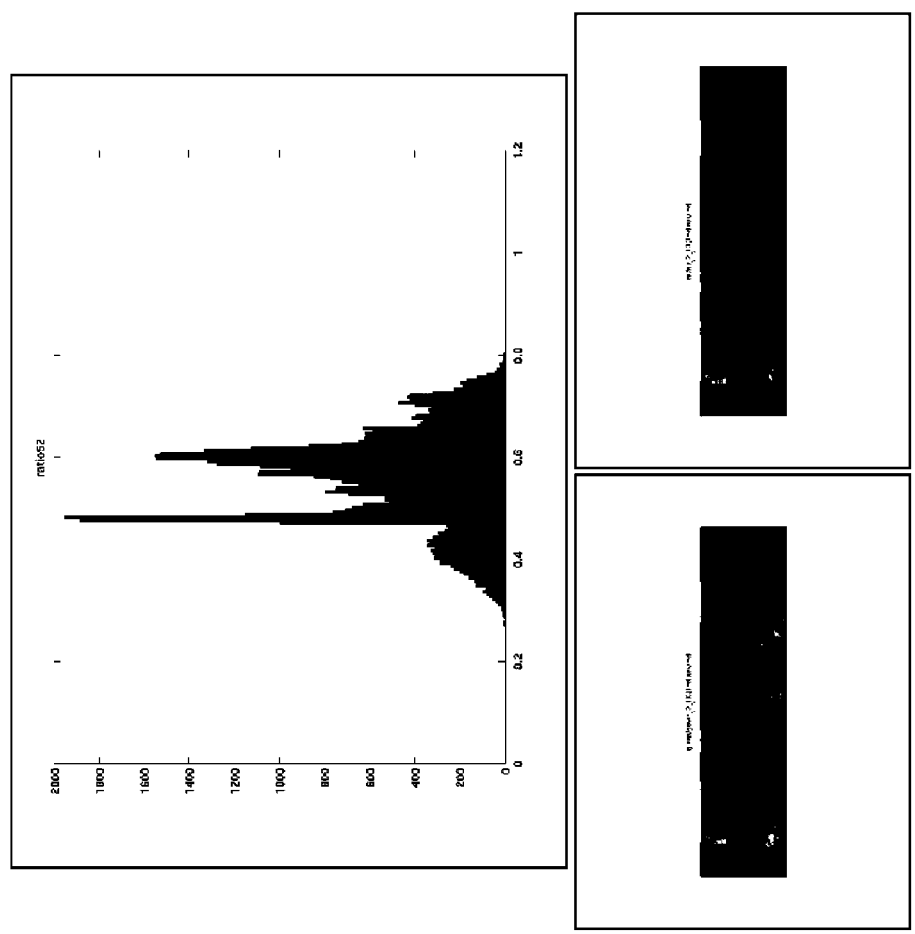
FIG. 81 shows the AVI histogram for the AVI_332 and the corresponding green and NIR images.
Figure 82:
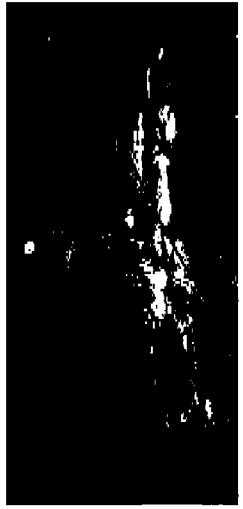
FIG. 82 shows the new query with the selection of NDVI feature.
Figure 84:
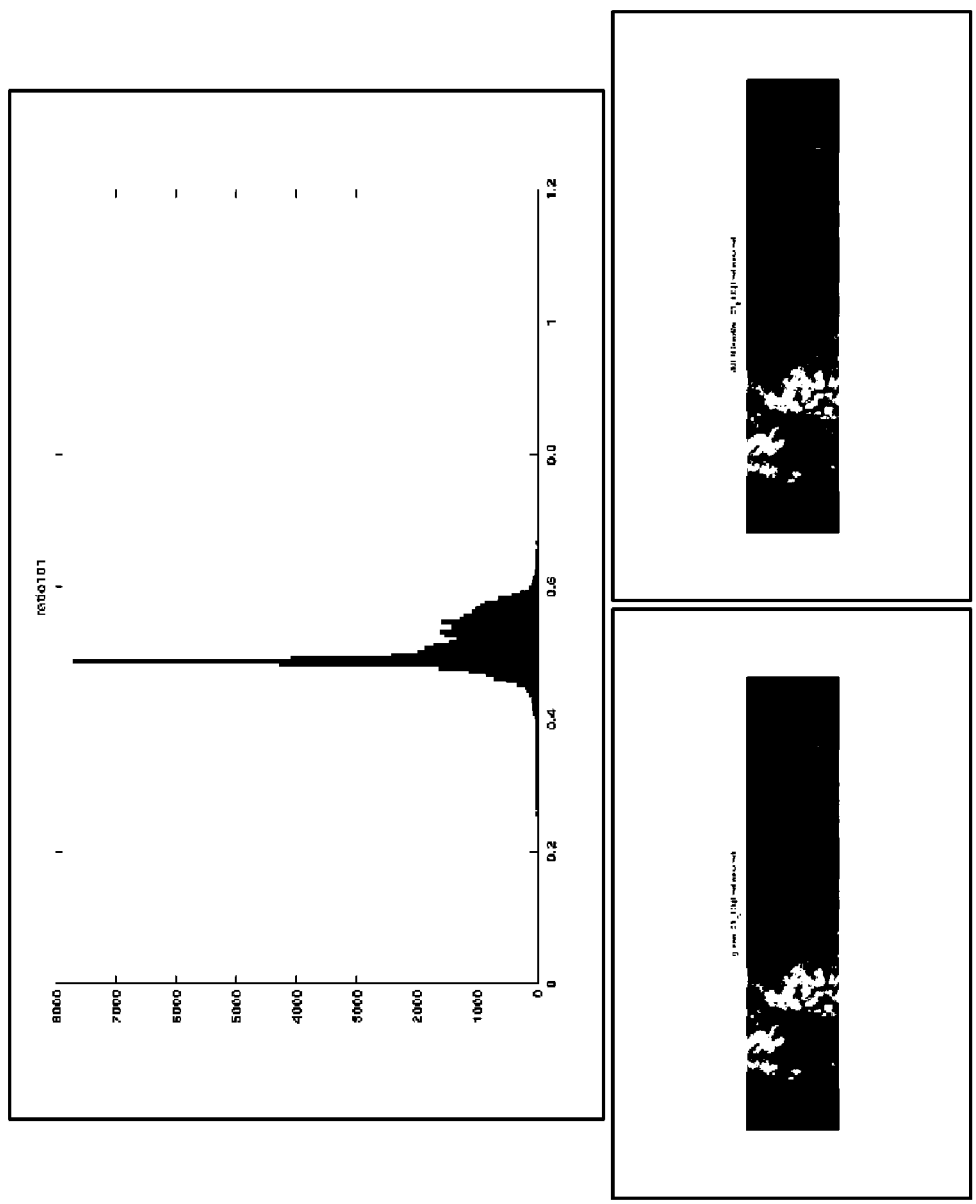
FIG. 84 shows the AVI histogram for AVI_237 and the green and NIR images.
Figure 85:
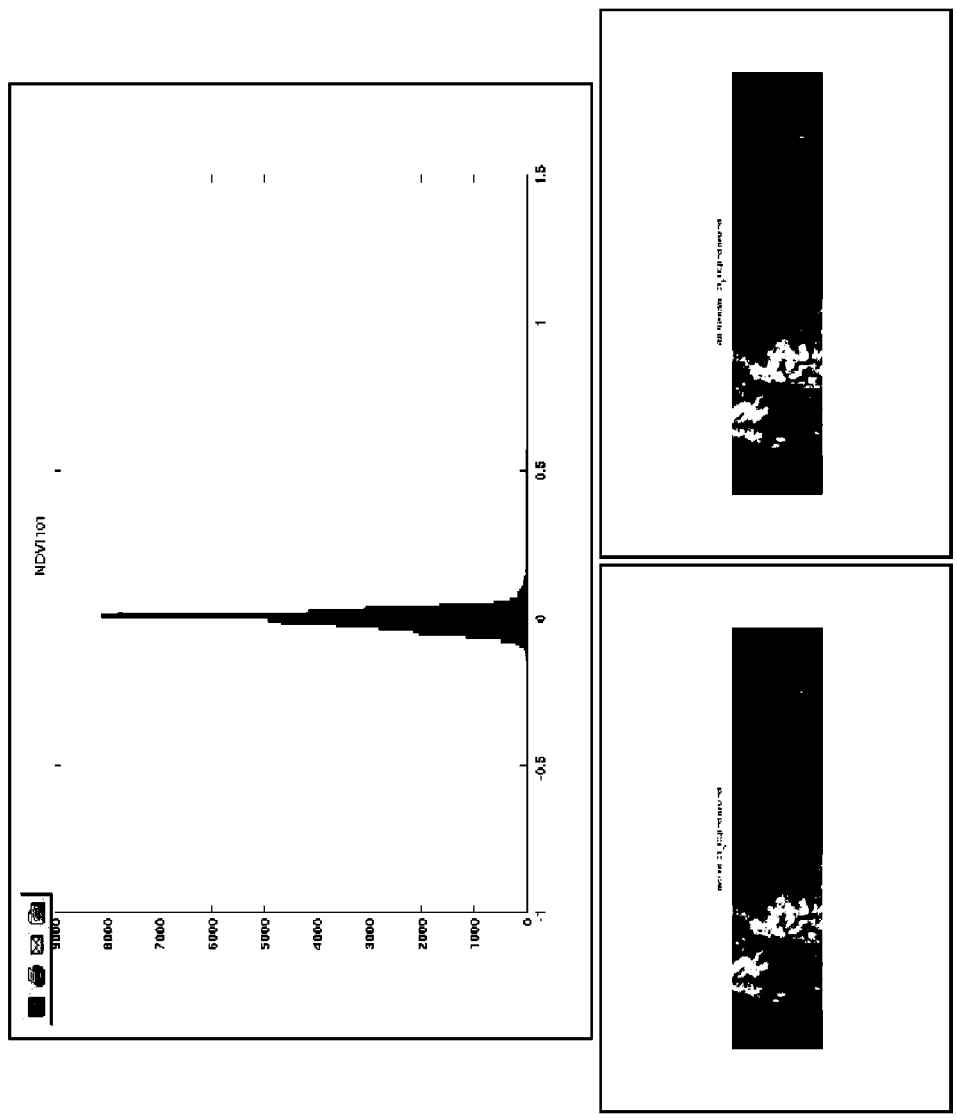
FIG. 85 shows the NDVI histogram for AVI_237 and the NIR and red images.
Figure 86:
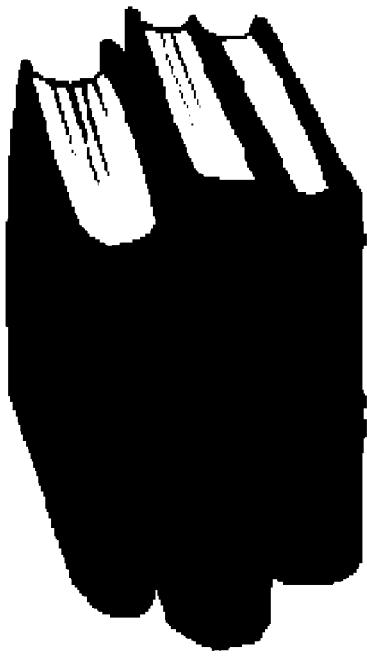
FIG. 86 shows the page of features extraction of data.
Figure 93:
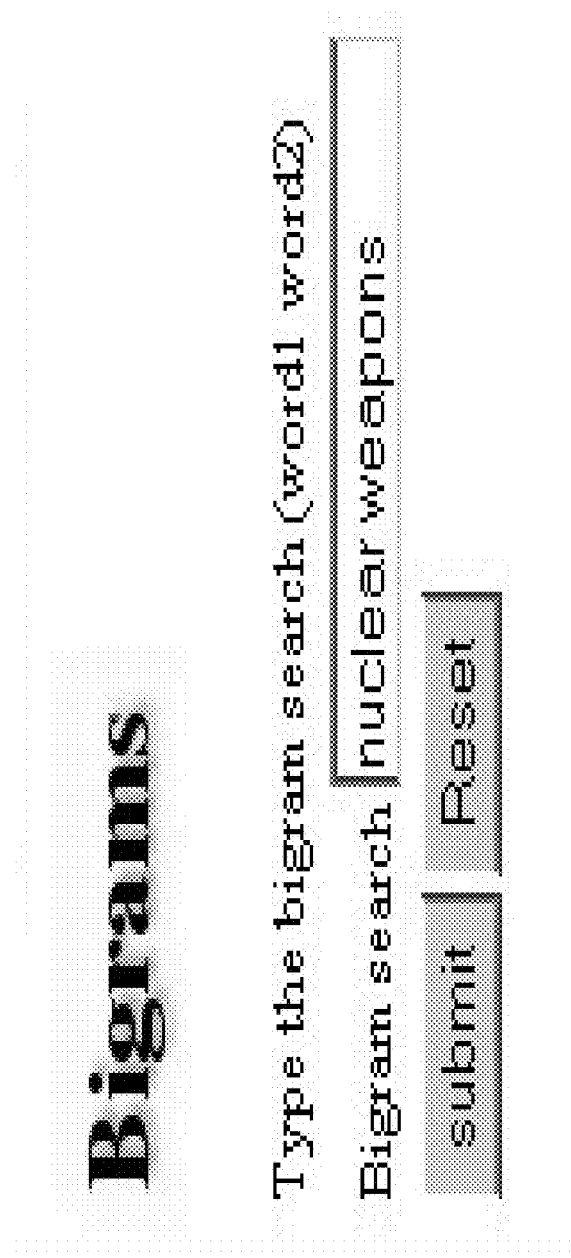
FIG. 93 shows the Bigrams page.

TABLE-US-00001
FIG. Page 1. FIG. 1 61 2. FIG. 2 70 3. FIG. 3 71 4. FIG. 4 74 5. FIG. 5 75 6. FIG. 6 77 7. FIG. 7 77 8. FIG. 8 81 9. FIG. 9 105 10. FIG. 10 107 11. FIG. 11 110 12. FIG. 12 111 13. FIG. 13 111 14. FIG. 14 111 15. FIG. 15 112 16. FIG. 16 112 17. FIG. 17 112 18. FIG. 18 114 19. FIG. 19 114 20. FIG. 20 114 21. FIG. 21 117 22. FIG. 22 117 23. FIG. 23 117 24. FIG. 24 118 25. FIG. 25 118 26. FIG. 26 118 27. FIG. 27 119 28. FIG. 28 119 29. FIG. 29 120 25. FIG. 30 120 26. FIG. 31 120 27. FIG. 32 121 28. FIG. 33 121 29. FIG. 34 122 30. FIG. 35 122 31. FIG. 36 122 32. FIG. 37 123 33. FIG. 38 123 34. FIG. 39 124 35. FIG. 40 124 36. FIG. 41 124 37. FIG. 42 125 38. FIG. 43 125 39. FIG. 44 126 40. FIG. 45 126 41. FIG. 46 126 42. FIG. 47 127 43. FIG. 48 127 44. FIG. 49 128 45. FIG. 50 128 46. FIG. 51 128 47. FIG. 52 129 48. FIG. 53 129 49. FIG. 54 130 50. FIG. 55 130 51. FIG. 56 130 52. FIG. 57 131 53. FIG. 58A 142 54. FIG. 58B 142 55. FIG. 59 145 56. FIG. 60 147 57. FIG. 61 148 58. FIG. 62 149 59. FIG. 63 152 60. FIG. 64 155 61. FIG. 65 155 62. FIG. 66 157 63. FIG. 67 158 64. FIG. 68 159 65. FIG. 69 159 66. FIG. 70 161 67. FIG. 71 162 68. FIG. 72 164 69. FIG. 73 165 70. FIG. 74 166 71. FIG. 75 167 72. FIG. 76 167 73. FIG. 77 168 74. FIG. 78 168 75. FIG. 79 169 76. FIG. 80 170 77. FIG. 81 171 78. FIG. 82 172 79. FIG. 83 173 80. FIG. 84 173 81. FIG. 85 174 82. FIG. 86 175 83. FIG. 87 176 84. FIG. 88 177 85. FIG. 89 178 86. FIG. 90 179 87. FIG. 91 180 88. FIG. 92 181 89. FIG. 93 182 90. FIG. 94 182 91. FIG. 95 183

DETAILED DESCRIPTION

Abbreviations

NDVI Normalized differences vegetation Index
AVI Alternate Vegetation Index
GLCM Gray Level Co-occurrence Matrix
CGI Common Gateway Interface
TDT Topic Detection and Tracking
LDC Linguistic Data Consortium
JPL Jet Propulsion Laboratory
MST Minimal Spanning Tree
ASM Angular Second Moment
MISR Multi-angle Imaging SpectroRadiometer
DBMS Database Management Systems
BLOB Binary Large Objects
CLUTO Clustering Toolkit
GIS Geographical Information System
GDBSCAN Generalized Density Based Spatial Clustering of Applications with Noise
CLARANS Clustering Algorithm based on Randomized Search
SDBS Spatial Database System
LSI Latent Semantic Indexing
SVD Singular Value Decomposition
CBC Clustering by Committee
ESIPs Earth Science Information Partners
SIESIP Seasonal Interannual ESIP
GES DAAC Goddard Earth Sciences Distributed Active Archive Center
EOS Earth Observing System
EOSDIS EOS Data Information System
IR Information Retrieval
SDP Scientific Data Processing
LaRC Langley Research Center
CCD Charge-Coupled Device
OBC On-Board Calibrator
HDF Hierarchical Data Format
BPM Bigram Proximity Matrix
TPM Trigram Proximity Matrix
Chapter 1: Introduction and Methodology
1.1 Motivation
1.1.1 Data Mining: An Overview The capabilities for generating and collecting data have been increasing rapidly. The computerization of many business and government transactions, and the advances in data collection tools have provided us with huge amounts of data. Millions of databases have been used in business management, government administration, scientific and engineering data management, and many other applications. This explosive growth in data and databases has generated an urgent need for new techniques and tools that can intelligently and automatically transform the processed data into useful information and knowledge (Chen et al., 1996).

Data mining is the task of discovering interesting patterns in large amounts of data where the data can be stored in a database, data warehouses, or other information repositories. It is a young interdisciplinary field, drawing from areas such as databases, data warehousing, statistics, machine learning, data visualization, information retrieval, and high-performance computing. Other contributing areas include neural networks, pattern recognition, spatial data analysis, image and signal processing, and many application fields, such as business, economics, and bioinformatics.

Data mining is a process of nontrivial extraction of implicit, previously unknown and potentially useful information (such as knowledge rules, constraints, regularities) from data in databases. The information and knowledge gained can be used for applications ranging from business management, production control, and market analysis, to engineering design and science exploration.

There are many other terms that appear in articles and documents carrying a similar or slightly different meaning, such as knowledge mining, knowledge extraction, data archaeology, data dredging, and data analysis. By knowledge discovery in databases (KDD), interesting knowledge, regularities, or high-level information can be extracted from the relevant sets of data and be investigated from different angles, and large databases thereby serve as rich and reliable sources for knowledge generation and verification. Mining information and knowledge from large databases has been recognized by many researchers as a key research topic in database systems and machine learning and by many industrial companies as an important area with an opportunity for major revenues. The discovered knowledge can be applied to information management, query processing, decision making, process control, and many other applications. Researchers in many different fields, including database systems, knowledge-base systems, artificial intelligence, machine learning, knowledge acquisition, statistics, spatial databases, and data visualization, have shown great interest in data mining. Furthermore, several emerging applications in information providing services, such as on-line services and the World Wide Web, also call for various data mining techniques to better understand user behavior, to meliorate the service provided, and to increase the business opportunities.

1.1.2 Mining Massive Datasets

Recent years have witnessed an explosion in the amount of digitally-stored data, the rate at which data is being generated, and the diversity of disciplines relying on the availability of stored data. Massive datasets are increasingly important in a wide range of applications, including observational sciences, product marketing, and the monitoring and operations of large systems. Massive datasets are collected routinely in a variety of settings in astrophysics, particle physics, genetic sequencing, geographical information systems, weather prediction, medical applications, telecommunications, sensors, government databases, and credit card transactions. The nature of this data is not limited to a few esoteric fields, but, arguably to the entire gamut of human intellectual pursuit, ranging from images on web pages to exabytes ($.about.10^{18}$ bytes) of astronomical data from sky surveys (Hambrusch et al., 2003).

There is a wide range of problems and application domains in science and engineering that can benefit from data mining. In several fields, techniques similar to data mining have been used for many years, albeit under a different name (Kamath, 2001). For example, in the area of remote sensing, rivers and boundaries of cities have been identified using image-understanding methods. Much of the use of data mining techniques in the past has been for data obtained from observations of experiments, as one-dimensional signals or two-dimensional images. However, these techniques are increasingly attracting the attention of scientists involved in simulating complex phenomena on massively parallel computers. They realize that, among other benefits, the semi-automated approach of data mining can complement visualization in the analysis of massive datasets produced by the simulations.

There are different areas that provide an opportunity for the use of data mining such as:

Astronomy: Due to the massive data being collected using new technology of telescopes and other detectors from astronomical surveys, it is useful to provide data mining tools to be used to analyze and visualize the time series data, image data, or a series of image data. These datasets can be stored and analyzed because of high performance computers and easy availability of storage.

There are many problems in manipulating the astronomy data. This makes astronomy a challenging field for the practice of the data mining (Grossman et al., 2001). Examples of these problems are the noise in the data due to the sensors used for collecting the data, atmospheric disturbances, and the data corruption because of the missing values or invalid measurements. Identifying an object within an image is a challenging and complex process that depends on the identification of edges or lines of the object. Further, the expensive pre-preprocessing to transform the high dimensional space of the large volumes of the astronomy data into a lower-dimensional feature space is a challenging problem.

Biology, Chemistry, and Medicine: Bioinformatics, chemical informatics, and medicine are all areas where data mining techniques have been used for a while and are increasingly gaining acceptance.

In bioinformatics, which is a bridge between biology and information technology (Cannataro et al., 2004), the focus is on the computational analysis of gene sequences. The bioinformatics data can be gene sequences, expressions, or protein data. Expressions mean information on how the different parts of a sequence are activated, whereas protein data represent the biochemical and biophysical structure of the molecules. One of the most challenging problems in bioinformatics is the infrastructure issue related to the integration of databases and flexible access to the data. The data mining task in the bioinformatics field includes finding the genes in the DNA sequences and understanding the higher order structure of a protein in order to understand the function of the protein.

In medicine, image mining is used in the analysis of images from mammograms, MRI scans, ultrasound, DNA microarrays, and X-rays for tasks such as identifying tumors, retrieving images with similar characteristics, detecting changes and genomics. Added to the above, data mining can be used in the analysis of medical records.

In the chemical sciences, the many new compounds added yearly to the databases cause information overload. These large volumes of data require effective and efficient data analysis techniques to analyze the new data obtaining from the experimentation or computer simulation. Data mining is being used to analyze chemical datasets for molecular patterns and to identify systematic relationships between various chemical compounds. One of the key problems in chemical data mining is an adequate descriptor to represent the chemical structures.

The application of neural networks and genetic algorithms to chemical data analysis is another active area of research (Hemmer et al., 2000). The diversity and the richness of the data mining tasks in biology, chemistry, and medicine are matched only by the enormous potential payoffs of success, with better drug and vaccine design, drug discovery, a more objective identification of tumors, and a better understanding of the human genome (Kamath, 2001).

Earth Sciences and Remote Sensing: As in the case of astronomy, the volumes of the data for the earth sciences and remote sensing cover abroad range of topics including climate modeling and analysis, atmospheric sciences, and geographical information systems, and are increasing rapidly, with for example, NASA Earth Observing System that is expected to generate more than 11,000 terabytes. These large volumes require the use of automated techniques for data analysis.

The key challenging point in analyzing the earth sciences and remote sensing data is the extensive work needed to pre-process the data because these come into different formats, scales and resolutions. The pre-processing method includes image processing, feature extraction, and feature selection.

Data mining techniques address many problems in the earth sciences and remote sensing fields that include understanding ozone depletion and greenhouse effects, desert and vegetation patterns, and land and ocean productivity. Addressing and then analyzing these issues will give major assistance in understanding the inter-relationships between the earth's geosphere, biosphere, and cryosphere.

Other areas where data mining is being applied include land cover classification for monitoring change, planning and assessing land-use impact, detection of earthquakes from space, forest management, cloud detection, and early storm warning (Ramachandran et al., 2000).

Computer Vision and Robotics: There is a substantial overlapping between the fields of computer vision and robotics on one hand, and data mining on the other hand. There are several ways in which the two fields can benefit each other. For example (Kamath, 2001), while computer vision applications can benefit from the accurate machine learning algorithms developed in data mining, it is also that the extensive work done in image analysis and fuzzy logic for computer vision and robotics can be used in data mining, especially for applications involving images.

There is diversity in the application of data mining methodologies used in computer vision and robotics that include automated inspection in industry for tasks such as detecting errors in semiconductor masks and identifying faulty widgets in assembly line production, face recognition and tracking of eyes, gestures, and lip movements for problems such as lip-reading, automated television studios, video conferencing, and surveillance, medical imaging during surgery as well as for diagnostic purposes, and vision for robot motion control.

One of the key characteristics of problems in computer vision and robotics (Kamath, 2001) is that they must be done in real time. In addition, the data collection and analysis can be tailored to the task being performed, as the objects of interest are likely to be similar to each other.

Engineering: As large amounts of engineering data are being generated and are becoming more complex, these provide the ideal opportunity for using the data mining techniques in understanding better the challenging problems in areas such as structural mechanics, computational fluid dynamics, material science, and the semi-conductor industry.

Data from sensors are being used to address a variety of problems including detection of land mines, identification of damage in aerodynamic systems or structures such as helicopters and bridges, and nondestructive evaluation in manufacturing quality control, to name just a few.

In computer simulation, which is increasingly seen as the third mode of science, complementing theory and experiment, the techniques from data mining are yet to gain a widespread acceptance (Marusic et al., 2001).

Data mining techniques are used on projects studying the identification of coherent structures in turbulence. Other applications of data mining in engineering include the analysis of simulation output as a complementary technique to visualization.

Financial Data Analysis: Most banks and financial institutes offer a wide variety of banking services such as checking, savings, and business and individual customer transactions. Added to that, credit services like business mortgage, and investment services such as mutual funds. Some also offer insurance services and stock investment services. Financial data collected in the banking and financial industries are often relatively complete, reliable, and of high quality, which facilitates systematic data analysis and data mining. Classification and clustering methods can be used for customer group identification and targeted marketing. For example (Han et al., 2001), customers with similar behaviors regarding banking and loan payments may be grouped together by multidimensional clustering techniques. Effective clustering and collaborative filtering methods such as decision trees and nearest neighbor classification can help identifying customer groups, associate new customer with an appropriate customer group, and facilitate targeted marketing.

Data mining can also be used to detect money laundering and other financial crimes by integrating information from multiple databases such as bank transaction databases, and federal or state crime history databases, as long as they are potentially related to the study. Multiple data analysis tools can then be used to detect unusual patterns, such as large amounts of cash flow at certain periods, by certain groups of people, and so on.

Data visualization is so important in the financial analysis area to present in graphs the transaction activities and classifying or clustering the data according to the time, relationship among the activities, and the customers.

Security and Surveillance: Homeland security is an active area for data mining methodologies for tasks such as automated target recognition. It includes applications such as fingerprint and retinal identification, human face recognition, and character recognition in order to identify people and their signatures for access, law enforcement, or surveillance purposes.

The above areas of the scientific and engineering benefit from data mining and will often involve such massive datasets that automated methods, such as proposed in this dissertation, are needed. Added to these areas there are various technologies areas that produce enormous amounts of data, such as high-energy physics data from particle physics experiments that are likely to exceed a petabyte per year, and data from the instrumentation of computer programs run on massively parallel machines that are too voluminous to be analyzed manually. However, what is becoming clear is that the data analysis problems in science and engineering are becoming more complex and more pervasive, giving rise to a wonderful opportunity for the application of data mining methodologies.

1.1.3 Requirements and Challenges of Mining Massive Datasets

In order to conduct effective data mining, one needs to first examine what kind of features an applied knowledge discovery system is expected to have and what kind of challenges one may face in using data mining techniques. The following are some of these challenges:

a. Handling of Different Types of High-Dimensionality Data

Most massive datasets contain complex data types and are high dimensional with attributes numbering from a few hundred to the thousands. These datasets can be obtained from spatial and temporal data, remote sensing, gene sequencing, transaction data, legacy data, structural data and complex data objects, and hypertext and multimedia data. To analyze the high dimensional datasets it is important to reduce their dimension. At the same time there is an urgent demand for new techniques for data representation and retrieval, new probabilistic and statistical models for high-dimensional indexing, and database querying methods. The new techniques should be able to perform effective data mining on such complex types of data as well.

b. Efficiency and Scalability of Data Mining Algorithms

With the increasing size of the data, there is a need for algorithms that are efficient and scalable, which will help them effectively to extract information from the large datasets. Scalability refers to the ability to use additional resources, such as CPU and memory, in an efficient manner to solve increasingly larger problems. It describes how the computational requirements of an algorithm grow with problem size.

c. Usefulness, Certainty and Expressiveness of Data Mining Results

Scientific data, especially data from observations and experiments, is noisy. Removing the noise from data, without affecting the signal, is a challenging problem. Noise, missing or invalid data, and exceptional data should be handled elegantly.

d. Building Reliable and Accurate Models and Expression the Results

As the increasingly growing volumes of the datasets make them more complex to analyze, it is necessary to build models that reflect the empirical characteristics of the observed data and to express both the data mining requests and the discovered information in high-level languages or graphical user interfaces so that discovered relationships can be understandable and directly usable.

e. Mining Distributed Data

The huge size of the datasets, the wide distribution of the data, and then the complexity computation are often characteristic of data mining applications. Mining massive data from different huge sources of formatted or unformatted datasets is a big challenge in the data mining area. These datasets can be text data that are distributed across various web servers or astronomy data that are distributed as part of a virtual observatory. Data mining techniques may help in discovering information that can be discovered only with great difficulty by using simple query systems.

f. Protection of Privacy and Data Security

When data can be viewed from many different perspectives and at different abstraction levels, it threatens the goal of protecting data security and guarding against the invasion of privacy (Chen et al., 1996). Protecting sensitive information is an urgent issue in the data mining area. Some data like patient medical data, or data used for surveillance purposes should be protected and secured, whereas scientific data in the field of astronomy or the earth sciences should be freely accessible and the data mining system does not have to address the privacy or the security issues.

g. Size and Type of the Data

Science datasets range from moderate to massive, with the largest being measured in terabytes or even exabytes. As more complex simulations are performed, and observations over longer periods at higher resolutions are conducted, the data is expected to grow. Data mining infrastructure should support the rapidly increasing data volume and the variety of data formats that are used in the scientific domain.

h. Data Visualization

The complexity of and noise in the massive data affects the data visualization. Scientific data are collected from variant sources, using different sensors. Data visualization is needed to use all available data to enhance the analysis. Unfortunately, we may have a difficult problem when the data are collected at different resolutions, using different wavelengths, under different conditions, with different sensors (Kamath, 2001). Collaborations between computer scientists and statisticians are resulting in the development of statistical concepts and modeling strategies to facilitate data exploration and visualization.

i. Lack of Labeled Data

One of the differences between commercial data and scientific data is in its labeling of the data. In the commercial data, labeling can be generated historically, whereas in scientific data, labeling is usually generated manually, which causes a problem because not all scientists may agree on a label for an object in the dataset. In fact there are some datasets like astronomy that scientists find hard to label. Data mining sometimes faces problems of determining or identifying interesting objects for scientists, because they are not agree on determining the object label.

1.2 Statement of the Problem

Data mining associated with massive datasets presents a major problem to the serious data miner. Datasets of the scale of terabytes or more preclude any possibility of serious effort by individual humans at manually examining and characterizing the data objects. The challenging problem here is how to deal with the complexity of the massive dataset to extract the features and discover the contextually relevant information in the image and text datasets. To solve this problem, an automated data mining system may be developed for automatically scanning the database for certain statistically appropriate feature vectors, recording them as digital objects, subsequently augmenting the metadata, which is the data about the dataset, with appropriate digital objects.

1.3 Research Objective

My thesis is that datasets, previously inaccessible because of their massive size, can be made accessible to human analysts by creating automated methods for capturing content of datasets, i.e. what I call automated metadata. These in turn can lower the effective size of a dataset by creating a search mechanism that eliminates candidates portions of the dataset that are unlikely to be useful to the data analyst.

Thus my research addresses the challenges of autonomous discovery and triage of the contextually relevant information in massive and complex datasets. The goal is extracting feature vectors from the datasets, which will function as digital objects and then, effectively reduce the dataset's volume. I have developed an automated metadata system for mining the datasets. The system does Boolean search on the augmented metadata and quickly reduces the number of objects to be scanned to a much smaller dataset.

Two datasets were considered in my research. The first dataset is text data, and the second dataset is remote sensing image data.

1.3.1 Text Data

The text data used in my research are documents from the Topic Detection and Tracking (TDT) Pilot Corpus collected by Linguistic Data Consortium, Philadelphia, Pa. The TDT corpus comprises a set of nearly 16000 stories (15863) spanning the period from Jul. 1, 1994 to Jun. 30, 1995. Chapter 3 describes the TDT corpus in more detail.

My objective is to create feature vectors for each document in the dataset, which reflect the semantic content of that document. The process involved starting by denoising the documents by removing the stopper words (words that are too common and do not convey information), and then stemming words (remove suffixes; e.g., words like move, moving, moved will be reduced to "mov" after stemming).

Feature vectors of interest include bigrams or trigrams (sequence of two words or three words respectively). These have significant potential for capturing semantic content, because they capture noun-verb pairs or adjective-noun-verb triplets (Martinez et al., 2002). By this I mean, for example, that a particular noun-verb pair may occur in a large number of documents so that we may reasonably guess that these documents have some similarity in their semantic content. The bigram (trigram) proximity matrix (BPM, TPM) can be constructed by having a word by word matrix were the row entry is the first word in a bigram and the column is the second word in the bigram. Strictly speaking a trigram proximity matrix is not a two-dimensional matrix array, but a three dimensional array. However, the analogy is clear and I will abuse the language slightly and refer to a trigram proximity matrix for simplicity. In BPM (TPM), the order of the words matter. Documents that have similar BPMs or TPMs might have similar semantic content. The elements of the BPM (TPM) are either a simple binary variable describing whether or not the bigram (trigram) appeared in the document or alternatively a count of the number of times the bigram appeared. The bigrams and trigrams can be used for clustering the documents as well, typically using the well-known cosine metric.

The feature vectors will be attached to each document in the dataset as digital objects, which help in retrieving the information related to each document on the dataset. Chapter 5 describes all the extracted feature vectors that are attached to each document. It also describes the Minimal Spanning Tree (MST), an approach for connecting the documents (Solka et al., 2005). MST is a greedy algorithm so that pair of documents that are connected in the minimal spanning tree have minimal distance between them and is thus likely to be similar. The minimal spanning tree is an excellent visualization tool, because it can always be made as a diagram in the plane.

1.3.2 Image Data

In my research, the test bed for image data consisted of 50 gigabytes of image data from NASA's TERRA satellite, the first of the polar orbiting Earth Observing System satellites. The image data provided to me by the Jet Propulsion Laboratory (JPL) came from the Multiangle Imaging SpectroRadiometer (MISR). The MISR instrument of NASA's satellite Terra provides an excellent prototype database for demonstrating feasibility. The instrument captures radiance measurements that can be converted to georectified image. Chapter 3 describes the MISR data in detail.

For image data, a similar approach is commonly applied to create feature vectors for each image in the dataset. One interesting set of features can be developed based on the so-called grey level co-occurrence matrix (GLCM). The GLCM is in some analogous to BPM. The idea is to look at adjacent pairs of pixels (each member assuming 256 grey levels) and create a 256 by 256 matrix to count the number of occurrences of grey levels pairs. Images that have similar GLCM are expected to be similar with respect to characteristics implied by the geospatial relationship used to define the pair.

Some features that can be constructed based on GLCM are measures of Homogeneity, Contrast, Dissimilarity, Entropy, Energy, and Angular Second Moment (ASM). Other computable features include histogram-based contrast, Alternate Vegetation Index (AVI), Normalized Difference Vegetation Index (NDVI), occurrence of linear features, and occurrence of circular features. Similar to the text data approach, images that have similar features are likely to be similar. The key point is the above features can be dynamically adapted as a new relevant feature is created.

The above features will be attached to an image and work as a digital object as in the text data case. A standard query language can be used to search for all images having a particular instance of a given features.

1.3.3 Automated Metadata

The interest key in the text application as well as the image application is the concept of automated metadata. The general idea is to have a computer bot (robot) search the existing database as well as automatically operate new (streaming) data and associate with each feature a digital object. In the document example, a one-pass approach to constructing bigrams (trigrams) is to identify a bigram (trigram) and create a digital object corresponding to the bigram (trigram) to each document. The same digital object may be attached to many different documents and a standard query language can be used to recover all documents exhibiting instances of a specific instance of that feature. For example, we might be interested in finding all documents that contain the bigram of "nuclear weapons" in conjunction with the bigram "North Korea".

1.4 Methodology

The following is a brief outline of my dissertation research work, which depends on the METANET concept; the following chapters will explain the work in details. I consider a heterogeneous collection of massive databases. The methodology is divided into two sections. The first section is automated generation of metadata, and the second one is the query and search of the metadata.

1.4.1 Automated Generation of Metadata

"Metadata" simply means data about data. Metadata may be defined as any information required making other data useful. Thus, metadata provide an architecture or framework describing the user's data within a data environment. This architecture should provide a precise, coherent and logical structure that "paints a picture" of the data. It should describe how the data internal to the data environment are interfaced to the external world.

In the information system area, metadata are a general notion that captures all kinds of information necessary to support the management, query, consistent use and understanding of data. Metadata help the user discover, locate, understand, evaluate data, and help data administrators to manage data, and control access and use it. Metadata may also describe how and when and by whom a particular set of data was collected, and how the data are formatted. Metadata are essential for understanding information stored in data warehouses.

Metadata schemes (also called schema) are sets of metadata elements designed for a particular purpose, for example, to describe a particular type of information resource. The definition or meanings of the elements are the content. Metadata schemes generally specify names of elements and their semantics. Optionally, they may specify content rules for how content must be formulated (for example, how to identify the main title) and/or representation rules for how content must be represented (for example, capitalization rules). There maybe also syntax rules for how the elements and their content should be encoded.

In general there exist metadata to describe file and variable type and organization, but have minimal scientific content data. In raw form, a dataset and its metadata have minimal usability. For example, not all the image datasets in the same file form that are produced by a satellite-based remote sensing platform are important to the scientists, in fact only the image datasets that contain certain patterns will be of interest to the scientist (Wegman, 1997). Scientists need metadata about the image dataset's content in order to narrow the scientist's searching time taking into account the size of the datasets, e.g. terabyte datasets. So, without additional metadata about the content, the scientist would have to scan all of these images.

Creating a digital object and linking it to the dataset will make the data usable, and at the same time, the search operation for a particular structure in a dataset will be a simple indexing operation on the digital objects linked to the data. The objective of this process is to link digital objects with scientific meaning to the dataset at hand, and make the digital objects part of the searchable metadata associated with the dataset. Digital objects will help scientist to narrow the scope of the datasets that the scientist must consider. In fact, digital objects reflect the scientific content of the data, but do not replace the judgment of the scientist.

The digital objects will essentially be named for patterns to be found in the datasets. The goal is to have a background process, launched either by the database owner or, more likely, via an applet created by a virtual data center, examines databases available on the data-Web and searching within datasets for recognizable patterns. Once a pattern is found in a particular dataset, the digital object corresponding to that pattern is made part of the metadata associated with that set. If the same pattern is contained in other distributed databases, pointers would be added to that metadata pointing to metadata associated with the distributed databases. The distributed databases will be linked through the metadata in the virtual data center.

At least one of the following three different methods is to be used to generate the patterns to be found (Wegman, 1997). The first method is based on empirical or statistical patterns, those patterns that have been observed over a long period of time and may be thought to have some underlying statistical structure. An example of the empirical or statistical patterns is found in some DNA sequencing.

The second method is the model-based patterns. This method is predictive and of interest if verified on real data. The third is the patterns found by clustering algorithms. With this approach, patterns are delineated by purely automated techniques that may or may not have scientific significance.

1.4.2 Query and Search

The idea of the automated creation of metadata is to develop metadata that reflect the scientific content of the datasets within the database rather than just data structure information. The locus of the metadata is the virtual data center where it is reproduced.

The general desideratum for the scientist is to have a comparatively vague question that can be sharpened as he/she interacts with the system. The main issues in the retrieval process are the browser mechanism for requesting data when the user has a precise query, and an expert system query capability that would help the scientist reformulate a vague question in a form that may be submitted more precisely.

Query and search would contain four major elements: (1) client browser, (2) expert system for query refinement, (3) search engine, and (4) reporting mechanism.

1.4.2.1 Client Browser

The client browser is a piece of software running on the scientist's client machine. This machine is likely to be a PC or a workstation. The main idea here is to have a GUI interface that would allow the user to interact with a more powerful server in the virtual data center. The client software is essentially analogous to the myriad of browsers available on the World Wide Web.

1.4.2.2 Expert System for Query Refinement

A scientist interacts with the server in two different scenarios. In the first scenario, the scientist knows precisely the location and type of data he or she desires. The second one, the scientist knows generally the type of question he or she would like to ask, but has little information about the nature of the databases with which to interact. The first scenario is relatively straightforward, but the expert system would still be employed to keep a record of the nature of the query. The idea is to use the queries as a tool in the refinement of the search process.

The second scenario is more complex. The approach is to match a vague query formulated by the scientist to one or more of the digital objects discovered in the automated generation of metadata phase. Discipline experts give rules to the expert system to perform this match. The expert system would attempt to match the query to one or more digital objects. The scientist has the opportunity to confirm the match when he/she is satisfied with the proposed match or to refine the query. The expert system would then engage the search engine in order to synthesize the appropriate datasets. The expert system would also take advantage of the interaction to form a new rule for matching the original query to the digital objects developed in the refinement process. Thus, two aspects emerge: one is the refinement of the precision of an individual search, and the other is the refinement of the search process. Both aspects share tactical and strategic goals. The refinement would be greatly aided by the active involvement of the scientist. He/she would be informed about his/her particular query was resolved, allowing him/her to reformulate the query efficiently. The log files of these iterative queries would be processed automatically to inspect the query trees and, possibly, improve their structure.

Two other considerations of interest emerge. First, other experts not necessarily associated with the data repository itself may have examined certain datasets and have commentary in either informal annotations or in the refereed scientific literature. These commentaries could form part of the metadata associated with the dataset. Part of the expert system should provide an annotation mechanism that would allow users to attach commentary or library references (particularly digital library references) as metadata. Obviously, such annotations may be self-serving and potentially unreliable. However, the idea is to alert the scientist to information that may be useful. User derived metadata would be considered secondary metadata.

The other consideration is to provide a mechanism for indicating data reliability. This would be attached to a dataset as metadata, but it may in fact be derived from the original metadata. For example, a particular data collection instrument may be known to have a high variability and any dataset that is collected by this instrument, no matter where in the database it occurred, should have as appropriate caveat part of the attached metadata. Hence, an automated metadata collection technique should be capable of not only examining the basic data for patterns, but also examining the metadata themselves; and, based on collateral information such as just mentioned, it should be able to generate additional metadata.

1.4.2.3 Search Engine

Large scale scientific information systems will probably be distributed in nature and contain not only the basic data, but also structured metadata: for example, sensor type, sensor number, measurement date and unstructured metadata, such as a text-based description of the data. These systems will typically have multiple main repository sites that together will house a major portion of the data as well as some smaller sites, virtual data centers, containing the remainder of the data. Clearly, given the volume of the data, particularly within the main servers, high performance engines that integrate the processing of the structured and unstructured data are necessary to support desired response rates for user requests.

Both Database Management System (DBMS) and information retrieval systems provide some functionality to maintain data. DBMS allow users to store unstructured data as binary large objects (BLOB) and information retrieval systems allow users to enter structured data in zoned fields. However, DBMS offer only a limited query language for values that occur in BLOB attributes. Similarly, information retrieval systems lack robust functionality for zoned fields. Additionally, information retrieval systems traditionally lack efficient parallel algorithms. Using a relational database approach to information retrieval allows for parallel processing, since almost all commercially available parallel engines support some relational database management system. An inverted index may be modeled as a relation. This treats information retrieval as an application of a DBMS. Using this approach, it is possible to implement a variety of information retrieval functionality and achieve good run-time performance. Users can issue complex queries including both structured data and text.

The key hypothesis is that the use of a relational DBMS to model an inverted index will: (1) permit users to query both structured data and text via standard SQL; in this fashion, users may use any relational DBMS that support standard SQL; (2) permit the implementation of traditional information retrieval functionality such as Boolean retrieval, proximity searches, and relevance ranking, as well as non-traditional approaches based on data fusion and machine learning techniques; and (3) take advantage of current parallel DBMS implementations so that acceptable run-time performance can be obtained by increasing the number of processors applied to the problem.

1.4.2.4 Reporting Mechanism

The most important issue on the reporting mechanism is not only to retrieve datasets appropriate to the needs of the scientist, but scaling down the potentially large databases the scientist must consider. In other words, the scientist would consider megabytes instead of terabytes of data. The search and retrieval process may still result in a massive amount of data. The reporting mechanism would, thus, initially report the nature and magnitude of the datasets to be retrieved. If the scientist agrees that the scale is appropriate to his/her needs, then the data will be delivered by an FTP or similar mechanism to his/her local client machine or to another server where he/she wants the synthesized data to be stored.

1.5 Implementation

In order to help scientists on searching massive databases and find data of interest to them, a good information system should be developed for data ordering purposes. The system should be performing effectively based on the descriptive information of the scientific datasets or metadata such as the main purpose of the dataset, the spatial and temporal coverage, the production time, the data quality of the datasets, and the main features of the datasets.

Scientists want to have an idea of what the data look like before ordering them, since metadata searching alone does not meet all scientists' queries. Therefore, content-based searching or browsing and preliminary analyzing data based on their actual values will be inevitable in such application contexts.

One of the most common content-based queries is to find large enough spatial regions over which the geophysical parameter values fall into intervals in a specific observation time. The query result could be used for ordering data as well as for defining features associated with scientific concepts.

To make this content-based query technique understandable I designed a web-based prototype to demonstrate the idea. The prototype dealt with different types of massive databases. In my research I have focused only on remote sensing data, and a collection of text databases. I implemented the prototype system in the Center for Computational Statistics Lab, which contains 4 terabyte storage capabilities with high performance computing. Remote sensing data were available through the NASA JPL research center.

The prototype system allowed scientists to make queries against disparate types of databases. For example, queries on the remote sensing data will focus on the features observing on images. Those features are environmental or artificial. Recognizing features is the key to interpretation and information extraction. Images differ in their features, such as tone, shape, size, pattern, texture, shadow, and association.

Tone refers to the relative brightness or color objects in an image. It is the fundamental element for distinguishing between different targets or features. Shape refers to general form, structure, or outline of individual objects. Shape can be a very distinctive clue for interpretation. Size of objects in an image is a function of scale. It is important to assess the size of a target relative to other objects in a scene, as well as the absolute size, to aid in the interpretation of that target. Pattern refers to the spatial arrangement of visibly discernible objects. Texture refers to the arrangement and frequency of tonal variation in particular area of an image. Shadow will help in the interpretation by providing an idea of the profile and relative height of a target or targets, which may make identification easier. Association takes into account the relationship between other recognizable objects or features in proximity to the target of interest.

Other features of the images that also could be taken into consideration; example are percentage of water, green land, cloud forms, and snow. The prototype system helps scientists to retrieve images that contain different features; the system can handle complex queries.

In the text database, the prototype system does not yet consider polysemy and synonymy problems in the queries. Polysemy means words having multiple meanings, such as mining, may mean different things in different contexts. Synonymy means multiple words having the same meaning, for example, authors of medical literature may write about myocardial infarctions, but the person who has had a minor heart attack may not realize that the two phrases are synonymous when using the public library's online catalog to search for information on treatments and prognosis (Berry et al., 1999).

The collected documents are characterized into different categories depending on the document's subject. Scientists can search into those documents and retrieve only the documents related to queries they asked. Scientists can search on words or terms, and then retrieve documents or articles may be they are on same category or from different categories as long as they are related to the words or terms on which the scientists search.

In my research, data mining techniques, and visualization played a role in discovering unexpected correlation and causal relationships, and understanding structures and patterns in the massive data. Clustering algorithms were used to characterize the text datasets into different clusters depend on the similarities between the documents in the datasets.

Visualization is a key process in Visual Data Mining. Visualization techniques can provide a clearer and more detailed view on different aspects of the data as well as on results of automated mining algorithms. The exploration of relationships between several information objects, which represent a selection of the information content, is an important task in visual data mining. Such relations can either be given explicitly, when being specified in the data, or they can be given implicitly, when the relationships are the result of an automated mining process; e.g. based on the similarity of information objects by hierarchical clustering.

To help scientists understand and trust the implicit data discovered and to get useful information from the massive datasets, I use various data presentation methods including boxplots, parallel coordinate plot, minimal spanning tree (MST), tables, as well as hierarchical clustering, and so on.

In my research, I used software called CrystalVision (Wegman, 2003) for visualizing the data. CrystalVision is an easy to use, self-contained Windows application designed as a platform for multivariate data visualization and exploration. It is intended to be robust, intuitive, commercial-grade software. Key features include scatter plot matrix views, parallel coordinate views, rotating 3-D scatter plot views, density plots, multidimensional grand tours implemented in all views, stereoscopic capability, saturation brushing, and data editing tools. It has been used successfully with datasets as high as 20 dimensions and with as many a 500,000 observations. CrystalVision is available at (ftp://www.galaxy.gmu.edu/pub/software/CrystalVision Demo.exe).

1.6 What Follows

In Chapter 2, Areas of Application, I discuss some of the background issues in mining spatial, text, and remote sensing databases. The Chapter starts by describing some methods for knowledge discovery in spatial databases, such as spatial classification, spatial association, and spatial clustering. The Chapter covers some issues related to basic measure for text retrieval and word similarity. It discusses the latent semantic indexing and singular value decomposition. Some of algorithms related to text mining also will be discussed in the chapter. Finally, the Chapter discusses some work done on mining the remote sensing data.

In Chapter 3, Data Sources, I provide a detail description about the datasets used in the research. The chapter starts by giving a background on the text data, which is collected by Linguistic Data Consortium 1997. The text data are news data taken from Reuters and CNN. In this chapter, I describe some of the lexicon features including , full, denoised, and stemmed lexicons.

The second part of Chapter 3 covers remote sensing data. The image data used in this research are Multi-angle Imaging SpectraRadiometer (MISR) instrument delivered by NASA's Jet Propulsion Laboratory (JPL), California Institute of Technology. In the Chapter I describe the architecture of MISR instrument, structure and data formats of MISR data, and the metadata formats for the MISR data. The software hdview also is discussed.

Chapter 4, Features Extraction from Image Data, discusses all the extracted features for the image data. The Chapter discusses some geometric features methods such as edge detection method, Canny edge detection, and Hough transform. In this chapter I discuss some of interesting features based on the grey level co-occurrence matrix (GLCM). These measured features are homogeneity, contrast, dissimilarity, entropy, energy, angular second moment (ASM). Other computed features include histogram-based contrast, normalized difference vegetation index (NDVI), and alternate vegetation index (AVI), which is new vegetation index I developed and implemented. The Chapter shows some comparisons in between NDVI and AVI.

For the Extracted Features from Text Data, Chapter 5, describe text data features in detail. In this Chapter, I use Clustering Toolkit (CLUTO) for clustering the text data. CLUTO is a software package for clustering the low- and high-dimensional datasets and for analyzing the characteristics of the various clusters. The Chapter also discusses the minimal spanning tree (MST), which is used to understand the relationship between the documents in the dataset. In the last section, I describe the features extracted from the text data. There are four features that I have implemented. Topics features, discriminating words features, bigrams/trigrams features, and verbs features. Examples of all these features are described.

Chapter 6 covers the implemented prototype design for the webpage. In this Chapter I discuss the method used in search engine, and the queries. The Chapter presents some example of these queries, and displays the results.

The Conclusions contributions and the future work are covered in Chapter 7.

1.7 A Note on Computational Resources

The datasets used in this research, the image and text, were implemented in MATLAB 7.0.4 on Pentium 4, which has 6 terabytes in memory. C++ language also used in implemented the text data. To read the MISR data I used hdfview software. For designing the webpage, html code was used. More detail discussion of the software and programming languages are discussed in the following chapters.

Chapter 2: Areas of Application 2.1 Introduction

It is now common knowledge that data gathering, data management, and data processing are routine practices in both the scientific and commercial world. Spectacular advances in sensor technology, data storage devices, and large-scale computing are enabling collection of huge data sets, perhaps terabytes of data, which tend to lie in very high dimensional spaces.

The key characteristics of the massive datasets are their sizes, and the complex structure in terms of the relations between different parts of the data and the nature of the data itself (Chandra, 2001). These datasets are in general multidimensional objects.

The last decade has witnessed a thousand-fold increase in computer speed, great innovations in remote sensing detectors and capabilities, a great reduction in the cost of computing and data storage and widespread access to the information highways. The existence of the Internet and the World Wide Web (WWW) has enabled an era of wide access to information and data impossible even a few years ago. As the data volumes continue to grow, storage costs are dropping but not fast enough to accommodate the data increase. Moreover, a challenge remains for the long-term archiving of remote sensing data, media degradation will occur faster than data will be able to be transferred to new media.

Although general purpose search engines are still limited in providing few step specific (Yang et al., 2001), useful information to users and require several searches to yield the desired results, it is clear that users can now access datasets and information that before was reserved for specialists at government labs and small number of academic institutions.

Scientists, applications specialists, graduate and undergraduate students, high school students and even the general public can now access, order or even download data to their own systems for their own use.

Along with the existence of the vast web information contained in the WWW, the current Internet is being stretched by precisely this volume of information and usage, mostly of commercial or private nature, limiting effective access to large data volume by the very specialists and scientists who were the reason the whole Internet revolution was started. Scientists, researchers and applications users need not only access information and data but to do it efficiently. If a user requires some datasets for a specific application that involve hundreds of megabytes or even gigabytes, general purpose kilobit on-line access rates are, clearly, inadequate. The user will have to order the datasets in hard media and the advantage of fast, online access is clearly lost.

The following sections cover some of the related works have been accomplished on mining massive datasets on the areas of remote sensing, spatial data, and text data.

2.2 Mining Spatial Databases 2.2.1. Background

Data mining (Shekhar et al., 2002) is a process to extract implicit, nontrivial, previously unknown and potentially useful information such as knowledge rules, constraints, and regularities from data in databases. Data mining techniques are important for extracting useful information from large datasets which are collected by scientists or companies and thus helping users to make more effective decisions.

The study and the development of data mining algorithms for spatial databases is motivated by the large amount of data collected through remote sensing, medical equipment, and other methods (Koperski et al., 1995). Moreover, the geocoding of consumer addresses in combination with the large amount of recorded sales transactions creates very large spatially related databases. Managing and analyzing spatial data became an important issue due to the growth of the applications that deal with geo-reference data.

In the last 20 years, the human capability in generating and collecting data has been increasingly widespread. The explosive growth in data and databases used in business management, government administration, and scientific data analysis has created a need for techniques and tools that can automatically transform the processed data into useful information and knowledge.

Spatial data mining or discovery of interesting, implicit knowledge, spatial relationships, or other interesting patterns not explicitly stored in spatial databases, is a demanding field because very large amounts of spatial data have been collected in various applications, ranging from remote sensing, to geographical information systems (GIS), computer cartography, environmental assessment and planning (Koperski et al., 1995). Spatial data mining combines methods of statistics, machine learning, spatial reasoning and spatial databases. Spatial data mining can be used for understanding spatial data, discovering spatial relationships and relationships between spatial and non-spatial data, constructing spatial knowledge bases, reorganizing spatial databases, and optimizing spatial queries. It has wide applications in geographic information systems, geo-marketing, remote sensing, image database exploration, medical imaging, navigation, traffic control, environmental studies, and many other areas where spatial data are used (Han et al., 2001).

A key goal of spatial data mining is partially to automate knowledge discovery, i.e., search for "nuggets" of information embedded in very large quantities of spatial data. A crucial challenge to spatial data mining is the exploration of efficient spatial data mining techniques due to the huge amount of spatial data and the complexity of spatial data types and spatial access methods. Challenges (Shekhar et al., 2002) in spatial data mining arise from a variety of different issues. First, classical data mining is designed to process numbers and categories, whereas spatial data is more complex, it stores large amount of space-related data includes points, lines, and polygons. Second, classical data mining works with explicit inputs. On the other hand, spatial data predicated and attributes are often implicit. Third, classical data mining treats each input independently of other inputs, while spatial patterns often exhibit continuity and high autocorrelation among nearby features. Finally, the query language that is used to access spatial data differs than the one used to access the classical data (Palacio et al., 2003).

2.2.2 Methods for Knowledge Discovery in Spatial Databases

Statistical spatial data analysis has been a popular approach to analyzing spatial data. This approach handles numerical data well and usually proposes realistic models of spatial phenomena. Different methods for knowledge discovery, and algorithms and applications for spatial data mining must be created.

2.2.2.1 Spatial Classification

The task of classification is to assign an object to a class from a given set of classes based on the attribute values of the object. In spatial classification the attribute values of neighboring objects may also be relevant for the membership of objects and therefore have to be considered as well.

Classification of spatial data has been analyzed by some researchers. A method for classification of spatial objects was proposed by Ester et al. (1997). Their proposed algorithm is based on ID3, a non-incremental algorithm deriving its classes from a fixed set of training instances. It builds a decision tree which is used to classify and it uses the concept of neighborhood graphs. It considers not only non-spatial properties of the classified objects, but also non-spatial properties of neighboring objects. Objects are treated as neighbors if they satisfy the neighborhood relations (Ester et al., 2000) such as topological, distance, and direction spatial relations. They define topological relations as those relations which are invariant under topological transformations. This means if both objects are rotated, translated or scaled simultaneously the relations are preserved. The topological relations between two objects are: disjoint, meets, overlaps, equal, cover, covered-by, contains, and inside. The second type of relation refers to distance relations. These relations compare the distance between two objects with a given constant using arithmetic operators like greater than, less than, or equal to. The distance between two objects is defined as the minimum distance between them. The third relation they defined is the direction relations. They defined a direction relation A R B of two spatial objects using one representative point of the object A and all points of the destination object B. It is possible to define several possibilities of direction relations depending on the points that are considered in the source and the destination objects. The representative point of a source object may be the center of the object or a point on its boundary. The representative point is used as the origin of a virtual coordinate system and its quadrants define the directions.

Another algorithm for spatial classification is presented by Koperski et al. (1998). It works as follows: the relevant attributes are extracted by comparing the attribute values of the target objects with the attribute values of their nearest neighbors. The determination of relevant attributes is based on the concept of the nearest hit (the nearest neighbor belonging to the same class) and the nearest miss (the nearest neighbor belonging to a different class). In the construction of the decision tree, the neighbors of target objects are not considered individually. Instead, buffers are created around the target objects and then the non-spatial attribute values are aggregated over all objects contained in the buffer. For instance, in the case of shopping malls a buffer may represent the area where its customers live or work. The size of the buffer yielding the maximum information gain is chosen and this size is applied to compute the aggregates for all relevant attributes.

Fayyad et al. (1996) used decision tree methods to classify images of stellar objects to detect stars and galaxies. About 3 terabytes of sky images were analyzed.

2.2.2.2 Spatial Association

An association rule is a rule $I.sub.1 I.sub.2$ where $I.sub.1$ and $I.sub.2$ are disjoint sets of items. The support of the rule is given by the number of database tuples containing all elements of $I.sub.1$ and the confidence is given by the number of tuples containing all elements of both $I.sub.1$ and $I.sub.2$. For a database of transactions, records contain sets of items bought by some customer in one transaction, all association rules should be discovered having a support of at least minsupp and a confidence of at least minconf in the database.

Similar to the mining association rules in transactional and relational databases, spatial association rules can be mined in spatial databases. Spatial association (Ester et al., 2000) is a description of the spatial and nonspatial properties, which are typical for the target objects but not for the whole database. The relative frequencies of the non-spatial attribute values and the relative frequencies of the different object types are used as the interesting properties. For instance, different object types in a geographic database are communities, mountains, lakes, highways, railroads, etc. To obtain a spatial association, not only the properties of the target objects, but also the properties of their neighbors up to a given maximum number of edges in the relevant neighborhood graph are considered. Koperski et al., (1995) introduce spatial association rules, which describe associations between objects based on spatial neighborhood relations. For example, is_a (X, "school")close_to(X, "sports_center")close_to(X, "park") This rules states that 80% of schools that are close to sports centers are also close to parks, and 0.5% of the data belongs to such a case.

2.2.2.3 Spatial Clustering

Clustering is the task of grouping the objects of a database into meaningful subclasses so that the members of a cluster are similar as possible whereas the members of different clusters differ as much as possible from each other. The detection of seismic faults by grouping the entries of an earthquake catalog or the creation of thematic maps in geographic information systems by clustering feature vectors, are some of the applications of clustering examples in spatial databases.

Spatial data clustering identifies clusters, or density populated regions, according to some distance metric in large, multidimensional data set. There are different methods for spatial clustering such as k-mediod clustering algorithms like CLARANS (A Clustering Algorithm based on Randomized Search) (Ng et al., 1994). This is an example of a global clustering algorithm, where a change of a single database object may influence all clusters. On the other hand, the basic idea of a single scan algorithm is to group neighborhood objects of the database into clusters based on a local cluster condition performing only one scan through the database. Single scan clustering algorithms are efficient if the retrieval of the neighborhood of an object can be efficiently performed by the spatial database system (SDBS).

Another clustering algorithm is GDBSCAN (Generalized Density Based Spatial Clustering of Applications with Noise) (Sender et al., 1998), which relies on a density-based notion of clusters. It is designed to discover arbitrary-shaped clusters in any dataset D and at the same time can handle noise or outliers effectively. The core point in GDBSCAN refers to such point that its neighborhood of a given radius (EPS) has to contain at least a minimum number of points, so the density in the EPS-neighborhood of points has to exceed some threshold. This idea of "density based clusters" can be generalized in two important ways. First, any notion of a neighborhood can be used instead of an EPS-neighborhood if the definition of the neighborhood is based on a binary predicate which is symmetric and reflexive. Second, instead of simply counting the objects in a neighborhood of an object other measures to define the "cardinality" of that neighborhood can be used as well.

Added to the above methods, visualizing large spatial data sets became an important issue due to the rapidly growing volume of spatial datasets, which makes it difficult for a human to browse such data sets. Shekhar et al. (2002) constructed a web-based visualization software package for observing the summarization of spatial patterns and temporal trends. The visualization software will help users gain insight and enhance the understanding of the large data.

2.3 Mining Text Databases

2.3.1 Overview of Text Mining

The volume of collections of documents are growing rapidly due to the increasing amount of information available in various sources such as news articles, research papers, books, digital libraries, email messages, and web pages. There are more than 1.5 billion web pages in the public internet (Dhillon et al., 2001), which contain technical abstracts and papers.

Data stored in most text databases are semistructured data in that they are neither completely unstructured nor completely structured. For example, a document may contain a few structured fields, such as a title, authors, publication date, length, and category, and so on, but also contain some largely unstructured text components, such as abstract and contents.

Traditional information retrieval techniques become inadequate (Han et al., 2001) for the increasingly vast amounts of text data. Not all documents will be relevant to a given individual or user. Without knowing what could be in the documents, it is difficult to formulate effective queries for analyzing and extracting useful information from the data. These large collections of documents need a technique to organize them as the collection grows in size and at the same time to provide an easy way to browse and search the documents in the datasets. This technique will help user to compare different documents, rank the importance and the relevance of the documents, or find patterns and trends across multiple documents. Thus, text mining has become an increasingly popular and essential theme in data mining.

Text mining has emerged as new research area of text processing. It is focused (Gomez et al., 2001) on the discovering of new facts and knowledge from large collections of texts that do riot explicitly contain the knowledge to be discovered. The goals of text mining are similar to those of data mining, because it attempts to find clusters, uncover trends, discover associations and detect deviations in a large set of texts. Text mining has also adopted techniques and methods of data mining, such as statistical techniques and machine learning approaches.

Text mining (Dorre et al., 1999) helps to discover the hidden gold from textual information. It makes the leap from old fashioned information retrieval to information and knowledge discovery.

The general framework of text mining consists of two main phases: a pre-processing phase and a discovery phase (Gomez et al., 2001). In the first phase, the free-form texts are transformed to some kind of semistructured representation that allows for their automatic analysis, and in the second one, the intermediate representations are analyzed and it is to be hoped that some interesting and non-trivial patterns are discovered.

Many of the current methods of text mining use simple and shallow representations of texts, such representations are easily extracted from the texts and easily analyzed, but on the other hand, they restrict the kind of discovered knowledge. Text mining use complete representations more than just keywords. These representations will expand the discovered knowledge.

2.3.2 Text Data Analysis and Information Retrieval
2.3.2.1 Basic Measure for Text Retrieval Information retrieval is a field that been developing in parallel with database systems for many years. It differs from the field of database system, which has focused on query and transaction processing of structured data, information retrieval on the other hand is concerned with the organization and retrieval of information from large number of text based documents. The challenging problem in information retrieval (Berry et al., 1999) is to locate relevant documents based on user input, such as keywords or example documents. Typical information retrieval systems include online library catalog systems and online document management systems.

It is important to know how accurate or correct the text retrieval system on retrieving the documents based on the query. The set of documents relevant to the query be called "{Relevant}", whereas the set of documents retrieved called as "{Retrieved}". The set of documents that are both relevant and retrieved is denoted as "{Relevant}.andgate.{Retrieved}". To estimate the performance of the text retrieval system, there are two basic measures for assessing the quality of the text retrieval, Precision and Recall (Berry et al., 1999).

The precision of the system is the ratio of the number relevant documents retrieved to the total number of documents retrieved. It is the percentage of retrieved documents that are in fact relevant to the query, i.e. the correct response.

$$\text{Precision} = \frac{|\{\text{Relevant}\} \cap \{\text{Retrieved}\}|}{|\{\text{Retrieved}\}|}$$

The recall of the system is the ratio of the number of relevant documents retrieved to the total number of relevant documents in the collection. It is the percentage of documents that are relevant to the query and were retrieved.

$$\text{Recall} = \frac{|\{\text{Relevant}\} \cap \{\text{Retrieved}\}|}{|\{\text{Relevant}\}|}$$

2.3.2.2 Word Similarity

Information retrieval systems support keyword-based and/or similarity-based retrieval. In keyword-based information retrieval, a document is represented by a string, which can be identified by a set of keywords. There are two major difficulties on keyword-based system, synonymy and polysemy. The synonymy problem, a keyword such as "software product," may not appear anywhere in the document, even though the document is closely related to software product. Whereas the polysemy means, the same keyword such as "regression," may mean different things in different contexts. A good information retrieval system should consider these problems when answering the queries. For example, synonyms such as automobile and vehicle should be considered when searching on keyword car.

The similarity-based retrieval finds similar documents based on a set of common keywords. The output of such retrieval should be based on the degree of relevance, where relevance is measured based on the closeness of the keywords, the relative frequency of the keywords, and so on.

A text retrieval system often associates a stop list with a set of documents. A stop list is a set of words that are deemed "irrelevant." For instance, a, the, of, for, with, and so on are stop words even though they may appear frequently. The stop list depends on the document itself, for example, artificial intelligence could be an important keyword in a newspaper. However, it may be considered as stop word on research papers presented in the artificial intelligence conference.

A group of different words may share the same word stem. A text retrieval system needs to identify groups of words where the words in a group are small syntactic variants of one another, and collect only the common word stem per group. For example, the group of words drug, drugged, and drugs, share a common word stem, drug, and can be viewed as different occurrences of the same word.

Pantel and Lin (2002) computed the similarity among a set of documents or between two words w.sub.i and w.sub.j, by using the cosine coefficient of their mutual information vectors:

$$sim(w_i, w_j) = \frac{\sum_c mi_{w_i c} \times mi_{w_j c}}{\sqrt{\sum_c mi^2_{w_i c} \times mi^2_{w_j c}}}$$

Where, mi.sub.w,c is the pointwise mutual information between context (c) and the word (w). F.sub.c(w) be the frequency count of the word w occurring in context c:

$$mi_{w,c} = \frac{\frac{F_c(w)}{N}}{\frac{\sum_i F_i(w)}{N} \times \frac{\sum_j F_c(j)}{N}},$$

$$\text{where } N = \sum_i \sum_j F_i(j),$$

is the total frequency counts of all is the total frequency counts of all words and their context.

2.3.3 Methods for Text Retrieval
2.3.3.1 Latent Semantic Indexing

In the text retrieval system, the key point is the matching terms in the documents. The information retrieved by literally matching terms with those of a query. As mentioned above because of the problems of synonymy and polysemy, some of the lexical matching methods can be inaccurate when they are used to match a user's query. Many words have multiple meaning, and at the same time there are many ways to express a given concept, so the result of the query matching terms in irrelevant documents. To solve this problem we must find a better approach which allows user to retrieve information on the basis of a conceptual topic or meaning of a document.

Latent Semantic Indexing (LSI) (Berry et al., 1995) tries to overcome the problems of lexical matching by using statistically derived conceptual indices instead of individual words for retrieval. LSI assumes that there is some underlying or latent structure in word usage that is partially obscured by variability in word choice.

LSI and similar conceptual methods are based on a vector space model in which a vector is used to represent each item or document in a collection. Each component of the vector reflects a particular concept, key word, or term associated with a given document. The value assigned to that component reflects the important of the term in representing the semantics of the document. Typically, the value is a function of the frequency with which the term occurs in the document or in the document collection as a whole.

In order to implement LSI (Foltz et al., 1992) a basic structure matrix m.times.n terms by documents must be constructed, in which the documents are the columns of the matrix, and the rows of the matrix are the term vectors. It can be inferred that the columns of the matrix span a subspace determining the semantic content of the collection of documents. Queries are translated into vectors of equal dimensionally as the column vectors of the matrix. Then a measure of semantic similarity is applied to match each query vector to the document vectors.

2.3.3.2 Singular Value Decomposition (SVD)

Singular Value Decomposition (SVD) (Maltseva et al., 2001) is a powerful technique in matrix computation and analysis that has been introduced by Beltrami in 1873. More recently it has been used in several applications such as solving systems of linear equations, linear regression, pattern recognition, statistical analysis, data compression, and matrix approximation.

In data mining applications (Skillicorn et al., 2001), the initial matrix is an array of objects and attributes. Both number of rows and columns are very large, which requires some additional tools to work with the high-dimensional matrices.

Singular value decomposition is a useful tool for dimensionality reduction. It may be used for preprocessing before using an automatic clustering package. It may be used to improve similarity. The most successful application of SVD for reducing dimensionality is in the area of text retrieval. It is used to estimate the structure in word usage across documents.

As mentioned above in LSI a matrix of terms by documents must be constructed, where the elements of the matrix are the occurrence of each word in a particular document such as A=

The matrix A is factored into the product of 3 matrices A=U.SIGMA.V.sup.T using the singular value decomposition. The SVD derives the latent semantic structure model from the orthogonal matrices U and V containing left and right singular vectors of A, respectively, and the diagonal matrix (has singular values on its diagonal and zero elsewhere), .SIGMA., of singular values of A. These matrices reflect a breakdown of the original relationships into linearly-independent vectors or factor values. The latent semantic model takes the form of A.apprxeq.=TSD.sup.T, where is approximately equal to A and is of rank k (with k less than the number of documents). The dimensionality reduction in is obtained by selecting the highest singular values of .SIGMA. and entering zeros in the remaining positions in the diagonal. Zeros are also entered in the corresponding positions in T and D.sup.T. The rows of the reduced matrices of singular vectors represent terms and documents as points in a k-dimensional space using the left and right singular vectors. The inner products between points are then used to compare the similarity of corresponding objects.

There are three comparisons of interest in this approach: comparing two terms, comparing two documents, and comparing a term and document. The first comparison shows how semantically similar are two terms, whereas the second comparison describes how semantically similar are two documents. The last comparison shows how associated are term i and document j.

It is important (Berry et al., 1995) for the LSI method that the derived matrix not reconstructs the original term document matrix A exactly. The truncated SVD, in one sense, captures most of the important underlying structure in the association of terms and documents, and at the same time removes the noise or variability in word usage that plagues word-based retrieval methods. Because of the number of dimensions, k, is much smaller than the number of unique terms, m, minor differences in terminology will be ignored.

Terms which occur in similar documents, for example, will be near each in the k-dimensional factor space even if they never co-occur in the same document. This means that some documents which do not share any words with a users query may none the less be near it in k-space. This derived representation which captures term-term associations is used for retrieval. For example, let consider words like car, automobile, driver, and elephant. The terms car and automobile are synonyms, driver is a related concept and elephant is unrelated. A query on automobile will neither retrieve documents about cars nor about elephants if the term automobile not used precisely in the documents. It would be preferable if a query about automobiles also retrieved articles about cars and even articles about drivers to a lesser extent. The derived k-dimensional feature space can represent these useful term inter-relationships. The words car and automobile will occur with many of the same words (e.g. motor, model, vehicle, chassis, carmakers, sedan, engine, etc.), and they will have similar representation in k-space. The contexts for driver will overlap to a lesser extent, and those for elephant will be quite dissimilar. The main idea (Berry et al., 1995) in LSI is to explicitly model the interrelationships among terms using the truncated SVD and to exploit this to improve retrieval.

2.3.4 Related Work

Text mining and applications of data mining to structured data derived from text has been the subject of many research efforts in recent years. Most text mining has used natural language processing to extract key terms and phrases directly from the documents.

Data mining is typically applied to large databases of highly structured information in order to discover new knowledge. In businesses and institutions, the amount of information existing in repositories of text documents usually rivals or surpasses the amount found in relational databases. Though the amount of potentially valuable knowledge contained in document collections can be great, they are often difficult to analyze. Therefore, it is important to develop methods to efficiently discover knowledge embedded in these document repositories. Pierre (2002) described an approach to knowledge discovery in text collections. The approach used automated text categorization to assign faceted metadata records to text documents. Metadata may be faceted in that it is composed of orthogonal sets of categories. For example (Yee et al., 2003), in the domain of arts images, possible facets might be themes, artist names, time period, media, and geographical locations. These metadata records serve as a bridge between a corpus of free-text documents and highly structured database with a rigid schema. Statistical techniques and traditional data mining can then be applied to the set of structured metadata records to discover knowledge implicit in the underlying document collection. By choosing the metadata schema and then the set of concepts in each facet the knowledge discovery process can be controlled. The approach contains some of aspects such as, first; gather a document collection that covers the domain of interest. Second, segment documents into an appropriate set of transactions. Third, construct a metadata schema with facets and concepts that suit the goal of the knowledge discovery task. Fourth, train text classifiers to populate the metadata fields using machine learning techniques. Fifth, apply automated text categorization to create a metadata database. Finally, use data mining to discover associations between concepts or derive rules.

Pantel and Lin (2002) proposed a clustering algorithm, CBC (Clustering By Committee) that automatically discovers concepts from text. It initially discovers a set of tight clusters called committees that are well scattered in the similarity space. The centroid of a cluster is constructed by averaging the feature vectors of a subset of the cluster members. The subset is viewed as a committee that determines which other elements belong to the cluster. By carefully choosing committee members, the features of the centroid tend to be the more typical features of the target class. They divided the algorithm into three phases. In the first phase, they found the top similar elements. To compute the top similar words of a word w, they sorted w's features according to their mutual information with w. They computed only the pairwise similarities between w and the words that share high mutual information features with w. In the second phase, they found recursively tight clusters scattered in the similarity space. In each recursive step, the algorithm finds a set of tight clusters, called committees, and identifies residue elements that are not covered by any committee. The committee covers an element if the element's similarity to the centroid of the committee exceeds some high similarity threshold. The algorithm then recursively attempts to find more committees among the residue elements. The output of the algorithm is the union of all committees found in each recursive step. Assigning elements to clusters is the last phase on CBC algorithm. In this phase, every element is assigned to the cluster containing the committee to which it is most similar. This phase resembles K-means in that every element is assigned to its closest cetroid.

Wong et al. (1999) designed a text association mining system based on ideas from information retrieval and syntactic analysis. The focus is to study the relationships and implications among topics, or descriptive concepts that are used to characterize a corpus. The goal is to discover important association rules within a corpus such that the presence of a set of topics in an article implies the presence of another topic. In the system the corpus of narrative text is fed into a text engine for topic extractions, and then the mining engine reads the topics from the text engine and generates topic association rules. Finally, the resultant association rules are sent to the visualization system for further analysis.

There are two text engines developed in their system in order to generate conceptual topics from a large corpus. The first one is word-based and results in a list of content-bearing words for the corpus. The second one is concept-based and results in concepts based on corpus. The engines are similar in that the topics and concepts are initially evaluated using the entire corpus. The topic words selected by the text engine are fed into the mining engine to compute the association rules according to the requested confidence and support values.

Wong et al. (2000) presented a powerful visual data mining system that contains a customized sequential pattern discovery engine and interactive visualization tool. The system was developed to support the text mining and visualization research on large unstructured document corpora. The objective is to discover inter-transaction patterns such as presence of a topic is followed by another topic. The primary goal of sequential pattern discovery is to assess the evolution of events against a measured timeline and detect changes that might occur coincidentally. Visualizing sequential pattern for text mining differs from visualizing association rules for text mining. A sequential pattern is the study of ordering or arrangement of elements, whereas an association rule is the study of togetherness of elements.

Dhillon et al. (2001) designed a vector space model to obtain a highly efficient process for clustering very large document collections exceeding more than 100,000 documents in a reasonable amount of time on a single processor. They used efficient and scalable data structures such as local and global hash tables, added to that highly efficient and effective spherical k-means algorithm is used, since both the document and concept vectors lie on the surface of a high-dimensional sphere.

In 1998, IBM for the first time introduced a product in the area of text mining, the Intelligent Miner for Text. It is a software development toolkit. It addresses system integrators, solution providers, and application developers. The toolkit contains the necessary components for "real text mining": feature extraction, clustering, categorization, and more.

With the mapping of documents to feature vectors that describe them in place, Dorre et al., (1999) performed document classification in either of two ways. Clustering is a fully automatic process, which partition a given collection into groups of documents similar in contents, i.e., in their feature vectors. Intelligent Miner for text includes two clustering engines employing algorithms that are useful in different kinds of applications. The Hierarchical Clustering tool orders the clusters into a tree reflecting various levels of similarity. The Binary Relational Clustering tool uses "Relational Analysis" to produce a flat clustering together with relationships of different strength between the clusters reflecting inter-cluster similarities. Both tools help to identify the topic of a group by listing terms or words that are common in the documents in the group. Thus clustering is a great means to get an overview of the documents of a collection. The second kind of classification is called text categorization. The topic categorization tool assigns documents to preexisting categories, sometimes called "topics", or "themes". The categories are chosen to match the intended use of the collection. In the Intelligent Miner for text, those categories are simply defined by providing a set of sample documents for each category. All the analysis of the categories, feature extraction and choice of features, i.e., key words and phases, to characterize each category, are done automatically. This "training" phase produces a special index, called the categorization schema, which is subsequently used to categorize new documents. The categorization tool returns a list of category names and confidence levels for each document being categorized.

2.4 Mining Remote Sensing Data 2.4.1 Introduction

In the last two decades, great progress has been made in earth observing from space and associated earth systems numerical simulations. Unprecedented observations of the earth have provided very large amounts of data. The Earth Observing System (EOS) satellites Terra and Aqua and other earth observing platforms are producing or will produce massive data products with rates of more than terabyte per day (King et al., 1999). Moreover, with high performance computers, more and more model data are generated. Applications and products of earth observing and remote sensing technologies have been shown to be crucial to our global social, economic, and environmental well being (Yang et al., 2001).

To face the challenges of the rapidly growing volumes of data, one cannot rely on the traditional method where a user downloads data and uses local tools to study the data residing on a local storage system. Instead, users need to use an effective and efficient way. Data information systems, through which they can search massive remotely sensed databases for their interested data and can order the selected datasets or subsets, provide an efficient way.

Several information systems have been developed for data ordering purposes (Tang et al., 2003). Metadata, well based descriptive information of the scientific datasets, are provided in a database to support data searching by commonly used criteria such as the main purpose of the dataset, spatial coverage, temporal coverage, spatial resolution, temporal resolution, production time, and the data quality of the dataset.

Because a metadata search itself may still result in large amounts of data, some textual restriction, such as keyword searches, could be used to narrow down the data selection. Sometimes users may want to have an idea of what the data look like before ordering them. Content-based data search (Yang et al., 2003) (searching data based on not only metadata, but also actual data content), or browsing and preliminary analyzing data based on their actual values, will help data users to narrow down selected data.

2.4.2 Data Mining for Remote Sensing

As the data volume becomes larger and larger, users are not satisfied with locating datasets based only on the regular textual/spatial/temporal conditions. Alternatively, users like to find datasets based on data values themselves. The histogram clustering technique may help users find the datasets efficiently with a specified accuracy so that it is used as a data mining tool for the datasets.

Since the earth science data are naturally distributed among different data providers, a design system should be distributed based on the existing data distribution. Yang et al. (2001), developed a distributed data information system, named SIESIP (Seasonal to Interannual ESIP), FIG. 1, which is a federated system and a part of a larger federation of earth science information partners (ESI Ps). The system provides services for data searching, browsing, analyzing and ordering. It provides not only data and information, but also data visualization, analysis and user support capabilities.

FIG. 1 Shows Architecture of SIESIP System

The SIESIP system is a multi-tired client-server architecture, with three physical sites or nodes, distributing tasks in the areas of user services, access to data and information products, archiving as needed, ingest and interoperability options and other aspects. This architecture can serve as a model for many distributed earth system science data. There are three phases of user interaction with the data and information system, each phase can be followed by other phase or can be conducted independently.

Phase1, metadata access. In this phase using the metadata and browsing images provided by the SIESIP system. The users can browse the data holdings. Metadata knowledge is incorporated in the system, and users can issue queries to explore this knowledge. Phase2, data discovery/online data analysis. Here users get a quick estimate of the type and quality of data found in phase1 . Analytical tools are then applied as needed for users to mine content-based information, including statistical functions and visualization algorithms. Phase3, data order. After users locate the datasets of interest, they are now ready to order datasets. If the data are available through SIESIP, the information system will handle the data order, otherwise, an order will be issued to the appropriate data provider such as Goddard Earth Sciences Distributed Active Archive Center (GES DAAC) on behalf of users, or necessary information will be forwarded to users via e-mails for further action.

A database management system is used in the system to handle catalogue metadata and statistical summary data. Two major kinds of queries are supported by the database system. The first query is used to find right data files for analysis and ordering based on catalogue metadata only. The second one queries on the data contents which are supported by the statistical summary data.

Data mining techniques help scientific data users not only in finding rules or relations among different data but also in finding the right datasets. With the explosively increasing of the massive data volume, scientists need a fast way to search for data of interest to them. In this process, users need to search data based on not only metadata but also actual data values. For example, a user may be interested in the regions over which a given parameter has values in a certain range. The goal of the data mining here is to find spatial regions and/or temporal ranges over which parameter values fall in certain ranges. The main challenge of the problem is the speed and the accuracy because they affect each other inversely.

Different data mining techniques can be applied on remote sensing data. Classification of remotely sensed data is used to assign corresponding levels with respect to groups with homogeneous characteristics, with the aim of discriminating multiple objects from each other within the image. Several methods exist for remote sensing image classification. Such methods include both traditional statistical or supervised approaches and unsupervised approaches that usually employ artificial neural networks.

Chapter 3: Data Sources 3.1 Text Data 3.1.1 Background

The text data used in the research reported in this dissertation are documents from the Topic Detection and Tracking (TDT) Pilot Corpus collected by Linguistic Data Consortium, Philadelphia, Pa. Topic Detection and Tracking (TDT) refers to automatic techniques for finding topically related material in streams of data such as newswire and broadcast news (Linguistic Data Consortium, V2.8, 1997). Exploring techniques for detecting the appearance of new, unexpected topics and tracking the reappearance and evolution of them are the main tasks for the TDT study.

There are multiple sources of information for the TDT study, the sources can be newswires or news broadcast programs. All the information from both sources are divided into sequences of stories, which may provide information on one or more events. The general task is to identify the events being discussed in these stories, in terms of the stories that discuss them.

The TDT study is concerned with the detection and tracking of events, which depend on the stream of stories. This stream may or may not be pre-segmented into stories, and the events may or may not be known to the system. There are three technical tasks can be addressed in the TDT study to treat the stream of stories. These tasks are tracking of known events, detecting of unknown events, and the segmentation of a news source into stories.

The tracking task means the task of associating incoming stories with events known to the system. The event will be defined by a list of stories, and the stories should be classified as whether or not it discusses the target event. In this task the corpus will be divided into two parts, training set and test set. So a flag assigned to each story on the training set shows that either the story discusses the target event or does not, this flag will be a key for training the system to correctly classify the target event.

The detection task is characterized by the lack of knowledge of the event to be detected. There are two types of events detection, the first one is the retrospective event detection, identifying all of the events in a corpus of stories. It is assumed that each story discusses at most one event. The second event detection is the on-line new event detection, identifying new events in a stream of stories. Each story is processed in sequence, and a decision is made weather or not a new event is discussed in the story. The aim of this task is to output a new event flag each time a story discusses a new event.

The segmentation task is the task of segmenting a continuous stream of text including transcribed speech into its constituent stories.

3.1.2 Description of the LDC TDT Data

The TDT corpus comprises a set of nearly 16000 stories (15863) spanning the period from Jul. 1, 1994 to Jun. 30, 1995. Each story is represented as a stream of text, in which the text was either taken directly from the newswire (Reuters) or was a manual transcription of the broadcast news speech (CNN). Half of the stories were taken from Reuters newswire and half from CNN broadcast news transcripts, which were produced by the Journal of Graphics Institute (JGI).

The stories in the TDT corpus are arranged in chronological order (Linguistic Data Consortium, V2.8, 1997). The date/time information that comes with Reuter's stories was used for this purpose, whereas, for the CNN stories, an approximation time was assigned, since CNN does not provide broadcast time.

A sequential number with form TDTnnnnnn was assigned to each story after the merging. The sequential number uniquely identify (work as primary key) each story in the data set. The first story in the dataset was assigned TDT000001, whereas the last one is TDT015863. The information following from each source is assumed to be divided into a sequence of stories, which may provide information on one or more events. Table 3.1 shows the data sources (Broadcasts news (CNN), and Newswire (Reuters)) of the data selected (Linguistic Data Consortium, V1.3, 1997).

Table 3.1 shows a breakdown of the stories from each half-year

Table 3.1 Shows a Breakdown of the Stories from Each Half-Year

| Program Source CNN Sources | 1994 | 1995 | Time-of-day |
|---|---|---|---|
| Newsnight | 194 | 49 | 12:00 AM |
| CNN Overnight | 160 | 44 | 3:00 AM |
| Daybreak | 1056 | 470 | 5:00 AM |
| Newsday | 567 | 514 | 12:00 PM |
| Newshour | 453 | 353 | 3:00 PM |
| Early Prime | 665 | 290 | 4:30 PM |
| The International Hour | 569 | 176 | 5:00 PM |
| World News | 641 | 225 | 6:00 PM |
| The World Today | 899 | 573 | 10:00 PM |
| Total # of Stories | 1994 | 1995 | 1994 + 1995 |
| CNN | 5204 | 2694 | 7898 |
| Reuters | 3520 | 4445 | 7965 |
| CNN + Reuters | 8724 | 7139 | 15863 |

3.1.3 LDC TDT Text Database

A set of 25 events was defined to support the TDT corpus. Events might be unexpected, such as the eruption of volcano, or expected such as a political election (Linguistic Data Consortium, V1.3, 1997). The TDT corpus was completely annotated with respect to these events. Each story was flagged with one of the three flag values (Martinez et al., 2002) according to whether the story discussed the event or not: YES (the story discussed the event), NO (the story does not discuss the event), and BRIEF (the story mentioned the event only briefly).

Great care was taken in labeling the stories in the corpus with event labels. Two independent sites were used to read 1382 stories and classifying them accordingly into the twenty-five events. Table 3.2 presents a list of the twenty-five events (Linguistic Data Consortium, V1.3, 1997).

Table 3.2 shows list of the 25 events

Table 3.2 Shows List of the 25 Events

| Event No | Event Name |
|---|---|
| 1 | Aldrich Ames |
| 2 | Carlos the Jackal |
| 3 | Carter in Bosnia |
| 4 | Cessna on White House |
| 5 | Clinic Murders (Salvi) |
| 6 | Comet into Jupiter |
| 7 | Cuban riot in Panama |
| 8 | Death of Kim Jong Il (N. Korea) |
| 9 | DNA in OJ trial |
| 10 | Haiti ousts observers |
| 11 | Hall's copter (N. Korea) |
| 12 | Humble, TX, flooding |
| 13 | Justice-to-be Breyer |
| 14 | Karrigan/Harding |
| 15 | Kobe Japan quake |
| 16 | Lost in Iraq |
| 17 | NYC Subway bombing |
| 18 | OK-City bombing |
| 19 | Pentium chip flaw |
| 20 | Quayle lung clot |
| 21 | Serbians down F-16 |
| 22 | Serbs violate Bihac |
| 23 | Shannon Faulker |
| 24 | USAir 427 crash |
| 25 | WTC Bombing trial |

3.1.4 Lexicon Features 3.1.4.1 Full Lexicon

A set of 15863 documents was used in this research; they differ in their size (number of words on each document). The minimum size was 13 words, whereas the biggest document had 5249 words. The total number of words on the full lexicon has 68354 words. FIG. 2 shows the boxplot of the length of each document in the full lexicon, whereas FIG. 3 shows the length of documents in order of increasing size.

FIG. 2 Boxplot of the Length of Each Document in the Full Lexicon

FIG. 3 Shows the Length of the Documents in Order of Increasing Size 3.1.4.2 Denoised Lexicon In this variant of lexicon all common high-frequency words have been removed from the lexicon in the documents (Martinez et al., 2002). 313 stop or noise words were removed. Appendix A shows all the stop list words. The rare words after eliminating the words of high frequencies and low semantic content would increase the discriminatory factor of the features. The size of the denoised lexicon was 68050 words.

3.1.4.3 Stemmed Lexicon

In my approach, the words are stemmed as well as removed the common high-frequency words of the documents. Stemming the words or returning the word to its root will increase the frequency of key words and enhance the discriminatory factors of the features (Martinez et al., 2002). Stemming is used also to enhance the performance of the information retrieval (IR) system, as well as to reduce the total number of unique words and save on computational resources.

Table 3.3 summarizes the lexicon size for full, denoised and stemming lexicons of the documents.

Table 3.3 Shows the Lexicon Sizes

| Type of Lexicon | Size of Lexicon |
| --- | --- |
| Full Lexicon | 68354 |
| Denoised Lexicon | 68050 |
| Stemmed Lexicon (also denoised) | 45021 |

3.2 Remote Sensing Data
3.2.1 Overview

The remote sensing images used in my research were the Multi-angle Imaging SpectroRadiometer (MISR) instrument delivered by the NASA's Jet Propulsion Laboratory (JPL), California Institute of Technology. The Multi-angle Imaging SpectroRadiometer (MISR) project is a component of the Earth Observing System (EOS) Terra Mission and the EOS Data Information System (EOSDIS), which are components of the National Aeronautics and Space Administration's (NASA) Earth Science Enterprise. An integral part of the MISR project is Scientific Data Processing (SDP) of the observations coming from the MISR instrument on-board the EOS-TERRA satellite.

MISR SDP produces science and supports data products from MISR instrument data. It does not operate as an independent entity, but rather is linked to the functionality of the EOSDIS at the Langley Research Center (LaRC) Distributed Active Archive Center (DAAC), which has a subsystem agent for receiving and organizing all of the input data needed by MISR SDP. These data are then made available to MISR SDP through the data server. Once the MISR standard data processing is complete, the standard output products are archived through the EOSDIS data server and made available to users through the client services.

MISR measurements are designed to improve the understanding of the earth's ecology, environment, and climate (Diner et al., 1998). The illumination source for MISR imagery is reflected sunlight. In fact, understanding how sunlight is scattered in different directions more helpful in determining the changes in the amount, types, and distribution of clouds, airborne particulates, and surface cover that affects our climate.

MISR imaging the earth in nine different view directions to infer the angular variation of reflected sunlight and the physical characteristics of the observed scenes.

3.2.2 MISR Architecture

The main component of the MISR instrument is the optical bench, see FIG. 5, which holds the cameras at their light-admitting end with the detector and cantilevered into the instrument cavity (Diner et al., 1998). The forward and aftward cameras are paired in a symmetrical arrangement and set at fixed view angles on the optical bench. In order to acquire images with nominal view angles, relative to earth's surface, of 0, 26.1, 45.6, 60.0, and 75.5 for An, Af/Aa, Bf/Ba, Cf/Ca, and Df/Da, respectively, each off-nadir camera is oriented at a fore-aft pointing angle that is somewhat smaller than the corresponding view angle to account for earth curvature.

FIG. 5 Shows MISR Optical Bench Assembly (Image From: http://www.misr.jpl.nasa.gov)

To maximize overlap of the swath seen at all angles, the effect of earth rotation during the 7-min interval between viewing a point on the surface by the Df and Da cameras must be taken into consideration. To reach this goal, a slight cross-track offset angle should be incorporated into each camera's view direction. For these angles, the convention is that a positive (negative) offset points the camera in the same (opposite) direction as the earth is rotating.

As mentioned above, there are nine cameras at MISR instrument, see FIGS. 3.5 and 3.6. Each camera has focal lengths that vary with view angle to maintain cross-track sample spacing. In each camera a double-plate Lyot depolarizer is incorporated to render its polarization insensitive. The MISR lenses are superachromatic. They are mounted in aluminum barrels with some additional materials to accommodate thermally induced dimensional changes of the lenses during flight. Each MISR camera contains a camera head that houses the focal plane structure and to which is attached the driver electronics for the charge-coupled device (CCD) line arrays. The camera heads and electronics are identical for all nine cameras, leading to a modular design in which only the lens barrels are unique. MISR contains 36 parallel signal chains corresponding to the four spectral bands in each of the nine cameras. Each signal chain contains the output from the 1520 pixels (Diner et al., 1998) (1504 photoactive, 8 light-shielded and 8 overclock samples of the CCD serial register) in each detector array. The detector elements (pixels) measure 21 (cross-track)*18 Mm (along-track). Each camera focal plane contains four separate line arrays, one for each separate band.

FIG. 6 Shows the Family Portrait of the 9 MISR Cameras (Image From: http://www.misr.jpl.nasa.gov)

FIG. 7 Shows One of the 9 MISR Camera Completely Assembled Together with its Support (Image From: http://www.misr.jpl.nasa.gov)

The MISR CCD architecture is based on standard three phase, three-poly, n-buried channel silicon detector technology. Thinning of the poly gate over the active pixels increases the detectors' quantum efficiency in the blue spectral region.

The other component of MISR's camera, the focal plane filter, which is assembly defining the four optical bandpasses, it's placed about 1.5 mil above the CCD. The camera filters are mosaicked arrays of four separate medium band filters. Masks are placed over the epoxy bond lines between the different filters to prevent white light from leaking to the focal plane. The filters use ion-assisted deposition technology to insure stable and durable coatings that should not shift or degrade with age or environmental stresses.

Added to the optical bench mentioned above, the On-Board Calibrator (OBC) considers being a key component of the MISR instrument. It is hardware provides high radiometric accuracy and stability of the data. It contains a pair of deployable diffuser panels. These are covered with SpectraIon, a pure polytetrafluoroethylene (Teflon) polymer resin, which is compressed and sintered. The OBC is used to provide camera response as a function of input radiance, as established by the diode detector standards.

All MISR system electronics are redundant. There are two sides A and B, to avoid the possibility of a single point failure. It consists of power supplies, logic units, which include the firmware to control the instrument prior to loading of the flight software, data management units, and 1750 A computers, programmed in Ada with 1553-type interfaces to the spacecraft. The system electronics provide the high rate data interface as well as camera, power, and mechanism controls.

3.2.3 Structure and Data Formats of MISR Data

The MISR Data files are implemented in the Hierarchical Data Format (HDF). There are two file formats for the MISR standard data, HDF-EOS Swath or HDF-EOS Grid, which are extensions of the original HDF as developed by the National Center for Supercomputing Applications (NCSA).

The HDF framework is used to define the HDF-EOS data products used by MISR. These products are supported by the special application-programming interface (API), which helps the data producer and user in writing to and reading from these files. The data products can be created and manipulated in variety of ways appropriate to each datatype through the support of the API, without regard to the actual HDF objects and conventions underlying them.

The only MISR standard science data products that use the standard NCSA-supplied HDF file structures are the MISR Ancillary Radiometric Product and Aerosol Climatology Product files. The MISR Level 1A Reformatted Annotated Product and Level 1B1 Radiometric Product data use the HDF-EOS Swath file type, which is designed to support time-ordered data, such as satellite swaths with time-ordered series of scanlines or time-ordered series of profiles.

The HDF-EOS Grid files are used to store the MISR Level 3, using a geographic projection, and above products, which have been gridded to a single Earth-based map projection. MISR stores swath-like products at Level 1B2 and Level 2 in space-based map projection. MISR SDP breaks up L1B1 and L2 swaths into equal-sized blocks. Block means static, fixed-size, rectangular SOM (Space-Oblique Mercator) region on the Earth, which is wide enough to contain the horizontal overlap of all 9 MISR camera views at low latitudes. Block is the geographic unit over which MISR SDP is attempted. It is the standard unit of MISR data access. The construction of the block enables the co-registration of the 9 different images with minimal waste of space and processing effort.

To meet the MISR's needs for Level 1B2 and Level 2 data products, all blocks of an orbit stack into a single dataset to be the third dimension of the dataset. There are 180 blocks to cover the seasonal sun-lit ground under a single path. FIG. 8 shows MISR SOM Representation in HDF-EOS FIG. 8 MISR SOM Representations in HDF-EO

3.2.4 Metadata Formats of MISR Data

For all different types of MISR data there are metadata attached to the MISR file to describe the file in the EOSDIS Core System (ECS) environment. These metadata are produced at the same time that the file is created. There are 6 types of metadata are used in the MISR HDF-EOS Swath and Grid files. These are structural metadata, core metadata, product metadata, file metadata, grid/swath metadata and per-block metadata (for grid files only). The first three types of metadata are recognized by ECS and can be searched in the ECS Data Server database, whereas the last three types were invented by MISR and contain values required by MISR processing.

3.2.4.1 Structural Metadata

Structural Metadata are written into HDF files automatically by HDF-EOS software when writing out HDF-EOS files. These metadata describe the structure of the file in terms of its dimensions, Swath or Grid characteristics, projection (for Grid only), and data fields. These metadata are used by HDF-EOS software to recognize file structures when reading back the data.

3.2.4.2 Core Metadata

Core Metadata provide granule level information used for ingesting, cataloging, and searching the data product. These metadata are attached to HDF-EOS files by Toolkit metadata calls. The attributes of the core metadata are described by the Metadata Configuration File (MCF).

3.2.4.3 Product Metadata

Not like core metadata, product metadata provide granule level information which are not used for search purposes, but are important to be kept with the HDF-EOS file. The same as core metadata, product metadata are also attached by toolkit metadata calls once it's created and the attributes described within the MCF file.

3.2.4.4 File Metadata

File metadata contain MISR-specific information which are common to whole file when used by MISR. These metadata are stored as global attributes which are attached to the standard National Center for Supercomputing Applications (NCSA)-supplied HDF Scientific Dataset (SD) object. The main purpose of these metadata is for processing the file; they are not used for search purposes. These metadata also used on MISR as projection information and product statistics.

3.2.4.5 Per-Grid/Per-Swath Metadata

Grid and Swath Metadata are internal to HDF-EOS files and are used to provide MISR-specific information unique to an individual Grid or Swath dataset in the file. The resolution of the data in a Grid or Swath dataset is an example of these metadata. On the Swath files type, these metadata are consider to be global attributes of a Swath dataset, whereas on the Grid files type, it is the Grid attributes attached using HDF-EOS Grid application calls.

3.2.4.6 Per-Block Metadata

The Per-block Metadata are internal to the file and are used to provide MISR specific information unique to an individual block of a Grid dataset. These metadata are used in the Grid files only, and stored using standard NCSA-supplied HDF Vdata tables within the file, because there are no structures for dealing with MISR blocks on the HDF-EOS Grid API. The attributes stored in Per-block Metadata include per-block coordinates, such as L1B2 transform information, and statistics.

3.2.5 Quality Assurance Formats for MISR Data

There are four types of Quality Assurance (QA) structures for the MISR data that are related naturally to MISR instrument swath, blocks, lines, pixels. The content of the QA are collection of statistics which may be indexed over some dimension. Vdata's are the suitable example of this type of HDF. It is a collection of one-dimensional fixed-length records, where each record is composed of one or more fixed-length array fields. The content of the Vdata differ from one record to the next, although the Vdata records are identical in structure.

3.2.5.1 Quality Assurance (QA) Fields

The Quality Assurance (QA) statistics are generally organized within the following four fields of Vdata.

Per-swath Field: a single value statistic relevant to an entire MISR swath of a data product. It is either integer or floating point.

Per-block Field: a single value statistic either integer or floating point relevant to a particular MISR block. For any QA file there are 100 per-block QA fields defined. On the MISR data there 180 blocks for each of the four bands of the each nine cameras.

Per-line Field: a single value statistic (integer or floating point) relevant to a particular line in a swath. There are 100 per-line fields defined in each QA file. All per-line QA fields relating to a particular line are indexed up to 72,000 which is the maximum line in a MISR swath for each band of each camera.

Per-pixel Field: a single value statistic, integer or floating point, relevant to a particular pixel in a swath. For each line there are 1520 pixels. This field is used with HDF-EOS swath products.

Added to the above QA fields, there are other QA structures used on MISR standard data products which have more than one dimension and not predefined in size, such as Grid Cell structure needed by L1B2. Pre-grid Cell Field is also a single value statistic, integer or floating point, relevant to particular L1B2 grid cell in a particular block. The range of grid cell per block is from 2 to 6. All Per-grid Cell Fields are indexed by block then by grid cell.

3.2.6 Misr Level 1B2 Georectified Radiance Product

There are six file granules on the MISR Level 1B2 Georectified Radiance Product. These parameters are in geometric corrections and have been projected to a Space-Oblique Mercator (SOM) map grid. Added to the six file granules, there are also additional granules, such as the browse product which is a JPEG image of the Ellipsoid products, and the two intermediate granules, the ellipsoid and terrain transform parameters products (TRP). Table 3.4 shows the list of all the six file granules.

180 blocks indexed from 1 to 180. The size of the block of x dimension either 512 or 128, whereas the size of the block of y dimension is 2048 or 512, both sizes of x and y dimensions depend on the band. The resolution of block x and y dimensions are between 275 and 1100 meters.

Chapter 4: Features Extraction from Image Data 4.1 Introduction to Features and Textures It is easy to recognize the similarities or differences of two features when we see them but the difficulty is how to define or describe these features. There is no specific or precise definition for a feature, although it is important in image analysis. Many researchers define features in different ways, but all agree on one point; features are important in order to characterize, identify, and recognize objects.

Features are one of the abstraction levels for representing images. They are distinguishing characteristics or attributes of an image. Features can be classified as natural or artificial features. The natural features such as luminance, shape descriptor, and gray-scale texture are correspond to visual appearance of an image. Whereas the artificial features such as amplitude histogram, color histogram, and spatial frequency spectra are usually obtained from specific manipulations of an image. In general, each image can be segmented by n features, which are grouped into a feature vector. Each region consists of homogeneous feature vectors.

| MISR Level 1B2 File Granule Name | Earth Science Datatype (ESDT) Name |
| --- | --- |
| MISR_AM1_GRP_ELLIPSOID_GM_Pmmm_Onnnnnn_cc_Fff_vvvv.hdf | MI1B2E |
| MISR_AM1_GRP_ELLIPSOID_LM_Pmmm_Onnnnnn_cc_Fff_vvvv.hdf | MB2LME |
| MISR_AM1_GRP_TERRIAN_GM_Pmmm_Onnnnnn_cc_Fff_vvvv.hdf | MI1B2T |
| MISR_AM1_GRP_TERRIAN_LM_Pmmm_Onnnnnn_cc_Fff_vvvv.hdf | MB2LMT |
| MISR_AM1_GP_GMP_Pmmm_Onnnnnn_Fff_vvvv.hdf | MIB2GEOP |
| MISR_AM1_GRP_RCCM_GM_Pmmm_Onnnnnn_cc_Fff_vvvv.hdf | MIRCCM |
| MISR_AM1_GRP_ELLIPSOID_GM_BR_Pmmm_Onnnnnn_cc_Fff_vvvv.jpg | MISBR |
| MISR_AM1_TRP_ELLIPSOID_Pmmm_Onnnnnn_cc_Fff_vvvv.hdf | MIB2TRPE |
| MISR_AM1_TRP_TERRAIN_Pmmm_Onnnnnn_cc_Fff_vvvv.hdf | MIB2TRPT |

As mentioned above, the Georectified Radiance Product produced as six ESDT, each with one physical file, which is in the HDF-EOS Grid stacked-block format and each contains one or more HDF-EOS Grid datasets, corresponding to parameters at certain spatial resolutions. The grid dataset is a 3-dimensional dataset. The X and Y dimensions are the number of samples in the along-track and cross-track directions respectively, whereas the third dimension is the SOM block number.

The MISR data used in my research are MISR data level 1B2 (L1B2 Ellipsoid) HDF-EOS Stacked-Block Grid. The file granule name is (MISR_AM1_GRP_ELLIPSOID_GM_Pmmm_o nnnnnn_cc_Fff_vvv.hdf), with ESDT name (MI1B2E), where, GM: global mode
Pmmm: orbit path number
Onnnnnn: absolute orbit number
cc: camera identifier (9 cameras available, Df, Cf, Bf, Af, An, Aa, Ba, Ca, Da)
ff: file format version
vvvv: version number, relates to the reprocessing of a dataset with different software and/or ancillary inputs.

This type of file contains of four grid dataset, NIR Band, Red Band, Green Band, and Blue Band. The range of the path number varies from 1 to 233. Number of blocks on this file is Features should be easily computed, robust, insensitive to various distortions and variations in the images, and they should discriminate among the various possible classes of images.

Texture is a combination of repeated patterns with a regular frequency. It is an important aspect in image analysis as it involves a measure of both the spectral and spatial variation in the scene (Sudibjo et al., 1989). The primitive of the image texture is a collection of pixels that share a common property and are geometrically connected. These pixels have a structural or probalistic relationship or possibly both. There are several types of properties, such as smoothness, fineness, coarseness, regularity, randomness, directionality, and linelikeness, which are used in the classification. Texture defines the characteristics of the image; it can be determined (characterized) by the spatial distribution of gray levels in a neighborhood (Jain et al., 1996). According to Haralick, et al. (1979), an image texture is described by the number and types of its primitives (tonal), the continuous gray scale varying from white to black, and the spatial organization or layout of its primitives (tonal). (Baraldi, et al., 1995) define texture as the visual effect that is produced by the spatial distribution of tonal variations over relatively small areas. There is a relationship between tone and texture which effects on the texture concept of the small areas, since both of them are present on the image or either one dominates the other. In a small area if there is little tonal variation, the dominant information is gray tone (homogenous) (Baraldi, et al., 1995). In general, we can look to texture analysis as an approach for recognition and distinction of different characteristics of spatial arrangement and frequency of tonal variation related to patterns in the digital sensor image (Lee et al., 2004).

4.2 Automated Feature Extraction

Many areas can be distinguished from one another by their shape or structure characteristics. Therefore, it is important to extract features that are helpful to describe relevant texture properties of the areas (Aria, et al., 2004). As mentioned above, feature extraction can be viewed as finding a set of vectors that represent an observation while reducing the dimensionality (Palmason et al., 2003). Automated feature extraction is an important and supplemental technology that is helpful in analyzing and interpreting the remote sensing data for a wide variety tasks and applications. It allows the identification of relevant features and their outlines by post-processing digital imagery through techniques to enhance and isolate feature definition. Feature extraction can be defined as the operation to quantify the image quality through various parameters of functions, which are applied to the original image. It is normally used for automated classification or analysis in quantitative form.

The extracted textural features play the fundamental role in image classification by presenting relevant properties. The quality of the results of remote sensing imagery depends upon both the qualities and characteristics of the available imagery, the nature of the feature extraction (recognition) problems, and the automated feature extraction tools and methodology used. The effective use of automated features extraction can improve general understanding of the evidence presented by imagery. To support the automated feature extraction process to improve the quality of image analysis and interpretation, it is good if the features are reviewed by skilled personnel with some manual interaction. Intervention in the automated feature extraction processing can improve results (Granzow, 2001).

In general, automated feature extraction is applicable to a wide range of imagery interpretation tasks. Success in isolating particular features generally depends on establishing a set of conditions that uniquely mark that feature.

Knowing the range and contrast of the surrounding pixels is helpful in automated feature extraction, which we can look to as texture or segmentation analysis.

4.2.1 Methods of Feature Extraction

There are several different methods to describe the feature analysis. Each one defines the features that are used in the classification process on different ways. The most important methods are the structural (geometrical) and statistical approaches. Structural methods use the geometrical features of the determined texture primitives as the texture features (Kuan et al., 1998). These methods depend on the fact that textures are made up of primitives with geometrical properties. These methods are suitable for describing the placement rules of the texture, which can be used not only to recognize texture but also to synthesize new images with a similar texture. Image preprocessing procedures are required to extract texture primitives using these methods.

Statistical methods are the dominant approach for texture matching. With these methods, regular, random, and quasi-random textures can be recognized. Statistical methods generate features for the analysis of the properties of the spatial distribution of gray levels in the image by computing local features at each point in the image, and deriving a set of statistics from the distributions of the local features. These methods are often more powerful than the structural methods because the textures are described by statistical measures. They are classified in different ways depending on the number of pixels: first-order (one pixel), second-order (two pixels), and higher-order (three or more pixels) statistics.

First-order statistical methods are the simpleset way to extract statistical features in an image. They are concerned with the frequency of the gray levels in the scene. They are described by the distribution of the gray levels as a measure of the domain and range in a fixed area. Examples of these are the calculation of mean for location, the standard deviation to measure the dispersion, the skewness to describe the asymmetry, and the kurtosis to represent the shape of the distribution (Sudibjo et. al., 1989) (Aria et. al., 2004). The first-order statistics provide a more robust measure for feature identification, because they involve local distributions rather than simple absolute values.

One of the most common techniques of image analysis using the second-order statistical measure of image variation is the gray level co-occurrence matrix (GLCM) method. Gray-level difference method (GLDM) is another statistical method. The latter estimates the probability density function for differences taken between picture function values. Other statistical approaches include an autocorrelation, which has been used for analyzing the regularity coarsencess of texture. This function evaluates the linear spatial relationship between primitives.

4.3 Geometrical Feature Methods

4.3.1 Edge Detection Method

Edge detection is a method that significantly reduces the amount of data and filters out useless information, while preserving the important structural properties in an image. (Kim et. al., 1998) define the edge detection method as the process of converting a change of gray level between regions of an image into a variation function that gives the difference between the gray level of each region and the gray level of the line of discontinuity. The process of edge detection must consider the distinct features of edge line such as intensity, direction, and position. According to Lim (1990), an edge in an image is a boundary or contour at which a significant change occurs in some physical aspect of the image. It is an area with high intensity contrast which has higher value than those surrounding it. Edge detection filters designed to highlight linear features, such as roads or field boundaries. These filters are useful in applications such as remote sensing, for detecting linear geographic structures. Remote sensing applications (Ali et al., 2001) such as image registration, image segmentation, region separation, object description, and recognition, widely use edge detection as a preprocessing stage for features extraction.

There are many ways to perform edge detection that consider a two-directional computation (horizontal and vertical directions) of the gray-level difference, and at the same time using gradient intensity to represent the edge intensity. Examples of these methods are gradient, Laplacian, and Sobel. The gradient method detects the edges by looking for the maximum and minimum in the first derivative of the image. It computes some quantity related to the magnitude of the slope of the underlying image gray tone intensity surface of which the observed image pixel values are noisy discretized samples. The gradient of image intensity is the vector $$\nabla f = \left[\frac{\sigma}{\sigma x}f + \frac{\sigma}{\sigma y}f\right]^t = [G_x, G_y]^t$$

and the magnitude and direction of the gradient are:

$$G = \sqrt{G_x^2 + G_y^2},$$
$$\theta = \tan^{-1}\frac{G_y}{G_x}.$$

The Laplacian method searches for zero-crossings (places where one pixel is positive and a neighbor is negative) in the second derivative of the image to find edges. It computes some quantity related to the Laplacian of the underlying image gray tone intensity surface. The zero-crossing determines whether or not the digital Laplacian or the estimated second direction derivative has a zero-crossing within the pixel. Although zero-crossings provide closed paths, they have two problems, they produce two pixel thick edges, and they can be extremely sensitive to noise.

The third method, the Sobel method which performs a 2-D spatial gradient measurement on an image. It is used to find the approximate absolute gradient magnitude at each point in an gray-scale image. The Sobel edge detector provides very thick and sometimes very inaccurate edges, especially when applied to noisy images (Ali et. al., 2001).

As mentioned above, there is no general way to extract the edges in an image. The edge extracting method differs by the type of the image we investigate. For example (Kim et. al., 1998), in the intensity images, the edges depend on brightness variation and orientation. On the range images, the edges depend on depth variation and viewpoint. For thermal images, the edges depend on temperature variation and its diffusion direction. On these methods one directional computation is used to generate the edge in discontinuity region, and the amount of variation of gray level is using to represent the edge intensity.

4.3.2 Canny Edge Detection

The Canny edge detector is based on computing the squared gradient magnitude. Local maxima of the gradient magnitude that are above some threshold are then identified as edges. The aim of Canny's edge operator is to derive an optimal operator its main task minimizes the probability of multiply detecting an edge, minimizes the probability of failing to detect an edge and minimizes the distance of the reported edge from the true edge. The optimality of Canny's edge detector is related to three criteria, detection, localization, and one response criterion. The detection criterion expresses the fact that important edges should not be missed and that there be no responses to non-edges, i.e. given that an edge is present, the edge detector will detect that edge and no other edges.

The localization criterion shows how the accurately the position of an edge is reported. This criterion is concerned about the distance between the actual and located position of the edge should be minimal. There is tradeoff between the detection and localization, the more accurate the detector the less accurate the localization, and the vice-versa (Ali et al., 2001). Because of the first two criterion were not substantial enough to completely eliminate the possibility of multiple responses to an edge, the third criterion, the one response, was implemented, which concerns on having only one response to a single edge, i.e., minimizes multiple responses to a single edge. The one response criterion is partly covered by the detection criterion when there are two responses to a single edge one of them should be considered as false.

In order to implement Canny edge detector algorithm, there are multiple steps such as (Green, 2002):

1—Filters out any noise in the original image before trying to locate and detect any edges.

2—After smoothing the image and eliminating the noise, the next step is to find the edge strength by taking the gradient of the image. Here the Sobel operator performs a 2-D spatial gradient measurement on an image, to find the gradient magnitude at each point. The Sobel operator estimates the gradients in the x-direction (columns) and in the y-direction (rows).

3—Find the direction of the gradient.

4—Once the direction is known, the next step is to relate the edge direction to a direction that can be traced in an image. There are only four directions when describing the surrounding pixels, the horizontal direction (0-degrees), along the positive diagonal (45-degrees), the vertical direction (90-degrees), and along the negative diagonal (135-degrees). Depending on which direction is closest, the edge orientation can be resolved on one of these directions.

5—On this step the nonmaximum suppression is used to trace along the edge direction and suppress any pixel value (set it equal to zero) that is not considered to be an edge. This will give a thin line in the output image.

6—Finally, the thresholding hysteresis introduced. Hysteresis is used as a means of eliminating streaking, which is the breaking up of an edge contour caused by the operator output fluctuating above and below the threshold. The hysteresis uses two thresholds, high and low, the higher one is usually three times the low one. Any pixel in the image that has a gradient value greater than the higher threshold value is considered immediately as a valid edge point. Any pixels that are connected to the edge pixel and have a gradient value greater than the lower thresholding value are also considered as edge points. The process continues once one has started an edge, and doesn't stop until the gradient on the edge is has dropped considerably.

Canny edge detector using as an enhancement tool for remote sensing images, by performing image smoothing, then the sharp edge map produced by the Canny edge detector is added to the smoothed noisy image to generate the enhanced image.

4.3.3 Hough Transform (HT)

The Hough transform (HT) is a technique for shape detection in digital images. It maps an image into a n-dimensional parametric space, transforming the problem of detecting the shape in the plane of the image to the one of searching peaks in the parameter space (Cappellini et al., 1991). The HT is helpful for detecting straight lines and circles. HT for line detection maps an image into 2-dimensional parametric plane as in the following equation $$r = x \cos(\theta) + y \sin(\theta),$$

where, r is the distance between the line and the origin of the image plane, and .theta. is the angle between the minimum distance from the origin to the line and the x-axis. On the above equation the value of r is computed for every point (x,y) of the image and for every θ value. Once the value of r is calculated, the cell (r, .theta.) in the parametric space is incremented. As a result, a set of collinear points in the image produces a peak in the parametric plane located at the cell of coordinates (r, .theta.) where r and .theta. describe the line on which the points lie.

In another way, points of an image can be transformed to produce a 3-dimensional transformed space where the presence of a peak is caused by a circular feature in the image domain by using the following equation, $$r^2 = (x-a)^2 + (y-b)^2.$$

The problem with HT implementation for circular features is that detection demands a substantial memory requirement. For that reason researchers suggest some techniques that depend on fixing one or more parameters. Cappellini et al., (1991) developed a technique to avoid the heavy memory requirement and, at the same time, is helpful in the remote sensing image analysis for extracting circular features. The technique showed on every iteration the value of the radius was frozen and each point in the image was mapped in a circle in the 2-dimensional parametric plane. In this case, the edge direction information reduces the locus traced in the parameter plane to two points placed at a distance equal to the radius and perpendicular to the direction of the edge. Two arcs were traced passing through the two points to eliminate the effects of quantization noise. To compute the circular loci, a fast look-up-table built at the beginning of each iteration. With this technique a linked list data structure that keeps information on position, amplitude, symmetry of each peak together with the radius of the corresponding circle is implemented. The most significant peaks are inserted in a linked list data structure. For each peak a confidence value is computed based on the amplitudes of peaks in neighboring cells.

Finally a clustering algorithm is implemented to the best center for the coordinates of the cluster as well as its radius and a unique confidence value is added to the confidence values of each cluster. The clusters information is stored in a second linked list data structure, which provides the information of the position of the revealed circles in the image domain.

The advantage of this technique is not only in finding the circular feature but also in reducing the heavy memory load by reducing the parametric space, because the older techniques need more space to store information from previous iterations.

4.4 Statistical Feature Methods
4.4.1 Gray Level Co-Occurrence Matrix (GLCM)

Gray Level Co-occurrence Matrix (GLCM) is a common technique in texture analysis methods. It is used to estimate image properties related to second-order statistics. The GLCM considers the relation between two neighboring pixels with one offset as the second-order texture (Lee et al., 2004). The first pixel is called reference pixel and the second one the neighbor pixel, which is chosen to be the one to the east (right) of each reference pixel. GLCM measures the occurrence of one gray tone in a specified spatial linear relationship with another gray tone within the same area. It can reveal certain properties about the spatial distribution of the gray level in the texture image. GLCM is matrix of joint probabilities P.sub.d(i,j), which measures the probability that gray level j follows the gray level i at pixel separated by distance d, defined as the number of pixels, in a direction .theta. of 0', 45.degree., 90.degree. or 135.degree.

4.4.1.1 GLCM Framework

There are several steps necessary to build symmetrical normalized GLCM. These steps are as follows:

1—Create framework matrix: In this step the matrix will be filled starting from the top left cell to bottom right cell. The values on the cells show how many times, for example, the combination of 0,0 or 0,1 occurs, i.e. how many times within the image area a pixel with gray level 0 falls to the right of another pixel with gray level 0. Pixels along the right edge have no right-hand neighbor (no wrap).

2—Add the matrix to its transpose to make the result symmetric: The transpose matrix is created by interchanging the rows and columns of the original matrix. A symmetric matrix means that the same values occur in cells on opposite sides of the diagonal; for example, the value in cell 3,2 would be the same as the value in cell 2,3.

3—Expressing the GLCM as a probability: In this step the GLCM is transformed into a close approximation of a probability table. This process is called normalizing the matrix. Normalization involves dividing by the sum of values. The probability can be measured by apply the normalization equation:

$$P_{i,j} = \frac{V_{i,j}}{\sum_{i,j=0}^{N-1} V_{i,j}},$$

where,
i and j are the row and column numbers respectively.
$V_{i,j}$ is the value in the cell i, j of the image.
$P_{i,j}$ is the probability for the cell i, j.
N is the number of rows or columns.

To apply the above steps, the following test image is given as example:

Test Image:

| 1 | 1 | 1 | 3 | 4 |
|---|---|---|---|---|
| 2 | 5 | 3 | 2 | 1 |
| 1 | 4 | 5 | 3 | 2 |
| 5 | 1 | 2 | 1 | 4 |

GLCM Framework Matrix:

|   | 1 | 2 | 3 | 4 | 5 |
|---|---|---|---|---|---|
| 1 | 2 | 1 | 1 | 2 | 0 |
| 2 | 2 | 0 | 0 | 0 | 1 |
| 3 | 0 | 2 | 0 | 1 | 0 |
| 4 | 0 | 0 | 0 | 0 | 1 |
| 5 | 1 | 0 | 2 | 0 | 0 |

Transpose Matrix:

|   | 1 | 2 | 3 | 4 | 5 |
|---|---|---|---|---|---|
| 1 | 2 | 2 | 0 | 0 | 1 |
| 2 | 1 | 0 | 2 | 0 | 0 |
| 3 | 1 | 0 | 0 | 0 | 2 |
| 4 | 2 | 0 | 1 | 0 | 0 |
| 5 | 0 | 1 | 0 | 1 | 0 |

Symmetric Matrix:

|   | 1 | 2 | 3 | 4 | 5 |
|---|---|---|---|---|---|
| 1 | 4 | 3 | 1 | 2 | 1 |
| 2 | 3 | 0 | 2 | 0 | 1 |
| 3 | 1 | 2 | 0 | 1 | 2 |
| 4 | 2 | 0 | 1 | 0 | 1 |
| 5 | 1 | 1 | 2 | 1 | 0 |

Normalized Symmetrical GLCM:

|   | 1 | 2 | 3 | 4 | 5 |
|---|---|---|---|---|---|
| 1 | 0.125 | 0.09375 | 0.03125 | 0.0625 | 0.03125 |
| 2 | 0.09375 | 0 | 0.0625 | 0 | 0.03125 |
| 3 | 0.03125 | 0.0625 | 0 | 0.03125 | 0.0625 |
| 4 | 0.0625 | 0 | 0.03125 | 0 | 0.03125 |
| 5 | 0.03125 | 0.03125 | 0.0625 | 0.03125 | 0 |

4.5 Image Features Implementation

Haralick et al., (1979) has proposed 14 measures of texture features that can computed from the co-concurrence matrices. Some of these features are related to first-order statistical concepts, such as contrast and variance and have clear textural meaning like pixel pair repetition rate and spatial frequencies detection. Other features contain textural information and at the same time are associated with more than one specific textural meaning (Baraldi et al., 1995). In my research I developed a set of features partly based on GLCM. Adjacent pairs of pixels (assuming 256 gray levels) are used to create 256 by 256 matrix with all possible pairs of gray levels reflected. Images with similar GLCM are expected to be similar images. In this research some of the features that are based on the GLCM are used, such as homogeneity, contrast, dissimilarity, entropy, angular second moment (ASM), and energy. Other features included histogram-based contrast, the alternate vegetation index (AVI) (greenness/NIR ratio), and the normalized difference vegetation index (NOVI).

To manipulate the images different softwares are used such as hdfview and matlab.

4.5.1 Homogeneity $$\text{Homogeneity} = \sum_{i=0}^{255}\sum_{j=0}^{255} \frac{1}{1+(i-j)^2} P_{i,j}$$

Homogeneity is a measure of the uniformity of the co-occurrence matrix. It measures image homogeneity because it assumes larger values for smaller gray tone difference pair elements. It is more sensitive to the presence of near diagonal elements in the GLCM. It returns a value that measures the closeness of the distribution of elements in the GLCM to the GLCM diagonal. The range of the Homogeneity values is between $$\text{Contrast} = \sum_{i=0}^{255}\sum_{j=0}^{255} (i-j)^2 P(i,j)$$

Contrast measures the extent to which most elements do not lie on the main diagonal. It returns a measure of the intensity of the contrast between a pixel and its neighbor over the whole image. Large value of Contrast indicates large local variation. For a low contrast image the Contrast value=0. Contrast is correlated with the spatial frequency, the difference between the highest and the lowest values of a continuous set of pixels (Baraldi et al., 1995), whereas it is correlated, but inversely, with Homogeneity. Homogeneity decreases when the Contrast increases (see FIG. 9). A low contrast image is not necessarily characterized by a narrow gray level distribution because it does not necessarily present a low variance value, but the low contrast image certainly features low spatial frequencies.

FIG. 9 Shows the Values of Homogeneity and Contrast for Different Images 4.5.3 Dissimilarity $$\text{Dissimilarity} = \sum_{i=0}^{255}\sum_{j=0}^{255} |i-j| P(i,j)$$

Dissimilarity measures how much different elements of the co-occurrence matrix are from each other. While Contrast is based on squared differences, Dissimilarity is based on absolute differences, similar to $L_2$ versus $L_1$ norms.

4.5.4 Entropy $$\text{Entropy} = \sum_{i=0}^{255}\sum_{j=0}^{255} (-\ln(P(i,j))) P(i,j)$$

Entropy measures the randomness, the degree of disorder or non-homogeneity of an image. It will be maximum when all elements of the co-occurrence matrix the same, i.e., when the image is not texturally uniform, which means many GLCM elements have very small values. The histogram for such image is a constant function since P(i,j) are the same.

4.5.5 Angular Second Moment (ASM) and Energy $$ASM = \sum_{i=0}^{255}\sum_{j=0}^{255} P^2(i,j)$$

$$\text{Energy} = \sqrt{\sum_{i=0}^{255}\sum_{j=0}^{255} P^2(i,j)}$$

Energy and ASM measure extent of pixel pair repetitions and pixel orderliness. They measure the textural uniformity such as pixel pair repetition, which means the image patch under consideration is homogeneous, when only similar gray level pixels are present, when the image is texturally uniform, or when the vector displacement always falls on the same (i, j) gray level pair. The range of Energy=High Energy values occur when the gray level distribution over the window has either a constant or a periodic form. Energy is strongly uncorrelated to first-order statistical variables such as contrast and variance. Energy is inversely correlated to Entropy (see FIG. 10), therefore similar results maybe expected for Energy and Entropy clustering. The advantage in using Energy rather than Entropy is that Energy has a normalized range.

FIG. 10 Shows the Correlation Between Entropy and Energy (Inversely Correlated)

4.5.6 Descriptive Statistics of the GLCM Texture Measure

Added to the above texture features, there are three important statistical parameters for the GLCM, which are Mean, Variance, and Correlation.

4.5.6.1 GLCM Mean $$\mu_{i.} = \sum_{i,j}^{255} i P_{i,j}$$

$$\mu_{.j} = \sum_{i,j}^{255} j P_{i,j}$$

The GLCM Mean is not the average of all the original pixel values in the image. The pixel value is weighted by the frequency of its occurrence in combination with a certain neighboring pixel value. Because the combination of pixels are different in the horizontal and vertical GLCMs, the GLCM Means will be different.

4.5.6.2 Variance (Standard Deviation)

$$\text{Variance} = \sum_{i=0}^{255} \sum_{j=0}^{255} (i - \mu)^2 P(i, j)$$

GLCM Variance is like Contrast, a first-order statistical concept. It's a measure of heterogeneity, i.e. measure the dispersion of the values around the mean. Variance increases when the gray-level values differ from their mean.

4.5.6.3 Correlation $$\text{Correlation} = \sum_{i=0}^{255} \sum_{j=0}^{255} (i - \mu)(j - \mu) P(i, j) / \sigma^2$$

Correlation between two pixels means that there is a predictable and linear relationship between the two pixels. GLCM correlation is the correlation coefficient between two random variables i, j, where i represents the possible outcomes in the gray tone measurement for the first element of the displacement vector, whereas j is associated with gray tones of the second element of the displacement vector. GLCM Correlation measures a gray-tone linear dependencies in the image. High Correlation values, i.e. close to 1, mean that there is a linear relationship between the gray level of pixel pairs. The range of correlation is between −1 and 1. GLCM Correlation is uncorrelated with GLCM Energy and Entropy, i.e., to pixel repetitions.

4.5.7 Alternate Vegetation Index (AVI)

As an Alternate Vegetation Index (AVI), I suggest the formula, $$AVI = \frac{1}{n} \sum_{i=1}^{128} \sum_{j=1}^{512} \frac{G(i, j)}{(G(i, j) + (NIR(i, j)))}$$

which is scaled between 0 and 1. Here the i and j indices run over the pixel locations within a given image. $G_{ij}$ is the green intensity at pixel location ij, $NIR_{ij}$ is the near infrared intensity at pixel location ij, and n is the product of the number of rows and number of columns in a given image. Nominally, there are 128 rows and 512 columns in a given image so that $n = 2^{16}$. However, because the footprint of the MISR instrument does not necessarily cover the entire matrix, I omit pixels which have no image component. Thus $n = 2^{16}$ is an upper bound on the number of pixels. In all cases, the actual number of non-null pixels is $n_a \leq n$, in some circumstances $n_a \ll n$.

The logic for this formula is as follows. Vegetation tends to reflect highly in the green band, because chlorophyll absorbs blue and red energy. Vegetation also reflects infrared energy. Hence if these are reflected in equal amounts, the AVI will approximate ½. Generally speaking, bodies of water absorb red and near infrared and reflect blue and green. Thus I would expect water to be closer to 1. In fact, in most of the experimental images I have tried, an upper bound of about 0.8 for AVI seems to be the case. Conversely, if I look at rocky terrain, I might expect a relatively low green reflectance, but because of their mass density, rock would tend to absorb heat and re-radiate near infrared energy. Thus I might expect rocky terrain to have a value of AVI near 0. The effect of clouds is less clearcut.

The conjecture I make that the AVI can actually distinguish three major types of ground truth is supported by FIG. 11. In this Figure, three clearly distinguishable fingers are seen in the plot of AVI versus dissimilarity. I have colored these red for the highest level of AVI, green for the middle level of AVI, blue for the lowest level of AVI. These clusters are consistent with three different types of ground truth. The plot in the upper right corner feature AVI versus dissimilarity.

FIG. 11 Shows Scatter Plot Matrix of 8 Features Some examples of AVI histograms and related images are given in following figures.

FIG. 12 AVI=0.9002

FIG. 13 Shows the Image of the Green Band for the Above Histogram in FIG. 12

FIG. 14 Shows the Image of the NIR Band for the Above Histogram in FIG. 12

FIG. 15 AVI=0.4411

FIG. 16 Shows the Image of the Green Band for the Above Histogram in FIG. 15

FIG. 17 Shows the Image of the NIR Band for the Above Histogram in FIG. 15

4.5.8 Contrast (Histogram-Based)

As in the case of the AVI, I consider only the $n_a$ pixels that contain actual data.

$$\text{Contrast} = (S * ((n_b + n_w)^2 - n_g^2) / (n_b + n_w + n_g)^2$$

where,
$n_w$: number of white pixel
$n_b$: number of black pixels
$n_g$: number of gray pixels,
where, $$S = \begin{cases} 1, & \text{if } n_b \text{ and } n_w > 0 \\ -1, & \text{if } (n_b, n_g = 0 \text{ and } n_w > 0) \text{ or } (n_w, n_g = 0 \text{ and } n_b > 0). \end{cases}$$

The procedure I followed was to construct histograms of the gray scale image in each of the four spectral bands. In principle the minimum value of the gray scale image is 0 and the maximum value is $2^{16}$. In practice the range in the radiance measurements is actually somewhat less. A practical upper limit seems to be about 14,000. nw is the number of pixels with values ≥ 7500, $n_b$ is the number of pixels ≤ 4500, $n_g = n_a − n_b − n_w$. In general the expression $((n_b + n_w)^2 − n_g^2) / (n_b + n_w + n_g)^2$ will be close to 1 if there are few gray pixels and only black and white pixels. This is the high contrast situation. If on the other hand there are only gray pixels that same expression $((n_b + n_w)^2 − n_g^2)/(n_b + n_w + n_g)^2$ will be −1. The range of the contrast between −1 to 1, The S adjustment is to account for situations where there are only black pixels or white pixels, which are also low contrast situations. Thus low contrast is indicated by a Contrast value close to −1, high contrast by a Contrast value close to +1, and normal contrast by a Contrast value that approximates 0.

FIG. 18 High Contrast Image (Contrast=0.958)

FIG. 19 Low Contrast Image (Contrast=−1)

FIG. 20 Normal Contrast Image (Contrast=0.065)

4.5.9 Normalized Difference Vegetation Index (NDVI)

Remote sensing can be used to detect vegetative change from one growing season to the next, and at the same time can help us to understand the ecology of our planet and the impact on our natural biological cycle. A vegetation index, which is derived from sets of remotely sensed data, is used to quantify the vegetative cover on the Earth's surface. The most widely vegetative index used is the Normalized Difference Vegetation Index (NDVI).

NDVI is calculated as a ratio between measured reflectivity in the red (visible) and near-infrared portions of the electromagnetic spectrum. These bands (red and near-infrared) are chosen because they are the most effected by the absorption of chlorophyll in leafy green vegetation and by the density of green vegetation on the surface. Another reason for choosing these bands is that the contrast between vegetation and soil is at a maximum. Here the wavelengths of red (visible) and near-infrared sunlight reflected by the plants should be observed. The wavelengths range of red (visible) band is (from 0.4 to 0.7 microns), whereas the wavelengths range of the near-infrared is (from 0.7 to 1.1 micron).

NDVI is the difference between near-infrared and red reflectance divided by the sum of near-infrared and red reflectance, it is computed for each image pixel by the following equation:

$$NDVI = \frac{1}{n}\sum_{i=1}^{128}\sum_{j=1}^{512} \frac{NIR(i,j) - RED(i,j)}{NIR(i,j) + RED(i,j)}$$

The NDVI equation produces values for each pixel in the range of −1 to 1, where increasing positive values indicate increasing green vegetation and negative values indicate non-vegetated surface features such as water, ice, snow, or clouds, since they have larger visible (red) reflectance than near-infrared reflectance. Rock and bare soil areas have similar reflectance in two bands and result in vegetation indices close to zero. To maximize the range of values, the NDVI value must be scaled to byte (8-bits) data range. The following equation is used to scale the NDVI value:

Scaled $NDVI=100(NDVI+1)$

On this scale value on the range from −1 to 1, is scaled to the range of 0 to 200, where computed -1 equals 0, computed 0 equals 100, and computed 1 equals 200. As a result, scaled NDVI values less than 100 now represent water, snow, clouds, and other non-vegetative surfaces and values equal to or greater than 100 represent vegetative surfaces.

In general, if there is more reflected radiation in near-infrared wavelength than in red (visible) wavelengths, then vegetation in the pixel is likely to be dense and may contain some type of forest, the NDVI value will be greater than or equal to 0.6 compared to dead grass or dry soil which have lower NDVI values of about 0.1. The following figures show some examples of the NDVI histograms and the images.

FIG. 21 NDVI=0.0713
FIG. 22 Shows the Image of the NIR band for the Above Histogram in FIG. 21
FIG. 23 Shows the Image of the Red Band for the Above Histogram in FIG. 21
FIG. 24 NDVI=0.001
FIG. 25 Shows the Image of the NIR Band for the Above Histogram in FIG. 24
FIG. 26 Shows the Image of the Red Band for the Above Histogram in FIG. 24

4.5.10 Comparison Between NDVI and AVI

To compare the two vegetation indices, the Alternate Vegetation Index (AVI), and the Normalized Difference Vegetation Index (NDVI), I selected some images (from red band and NIR band for the NDVI, and from green and NIR bands for AVI) and I computed the vegetation values of both indices. The following figures show some selected images and the computed histograms for the NDVI and AVI.

FIG. 27 AVI=0.072
FIG. 28 NDVI for the Same Image of the Above AVI Histogram FIG. 27
FIG. 29 Shows the Image of the Green Band for the Above Histogram in FIG. 27
FIG. 30 Shows the Image of the NIR Band for the Above Histograms in FIG. 27 and FIG. 28
FIG. 31 Shows the Image of the Red Band for the Above Histogram in FIG. 28
FIG. 32 AVI=0.6005
FIG. 33 NDVI
FIG. 34 Shows the Image of the Green Band for the Above Histogram in FIG. 32
FIG. 35 Shows the Image of the NIR Band for the Above Histograms in FIG. 32 and FIG. 33
FIG. 36 Shows the Image of the Red Band for the Above Histogram in FIG. 33
FIG. 37 AVI=0.4262
FIG. 38 NDVI
FIG. 39 Shows the Image of the Green Band for the Above Histogram in FIG. 37
FIG. 40 Shows the Image of the NIR Band for the Above Histograms in FIG. 37 and FIG. 38
FIG. 41 Shows the Image of the Red Band for the Above Histogram in FIG. 38
FIG. 42 AVI=0.5019
FIG. 43 NDVI
FIG. 44 Shows the Image of the Green Band for the Above Histogram in FIG. 42
FIG. 45 Shows the Image of the NIR Band for the Above Histograms in FIG. 42 and FIG. 43
FIG. 46 Shows the Image of the Red Band for the Above Histogram in FIG. 43
FIG. 47 AVI=0.5417
FIG. 48 NDVI
FIG. 49 Shows the Image of the Green Band for the Above Histogram in FIG. 47
FIG. 50 Shows the Image of the NIR Band for the Above Histograms in FIG. 47 and FIG. 48
FIG. 51 Shows the Image of the Red Band for the Above Histogram in FIG. 48
FIG. 52 AVI=0.3958
FIG. 53 NDVI
FIG. 54 Shows the Image of the Green Band for the Above Histogram in FIG. 52
FIG. 55 Shows the Image of the NIR Band for the Above Histograms in FIG. 52 and FIG. 53
FIG. 56 Shows the Image of the Red Band for the Above Histogram in FIG. 53
FIG. 57 Shows a Parallel Coordinate Display of All Image Features FIG. 57 is a parallel coordinate display of all of the image features. This figure reflects the same coloring as FIG. 11, i.e. according to the three clusters of AVI. I include this Figure to illustrate that although I have some association among the various image feature, no one completely replaces any other. That is these image features reflect different characteristic of the image. As can be seen from this Figure, Energy and ASM are positively associated although not linearly correlated because Energy is the square root of the ASM. Energy and Entropy are generally negatively associated although again the correlation is far from −1.

Chapter 5: Features Extraction from Text Data 5.1 Introduction

Due to the advances in the information technology, the tremendous growth in the volume of the text documents in different fields ranging from business to the sciences that are available on the Internet, in digital libraries, in news sources, and on company-wide intranets, has greatly encouraged researchers in developing new challenging methods to work with the complexity and the growing size of this text data in order to extract its data features. These methods can help users to effectively navigate, summarize, and organize the data information in an appropriate way to help them to find that for which they are looking.

Data mining methods provide a variety of computational techniques that are becoming an increasingly important viable approach to efficiently and effectively extract new information from these massive datasets (Rasmuseen et al., 2004).

One of the methods that researchers can use is clustering. Developing fast and high quality document clustering algorithms significantly helps in the goal of extracting information from massive data. These clustering algorithms provide intuitive navigation, browsing mechanism by organizing large amounts of information into a small number of meaningful clusters as well as by greatly improving the retrieval performance either via cluster-driven dimensionality reduction, term-weighting, or query expansion. In fact the discovered clusters can be used to explain the characteristics of data distribution, and at the same time showing the relationships among these datasets.

Determining the most important features of the text dataset improve the analyzing and extracting methods and provide a meaning to the dataset and at the same time greatly benefit the users by increasing their understanding of their own work.

On this Chapter, I tried to extract some useful and meaningful information from the documents in the dataset (15863 documents), and at the same time tried to find the relationships among these documents. To reach this goal, I analyzed the dataset in different ways by extracting some features from the documents in the dataset, which help in understanding the contents of the documents. I implemented four features.

These features are topics features, discriminating words features, bigrams (and trigrams) features, and verb features. To implement these features, I used some data mining tools and algorithms, and other softwares, which will be explained in the following sections.

5.2 Document Clustering

Given a dataset S of n documents, the idea here is to partition these documents into a pre-determined number of k subsets $S.sub.1, S.sub.2, \ldots, S.sub.k$, such that the documents assigned to each subset are more similar to each other than the documents assigned to different subsets.

In my research, to partition the dataset (15863 documents) into a useful and meaningful subsets, and at the same time to discover the most characteristics (features) of these documents by describing and explaining the similarities between the documents on each subset (cluster) and how each differs from other subsets, I partitioned the documents on the data set into 25 different clusters. I experimented with several choices of the number of clusters, but chose to report on the choice of 25 clusters. This was motivated by a desire to compare the automated results in my dissertation with the manual results done by two individual human on a smaller subset (1382 items) of the same text dataset. So for each cluster intra-cluster similarity is maximized and the inter-cluster similarity is minimized. To do this I used a software application called CLUTO (Karypis, 2003).

5.2.1 Clustering Toolkit (CLUTO)

CLUTO (CLUstering TOolkit) is a software package for clustering the low and high dimensional datasets and for analyzing the characteristics of the various clusters. It provides tools for analyzing the clusters, so it will help in understanding the relations between the objects assigned to each cluster and at the same time the relations between the different clusters. In fact, CLUTO tries to identify all sets of features that occur within each cluster, which helps in describing or discriminating each cluster. These sets of features can work as a key (digital object) to understand the set of documents assigned to each cluster and to provide brief idea about the cluster's content. CLUTO also provides tools for visualizing the clustering solutions in order to understand the relationship among the clusters, objects, and the identifying features.

The CLUTO's algorithms have been optimized for operating on very large datasets both in terms of the number of objects as well as the number of dimensions. These algorithms quickly cluster datasets with several tens of thousands of objects and several thousand dimensions. CLUTO also keeps the sparsity of the datasets, and requires memory that is roughly linear on the input size (Karypis, 2003).

5.2.2 Clustering Algorithms Methods

There are 18 different cluster methodologies supported by CLUTO to compute the clustering solution based on partitional, agglomerative, and graph partitional clustering algorithms, each of which has advantages and disadvantages. Various of these algorithms are suited for datasets with different characteristics, and can be used to perform different types of analysis. These algorithms operate either directly in the object's feature space or in the object's similarity space.

5.2.2.1 Partitional Clustering

With the partitional clustering algorithms, the clusters are created by partitioning the dataset into a predetermined number of disjoint sets, each corresponding to a single cluster. This partitioning is achieved by treating the clustering process as an optimization procedure that tries to create high quality clusters according to a particular objective function that reflects the underlying definition of the goodness of the clusters.

The most important aspect on the partitional clustering algorithms is the method used to optimize the criterion function. CLUTO uses a randomized incremental optimization algorithm that is greedy in nature, has low computational requirements, and has been shown to produce high quality clustering solutions (Karypis, 2003).

Recently, many researchers have recognized that partitional clustering algorithms are well suited for clustering large document datasets due to their relatively low computational requirements (Zhao et al., 2001).

The default method used in CLUTO is a recursive bisection approach. With this method, the desired k-way clustering solution is computed by performing a sequence of k−1 repeated bisections on the data matrix. This method first clusters the data matrix into two groups (clusters), then one of these groups is selected and bisected further, leading to a total of three clusters. This process repeated until the desired number of clusters is reached (i.e. k clusters are obtained). Each of these bisections is performed so that the resulting two-way clustering solution optimizes a particular criterion function.

The bisection method ensures that the criterion function is locally optimized within each bisection, but in general is not globally optimized. Obtaining a k-way clustering solution in this approach maybe desirable because the resulting solution is hierarchical, and thus it can be easily visualized. The key aspect on this approach is the method used to select which cluster to bisect next. By default, the next cluster to be bisected is the one that will optimize the overall clustering criterion the most. This method generally shows that in high-dimensional datasets good clusters are often embedded in low-dimensional subspaces.

Another partitional method is the direct k-way clustering solution, which is computed by simultaneously finding all k clusters. The Clustering solution with this approach is slower than the clustering solution based on the recursive bisections approach. In fact, the direct k-way method yields a better selection when the value of k small (less than 10-20), whereas the repeated bisections approach much better than direct k-way clustering as k increases.

5.2.2.2 Agglomerative Clustering

On the agglomerative clustering algorithms, each object initially assigning to its own cluster and then one repeatedly merges pairs of clusters until either the desired number of clusters has been obtained or all the objects have been merged into a single cluster leading to a complete agglomerative tree (Rasmuseen et al., 2004).

The most important point on these algorithms is the method used to identify the pairs of clusters to be merged next.

5.2.2.3 Graph Partitional

CLUTO provides graph-partitioning based clustering algorithms which find appropriate clusters that form contiguous regions that span different dimensions of the underlying features space. CLUTO's graph partitioning clustering algorithms use a sparse graph to model the affinity relations between the different objects, and then discover the desired clusters by partitioning this graph.

CLUTO provides different methods for constructing this affinity graph and various post-processing schemes that are designed to help in identifying the natural clusters in the dataset. The actual graph partitioning is computed using an efficient multilevel graph partitioning algorithm that leads to high quality partitionings and clustering solutions.

On CLUTO's graph partitioning algorithms, the similarity between objects is computed by using the extended Jaccard coefficient (a measurement of similarity on binary information, it measures the degree of overlap between two sets and is computed as the ratio of the number of shared attributes (words) of X AND Y to the number processed by X OR Y) that takes into account both the direction and the magnitude of the object vectors. This method shows better results than the one using cosine-based similarity.

With the graph method the k-way clustering solution is computed by first modeling the objects using a nearest-neighbor graph. On this approach each object becomes a vertex, and is connected to its most similar other objects (vertices), and then the graph splits into k-clusters.

5.2.3 Clustering Criterion Functions

As mentioned above, the most important point on clustering algorithms provided by CLUTO is treating the clustering problem as an optimization process that seeks to optimize a particular clustering criterion function defined either globally or locally over the entire clustering solution space (Karypis, 2003). Table 5.1 shows a total of seven different clustering criterion functions that are used to drive both partitional and agglomerative clustering algorithms. Most of these criterion functions have been shown to produce high quality clustering solutions in high dimensional datasets, especially those arising in document clustering. The notation on these equations are: k is the total number of clusters, S is the total objects to be clustered, $S_i$ is the set of objects assigned to the ith cluster, $n_i$ is the number of objects in the ith cluster, v and u represent two objects, and sim(v,u) is the similarity between two objects.

The seven clustering criterion functions can be classified into four different categories, internal, external, hybrid, and graph-based. The internal criterion functions focus on producing a clustering solution that optimizes a function defined only over the documents of each cluster and does not take into account the documents assigned to different clusters. This group contains 2 criterion functions $I_1$, $I_2$. These criterion functions try to maximize various measures of similarity over the documents in each cluster.

Table 5.1 Shows the Mathematical Definition of CLUTO's Clustering Criterion Functions

| Criterion Function | Optimization Function |
|---|---|
| $I_1$ | $\text{maximize} \sum_{i=1}^{k} \frac{1}{n_i} \left( \sum_{v,u \in S_i} \text{sim}(v, u) \right)$ |
| $I_2$ | $\text{maximize} \sum_{i=1}^{k} \sqrt{\sum_{v,u \in S_i} \text{sim}(v, u)}$ |
| $\epsilon_1$ | $\text{minimize} \sum_{i=1}^{k} n_i \dfrac{\sum_{v \in S_i, u \in S} \text{sim}(v, u)}{\sqrt{\sum_{v,u \in S_i} \text{sim}(v, u)}}$ |
| $\mathcal{G}_1$ | $\text{minimize} \sum_{i=1}^{k} \dfrac{\sum_{v \in S_i, u \in S} \text{sim}(v, u)}{\sum_{v,u \in S_i} \text{sim}(v, u)}$ |
| $\mathcal{G}'_1$ | $\text{minimize} \sum_{i=1}^{k} n_i^2 \dfrac{\sum_{v \in S_i, u \in S} \text{sim}(v, u)}{\sum_{v,u \in S_i} \text{sim}(v, u)}$ |
| $\mathcal{H}_1$ | $\text{maximize} \dfrac{I_1}{\epsilon_1}$ |
| $\mathcal{H}_2$ | $\text{maximize} \dfrac{I_2}{\epsilon_1}$ |

The second group, external criterion functions that derive the clustering solution by focusing on optimizing a function that is based on how the various clusters are different from each other. In this group there is only one criterion function, $\epsilon_1$. The external criterion functions try to minimize the similarity between the cluster's documents and the collection.

The third category, the graph based criterion functions. The criterion functions in this group differ from the criterion functions on other groups by viewing the relations between the documents using the graphs, whereas other criterion functions in other groups viewing each document as a multidimensional vector. On the graph-based criterion functions, two types of graphs, have been proposed for modeling the document in the context of clustering. On the first graph, the graph obtained by computing the pair-wise similarities between the documents, and the second graph obtained by viewing the documents and terms as a bipartite graph (Zhao et al., 2001).

Finally, the hybrid criterion functions, which are combinations of various of clustering criterion functions that simultaneously optimize multiple individual criterion functions, whereas other criterion functions in groups one and two, focus only on optiming a single criterion function, which is viewing the documents in two ways. The first one, how the documents assigned to each cluster are related together. The second way, how the documents assigned to each cluster are related with the entire collection.

5.2.4 Scalability of CLUTO'S Clustering Algorithms

The scalability of the clustering algorithms provided by CLUTO differs from one algorithm to another. Table 5.2 summarizes the computational complexity, in both time and space, of some of the clustering algorithms (Karypis, 2003). The meaning of the various quantities are as follows: n: number of objects to be clustered. m: number of dimensions. NNZ: number of non-zeros in the input matrix or similarity matrix. NNbrs: number of neighbors in the nearest-neighbor graph.–clmethod=rb: repeated bisections clustering method.–clmethod=direct: direct k-way clustering method.–clmethod=agglo: agglomerative clustering method.–clmethod=graph: graph based clustering method. cos and corr are the similarity functions used on clustering. cos: the similarity between objects is computed using cosine function. corr: the similarity between objects is computed using the correlation coefficient.

Table 5.2 shows that the most scalable method in terms of time and memory is the repeated-bisecting algorithm that uses the cosine similarity function (–clmethod=rb, –sim=cos), whereas the least scalable of algorithms are the ones based on hierarchical agglomerative clustering (–clmethod=agglo, –crfun=

Table 5.2 Shows the Complexity CLUTO's Clustering Algorithms

| Algorithm | Time Complexity | Space Complexity |
|---|---|---|
| –clmethod = rb, –sim = cos | $O(NNZ * \log(k))$ | $O(NNZ)$ |
| –clmethod = rb, –sim = corr | $O(n * m * \log(k))$ | $O(n * m)$ |
| –clmethod = direct, –sim = cos | $O(NNZ * k + m * k)$ | $O(NNZ + m * k)$ |
| –clmethod = direct, –sim = corr | $O(n * m * k)$ | $O(n * m + m * k)$ |
| –clmethod = agglo, –crfun = $[\mathcal{I}_1, \mathcal{I}_2]$ | $O(n^2 * \log(n))$ | $O(n^2)$ |
| –clmethod = agglo, | $O(n^3)$ | $O(n^2)$ |
| –clmethod = graph, | $O(n^2 + n * NNbrs * \log(k))$ | $O(nNNbrs)$ |

5.3 Minimal Spanning Tree

Given a connected, undirected graph, a spanning tree of that graph is a subgraph, which is a tree and connects all the vertices together. For example if G=<V, E>, the minimum spanning tree problem is to find a tree T=<V,E>, such that E' subset of E and the cost of T is minimal.

The Minimal Spanning Tree (MST) problem is to select a set of edge so that there is a path between each node, The sum of the edge is to be minimized. MST is a collection of edges that join all of the points in a set together, with minimum possible sum of edge values. The minimal spanning tree is not necessary unique. FIG. 58A shows the complete graph and FIG. 58B is the associated MST.

FIG. 58A, and 5.1.b shows the completed graph and the associated MST respectively On text mining, we can use the Minimal Spanning Tree (MST) to understand the relationship between the documents (Solka et al., 2005), by viewing the documents as a vertices in a graph, the interpoint distance matrix defines a complete graph on this set of vertices. MST can be a subgraph that captures all the information on the complete graph and at the same time showing the relationship of the observation to the discriminate boundary. MST would be an appropriate tool to facilitate the exploration of class relationships in the dataset.

The minimal spanning tree is a greedy algorithm so that a pair of documents that are connected in the minimal spanning tree have minimal distance between them and are thus most likely to be similar. Finding the documents that are adjacent in the minimal spanning tree from different corpora again gives an approach to cross corpus discovery. The MST is an appropriate, cognitively friendly tool to present data mining results and allow analysts to interact with. It allow the analysts to visualize relationships among the documents in the dataset. It is an excellent visualization tool because it can always be made planar.

The MST calculations are implemented based on Kruskal's algorithm in JAVA. The Kruskal's algorithm creates a forest of tree. Initially it consists n single node trees and no edges. At each step (priority order) the cheapest edge added so it joins two trees together. If the addition of the new edge causes a cycle, then reject it, and add the next cheapest edge. On each step, two trees will be joined together in the forest, so that at the end there will be only one tree in T.

The visualization environment was implemented in JAVA and the graph layout was accomplished using the general public license package TouchGraph, www.touchgraph.com. TouchGraph supports zooming, rotation, hyperbolic manipulation, and graph dragging.

5.4 Text Features Implementation 5.4.1 Topics Feature

As mentioned in Chapter 3, a small proportion of the documents around (1382) documents were preclassified into 25 clusters by the two humans reading the documents.

In my research I use all the documents in the dataset (15863 documents). I used CLUTO, an agglomerative clustering software for high dimensional datasets, on my clustering process. I also clustered the documents into 25 clusters for comparison. The result of the experiment showed that the topics chosen by the clustering algorithm, using CLUTO, choose many of the same cluster topics as the humans, but certainly not all. This is because the topics they developed were based on the dataset they used which was only 1382 documents, whereas the topics I developed were based on the whole dataset of 15,863 documents. Table 5.3 shows the topics' name for the whole dataset and number of documents associated to each topic.

Table 5.3 Shows Topic's Names and Number of Documents for Each Topic

| Topic No | Topic Name | Number of documents |
|---|---|---|
| 1 | Northern Ireland | 157 |
| 2 | North Korea Nuclear | 323 |
| 3 | Major League Baseball | 213 |
| 4 | Space | 257 |
| 5 | Cuba Refuge | 346 |

-continued

| Topic No | Topic Name | Number of documents |
|---|---|---|
| 6 | Rwanda Refuge | 214 |
| 7 | Simpson Case | 1136 |
| 8 | Gulf War | 437 |
| 9 | Bosnian and Serb | 844 |
| 10 | Israel and Palestinian Conflict | 681 |
| 11 | Oklahoma City Bombing | 317 |
| 12 | Haiti and Aristid | 780 |
| 13 | Chechnya | 535 |
| 14 | China Trade | 211 |
| 15 | Earthquake in Kobe | 295 |
| 16 | Plane Crash | 394 |
| 17 | Health Care Reform | 1088 |
| 18 | Clinton in White House | 613 |
| 19 | Pan American Game | 431 |
| 20 | Humble, TX, Water Flooding | 579 |
| 21 | Cancer Research | 715 |
| 22 | Elections | 1009 |
| 23 | Iran and Islam | 941 |
| 24 | Police and Simpson | 1559 |
| 25 | Children and Music | 1788 |

The documents number (cluster size) for each topic differs from one topic to another. The cluster size range from 157 documents about Northern Ireland to 1788 documents about children and music. FIG. 59 shows the CLUTO output of clustering the dataset into 25 clusters.

FIG. 59 Shows the 25 Clustering Output of the Dataset

The Figure shows simpler statistics report about the quality of each cluster as measured by criterion function that it uses, and the similarity between each objects in each cluster. The figure shows information about the matrix, such as name, the number of rows (#Rows), the number of columns (#Columns), and the number of non-zeros in the matrix (#Non-Zero). On the second part the figure print information about the values of various options that it used to compute the clustering, and the number of desired clusters (#Clusters). The number of rows on the output is the number of the documents on the dataset using on the research (15863).

The Figure reports also the overall value of the criterion function for the computed clustering solution. Here it is reported as I2=3.21e+003, which is the value of the $I_2$ criterion function of the resulting solution. In general the overall cluster quality information displayed on the report depend on the criterion function used. The report also shows the number of objects that are able to cluster (15863 of 15863), which means all the documents on the dataset are clustered into some cluster. The last part on the figure shows some statistics report about each cluster, such as cluster number (cid), number of objects belong to each cluster (size), the average similarity between the objects of each cluster (internal similarities) (ISim), the standard deviation of these average internal similarities (ISdev). The report shows also the average similarity of the objects of each cluster and the rest of the objects (external similarities) (ESim), and finally, the report displays the standard deviation of the external similarities (ESdev).

One of the most important points discovered from the statistic report on FIG. 59 is that clusters are ordered in increasing (ISim-ESim) order, which means clusters that are tight and far away from the rest of the objects have smaller cid values.

The clusters can be represented as a leaf node on tree. FIG. 60 describes a hierarchical agglomerative tree for the discovered clusters. To construct this tree, the algorithm repeatedly merge a particular pair of clusters, and the pair of clusters to be merged is selected so that the resulting clustering solution at that point optimizes the specified clustering criterion function. The tree produced this way is represented in a rotated fashion, the root of the tree on the first column, and the tree grows from left to right. The leaves of the tree as mentioned above represent the discovered clusters, which numbered from 0 to NCluster−1. The internal nodes are numbered from Ncluster to 2*NCluster−2, with the root being the highest numbered node (on the hierarchical agglomerative tree of the dataset on this research shows the root=48, since the NCluster 25 clusters).

Added to the above information shown on the hierarchical agglomerative tree figure, there is also analysis for each cluster produced, displaying statistics regarding their quality and a set of descriptive features. It displays the number of objects on each cluster (Size), average similarity between the objects of each cluster (ISim), average similarity between the objects of each pair of clusters that are the children of the same node of the tree (XSim), and the change in the value of the particular clustering criterion function as a result of combining the two child clusters (Gain). The Figure shows set of features which describe well each cluster, next section cover this point in detail.

FIG. 60 Describes a Portion of the Hierarchical Agglomerative Tree for the Clusters As mentioned above the repeated bisections method is used as a default method for clustering the documents on the dataset. FIG. 61 displays the repeated bisections for the dataset clustering used on this research.

FIG. 61 Shows the Repeated Bisections for Clustering the Dataset

FIG. 62 shows the MST layout model screen for documents on cluster 12th (Haiti and Aristid). The screen presents an edge weight legend at the bottom of the plot. There are 5 colors in the color scheme: blue, green, yellow, orange, and red that are spread proportionally among the edge weight values. The color map used to represent the intra-class edges and to represent the inter-class edges. The relations between documents differ in the strength, the blue relation shows weak relations whereas red shows the strong association among documents.

FIG. 62 Displays the MST Layout Model Screen for Documents on Cluster 12

The purpose of this feature is to use the topic features as one key on the search engine for searching on the documents in the database, since topic features are attached as a metadata to each document. For example, if the user (scientist) wants to search on documents talking about any topic, he/she can use the topic list table and through that he/she can extract all the documents talking about the topic he/she wants. On Chapter 6, the prototype search engine, I will illustrate this issue on more details.

5.4.2 Discriminating Words Feature

The second feature is the discriminating words feature. This feature connected with the above feature (Topic features). In fact discriminating words are used as a key on topic features, since each topic contains of certain documents, these documents are clustered together on one cluster by looking to the discriminating words that distinguish the documents on certain topic than another topic, and at the same time used to determine in general the topic title, i.e. the discriminating words are surrogate for topic title. There are around (250) discriminating words for all the 25 clusters (10 discriminating words for each cluster or topic). Table 5.4 shows the discriminating words in the 25 clusters.

Table 5.4 Lists the Discriminating Words on the 25 Clusters

| | | |
|---|---|---|
| Ireland | palestinian | research |
| Irish | arafat | disease |
| Northern | gaza | doctor |
| fein | peace | health |
| sinn | jerusalem | medical |
| British | rabin | breast |
| Korea | Jordan | drug |
| North | Oklahoma | virus |
| Kim | bomb | . |
| nuclear | FBI | . |
| pyongyang | Haiti | . |
| South | arrested | . |
| baseball | military | . |
| league | invasion | Mexico |
| strike | . | Mandela |
| . | . | Berlusconi |
| . | . | Minister |
| . | . | Rebel |
| . | . | Islam |
| space | Russia | Iran |
| shuttle | Yeltsin | Guerrilla |
| astronomy | Chechnya | Algeria |
| comet | Moscow | France |
| earth | China | French |
| astronaut | trade | Algerian |
| jupiter | earthquake | . |
| NASA | kobe | . |
| mission | firefight | . |
| simpson | crash | . |
| Cuban | plane | police |
| cuba | airline | court |
| Castro | flight | charge |
| guantanamo | passenger | sentence |
| Havana | pilot | prison |
| refuge | aircraft | murder |
| fidel | accident | clinic |
| raft | USair | school |
| Rwanda | republican | film |
| hutu | congress | student |
| Rwandan | clinton | kid |
| Iraq | | music |
| Kuwait | . | movie |
| Baghdad | . | |
| Saddam | . | |
| gulf | . | |
| Kuwaiti | | |
| . | flood | |
| . | water | |
| . | river | |
| . | storm | |
| serb | rain | |
| bosnian | coast | |
| sarajevo | ship | |
| bihac | weather | |
| peacekeep | wind | |
| croatia | patient | |
| Israel | cancer | |

CLUTO can help in analyzing each cluster and determine the set of features that best describe and discriminate each one of the clusters. FIG. 63 shows the output produced by CLUTO for the discriminating words. The Figure displays the set of descriptive and discriminating features for each cluster into three different lines. The first line contains some basic statistics for each cluster such as cid, Size, ISim, and ESim. The second line contains ten of the most descriptive features (10 features), whereas the third line displays the most discriminating words features (10 features). The features in these lists are sorted in decreasing descriptive or discriminating order. The percentage number right to next each feature means in the case of descriptive features that the percentage of the within cluster similarity that this particular feature can explain. For example, on cluster 0, the feature "Ireland" explains 12.2% of the average similarity between the objects of the 0th cluster. Same as descriptive features, there is also a percentage follows each discriminating features, showing the percentage of the dissimilarity between the cluster and the rest of the objects which this feature can explain. One key point here, the percentages associated with the discriminating features are typically smaller than the corresponding percentages of the descriptive features. The main reason for that is some the descriptive features of the cluster may also be present in small fraction of the objects that do not belong to this cluster.

There are three types of discriminating features displaying on the figure, one phrase, two phrase, and three phrase. These appropriate discriminating features are attached to each document on the dataset as metadata to help in the searching process for feature extracting on the database and retrieving the documents.

FIG. 63 Shows a Portion of the Output Produced by CLUTO for the Discriminating Words 5.4.3 Bigrams and Trigrams Feature The Bigram Proximity Matrix (BPM) and the Trigram Proximity Matrix (TPM) are matrix structures used to encode each text unit such as paragraph, section, chapter, book, etc. The bigram proximity matrix is a non symmetric square matrix that captures the number of word's co-occurrences in a moving 2-words window (Martinez et al., 2002). The row (first word in the pair) and column (second word in the pair) headings of the matrix are alphabetically ordered entries of the lexicon, and listing the unique occurrence of the words in the text, which shows the size of the lexicon which determines the size of the BPM. The elements of the matrix show how many times word i appears immediately before word j in the unit of the text.

Before creating the BPM pre-processing steps should be done on the documents to create the lexicon which is the main part of the BPM. These pre-processing steps start by removing all punctuation within a sentence such as commas, semicolons, colons, etc. All end-of-sentence punctuation, other than a period, such as question mark and exclamation points are converted to a period. Remove XML code. Denoise by removing stopper words, e.g. words that have little meaning such as "of", "the", "a", "an" and so on. Stem words to root, for example words like move, moved, moving will be "mov" after stemming.

In the BPM, the period is used in the lexicon as a word, and it is placed at the beginning of the alphabetized lexicon. In general, the BPM preserves much of the semantic content of the originating text, because adjective-noun, noun-verb, and verb-noun (object) pairs are captured. Obtaining the individual counts of words co-occurrences, the BPM captures the intensity of the discourse's theme. BPM is a suitable tool for capturing meaning and performing computations to identify semantic similarities among units of discourse such as paragraphs, documents (Martinez et al., 2002).

To create a simple structure of BPM for the following sentence or text stream "The handsome man kissed the beautiful girl." we have to do first some pre-processing steps to obtain the final lexicon. In the above example, the sentence denoised by removing the stopper words (the), then we apply the stemming process. After we finish the pre-processing steps we obtain the following sentence "Handsom man kiss beaut girl."

The bigrams of the above sentence are: handsom man, man kiss, kiss beaut, beaut girl, girl. Table 5.5 shows the BPM of the above example. Since we have 6 lexicon words here (., beaut, girl, kiss, handsom, man), the size of the BPM is 6.times.6.

Table 5.5 Shows the Bigram Proximity Matrix of the Above Sentence

|         | . | beaut | girl | kiss | handsom | man |
|---------|---|-------|------|------|---------|-----|
| .       |   |       |      |      |         |     |
| beaut   |   |       | 1    |      |         |     |
| girl    | 1 |       |      |      |         |     |
| kiss    |   | 1     |      |      |         |     |
| handsom |   |       |      |      |         | 1   |
| man     |   |       |      | 1    |         |     |

From the table, the matrix element located in the fifth row (handsom) and the sixth column (man) has value of one, which means, that the pairs of words handsom man occurs once in this unit of text. In general, depending on the size of the lexicon and the size of the stream, the BPM will be very sparse.

On the other hand, Trigram Proximity Matrix (TPM) captures the occurrence of consecutive triples of words by constructing a cube with the lexicon on three axes. A trigram is the point of intersection of row, column, and page in the cube.

The trigrams of the same sentence we used to get the bigrams (The handsome man kissed the beautiful girl.) are, handsom man kiss, man kiss beaut, kiss beaut girl, beaut girl. So the trigram (kiss beaut girl) is the point (kiss, beaut, girl), the array element in the 4th row, 2nd column, and 3rd page.

The TPM is trivial extension of the BPM, in fact for larger size of text unit, the TPM performs better than the PBM (Martinez et al., 2002).

On the whole dataset (15863 documents) used on my research there are (1,834,123) bigrams extracting from the documents on the database.

FIG. 64 shows a strong association between two documents belongs to the same cluster. The Figure shows a list of bigrams that belongs (intersect) to both documents.

FIG. 64 Shows a Closer Look at the Association Between 2 Documents on the Same Cluster FIG. 65 Shows Another Strong Association Between Two Documents Belong to Cluster 2

FIG. 65 Shows Shows a Closer Look at the Association Between 2 Documents in Cluster 2 "North Korea"

Both the bigrams and trigrams are attached to each document on the dataset and working as metadata that will be used on the searching process to extract the information from documents on the dataset. Bigrams and trigrams are one of the features that will be used to matching between the documents on the dataset, and then trying to find the documents that are similar to each other. On Chapter 6, the prototype design shows how the bigram and trigram feature helping on extracting the information from documents.

5.4.4 Verb Context Feature

The fourth feature I used for my text feature extraction methods is the verb context features. I developed a list of 5263 relatively common verbs taking from the dictionary, and then matching these verbs with the documents on the dataset (15863 documents), I found around 2863 verbs used in these documents. The occurrence of these verbs differs from one verb to another. The most frequently used verb was "said", it is used 37,975 times (since the type of the documents on the dataset is news documents, "said", used regularly on the media to report someone talking), and the least frequently used was used only once (various verbs occur only one time such as dramatize, drape, drench, edit, etc). FIG. 66 shows a sample list of the matching verbs with the frequency occurs for each verb in the dataset.

FIG. 66 Shows Sample List of the Frequency Occur of All Verbs in the Dataset

Because of this variant range between the most frequently used verb and the least one, only the verbs that occur 100 times or more are considered in the experiment. As a result of that, a list of 757 verbs was created. FIG. 67 shows a sample list of the verbs used on research's experiment.

FIG. 67 A Sample List of the Verbs Used in my Research

For each selected verb on the list, I computed one word, two words and three words, following each verb on the list and used these to form the context for the verb, i.e. the equivalence class of words, word pairs, and word triples. These verbs work as a metadata attached to each document, which helps not only to know the document's content but also a good way to prove the relation between the documents on the datasets. This feature proved very effective at identifying duplicated documents. FIG. 68 displays sample list of one word following the verb "abandon" and the documents that contain the verb "abandon" with the desire word following. FIG. 69 shows three words following the same verb, "abandon".

By using the verb feature, I extracted some useful information from the documents on the dataset, this feature helps on finding the relationship between the documents. I found many documents almost the same contents by implemented the verb feature that attach to each documents on the dataset.

FIG. 68 Shows Sample List of One Word Following the Verb "Abandon"

FIG. 69 Shows Sample List of Three Words Following the Verb "Abandon"

Chapter 6: Prototype Design System 6.1 Common Gateway Interface (CGI)

In my dissertation I used the Common Gateway Interface (CGI) standard to implement the query capabilities of the prototype website. The CGI standard is a method for interfacing external applications with information servers and has the capability to dynamically return information to clients in real time. In my research, two CGI programs were written, one to handle the image features and the other one for text features. The main purpose of the image features CGI program was to allow users to query the image features database, which consisted of characteristics computed for MISR images. The results of this query were returned in a table, which shows the number of images in the query and the values of the search parameters. The text features CGI program is intended to search an immense dataset consisting of about two million bigrams extracted from all 15,863 documents in the database. In implementing the prototype design I wrote the CGI program in C++ language.

6.2 Implemented Prototype Design

As mentioned in Chapter 1, the system was implemented on Pentium 4 with 6 terabytes in memory. The home address of the website is http://www.scs.gmu.edu/.about.falshame/home.html.

FIG. 70 shows the home page of the website. In creating the website, the simplicity in the design was considered, users should have no problem in browsing the website, and I tried to make it easy for the users to understand the terminology I used on the website and at the same time to help them in writing the queries.

FIG. 70 Shows the Homepage of the Prototype System

From the title of the website homepage "Automated Generation of Metadata for Mining Image and Text Data," shows that the system works with image or text data. The user can select which type of data he/she wants to search by clicking on one of the options: "Image Features" or "Text Features". The next page depends on the user's selection. If the user selects Image features then next page "Features Extraction of Image Data" will be displayed, as in FIG. 71.

FIG. 71 Shows Features Extraction of Image Data Page

The Figure shows all the features of the image data, which I discussed on Chapter 4. The page shows the MISR instrument image, which indicates that the data on this research are MISR data. The user can click on the MISR image to go to the home page of Jet Propulsion Laboratory (http://www-misr.jpl.nasa.gov), where the user can find more and updated information about MISR instrument. FIG. 71 shows on the bottom a statement in red color "click on feature to see description", to help user understanding the meaning of each feature. Once the user clicks on any feature, a small box appears at the bottom describing the selected feature, and at the same time helping the user to input the correct value range for each feature. The box shows only the description of the feature selected. FIG. 72 shows a description of Alternative Vegetation Index (AVI) after the user click on the AVI feature. Submit and reset are used for proceed or cancel the query respectively.

Once the user reads the description of each feature and understand the feature's meaning, then he/she has the information to enable him/her to search the images on the database. The user needs to input values in the correct value range for each feature to obtain image(s) for his/her search; otherwise the output will be zero images.

FIG. 72 Shows the Description of Alternative Vegetation Index (AVI)

FIG. 73 shows a compound of seven features query. The user is trying to find the image(s) that has Homogeneity value with range (0.04-0.8), Contrast value from 50 to 150, Dissimilarity from 4 to 8, Entropy value with (5-8), ASM and Energy value from 0.0003 to 0.1, and Contrast (Histogram-based) value from −0.5 to 0.9.

FIG. 73 Shows a Compound of Seven Features Query

The output of this query shows that there are 268 images. All these images satisfy with the value range conditions for all features selection on the query.

FIG. 74 shows the output of the query. The Figure shows a table lists all the images and the features of each image in the above query with value of each features.

FIG. 74 Shows the Output of the Query in FIG. 73

The user can see any image in the output's list by clicking on the image name. FIG. 75 shows image.sub.—56.jpg, it is a blue band image which has Homogeneity value (0.4138), Contrast value (87.85), Dissimilarity value (5.131), Entropy value (6.824), ASM value (0.0084), Energy value (0.0919), and Contrast Histogram-based value (0.315).

FIG. 75 Shows a Blue Band Image as an Output of the Query in FIG. 73

FIG. 76 shows image.sub.—1340.jpg, a green band image with values (0.4464), (142.17), (6.137), (7.534), (0.0037), (0.0608), and (0.595) for Homogeneity, Contrast, Dissimilarity, Entropy, ASM, Energy, and Contrast (Histogram-based) features respectively.

FIG. 76 Shows a Green Band Image as an Output of the Query in FIG. 73

FIG. 77 shows image.sub.—957.jpg, a NIR band image with values (0.4182), (75.19), (4.777), (7.693), (0.003), (0.0551), and (0.619) for Homogeneity, Contrast, Dissimilarity, Entropy, ASM, Energy, and Contrast (Histogram_based) features respectively.

FIG. 77 Shows a NIR Band Image as an Output of the Query in FIG. 73

FIG. 78 shows image.sub.—2266.jpg, a red band image with Homogeneity value (0.4404), Contrast value (126.8), Dissimilarity value (5.395), Entropy value (7.179), ASM value (0.004), Energy value (0.0631), and Contrast Histogram_based value (0.887).

FIG. 78 Shows a Red Band Image as an Output of the Query in FIG. 73

The above query searches the all the images in the database whatever the image band as long as the values for each features satisfy with the range value in the query. If the user adds the AVI feature to the selection features in the query, in this case the limit of the searching images will be decreasing, only the images from green and NIR bands will considered as mentioned in Chapter 4 section 4.5.7.

FIG. 79 shows the new query after the user adds the AVI feature with value range (0.2-0.8) to the selected features without changing the values range of the above seven features.

FIG. 79 Shows the New Query After the AVI Feature Added to the Seven Features in FIG. 73

The output of this query shows that the number of the images decreasing to 86 images (forty three images from green band, and forty three images from NIR band), and number of AVI histograms in this search is forty three histograms. FIG. 80 shows the output of the above query in FIG. 79. The Figure shows the AVI values for each histogram in the output search with the values of each selection feature for green and NIR images.

FIG. 80 Shows the Output of the Query in FIG. 79

To see any of the histograms in the output search and the corresponding images related to each histogram, user can click on the AVI and the histogram and the images will appear in new page. FIG. 81 shows the AVI histogram for the AVI.sub.—332 image. The AVI value for this histogram is (0.5602). The Figure shows the histogram and the green (on the left) and NIR (on the right) images. The user can enlarge the images by double clicking on the image.

FIG. 81 Shows the AVI Histogram for the AVI.sub.—332 and the Corresponding Green and NIR Images To expand the query, user can select the NDVI and add it to the selection features. The output of the query will take into consideration all the selection features, and the output image(s) should match all the values range of all feature selections. FIG. 82 shows the new query after the user adds the NDVI feature to selection features. The Figure shows the user input a value range (0-0.9) for the Vegetation feature.

FIG. 82 Shows the New Query with Selection of NDVI Feature

The output of this query shows that there are eleven AVI histograms and eleven NDVI histograms. Number of images in this search is about thirty three images, eleven green images, eleven NIR images, and eleven red images. NIR images belong to both AVI and NDVI histograms. FIG. 83 shows the output of the above query in FIG. 82. The Figure shows the values of the AVI and NDVI histograms, and the values of the features selection for green, NIR, and red images.

FIG. 83 Shows the Output of the Query in FIG. 82

The user is able to compare the AVI and NDVI histograms by clicking on the AVI and NDVI images. FIG. 84 shows the AVI histogram for AVI.sub.—237 and the green and NIR images. The AVI value for the histogram is (0.5096).

FIG. 84 Shows the AVI Histogram for AVI.sub.—237 and the Green and NIR Images

FIG. 85 shows the NDVI histogram for AVI.sub.—237 and the NIR and red images. The vegetation value in this histogram is zero. Notice the NIR image (on the right) is the same on both FIGS. 6.15 and 6.16).

FIG. 85 Shows the NDVI Histogram for AVI.sub.—237 and the NIR and Red Images

The above queries show some examples related to image features, the user is able to go back to the homepage from any page, the prototype system provide this service. The second part the prototype design system provides is the text features search mechanism. As shown in FIG. 70, the second button is Text Features. The user can click on this button to browse the page of the text features. FIG. 86 shows the page of text data features. In this the page the user can see that there are four different features selection, Topic, Discriminating words, Verbs, and Bigrams. The user can select one feature at time. The next page displayed depends on the feature selected.

FIG. 86 Shows the Page of Features Extraction of Text Data

If the user clicks on the Topic feature, a list of 25 topics will be shown on the next page. FIG. 87 shows the Topic_List page. The Figure shows a table that contains a Topic_No and the Topic_Name related to each number.

FIG. 87 Shows the Topic_List Page

To browse any topic of the 25 topics, the user just need to click on the Topic_NO and the documents related to selection topic will appear on the next page. FIG. 88 shows the page related to the Topic_No one "Northern Ireland". In this page user can see the descriptive terms, discriminating terms, single word terms, double word terms, triple word terms, and the documents related to the selection topic. The Figure shows also number of these documents on the second line under the topic's name. FIG. 88 shows 157 documents for the Northern Ireland, as mentioned in Chapter 5. The user can click on any document to read its content.

FIG. 88 Shows the Page Related to the Topic_No One "Northern Ireland"

The second feature is the discriminating words. Once the user clicks on this feature, the discriminating words list page will appear. In this page user can see the list of all discriminating words, see FIG. 89. To see the document(s) where the selected discriminating word appears, user can click on the discriminating word and the next page shows number of documents which contain the selected word. User can browse the documents in the output search by click on the document.

FIG. 89 Shows a Discriminating Words List Page

FIG. 90 shows number of documents where the discriminating word "nuclear" appears. The page shows that there are (591) documents out of the (15863) documents in the dataset, the word "nuclear" appears. Again, the user can click on any document in the output search list to read it.

FIG. 90 Shows Number of Documents Where the Discriminating Word "Nuclear" Appears The third feature in the features extraction of text data page is the Verbs feature. Once the user click on this feature, a verbs_list appear in the next page. The page shows list of verbs sorted alphabetically. For each verb there is a list of one word, two words, and three words. FIG. 91 shows verbs_list page. User selects any verb by clicking on one of the three options one word, two words, or three words, to see the documents where the phrase appears.

FIG. 91 Shows Verbs_List Page

FIG. 92 shows three words phrase for the verb "abandon" The figure shows each phrase and the document(s) where the phrase appears.

FIG. 92 Shows Three Words Phrase for the Verb "Abandon"

The fourth feature is the Bigrams feature. In the Bigrams page user need to type the bigram (two words) in the bigram search box, then click on submit for proceeding the search or reset to cancel the search. As mentioned above, there are about two million bigrams in the database. FIG. 93 shows the Bigrams page, user trying to search in the database for document(s) where the bigram "nuclear weapons" appears.

FIG. 93 Shows the Bigrams Page

FIG. 94 shows the output search for the "nuclear weapons". The Figure shows that there are (188) documents in the database where the bigram "nuclear weapons" found.

FIG. 94 Shows the Output Search for the "Nuclear Weapons"

FIG. 95 shows the output search for the bigram "north korea". The Figure shows (365) documents in the database contain the bigram "north korea". What is interesting in both searches "nuclear weapons" and "north korea", there are some documents appear on both searches, which support what mentioned on the Chapter 1 that documents can be searched in conjunction of different words.

FIG. 95 Shows the Output Search for the Bigram "North Korea"

Chapter 7: Contributions and Future Work 7.1 Summary

In my dissertation I tried to address the challenges of autonomous discovery and triage of the contextually relevant information in massive and complex datasets. The goal was to extract feature vectors from the datasets that would function as digital objects and then effectively reduce the volume of the dataset. Two datasets were considered in my research. The first dataset was text data and the second dataset was remote sensing data.

The text data were documents from Topic Detection and Tracking (TDT) Pilot Corpus collected by Linguistic Data Consortium, Philadelphia, Pa., which were taken directly from CNN and Reuters. The TDT corpus comprised a set of nearly 16000 documents (15863) spanning the period from Jul. 1, 1994 to Jun. 30, 1995.

The objective was to create feature vectors for each document in the dataset, so that the features would reflect semantic content of that document. The documents in the dataset were denoised by removing the stopper words that were too common and did not convey information, and then stemmed by removing suffixes, words like move, moving, and moved become "mov" after stemming.

Four features were extracted from text dataset, topics feature, discriminating words feature, verbs feature, and bigrams feature. The documents in the dataset (15863 documents) are clustered into 25 topics with size range from 157 documents in topic.sub.—1 "Northern Ireland" to 1788 in topic.sub.—25 "Children and Music". The repeated bisection method is used for clustering the documents in the dataset. The second text feature was the discriminating words feature. There were about 250 discriminating words for all the 25 clusters, 10 discriminating words for each cluster.

The third feature is the verbs feature. A list of 5263 relatively common verbs was assembled, and then these verbs were matched with the documents in the dataset (15863 documents). 2863 verbs were used in these documents. Verbs occurring 100 times or more were taken into consideration in the research. A list of 757 verbs was created. For each selected verb in the list, one word, two words, and three words following each verb were computed.

The fourth feature was the bigrams feature. The documents in the dataset were transformed into bigrams and trigrams.

These had significant potential for capturing semantic content because they captured noun-verb pairs or adjective-noun-verb triplets. The bigram (trigram) proximity matrix (BPM, TPM) were constructed by having a word by word matrix were the row entry is the first word in bigram and the column is the second word in the bigram. The bigrams and trigrams were used to clustering the documents as well as typically using a cosine metric. Nearly two million (1,834,123) bigrams were extracted from the documents in the dataset.

The four features were attached to the each document in the dataset as metadata and are used to characterize the content of the documents, and at the same time they are a good way to investigate the relationships among the documents in the dataset.

A minimal Spanning Tree (MST) was used to present some results on text features. It allowed visualizing the relationships among the documents in the dataset. CLUTO was used for analyzing the characteristics of the 25 clusters, and provided tools for understanding the relationships among the different clusters.

The remote sensing images used in this research consisted of 50 gigabytes of the Multi-angle Imagining SpectroRadiometer (MISR) instrument delivered by the Jet Propulsion Laboratory (JPL). A similar approach was commonly applied to create feature vectors for each image in the dataset. One interesting set of features developed based on so-called gray level co-occurrence matrix (GLCM). A 256 by 256 matrix was created to count the number of occurrences of gray levels pairs. Images that have similar GLCM are expected to be similar with respect to characteristics implied by the geospatial relationship used to define the pair of pixels.

Some features that can be constructed based on GLCM were measures of Homogeneity, Contrast, Dissimilarity, Entropy, and Angular Second Moment (ASM). Other computable features include histogram-based contrast, Alternate Vegetation Index (AVI), Normalized Difference Vegetation Index (NDVI).

Similar to the text data approach, these features could be dynamically adapted as a new relevant feature was created. They were attached as metadata about images and function as a digital object. A standard query language was used to search for all images having a particular instance of a given feature. Parallel coordinate plot was used as a data presentation method for the image data.

A prototype system was developed and implemented. In the system, different queries were used in searching for image and text features. Common Gateway Interface (CGI) programs were written in C++ to implement the query capabilities of the prototype system.

7.2 Contribution

In this dissertation, I have developed an autonomous method for adding endogenous metadata to the exogenous metadata that already existed for a text or image database. The approach is general and not restricted to a particular class of data types. Based on this methodology, I created a system for automated metadata and demonstrated it on large-scale text and image datasets. The prototype system demonstrates the feasibility of such an automated metadata retrieval system. Specifically in accomplishing the development of this system, the following elements were pursued and developed:

7.2.1 Text Dataset

I invented the verbs feature. A list of 757 verbs was created. For each selected verb in the list, one word, two words, and three words following each verb were computed. This feature proved very effective in identifying duplicated documents.

I developed a software program in python for computing the (2863) verbs used in the documents of the dataset.

I computed all the four text features. I wrote software code to extract the topics feature, discriminating words features, verbs features, and the bigrams feature.

I used some statistical tools for visualizing the text corpus, and for analyzing and presenting the relationships among documents in the datasets.

I developed software for extracting bigrams in the dataset. A CGI program was written for this purpose.

I developed a prototype system design for searching and extracting all the four text features in the dataset.

7.2.2 Image Dataset

I developed a software to create a 256 by 256 gray level co-occurrence matrix (GLCM)

I developed software to compute some features that were constructed based on GLCM, such as Homogeneity, Contrast, Dissimilarity, Entropy, Energy, and Angular Second Moment (ASM).

I invented two image features. The first one was for the alternate vegetation index (AVI), and the second one for the Contrast histogram based.

I developed software to compute the normalized difference vegetation index (NDVI), alternate vegetation index (AVI), and the Contrast histogram based.

I developed a prototype system design for searching and extracting image features.

I developed software for extracting image features. A CGI program was written for this purpose.

7.4 Conclusion

The interest key in the text application as well as the image application is the concept of automated metadata. Creating a digital object and linking it to the dataset makes the data usable and at the same time the search operation for particular structure in the dataset is a simple indexing operation on the digital objects linked to the data.

In a text dataset, the BPM and TPM are suitable tools for capturing meaning and performing computations to identify semantic similarities among units of discourse. Digital objects corresponding to bigrams or trigrams are attached to each document in the dataset. The same digital object may be attached to many different documents.

Scalability is the important key in working with a massive dataset. In my research, scalability was taken into consideration when clustering the documents in the dataset.

APPENDIX (A)

| a | amongst | because | call | eleven | first |
|---|---|---|---|---|---|
| about | amount | become | can | else | five |
| above | an | becomes | cannot | elsewhere | for |
| across | and | becoming | cant | empty | former |
| after | another | been | could | enough | formerly |
| afterwards | any | before | couldn't | etc | forty |
| again | anyhow | beforehand | de | even | found |
| against | anyone | behind | describe | ever | four |
| all | anything | being | detail | every | from |
| almost | anyway | below | do | everyone | front |

APPENDIX (A)-continued

| | | | | | |
|---|---|---|---|---|---|
| alone | anywhere | beside | done | everything | full |
| along | are | besides | down | everywhere | further |
| already | around | between | due | except | get |
| also | as | beyond | during | few | give |
| although | at | both | each | fifteen | go |
| always | back | bottom | eg | fifty | had |
| am | be | but | eight | fill | has |
| among | became | by | either | find | hasn't |
| have | indeed | more | not | part | sixty |
| he | Interest | moreover | nothing | per | so |
| hence | into | most | now | perhaps | some |
| her | is | mostly | nowhere | please | somehow |
| here | it | move | of | put | someone |
| hereafter | its | much | off | rather | something |
| hereby | itself | must | often | re | sometime |
| herein | keep | my | on | same | sometimes |
| hereupon | last | myself | once | see | somewhere |
| hers | latter | name | one | seem | still |
| herself | latterly | namely | only | seemed | such |
| him | least | neither | onto | seeming | system |
| himself | less | never | or | seems | take |
| his | ltd | nevertheles | other | serious | ten |
| how | made | s | others | several | than |
| however | many | next | otherwise | she | that |
| hundred | may | nine | our | should | the |
| i | me | no | ours | show | their |
| ie | meanwhile | nobody | ourselves | side | them |
| if | might | none | out | since | themselves |
| in | mill | no one | over | sincere | then |
| inc | mine | nor | own | six | thence |
| there | top | whenever | would | | |
| thereafter | toward | where | yet | | |
| thereby | towards | where after | you | | |
| therefore | twelve | whereas | your | | |
| therein | twenty | whereby | yours | | |
| thereupon | two | wherein | yourself | | |
| these | un | whereupon | yourselves | | |
| they | under | wherever | | | |
| thick | until | whether | | | |
| thin | up | which | | | |
| third | upon | while | | | |
| this | us | whither | | | |
| those | very | who | | | |
| though | via | whoever | | | |
| three | was | whole | | | |
| through | we | whom | | | |
| throughout | well | whose | | | |
| thru | were | why | | | |
| thus | what | will | | | |
| to | whatever | with | | | |
| together | when | within | | | |
| too | whence | without | | | |

LIST OF REFERENCES

1. Ali, M., and Clausi, D. (2001) "Using the Canny Edge Detector for Feature Extraction and Enhancement of Remote Sensing Images," Proceeding of International Geosciences and Remote Sensing Symposium, IGARSS, Vol 5, PP: 2298-2300.

2. Aria, E., Saradjian, M., Amini, J., and Lucas, C. (2004) "Generalized Coocurrence Matrix to Classify IRS-ID Images using Neural Network," Geo-Imagery Bridging Continents, 7th ISPRS Congress. Istanbul, Turkey. Vol 7, PP: 117-122.

3. Baraldi, A., and Parmiggiani, F. (1995) "An Investigation of the Textural Characteristics Associated with Gray Level Cooccurrence Matrix Statistical Parameters," IEEE Transaction on Geoscience and Remote Sensing, Vol 33 (2), PP: 293-304.

4. Berry, M., Drmac, Z., and Jessup, E. (1999) "Matrices, Vector Spaces, and Information Retrieval," SIAM Review, Vol 41(2), PP: 335-362.

5. Berry, M., Dumais, S., and O'Brien, G. (1995) "Using Linear Algebra For Intelligent Information Retrieval," SIAM Review, Vol 37, PP: 573-595.

6. Cannattaro, M., Comito, C., Guzzo, A., and Veltri, P. (2004) "Integrating Ontology and Workflow in PROTEUS, a Grid-Based Problem Solving Environment for Bioinformatics," Proceedings of the International Conference on Information Technology Coding and Computing (ITCC'04). Vol 2, PP: 90-94.

7. Cappellini, V., Chiarantini, L., Fini, S., Harridan, E., and Mecocci, A. (1991) "Circular Geological Features Detection in Remote Sensing Multispectral Images", Proceedings of Geoscience and Remote Sensing Symposium, Vol 4, PP: 2057-2060.

8. Chandra, J. (2001) "Understanding High Dimensional and Large Data Sets: Some Mathematical Challenges and Opportunities," in Grossman et al., (2001) Data Mining for Scientific and Engineering Applications, Kluwer Academic Publishers, Norwell, Mass., USA. PP: 23-34.

9. Chen, M., Han, J., and Yu, P. (1996) "Data Mining: An Overview from a Database Perspective," IEEE Transactions on Knowledge and Data Engineering, Vol 8 (6), PP: 866-883.
10. Dhillon, I., Fan, J., and Guan, Y. (2001) "Efficient Clustering of Very Large Document Collection," in Grossman et al., (2001) Data Mining for Scientific and Engineering Applications, Kluwer Academic Publishers, Norwell, Mass., USA. PP: 357-381.
11. Diner, D., Beckert, J., Reilly, T., Bruegge, C., Conel, J., Khan, R., Martonchik, J., Ackerman, T., Davis, R., Gerstl, S., Gordon, H., Muller, J., Myneni, R., Sellers, P., Pinty, B., and Verstraete, M. (1998) "Multi-angle Imaging Spectroradiometer (MISR) Instrument Description and Experiment Overview," IEEE Transactions on Geoscience and Remote Sensing. Vol 36 (4), PP: 1072-1087.
12. Dorre, J., Gerstl. P., and Seiffert, R. (1999) "Text Mining: Finding Nuggest in Mountains of Textual Data," Proceedings of KDD-99 San Diego, Calif., US. PP: 398-401
13. Ester, M., Frommelt, A., Kriegel, H., and Sander, J. (2000) "Spatial Data Mining: Database Primitives, Algorithms and Efficient DBMS Support," Data Mining and Knowledge Discovery, Vol 4 (2/3), PP: 193-216.
14. Ester, M., Kriegel, H., and Sander, J. (1997) "Spatial Data Mining: A Database Approach!" Proceedings of International Symposium on Large Spatial Databases (SSD'97), Berlin, Germany, PP: 47-66.
15. Ester, M., Kriegel, H., and Sander, J. (2001) "Algorithms and Applications for Spatial Data Mining," Geographic Data Mining and Knowledge Discovery, Research Monographs in GIS, Taylor and Francis, PP: 167-187.
16. Fayyad U, M., Piatetsky-Shapiro, G., and Smyth, P. (1996) "From Data Mining to Knowledge Discovery: An Overview," Advances in Knowledge Discovery and Data Mining, AAAI Press, Menlo Park, PP: 1-34.
17. Foltz, P., and Dumais, S. (1992) "Personalized Information Delivery: An Analysis of Information Filtering Methods," Communications of the ACM, Vol 35, PP: 51-60.
18. Gomez, M., Gelbukh, A., Lopez, A., and Yates, R. (2001) "Text Mining With Conceptual Graphs," in IEEE International Conference on Systems, Man, and Cybernetics. PP: 898-903.
19. Granzow, E. (2001) "Automatic Feature Recognition and Extraction from Remote Sensing Imagery," National Consortium for Safety, Hazards, and Disaster Assessment of Transportation Lifelines, Technical Notes, issue 5 (November).
20. Green, B. (2002) "Canny Edge Detection Tutorial," http://www.pages.drexel.edu/.about.weg22/can.tut.html
21. Grossman, R. Creel, E. Mazzucco, M., and Williams, Roy (2001) "A Dataspace Infrastructure for Astronomical Data," In Grossman et al., 2001 Data Mining for Scientific and Engineering Applications, Kluwer Academic Publishers, Norwell, Mass., USA. PP: 115-123.
22. Hall-Bayer, M. (2004) "GLCM Texture: A tutorial," Vol 2.7.1, http://www.ucalgary.ca/.about.mhallbey/texture/texture_tutorial.html
23. Hambrusch, S., Hoffman, C., Bock, M., King, S., and Miller, D. (2003)
"Massive Data: Management, Analysis, Visualization, and Security," A School of Science Focus Area, Purdue University: Report May, 2003.
24. Han, J., and Kamber, M. (2001) "Data Mining: Concepts and Techniques," Morgan Kaufman Publishers, San Francisco, Calif., USA.
25. Haralick, R. M., (1979) "Statistical and Structural Approaches to Texture," Proceedings of the IEEE, Vol 67 (5), PP: 786-804.
26. Hemmer, M., and Gasteiger, J. (2000) "Data Mining in Chemistry," Terena Networking Conference, http://www-.terena.nl/tnc2000/proceedings/10B/10b5.html.
27. Jain, A., and Karu, K. (1996) "Learning Texture Discrimination Masks," IEEE Transactions on Pattern Analysis and Machine Intelligence, Vol (18), PP: 195-205.
28. Kafatos, M., Yang, R., Wang, X., Li, Z., and Ziskin, D. (1998) "Information Technology Implementation for a Distributed Data System Serving Earth Scientists: Seasonal to Interannual ESIP," Proceedings of the 10.sup.th International Conference on Scientific and Statistical Database Management. PP: 210-215.
29. Kamath, C. (2001) "On Mining Scientific Datasets," Data mining for Scientific and Engineering Applications. Kluwer Academic Publishers, Norwell, Mass., USA. PP: 1-21
30. Karypis, G. (2003) "CLUTO: A Clustering Toolkit," University of Minnesota, Department of Computer Science, Minneapolis, Minn. Release 2.1.1. PP:
31. Kim, K., Kim, D., and Aggarwal, J. (1998) "Feature Extraction of Edge by Directional Computation of Grayscale Variation," Proceedings of the 14th International Conference on Pattern Recognition, Vol 2, PP: 1022-1027.
32. King, M., Greenstone, R. (1999) "EOS Reference Handbook," NASA, Washington, D.C.
33. Koperski, K. and Han, J. (1995) "Discovery of Spatial Association Rules in Geographic Information Databases," Proceedings of the 4.sup.th International Symposium on Advances Spatial Databases, Portland, Me. PP: 47-66.
34. Koperski, K., Han, J., and Stefanovic, N. (1998) "An Efficient Two-steps Method for Classification of Spatial Data," Proceedings of Symposium on Spatial Data Handling, Vancouver, Canada. PP: 45-54.
35. Kuan, J., and Lewis, P. (1998) "Complex Texture Classification with Edge Information," In proceeding of the Second International Conference on Visual Information Systems. PP: 157-162.
36. Lee, K., Jeon, S., and Kwon, B. (2004) "Urban Feature Characterization using High-Resolution Satellite Imagery: Texture Analysis Approach," Map Asia Conference, Bejing, China. PP: 228-232.
37. Lewicki, S., Moroney, C., Crean, K., Gluck, S., Miller, K., Smyth, M., and Paradise, S. (2003) "MISR: Data Products Specification," Jet Propulsion Labatory, California Institute of Technology.
38. Lim, J. (1990) "Two Dimensional Signal and Image Processing," Prentice Hall, Englewood Cliffs, N.J.
39. Linguistic Data Consortium (1997) "The TDT Pilot Study Corpus Documentation," Vol 1.3, October 22.
40. Linguistic Data Consortium (1997) "The Topic Detection and Tracking (TDT) Pilot Study Evaluation Plan," Vol 2.8, October 22.
41. Maltseva, E., Pizzuti, C., and Talia, D. (2001) "Mining High-Dimensional Scientific Data Sets Using Singular Value Decomposition," in Grossman et al., (2001) Data Mining for Scientific and Engineering Applications, Kluwer Academic Publishers, Norwell, Mass., USA. PP: 425-438.
42. Martinez, A., and Wegman, E. (2002) "A Text Stream Transformation for Semantic-Based Clustering," Computing Science and Statistics, Vol 34, PP: 184-203.
43. Martinez, A., and Wegman, E. (2002) "Encoding of Text to Preserve Meaning," Proceedings of the Eighth Annual U.S. Army Conference on Applied Statistics. PP: 27-39.

44. Marusic, I., Candler, G., Interrante, V., Subbareddy, P., and Moss, A. (2001) "Real Time Feature Extraction for the Analysis of Turbulent Flows," Data mining for Scientific and Engineering Applications. Kluwer Academic Publishers, Norwell, Mass., USA. PP: 223-238.
45. Ng, R., and Han, J. (1994) "Efficient and Effective Clustering Methods for Spatial Data Mining," Proceedings of the 200.sup.th International Conference on Very Large Databases, Santiago, Chile. PP: 144-155.
46. Palacio, M., Sol, D., and Gonzalez, J. (2003) "Graph-based Knowledge Representation for GIS Data," Proceedings of the 4.sup.th Mexican International Conference on Computer Science (ENC'03). PP: 117-124.
47. Palmason, J., Benediktsson, J., and Arnason, K. (2003) "Morphological Transformations and Feature Extraction for Urban Data with High Spectral and Spatial Resolution," Geoscience and Remote Sensing Symposium, IGARSS, IEEE International, Vol 1, PP: 470-472.
48. Pantel, P., and Lin, D. (2002) "Discovering Word Senses from Text," Proceedings of ACM SIGKDD-01 Conference on Knowledge Discovery and Data Mining, San Francisco, Calif., USA. PP: 613-619.
49. Pierre, J. (2002) "Mining Knowledge from Text Collections Using Automatically Generated Metadata," Proceedings of the 4.sup.th International Conference on Practical Aspects of Knowledge Management, UK. PP: 537-548.
50. Ramachandran, R. Conovers, H., Graves, S., and Keiser, K. (2000) "Challenges and solutions to mining earth science data," In Data Mining and Knowledge Discovery, SPIE Proceedings, Vol 4057, PP: 259-264. http://datamining.itsc.uah.edu/.
51. Rasmussen, M., and Karypis, G. (2004) "gCLUTO-An Interactive Clustering, Visualization, and Analysis System," Technical Report TR#04-021, Department of Computer Science, University of Minnesota, Minneapolis, Minn.
52. Sander, J., Ester, M., and Kriegel, H. (1998) "Density-based Clustering in Spatial Databases: A new Algorithm and its Applications," Data Mining and Knowledge Discovery, Vol 2 (2), PP: 169-194.
53. Sheikholeslami, G., Zhang, A., and Bian, L. (1997) "Geographical Image Classification and Retrieval," Proceeding of GIS Conference'97, LasVegas, Nev., US. PP: 58-61.
54. Shekhar, S. Lu, C., Zhang, P., and Liu, R. (2002) "Data Mining for Selective Visualization of Large Spatial Datasets," Proceedings of the 14.sup.th IEEE International Conference on Tools with Artificial Intelligence (ICTAI'02). PP: 41-48.
55. Skillicorn, D., and Yang, X. (2001) "High-Performance Singular Value Decomposition," in Grossman et al., (2001) Data Mining for Scientific and Engineering Applications, Kluwer Academic Publishers, Norwell, Mass., USA. PP: 401-424.
56. Solka, J., Bryant, A., and Wegman, E. (2005) "Text Data Mining with Minimal Spanning Trees," Handbook of Statistics24: Data Mining and Visualization, Rao, C., Wegman, E., and Solka, J. Elsvier B. V, Netherlands. Vol: 24, PP: 133-169.
57. Sudibjo, E., Lodwick, G., and Pain, S., (1989) "Digital Enhancement of STAR-1 SAR Imagery for Linear Feature Extraction," Geoscience and Remote Sensing Symposium, IGARSS 12th, Vol 4, PP: 2242-2245.
58. Tang, J., Yang, R., Yang, K., and Kafatos, M. (2003) "Prototype of a Value-Range Query Technique on Earth Science Data," Proceedings of the 15th International Conference on Scientific and Statistical Database Management, IEEE, Computer Society. PP: 229-232.
59. Wegman, E. (1997) "A Guide to Statistical Software," http://www.galaxy.gmu.edu/papers/astr1.html
60. Wegman, E. (2003) "Visual Data Mining," Statistics in Medicine, Vol 22, PP: 1383-1397+10 color plates.
61. Wong, P., Wendy, C., Foote, H., Jurrus, E., and Thomas, J. (2000) "Visualizing Sequential Patterns for Text Mining," Proceedings of IEEE Symposium on Information Visualization'2000, Los Alamitos, Calif., 2000. IEEE CS Press. PP: 105-111.
62. Wong, P., Whitney, P. and Thomas, J. (1999) "Visualizing Association Rules for Text Mining," in Graham Wills and Daniel Keim, editors, Proceedings of IEEE Information Visualization'99, Los Alamitos, Calif., 1999. IEEE CS Press. PP: 120-123.
63. Yang, R., Deng, X., Kafatos, M. Wang, C., and Wang, X. (2001) "An XML-Based Distributed Metadata Server (DIMES) Supporting Earth Science Metadata," Proceedings of the 13.sup.th International Conference on Scientific and Statistical Database Management, PP: 251-256.
64. Yang, R. and Kafatos, M. (2001) "Massive Data Sets Issues in Earth Observing," in J. Abello, P. M. Pardalos & M. G. Resende, editors, Handbook of Massive Data Sets, Kluwer Academic Publishers, Dordrecht/Boston/London. PP: 1093-1140.
65. Yang, R., Yang, K., Tang, J., Qu, J., and Kafatos, M. (2003) "A Content-based Search Method and its Application for EOS Data,".
66. Yee, K., Swearingen, K., Li, K., and Hearst, M. (2003) "Faceted Metadata for Image Search and Browsing," Proceedings of the Conference on Human Factors in Computing Systems, ACM Press, PP: 401-408.
67. Zhao, Y., and Karypis, G. (2001) "Criterion Functions for Document Clustering: Experiments and Analysis," Technical Report TR#01-40, Department of Computer Science, University of Minnesota, Minneapolis, Minn. http://cs.umn.edu/.about.karypis/publications
68. Zhao, Y., and Karypis, G. (2002) "Evaluation of Hierarchical Clustering Algorithms for Document Datasets," Proceeding of Information and Knowledge Management, PP: 515-524.

What is claimed is:
1. A tangible computer readable medium encoded with instructions for automatically generating metadata, wherein said execution of said instructions by one or more processors causes said "one or more processors" to perform the steps comprising:
   a. creating at least one feature vector for each document in a dataset;
   b. extracting said one feature vector;
   c. recording said feature vector as a digital object;
   d. augmenting metadata using said digital object to reduce the volume of said dataset, said augmenting capable of allowing a user to perform a search on said dataset.
2. A tangible computer readable medium according to claim 1, wherein said feature vector is one of the following features:
   a. a topic feature;
   b. a discriminating word feature;
   c. a verb feature;
   d. a multigram feature; and
   e. a combination thereof.
3. A tangible computer readable medium according to claim 1, wherein said feature vector reflects semantic content in each of said document for said dataset prior to extraction, said dataset comprising text data.

4. A tangible computer readable medium according to claim 3, wherein said text data is denoised to remove stopper words and stemming words.

5. A tangible computer readable medium according to claim 3, further including linking said document having similar said feature vector, said linking being based one of the following:
   a. empirical patterns;
   b. statistical patterns;
   c. model-based patterns;
   d. clustering;
   e. Minimal Spanning Tree; and
   f. visualization.

6. A tangible computer readable medium according to claim 1, wherein said dataset includes image data.

7. A tangible computer readable medium according to claim 6, wherein said image data is remote sensing data.

8. A tangible computer readable medium according to claim 6, wherein said feature vector extracted from image data uses a grey-level co-occurrence matrix.

9. A tangible computer readable medium according to claim 8, wherein grey-level co-occurrence matrix includes at least one measure, said measure comprising:
   a. homogeneity;
   b. contrast;
   c. dissimilarity;
   d. entropy;
   e. energy;
   f. angular second moment;
   g. histogram-based contrast;
   h. alternate vegetation index;
   i. normalized difference vegetation index;
   j. occurrence of linear features;
   k. occurrence of circular features; and
   l. a combination thereof.

10. A tangible computer readable medium according to claim 9, wherein said measure is adaptable as a new relevant feature.

11. A tangible computer readable medium according to claim 6, wherein a query language is used to search for at least one image in said image data.

12. An automated metadata generation system comprising:
   a. a feature vector creator, configured for creating at least one feature vector for each document in a dataset;
   b. a feature vector extractor, configured for extracting said one feature vector;
   c. a digital object recorder, configured for recording said feature vector as a digital object; and
   d. a metadata augmenter, configured for augmenting metadata using said digital object to reduce the volume of said dataset, said augmenting capable of allowing a user to perform a search on said dataset.

13. An automated metadata generation system according to claim 12, wherein said feature vector is one of the following features:
   a. a topic feature;
   b. a discriminating word feature;
   c. a verb feature;
   d. a multigram feature; and
   e. a combination thereof.

14. An automated metadata generation system according to claim 12, wherein said feature vector reflects semantic content in each of said document for said dataset prior to extraction, said dataset comprising text data.

15. An automated metadata generation system according to claim 14, wherein said text data is denoised to remove stopper words and stemming words.

16. An automated metadata generation system according to claim 14, further including linking said document having similar said feature vector, said linking being based one of the following:
   a. empirical patterns;
   b. statistical patterns;
   c. model-based patterns;
   d. clustering;
   e. Minimal Spanning Tree; and
   f. visualization.

17. An automated metadata generation system according to claim 12, wherein said dataset includes image data.

18. An automated metadata generation system according to claim 17, wherein said image data is remote sensing data.

19. An automated metadata generation system according to claim 17, wherein said feature vector extracted from image data uses a grey-level co-occurrence matrix.

20. An automated metadata generation system according to claim 19, wherein grey-level co-occurrence matrix includes at least one measure, said measure comprising:
   a. homogeneity;
   b. contrast;
   c. dissimilarity;
   d. entropy;
   e. energy;
   f. angular second moment;
   g. histogram-based contrast;
   h. alternate vegetation index;
   i. normalized difference vegetation index;
   j. occurrence of linear features;
   k. occurrence of circular features; and
   l. a combination thereof.

21. An automated metadata generation system according to claim 20, wherein said measure is adaptable as a new relevant feature.

22. An automated metadata generation system according to claim 17, wherein a query language is used to search for at least one image in said image data.

* * * * *